US012551540B2

(12) United States Patent
Choi et al.

(10) Patent No.: US 12,551,540 B2
(45) **Date of Patent: *Feb. 17, 2026**

(54) DOSING AND ADMINISTRATION OF RECOMBINANT L-ASPARAGINASE

(71) Applicant: JAZZ PHARMACEUTICALS IRELAND LTD., Dublin (IE)

(72) Inventors: Mi Rim Choi, Encino, CA (US); Tong Lin, Palo Alto, CA (US); Jeffrey Silverman, Burlingame, CA (US)

(73) Assignee: Jazz Pharmaceuticals Ireland Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,166

(22) Filed: Mar. 30, 2022

(65) Prior Publication Data

US 2022/0323556 A1 Oct. 13, 2022

Related U.S. Application Data

(60) Provisional application No. 63/168,224, filed on Mar. 30, 2021.

(51) Int. Cl.

| | |
|---|---|
| ***A61K 38/50*** | (2006.01) |
| ***A61K 9/00*** | (2006.01) |
| ***A61K 45/06*** | (2006.01) |
| ***A61K 47/60*** | (2017.01) |
| ***A61P 35/00*** | (2006.01) |
| ***A61P 35/02*** | (2006.01) |

(52) U.S. Cl.

CPC ............ *A61K 38/50* (2013.01); *A61K 9/0019* (2013.01); *A61K 45/06* (2013.01); *A61K 47/60* (2017.08); *A61P 35/00* (2018.01); *A61P 35/02* (2018.01); *C12Y 305/01001* (2013.01)

(58) Field of Classification Search

CPC ...... A61K 9/0019; A61K 38/50; A61K 45/06; A61K 47/60; A61P 35/00; A61P 35/02; C12Y 305/01001

See application file for complete search history.

(56) References Cited

U.S. PATENT DOCUMENTS

| | | | | |
|---|---|---|---|---|
| 9,322,008 | B2 | 4/2016 | Kundu et al. | |
| 10,406,235 | B2 | 9/2019 | Ma et al. | |
| 11,141,468 | B2 | 10/2021 | Aguera et al. | |
| 2018/0371446 | A1* | 12/2018 | Friedrich | C12N 9/82 |
| 2019/0010192 | A1 | 1/2019 | Binder et al. | |
| 2019/0127742 | A1 | 5/2019 | Coleman et al. | |
| 2020/0277379 | A1 | 9/2020 | Bostwick et al. | |
| 2021/0032640 | A1 | 2/2021 | Coleman et al. | |
| 2021/0308237 | A1* | 10/2021 | Choi | A61K 9/0019 |
| 2022/0313798 | A1* | 10/2022 | Choi | A61K 45/06 |

FOREIGN PATENT DOCUMENTS

| | | | | |
|---|---|---|---|---|
| CN | 102657852 | A | 9/2012 | |
| EP | 3418383 | A1 | 12/2018 | |
| WO | WO 2011/003633 | A1 | 1/2011 | |
| WO | WO-2019109018 | A1 * | 6/2019 | A61K 38/05 |
| WO | WO 2020/014581 | A1 | 1/2020 | |
| WO | WO 2020/089743 | A1 | 5/2020 | |
| WO | WO 2020/102427 | A1 | 5/2020 | |
| WO | WO 2020/136666 | A1 | 7/2020 | |
| WO | WO 2021/032997 | A1 | 2/2021 | |
| WO | WO 2021/078988 | A1 | 4/2021 | |
| WO | WO 2022/087589 | A1 | 4/2022 | |
| WO | 2022217231 | A1 | 10/2022 | |

OTHER PUBLICATIONS

Lin et. al. (Population pharmacokinetic (PK) model development and simulation for recombinant crisantaspase produced in pseudomonas fluorescence (RC-P), 2020 (Abstract/Poster presented Mar. 18-21, 2020—Clinical Pharmacology and Therapeutics p. S93-S94(PIII-056)) (Year: 2020).*

Vrooman et. al. (Activity and Toxicity of IV Erwinia Asparaginase Following Allergy to *E. coli*-Derived Asparaginase in Children and Adolescents with Acute Lymphoblastic Leukemia, Pediatric Blood and Cancer, May 16, 2015, p. 228-233 (Year: 2015).*

Covini et al., “Expanding Targets for a Metabolic Therapy of Cancer: L-Asparaginase”, Recent Patents on Anti-Cancer Drug Discovery 7: 4-13 (Year: 2012).*

Balcao and Vila, “Structural and functional stabilization of protein entities: state of the art”, Advanced Drug Delivery Reviews 93: 25-41 (Year: 2015).*

Lomelino et al.,“Asparagine synthetase: Function, structure, and role in disease”, Journal of Biological Chemistry 292(49): 19952-19958 (Year: 2017).*

Sun et al.,“SLC1A3 contributes to L-asparaginase resistance in solid tumors”, The EMBO Journal 38: e102147 (Year: 2019).*

Salzer et al.,“Erwinia asparaginase achieves therapeutic activity after pegaspargase allergy: a report from the Children's Oncology Group”, Blood 122(4): 507-514 (Year: 2013).*

Panetta et al., “Higher plasma asparaginase activity after intramuscular than intravenous Erwinia asparaginase”, Pediatr Blood Cancer 67: e28244 pp. 1-4 (Year: 2020).*

Van der Sluis et al., “Consensus expert recommendations for identification and management of asparaginase hypersensitivity and silent inactivation”, Haematologica 100(3): 279-285 (Year: 2016).*

WO, International Search Report and Written Opinion for International Patent Application No. PCT/US2021/032627, 20 pages, Apr. 5, 2022.

Adamson, RH et al. Evaluation of the embryotoxic activity of L asparaginase. Arch Int Pharmacodyn 1970;186(2):310-20.

(Continued)

*Primary Examiner* — Anand U Desai
(74) *Attorney, Agent, or Firm* — Ice Miller LLP

(57) ABSTRACT

The present invention provides compositions and methods for treating a disease treatable by asparagine depletion in a human subject comprising dosing a human subject with L-asparaginase.

20 Claims, 60 Drawing Sheets

Specification includes a Sequence Listing.

(56) References Cited

OTHER PUBLICATIONS

American Cancer Society. Types of Non-Hodgkin Lymphoma in Children; dated Jan. 27, 2016. Available at: https://www.cancer.org/cancer/childhood-non-hodgkin-lymphoma/treating/by-stage.html. Accessed Mar. 20, 2020.
American Cancer Society: Acute Lymphocytic Leukemia (ALL). Atlanta: American Cancer Society; 2021. Available at: https://www.cancer.org/cancer/childhood-non-hodgkin-lymphoma/about/types-non-hodgkin-children.html. Accessed Jan. 31, 2022.
Ashworth, Lae et al., Comparison of the L-Asparaginases from *Escherichia coli* and *Erwinia carotovora* as immunosuppressants. Cancer Res 1974;34:1353-9.
Asparlas, Summary Basis of Approval. Application #761102, Approval Date: Dec. 20, 2018 https://www.accessdata.fda.gov/drugsatfda_docs/nda/2018/761102Orig1s000TOC.cfm.
Asselin, B et al., Asparaginase pharmacokinetics and implications of therapeutic drug monitoring. Leukemia & lymphoma. Aug. 3, 2015; 56(8):2273-80.
Avramis, VI et al., A randomized comparison of native Escherichia coli asparaginase and polyethylene glycol conjugated asparaginase for treatment of children with newly diagnosed standard-risk acute lymphoblastic leukemia: a Children's Cancer Group study. Blood, The Journal of the American Society of Hematology. Mar. 15, 2002;99(6):1986-94.
Ballerini, A et al. Pharmacodynamic effects in the cerebrospinal fluid of rats after intravenous administration of different asparaginase formulations. Cancer Chemother Pharmacol Jun. 2017;79(6):1267-1271. doi: 10.1007/s00280-017-3307-8 . . . .
Barry, E et al., Favorable outcome for adolescents with acute lymphoblastic leukemia treated on Dana-Farber Cancer Institute acute lymphoblastic leukemia consortium protocols. Journal of clinical oncology. Mar. 1, 2007;25(7):813-9.
Bassan, R et al., Lymphoblastic lymphoma: an updated review on biology, diagnosis, and treatment. European journal of Haematology. May 2016; 96(5):447-60.
Benbough, JE et al. The effect of chemical modification of L asparaginase on its persistence in circulating blood of animals. Biochem Pharmacol 1979;28:833.
Berenbaum, MC. Immunosuppression by L-asparaginase. Nature Feb. 7, 1970;225(5232):550-2. doi: 10.1038/225550a0.
Blazek, R et al., Improvement in the persistence of microbial asparaginase and glutaminase in the circulation of the rat by chemical modifications. Biochim Biophys Acta 1981;677:220-4.
Borek, D et al., Sequence analysis of enzymes with asparaginase activity. Acta Biochim Pol 2001;48(4):893-902.
Caruso, V et al., Thrombotic complications in childhood acute lymphoblastic leukemia: a meta-analysis of 17 prospective studies comprising 1752 pediatric patients. Blood. Oct. 1, 2006; 108(7):2216-22.
Celle, G et al. Toxic and immunodepressive effects of L-asparaginase from *E. coli* and from Erwinia carotovora following chronic administration in rats. Arzneimittelforschung 1977;27(11):2046-50.
Chen, Q. et al. Autophagy suppression potentiates the anti-glioblastoma effect of asparaginase in vitro and in vivo. Oncotarget 2017;8(53):91052-66.
Chien, WW et al., Pharmacology, immunogenicity, and efficacy of a novel pegylated recombinant *Erwinia chrysanthemi*-derived L-asparaginase. Invest New Drugs 2014;32:795-805.
Chiu, M et al., Glutamine depletion by crisantaspase hinders the growth of human hepatocellular carcinoma xenografts. Br J Cancer 2014;111:1159-67.
Covini, D. et al. Expanding targets for a metabolic therapy of cancer: L asparaginase. Recent Pat Anticancer Drug Discov 2012;7:4-13.
Dana-Farber Cancer Institute: Childhood Lymphoblastic Lymphoma. Available at: https://www.dana-farber.org/childhood-lymphoblastic-lymphoma/. Accessed Feb. 8, 2021.
Davies, B et al., Physiological parameters in laboratory animals and humans. Pharm Res 1993;10(7):1093-95.
DeAngelo, DJ et al., Long-term outcome of a pediatric-inspired regimen used for adults aged 18-50 years with newly diagnosed acute lymphoblastic leukemia. Leukemia. Mar. 2015; 29(3):526-34.
Durden, DL et al., Kinetic analysis of hepatotoxicity associated with antineoplastic asparaginases. Cancer Res 1983;43(4):1602-5.
Duval, M et al., Comparison of *Escherichia coli*-asparaginase with *Erwinia*-asparaginase in the treatment of childhood lymphoid malignancies: Results of a randomized European Organisation for Research and Treatment of Cancer-Children's Leukemia Group phase 3 trial. Blood 2002;99:2734-9.
Emadi, A et al., Asparaginase in the treatment of non-ALL hematologic malignancies Cancer Chemother Pharmacol 2014;73:875-83.
Erwinaze® (asparaginase Erwinia chrysanthemi) Prescribing Information (withdrawn 2021). Jazz Pharmaceuticals, Inc.; Palo Alto, CA.
Erwinase (L-asparaginase from Erwinia chrysanthemi) for injection, intramuscular or intravenous use. SmPC. Porton Biopharma Ltd. Ireland. Mar. 2021. Available from: https://mri.cts-mrp.eu/Human/Downloads/NL_H_5322_001_FinalPI.pdf.
European Medicines Agency (EMA). Guideline on bioanalytical method validation. Jul. 21, 2011 (Effective: Feb. 1, 2012) Available at: https://www.ema.europa.eu/en/bioanalytical-method-validation.
European Medicines Agency (EMA). Guideline on immunogenicity assessment of therapeutic proteins. May 18, 2017 (Effective: Dec. 1, 2017). Available at: https://www.ema.europa.eu/en/immunogenicity-assessment-biotechnology-derived-therapeutic-proteins.
Figueiredo, L et al., Asparaginase Erwinia chrysanthemi as a component of a multi-agent chemotherapeutic regimen for the treatment of patients with acute lymphoblastic leukemia who have developed hypersensitivity to *E. coli*-derived asparaginase. Expert Review of Hematology. Mar. 3, 2016;9(3):227-34.
Food and Drug Administration (FDA.) Guidance for Industry: Bioanalytical method validation. May 2018.
*Food* and Drug Administration (FDA). Guidance for Industry: Immunogenicity testing of therapeutic proteins-developing and validating assays for anti-drug antibody detection. Feb. 2019. Available at: https://www.fda.gov/regulatory-information/search-fda-guidance-documents/immunogenicity-testing-therapeutic-protein-products-developing-and-validating-assays-anti-drug.
Gervais, D. Acidic isoforms of Erwinase form part of the product: Correlation with clinical experience. Biologicals Mar. 2020;64:28-33. doi: 10.1016/j.biologicals.2020.01.005.
Gupta, S et al., Impact of Asparaginase Discontinuation on Outcome in Childhood Acute Lymphoblastic Leukemia: A Report From the Children's Oncology Group. Journal of Clinical Oncology. Jun. 10, 2020; 38(17):1897-905.
Hall, JG. The partitioning of L-asparaginase between blood and lymph. In: E Grundmann and Oeltgen HF. Recent Results in Cancer Research, vol. 33. Berlin, East Germany; Springer-Verlag. 1970.
Han, T et al., In vitro blastogenesis inhibited by Erwinia carotovora L-asparaginase. Nat New Biol Sep. 13, 19723;239(89):50-1. doi: 10.1038/newbio239050a0.
Hernandez-Ilias et al., "A Phase 1 Study of the Safety, Tolerability, and Pharmacokinetics of Recombinant Crisantaspase Produced in Pseudomonas Fluorescens (RC-PO in Healthy Adults", Blood,, American Society of Hematology, US ,vol. 134, Nov. 13, 2019, p. 3817, XP086674993, ISSN: 006-4971, DOI: 10.1182/BLOOD-2019-123695; the whole document.
Hijiya, N et al., Asparaginase-associated toxicity in children with acute lymphoblastic leukemia. Leukemia & lymphoma. Apr. 2, 2016; 57(4):748-57.
Horowitz et al., Asparagine synthetase activity of mouse leukemias. Science May 3, 1968;160(3827):533-5. doi: 10.1126/science.160.3827.533.
Howard, SC et al., Endocrine complications in pediatric patients with acute lymphoblastic leukemia. Blood reviews. Dec. 1, 2002; 16(4):225-43.
Kanda, P. et al., Determination of glycation levels in Erwinia chrysanthemi asparaginase drug product by liquid chromatography-mass spectrometry. Eur J Pharm Sci Mar. 30, 2020;145:105253. doi: 10.1016/j.ejps.2020.105253.

(56) References Cited

OTHER PUBLICATIONS

Karamitros, CS et al., Human 60-kDa lysophospholipase contains an N-terminal L-asparaginase domain which is allosterically regulated by L-asparagine. J Biol Chem 2014;289(19):12962-75.
Kearney, SL et al., Clinical course and outcome in children with acute lymphoblastic leukemia and asparaginase-associated pancreatitis. Pediatric Blood & Cancer. Aug. 2009; 53(2):162-7.
Kidd J(a). Regression of transplanted lymphomas induced in vivo by means of normal guinea pig serum. I. Course of transplanted cancers of various kinds in mice and rats given guinea pig serum, horse serum, or rabbit serum. J Exp Med 1953;98:565-82.
Kidd J(b). Regression of transplanted lymphomas induced in vivo by means of normal guinea pig serum. II. Studies on the nature of the active serum constituent: Histological mechanism of the regression: Tests for effects of guinea pig serum on lymphoma cells in vitro: Discussion. J Exp Med 1953;98:583-606.
Kloos, RQ et al., Individualized Asparaginase Dosing in Childhood Acute Lymphoblastic Leukemia. Journal of Clinical Oncology. Mar. 1, 2020; 38(7):715-24.
Knoderer, HM et al., Predicting asparaginase-associated pancreatitis. Pediatric blood & cancer. Oct. 15, 2007; 49(5):634-9.
Kotzia, GA et al., I-Asparaginase from *Erwinia chrysanthemi* 3937: Cloning, expression and characterization. J Biotechnol 2007;127:657-69.
Leukemia Foundation. Lymphoblastic Lymphoma, dated Jun. 18, 2019. Available at: https://www.leukaemia.org.au/disease-information/lymphomas/non-hodgkin-lymphoma/other-non-hodgkin-lymphomas/lymphoblastic-lymphoma/. Accessed Mar. 18, 2020.
Lin, T. et al., "Population pharmacokinetic (PK) model development and simulation for recombinant crisantaspase produced in pseudomonas fluorescens (RC-P)", Clinical Pharmacology and Therapeutics, vol. 107, No. S1, Jan. 1, 2020, pp. S93-S94, XP055870146; the whole document.
Lin, T. et al., "A Randomized Phase 1 Study of the Safety, Tolerability, and Pharmacokinetics of Recombinant Erwinia Asparaginase (JZP-458) in Healthy Adult Volunteers", Clin Transl Sci. May 2021;14(3):870-879.
Lin, T. et al., "Population Pharmacokinetic Model Development and Simulation for Recombinant Erwinia Asparaginase Produced in Pseudomonas fluorescens (JZP-458)", Clin Pharmacol Drug Dev. Dec. 2021;10(12):1503-1513.
Liu, C et al., Clinical and genetic risk factors for acute pancreatitis in patients with acute lymphoblastic leukemia. Journal of Clinical Oncology. Jun. 20, 2016; 34(18):2133-2140.
Maese, L et al., "Can recombinant technology address asparaginase Erwinia chrysanthemi shortages?" 2021, Submitted to Pediatric Blood & Cancer.
Maese L et al., "Open-Label, Multicenter, Phase 2/3 Study of Recombinant Crisantaspase Produced in Pseudomonas fluorescens (RC-P) in Patients with Acute Lymphoblastic Leukemia (ALL) or Lymphoblastic Lymophoma (LBL) Following Hypersensitivity to *Escherichia coli*-derived Asparaginases" [abstract]. J Clin Oncol. 2020;38(15_suppl). TPS7568.
Maese L et al., A Phase 2/3 study of JZP-458 in patients with acute lymphoblastic leukemia (ALL)/lymphoblastic lymphoma (LBL) who are hypersensitive to *E. coli*-derived asparaginases [abstract]. J Clin Oncol. 2020;38(15_suppl). TPS7568.
Mayo Clinic. Acute Lymphocytic Leukemia. Available at: https://www.mayoclinic.org/diseases-conditions/acute-lymphocytic-leukemia/symptoms-causes/syc-20369077. Accessed Feb. 8, 2021.
Minetto, P et al., Glutamine-dependence targeting by asparaginase significantly increases anti-myeloma activity of proteasome inhibitors. [Abstract 1796] Blood 2017;130 (Suppl 1).
Minton, NP et al., Nucleotide sequence of the *Erwinia chrysanthemi* NCPPB 1066 L-asparaginase gene. Gene 1986;46:25-35.
Moghrabi, A et al., Results of the Dana-Farber Cancer Institute ALL Consortium Protocol 95-01 for children with acute lymphoblastic leukemia. Blood. Feb. 1, 2007;109(3):896-904.
Nachman, JB et al., Augmented post-induction therapy for children with high-risk acute lymphoblastic leukemia and a slow response to initial therapy. New England Journal of Medicine. Jun. 4, 1998;338(23):1663-71.
National Comprehensive Cancer Network. NCCN Clinical Practice Guidelines in Oncology: Acute Lymphoblastic Leukemia. Version 1.2020, dated Jan. 15, 2020.
National Comprehensive Cancer Network. NCCN Clinical Practice Guidelines in Oncology: Pediatric Acute Lymphoblastic Leukemia. Version 2.2020, dated Nov. 25, 2019.
Neish et al., Inhibition of Rd/3 rat sarcoma by L-asparaginase alone and in combination with sodium para-amino-salicylate. Z Krebsforsch Klin Onkol Cancer Res Clin Oncol 1973;79(2):78-84. doi: 10.1007/BF00284381.
Nguyen, HA et al., A novel L-asparaginase with low L-glutaminase coactivity is highly efficacious against both T and B cell acute lymphoblastic leukemias in vivo. Cancer Res 2018;78(6):1549-60.
Nomme, J et al., Elucidation of the specific function of the conserved threonine triad responsible for human L-asparaginase autocleavage and substrate hydrolysis. J Mol Biol 2014;426:2471-85.
Ogawa, C. et al., Treatment Outcome of Discontinued L-Asparaginase in Children with Standard-Risk Acute Lymphoblastic Leukemia: Tokyo Children's Cancer Study Group (TCCSG) Study L99-15. Blood 2005; 106 (11): 878.
Okusanya, O et al., Intramuscular (IM) or intravenous (IV): Impact of Erwinia asparaginase route of administration on asparaginase activity. Journal of Clinical Oncology 2015; 33:15_suppl, 10031.
Panetta et al., "Higher plasma asparaginase activity after intramuscular than intravenous Erwina asparaginase", Pediatric Blood Cancer 2020:e28244.
Panosyan, EH et al., Asparaginase antibody and asparaginase activity in children with higher-risk acute lymphoblastic leukemia: Children's Cancer Group Study CCG-1961. Journal of Pediatric Hematology/Oncology. Apr. 1, 2004; 26(4):217-26.
Panosyan, EH et al., Deamination of glutamine is a prerequisite for optimal asparagine deamination by asparaginases in vivo (CCG-1961). Anticancer Res Mar.-Apr. 2004;24(2C):1121-5.
Parmentier, JH et al., Glutaminase activity determines cytotoxicity of L-asparaginases on most leukemia cell lines. Leuk Res 2015;39:757-62.
Parsons, SK et al., . Asparaginase-associated lipid abnormalities in children with acute lymphoblastic leukemia. Blood, The Journal of the American Society of Hematology. Mar. 15, 1997; 89(6):1886-95.
Patel, N et al., A dyad of lymphoblastic lysosomal cysteine proteases degrades the antileukemic drug L-asparaginase. J Clin Invest Jul. 2009;119(7):1964-73. doi: 10.1172/JCI37977.
Payne, JH et al., Thrombosis and acute lymphoblastic leukaemia. British journal of haematology. Aug. 2007; 138(4):430-45.
Peng, H. et al., Hypermethylation of CpG islands in the mouse asparagine synthetase gene: relationship to asparaginase sensitivity in lymphoma cells. Partial methylation in normal cells. Br J Cancer 2001;85(6):930-5. doi: 10.1054/bjoc.2001.2000.
Pieters, R et al., L-asparaginase treatment in acute lymphoblastic leukemia: a focus on Erwinia asparaginase. Cancer. Jan. 15, 2011; 117(2):238-49.
Place, AE et al., Intravenous pegylated asparaginase versus intramuscular native *Escherichia coli* L-asparaginase in newly diagnosed childhood acute lymphoblastic leukaemia (DFCI 05-001): a randomised, open-label phase 3 trial. The lancet oncology. Dec. 1, 2015;16(16):1677-90.
Plourde, PV et al., Safety profile of asparaginase Erwinia chrysanthemi in a large compassionate-use trial. Pediatric blood & cancer. Jul. 2014; 61(7):1232-8.
Pui, CH et al., Treatment of acute lymphoblastic leukemia. New England Journal of Medicine. Jan. 12, 2006; 354(2):166-78.
Raetz, EA et al., Tolerability and efficacy of L-asparaginase therapy in pediatric patients with acute lymphoblastic leukemia. J Pediatr Hematol Oncol 2010 32(7):554-63. doi: 10.1097/MPH.0b013e3181e6f003.
Raja, RA et al., Asparaginase-associated pancreatitis in children with acute lymphoblastic leukaemia in the NOPHO ALL 2008 protocol. British journal of haematology. Apr. 2014;165(1):126-33.

(56) References Cited

OTHER PUBLICATIONS

Rank, CU et al., Asparaginase-associated pancreatitis in acute lymphoblastic leukemia: results from the NOPHO ALL2008 treatment of patients 1-45 years of age. Journal of clinical oncology. Jan. 10, 2020;38(2):145.
Riccardi, R et al., L-asparaginase pharmacokinetics and asparagine levels in cerebrospinal fluid of rhesus monkeys and humans. Cancer Res 1981;41(11 Pt 1):4554-8.
Roberts, J. et al., A comparative study of the antitumor effectiveness of *E. coli* and Erwinia asparaginases. Cancer Biochem Biophys 1976;1:175-8.
Runzi, M et al., Drug-associated pancreatitis: facts and fiction. Pancreas. Jul. 1, 1996; 13(1):100-9.
Rutter, DA et al., The influence of the iso-electric point of L-asparaginase upon its persistence in the blood. Br J Exp Pathol 1971;52:610.
Ryu IH, Long-Term Survival after T-cell Lymphoblastic Lymphoma Treated with One Cycle of Hyper-CVAD Regimen. Cancer Res Treat. 2015; 47(1):115-119.
Sahu, S et al., L-asparaginase (Leunase) induced pancreatitis in childhood acute lymphoblastic leukemia. Pediatric hematology and oncology. Jan. 1, 1998;15(6):533-8.
Sallan, W et al., Influence of intensive asparaginase in the treatment of childhood non-T-cell acute lymphoblastic leukemia. Cancer Research. Nov. 1, 1983; 43(11):5601-7.
Salzer, WL et al., Erwinia asparaginase achieves therapeutic activity after pegaspargase allergy: a report from the Children's Oncology Group. Blood. Jul. 25, 2013; 122(4):507-14.
Salzer, WL et al., Development of asparaginase *Erwinia chrysanthemi* for the treatment of acute lymphoblastic leukemia. Ann NY Acad Sci 2014;1329:81-92.
Salzer, WL et al., Asparaginase activity levels and monitoring in patients with acute lymphoblastic leukemia. Leukemia & lymphoma. Aug. 3, 2018; 59(8):1797-806.
Samarasinghe, S et al., . Incidence and outcome of pancreatitis in children and young adults with acute lymphoblastic leukaemia treated on a contemporary protocol, UKALL 2003. British journal of haematology. Sep. 2013;162(5):710-3.
Sanghez, V et al., Efficacy of asparaginase *Erwinia chrysanthemi* with and without temozolomide against glioma cells and intracranial mouse medulloblastoma. Anticancer Res 2018;38:2627-34.
Serravalle, S et al., Synergistic cytotoxic effect of L-asparaginase combined with decitabine as a demethylating agent in pediatric T-ALL, with specific epigenetic signature. Biomed Res Int 2016; Article ID 1985750, 6 pp. http://dx.doi.org/10.1155/2016/1985750.
Siemers, RF et al., High-dose cytosine arabinoside-associated pancreatitis. Cancer. Oct. 15, 1985; 56(8):1940-2.
Silverman, LB et al., Improved outcome for children with acute lymphoblastic leukemia: results of Dana-Farber Consortium Protocol 91-01. Blood, The Journal of the American Society of Hematology. Mar. 1, 2001; 97(5):1211-8.
Sindhu, R. et al., "Expression and characterization of recombinant L-asparginase from *Pseudomonas fluorescens*", Protein Expression and Purification, vol. 143, 2017, pp. 83-91, XP085322762, ISSN: 1046-5928, DOI: 10.1016/J.PEP.2017.09.09. Abstract; figures.
Sobin, LH et al., Alterations in protein and nucleic acid metabolism of lymphoma 6$C_3$HED-og cells in mice given guinea pig serum. J Exp Med 1966;123(1):55-74. doi: 10.1084/jem.123.1.55.
Song, P et al., The role of autophagy in asparaginase-induced immune suppression of macrophages Cell Death Dis 2017;8:e2721; doi:10.1038/cddis.2017.144 2017.
Song, P et al., Asparaginase induces apoptosis and cytoprotective autophagy in chronic myeloid leukemia cells. Oncotarget 2015;6(6):3861-73.
Stock, W et al., What determines the outcomes for adolescents and young adults with acute lymphoblastic leukemia treated on cooperative group protocols? A comparison of Children's Cancer Group and Cancer and Leukemia Group B studies. Blood, The Journal of the American Society of Hematology. Sep. 1, 2008; 112(5):1646-54.
Stock, W et al., Prevention and management of asparaginase/pegasparaginase-associated toxicities in adults and older adolescents: recommendations of an expert panel. Leukemia & Lymphoma. Dec. 1, 2011; 52(12):2237-53.
Stock, W et al., A pediatric regimen for older adolescents and young adults with acute lymphoblastic leukemia: results of CALGB 10403. Blood. Apr. 4, 2019; 133(14):1548-59.
Summary of Product Characteristics. Kidrolase. https://pp.jazzpharma.com/pi/kidrolase.ca.PM-en.pdf. Accessed Mar. 5, 2021.
Tong, WH et al., A prospective study on drug monitoring of PEGasparaginase and Erwinia asparaginase and asparaginase antibodies in pediatric acute lymphoblastic leukemia, Blood. Mar. 27, 2014; 123(13): 2026-2033.
Ueno, T. et al., Cell cycle arrest and apoptosis of leukemia cells induced by L-asparaginase. Leukemia 1997;11:1858-61.
Uren, JR et al., Immunological and pharmacological characterization of poly-DL-alanyl-modified *Erwinia carotovora* L-asparaginase. Cancer Res 1982;42:4068-71.
Uren, JR et al., Improvement in the therapeutic, immunological, and clearance properties of *Escherichia coli* and *Erwinia carotovora* L-asparaginases by attachment of poly-DL-alanyl peptides. Cancer Res 1979;39:1927-33.
Van Der Sluis, IM et al., Consensus expert recommendations for identification and management of asparaginase hypersensitivity and silent inactivation. Haematologica 2016;100(3):279-85.
Vora, A et al., Augmented post-remission therapy for a minimal residual disease-defined high-risk subgroup of children and young people with clinical standard-risk and intermediate-risk acute lymphoblastic leukaemia (UKALL 2003): a randomised controlled trial. The lancet oncology. Jul. 1, 2014;15(8):809-18.
Vrooman, LM et al., Erwinia asparaginase after allergy to *E. coli* asparaginase in children with acute lymphoblastic leukemia. Pediatric Blood & Cancer. Feb. 2010; 54(2):199-205.
Vrooman, LM et al., Postinduction dexamethasone and individualized dosing of *Escherichia coli* L-asparaginase each improve outcome of children and adolescents with newly diagnosed acute lymphoblastic leukemia: results from a randomized study—Dana-Farber Cancer Institute ALL Consortium Protocol 00-01. Journal of Clinical Oncology. Mar. 20, 2013;31(9):1202.
Vrooman, L. et al., "Activity and Toxicity of Intravenous Erwinia Asparaginase Following Allergy to *E.coli*-Derived Asparaginase in Children and Adolescents With Acute Lymphoblastic Leukemia", Pediatric Blood and Cancer, vol. 63, No. 2, Sep. 16, 2015, pp. 228-233, XP055747148, US ISSN: 1545-5009, DOI: 10.1002/pbc,255757; abstract; figures; tables.
Wade, HE et al., A new L-asparaginase with antitumour activity? Lancet 1968;2(7571):776-7. doi: 10.1016/s0140-6736(68)90977-x.
Weaver, G., Steroid-induced pancreatitis. Gastroenterology. Mar. 1, 1982; 82(3):601.
Wolthers, BO et al., Asparaginase-associated pancreatitis: a study on phenotype and genotype in the NOPHO ALL 2008 protocol. Leukemia. Feb. 2017a; 31(2):325-32.
Wolthers, BO et al., Asparaginase-associated pancreatitis in childhood acute lymphoblastic leukemia: an observational Ponte di Legno Toxicity Working Group study. The Lancet Oncology. Sep 1, 2017b; 18(9):1238-48.
Woo, MH et al., Hypersensitivity or development of antibodies to asparaginase does not impact treatment outcome of childhood acute lymphoblastic leukemia. Journal of Clinical Oncology. Apr. 7, 2000; 18(7):1525-32.
Young, DM et al., Clinicopathologic and ultrastructural studies of L asparaginase-induced hypocalcemia in rabbits. An experimental animal model of acute hypoparathyroidism. Lab Invest 1973;29(4):374-86.
Zalewska-Szewczyk, B. et al., "The cross-reactivity of anti-asparaginase antibodies against different l-asparginase preparations", Clinical and Experimental Medicine, Springer-Verlaf, MI, vol. 9, No. 2, Jan. 30, 2009, pp. 113-116, XP019664932, ISSN: 1591-9528. Abstract, "Patient eligibility and treatment schedules"; p. 114.
Study No. SSARL-DPH-72-02; The toxicity of L-asparaginase from Erwinia carotovora (NSC 106977) in rabbits.
Study No. SSARL-DPH-72-05; Effects of *E. coli* L-Asparaginase (NSC 109229) and L-Asparaginase from Erwinia Carotovora (NSC 106977) on Rabbits, Rats, and Hamsters.

(56) References Cited

OTHER PUBLICATIONS

Study No. SSARL-DPH-69-00; Toxicity studies on Erwinia carotovora L-asparaginase Batch Aug. 17, 1969 (NSC 109229) following daily IV administration to rhesus monkeys.
Study No. SSARL-DPH-71-01; Comparative Toxicity of IV Administration of Erwinia Carotovora L-Asparaginase and *E. coli* L-Asparaginase to Rhesus Monkeys.
Study No. SSARL-DPH-71-02; Toxicity studies on NSC 106977, Erwinia L-asparaginase, MRE, Batch 9 following daily IV administration to a rhesus monkey.
Study No. SSARL-DPH-70-07; Non Diabetogenic action of Erwinia L-Asparaginase when administered intravenously to a rhesus monkey and a rabbit.
WO, International Search Report and Written Opinion for International Patent Application No. PCT/US2022/022635, 16 pages, Jul. 5, 2022.
Erwinaze, “Highlights of Prescribing Information: Erwinaze”, pp. 1-9 (Mar. 2016).

* cited by examiner

Figure 1

Table 1. Treatment-emergent Adverse Events (TEAEs)

| Participants with TEAEs by preferred term, n (%) | RC-P, IV 25 mg/m$^2$ (N = 6) | RC-P, IV 37.5 mg/m$^2$ (N = 6) | RC-P, IM 12.5 mg/m$^2$ (N = 6) | RC-P, IM 25 mg/m$^2$ (N = 6) |
|---|---|---|---|---|
| Nausea | 3 (50) | 6 (100) | 2 (33) | 4 (67) |
| Vomiting | 2 (33) | 2 (33) | 1 (17) | 2 (33) |
| Dyspepsia | 1 (17) | 1 (17) | 5 (83) | 0 |
| Leukopenia | 1 (17) | 0 | 0 | 1 (17) |
| Soft feces | 1 (17) | 0 | 0 | 0 |
| Decreased appetite | 0 | 1 (17) | 0 | 0 |
| Diarrhea | 0 | 1 (17) | 0 | 0 |
| Gastroesophageal reflux | 0 | 0 | 0 | 1 (17) |
| Headache | 0 | 0 | 0 | 1 (17) |
| Malaise | 0 | 0 | 0 | 1 (17) |
| Neck pain | 0 | 1 (17) | 0 | 0 |
| Oral disorder | 0 | 0 | 0 | 1 (17) |
| Pain in extremity | 0 | 0 | 1 (17) | 0 |
| Paresthesia | 0 | 1 (17) | 0 | 0 |
| Upper respiratory infection | 0 | 1 (17) | 0 | 1 (17) |

Table 2. Proportion of Participants with Serum Asparaginase Activity Levels ≥0.1 IU/mL at 48 and 72 Hours After RC-P Administration

| Category | SAA Level | RC-P, IV 25 mg/m$^2$ (N = 6) | RC-P, IV 37.5 mg/m$^2$ (N = 6) | RC-P, IM 12.5 mg/m$^2$ (N = 6) | RC-P, IM 25 mg/m$^2$ (N = 6) |
|---|---|---|---|---|---|
| n (%) ≥0.1 IU/mL | SAA at 48 hours | 6 (100) | 6 (100) | 6 (100) | 6 (100) |
| | SAA at 72 hours | 4 (67) | 6 (100) | 6 (100) | 6 (100) |

Figure 2

Proportion of Participants with Serum Asparaginase Activity Levels "0.1 IU/mL at 48 and 72 Hours After RC-P Administration

| Test Article | Condition | Total HMW% | Main Peak % |
|---|---|---|---|
| R-CRIS | Unstressed | 0.3 | 99.7 |
| | 5 Freeze/Thawed (F/T) | 0.4 | 99.6 |
| | 10 F/T | 0.5 | 99.5 |
| *E.coli* RC | Unstressed | 1.0 | 99.0 |
| | 5 F/T | 1.5 | 98.5 |
| | 10 F/T | 1.7 | 97.8 |
| ERWINASE® | Unstressed | 5.8 | 94.2 |
| | 5 F/T | 5.8 | 94.2 |
| | 10 F/T | 5.9 | 94.1 |

Figure 3

Purities of recombinant L-asparaginase, *E.coli*-derived recombinant crisantaspase, and Erwinase® evaluated by the SECMALLS Method.

| **Test Article** | **Condition** | **Tetramer [%]** | **Octamer [%]** | **Higher Aggregates [%]** |
|---|---|---|---|---|
| R-CRIS | Unstressed | 98.7 | 1.1 | 0.1 |
| | 5 Freeze/Thawed (F/T) | 97.7 | 1.8 | 0.3 |
| | 10 F/T | 97.2 | 2.3 | 0.3 |
| ERWINASE® | Unstressed | 92.5 | 5.5 | 1.7 |
| | 5 F/T | 92.0 | 5.9 | 1.9 |
| | 10 F/T | 91.7 | 6.1 | 1.9 |
| *E.coli* RC | Unstressed | 97.2 | 2.1 | 0.2 |
| | 5 F/T | 96.4 | 2.8 | 0.4 |
| | 10 F/T | 96.5 | 2.8 | 0.4 |

Figure 4

Sedimentation velocity AUC data

| Test Article | Condition | Aggregates [%] | Main Peak [%] | Sedimentation coefficient [S] |
|---|---|---|---|---|
| R-CRIS | Unstressed | 1.0 | 99.0 | 7.38 |
| | 5 Freeze/Thawed (F/T) | 1.0 | 99.0 | 7.38 |
| | 10 F/T | 0.6 | 99.3 | 7.36 |
| *E.coli* RC | Unstressed | 3.6 | 96.0 | 7.32 |
| | 5 F/T | 2.6 | 97.4 | 7.35 |
| | 10 F/T | 2.6 | 96.9 | 7.35 |
| ERWINASE® | Unstressed | 5.1 | 94.9 | 7.34 |
| | 5 F/T | 5.4 | 94.6 | 7.36 |
| | 10 F/T | 6.7 | 93.3 | 7.35 |

Figure 5

Size profile of recombinant L-asparaginase assessed by SE-UHPLC

| Sample name | HMW (%) | Main Peak (%) | LMW (%) |
|---|---|---|---|
| R-CRIS | 0.2 | 99.6 | 0.2 |
| ERWINASE® | 6.3 | 93.4 | 0.2 |

Figure 6

High molecular weight species present in the recombinant L-asparaginase measured using SEC-MALLS.

| Sample name | HMW | | Octamer | | Tetramer | | LMW | |
|---|---|---|---|---|---|---|---|---|
| | UV Rel. Peak Area [%] | Mw [kDa] | UV Rel. Peak Area [%] | Mw [kDa] | UV Rel. Peak Area [%] | Mw [kDa] | UV Rel. Peak Area [%] | Mw [kDa] |
| A | 0.04 | 435.10 | 0.26 | 246.30 | 99.28 | 134.80 | 0.42 | 114.50 |
| B | 0.04 | 407.00 | 0.26 | 240.30 | 99.27 | 134.80 | 0.42 | 118.00 |
| Average (n=2) | 0.04 | 421.05 | 0.26 | 243.30 | 99.28 | 134.80 | 0.42 | 116.25 |

Figure 9

Proportion of Healthy Volunteers With SAA Levels at 48 and 72 Hours Postdose

| Category | SAA Level | JZP-458 12.5 mg/m$^2$ IM (N = 6) | JZP-458 25 mg/m$^2$ IM (N = 6) | JZP-458 25 mg/m$^2$ IV (N = 6) | JZP-458 37.5 mg/m$^2$ IV (N = 6) | ERW 25,000 IU/m$^2$ IM (N = 3) | ERW 25,000 IU/m$^2$ IV (N = 3) |
|---|---|---|---|---|---|---|---|
| ≥0.1 IU/mL, n (%) | SAA at 48 hours | 6 (100) | 6 (100) | 6 (100) | 6 (100) | 3 (100) | 3 (100) |
| | SAA at 72 hours | 6 (100) | 6 (100) | 4 (67) | 6 (100) | 3 (100) | 3 (100) |
| ≥0.4 IU/mL, n (%) | SAA at 48 hours | 4 (67) | 6 (100) | 5 (83) | 6 (100) | 3 (100) | 3 (100) |
| | SAA at 72 hours | 0 | 5 (83) | 0 | 1 (17) | 1 (33) | 0 |

Figure 10

PK Summary Based on Serum Asparaginase Activity (SAA)

| Treatment, Mean (CV%) | $C_{max}$ (IU/mL) | $C_{48h}$ (IU/mL) | $C_{72h}$ (IU/mL) | $t_{max}$ (h) | $t_{1/2}$ (h) | $AUC_{0-t}$ (IU•h/mL) | $AUC_{0-inf}$ (IU•h/mL) | CL[a] (L/h) | V[a] (L) |
|---|---|---|---|---|---|---|---|---|---|
| JZP-458 12.5 mg/m$^2$ IM (N = 6) | 0.6 (13.2) | 0.4 (18.7) | 0.2 (32.9) | 24.0 (24.0-36.0) | 23.4 (23.6) | 33.3 (15.1) | 36.9 (18.4) | 0.4 (27.3) | 14.1 (25.1) |
| JZP-458 25 mg/m$^2$ IM (N = 6)[b] | 1.2 (18.8) | 0.9 (17.3) | 0.5 (33.6) | 36.0 (24.0-48.0) | 19.1 (21.8) | 66.3 (15.6) | 67.4 (9.0) | 0.4 (11.1) | 11.7 (20.9) |
| JZP-458 25 mg/m$^2$ IV (N = 6) | 10.9 (10.2) | 0.5 (37.7) | 0.1 (52.3) | 2.3 (2.0-3.5) | 11.5 (12.8) | 181 (20.5) | 182 (20.4) | 0.2 (25.7) | 2.7 (22.4) |
| JZP-458 37.5 mg/m$^2$ IV (N = 6) | 16.8 (18.1) | 1.2 (66.3) | 0.3 (63.8) | 2.3 (2.0-3.5) | 12.6 (11.2) | 315 (29.1) | 317 (29.5) | 0.1 (25.0) | 2.5 (16.6) |
| ERW 25,000 IU/m$^2$ IM (N = 3) | 1.3 (25.7) | 0.9 (11.6) | 0.4 (14.3) | 24.0 (24.0-36.0) | 20.6 (26.1) | 70.5 (15.3) | 75.8 (11.7) | 0.4 (20.8) | 13.0 (32.2) |
| ERW 25,000 IU/m$^2$ IV (N = 3) | 9.0 (21.0) | 0.8 (31.1) | 0.3 (37.6) | 2.0 (2.0-2.5) | 14.9 (12.0) | 180 (14.6) | 183 (15.1) | 0.2 (13.9) | 3.5 (8.1) |

Figure 11

TEAEs (treatment-emergent adverse event) after treatment

| | **JZP-458 12.5 mg/m² IM (N = 6)** | **JZP-458 25 mg/m² IM (N = 6)** | **JZP-458 25 mg/m² IV (N = 6)** | **JZP-458 37.5 mg/m² IV (N = 6)** | **ERW 25,000 IU/m² IM (N = 3)** | **ERW 25,000 IU/m² IV (N = 3)** |
|---|---|---|---|---|---|---|
| **TEAEs, n (%)** | | | | | | |
| Any TEAE | 5 (83) | 4 (67) | 4 (67) | 6 (100) | 2 (67) | 3 (100) |
| Grade 1 | 5 (83) | 4 (67) | 4 (67) | 6 (100) | 2 (67) | 3 (100) |
| Grade 2 | 0 | 1 (17) | 1 (17) | 1 (17) | 0 | 1 (33) |
| Grade ≥3 | 0 | 0 | 0 | 0 | 0 | 0 |
| Serious TEAEs | 0 | 0 | 0 | 0 | 0 | 0 |
| **Treatment-related TEAEs, n (%)[a]** | | | | | | |
| Nausea | 2 (33) | 4 (67) | 3 (50) | 6 (100) | 2 (67) | 3 (100) |
| Vomiting | 1 (17) | 2 (33) | 2 (33) | 2 (33) | 0 | 2 (67) |
| Dyspepsia | 5 (83) | 0 | 0 | 0 | 1 (33) | 0 |
| Headache | 0 | 1 (17) | 0 | 0 | 0 | 1 (33) |
| Leukopenia | 0 | 1 (17) | 1 (17) | 0 | 0 | 0 |
| Decreased appetite | 0 | 0 | 0 | 1 (17) | 0 | 0 |
| Diarrhea | 0 | 0 | 0 | 1 (17) | 0 | 0 |
| Soft feces | 0 | 0 | 1 (17) | 0 | 0 | 0 |
| Gastroesophageal reflux disease | 0 | 1 (17) | 0 | 0 | 0 | 0 |
| Malaise | 0 | 1 (17) | 0 | 0 | 0 | 0 |
| Paresthesia | 0 | 0 | 0 | 1 (17) | 0 | 0 |

Abbreviations: ERW, asparaginase *Erwinia chrysanthemi*; IM, intramuscular; IV, intravenous; TEAE, treatment-emergent adverse event. [a]By preferred term using MedDRA dictionary, version 22.0; treatment-related TEAEs are shown in descending order of frequency.

Figure 12
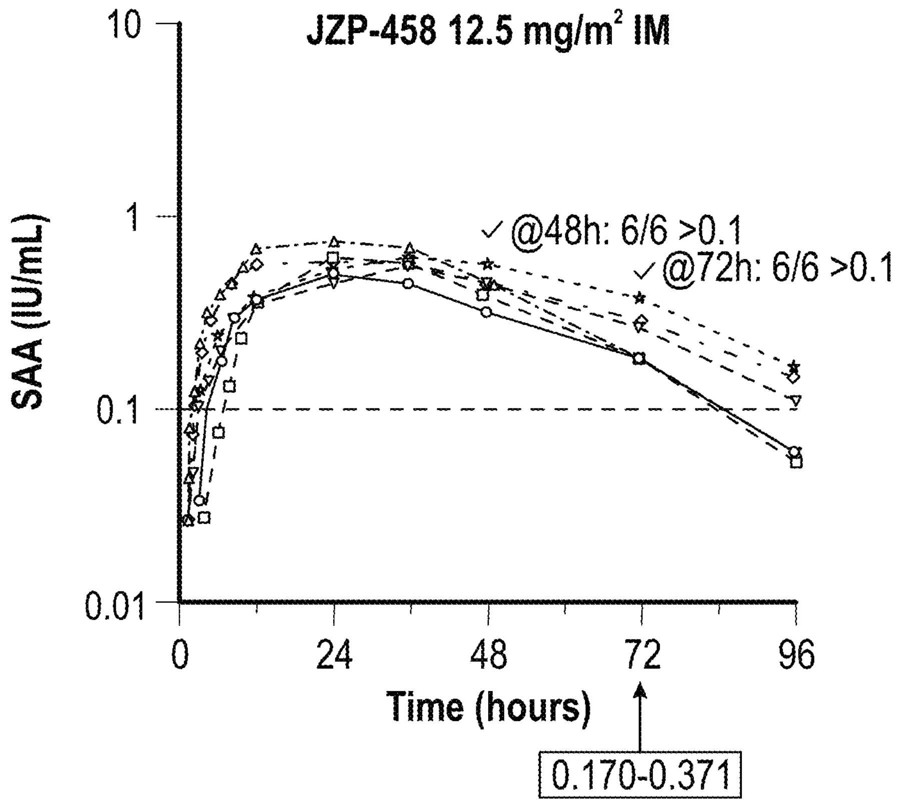
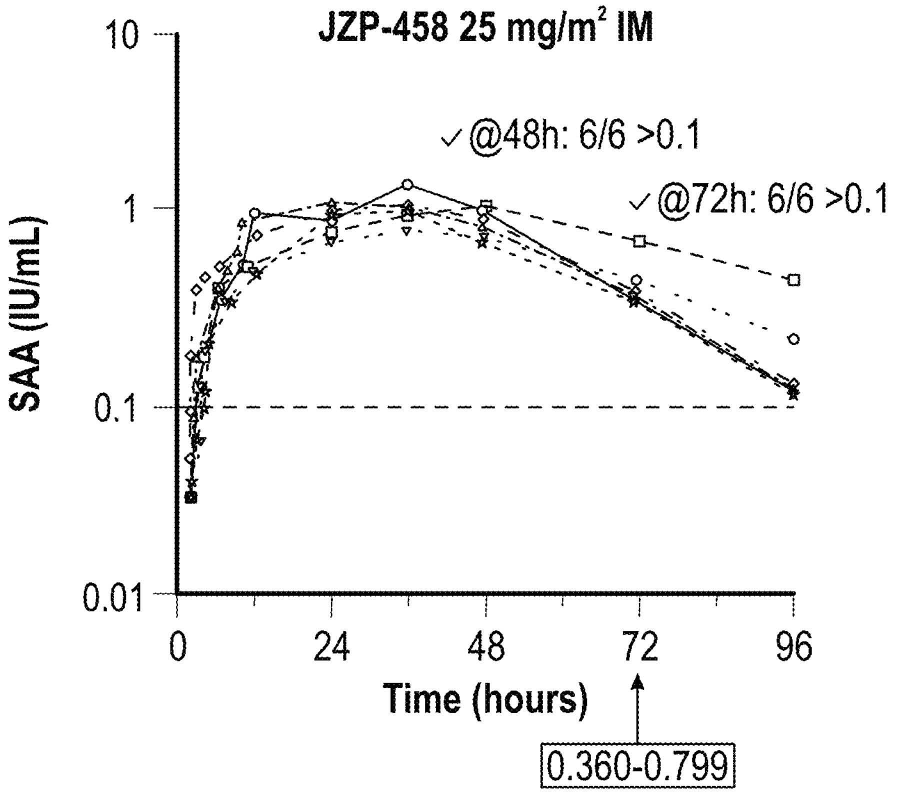

Figure 12 (Continued)
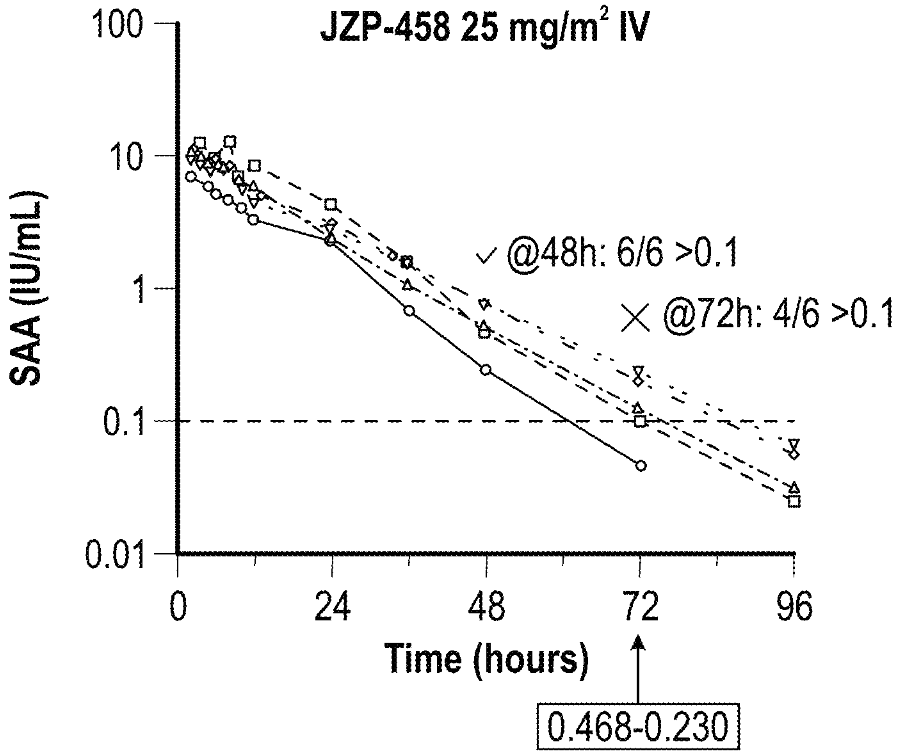
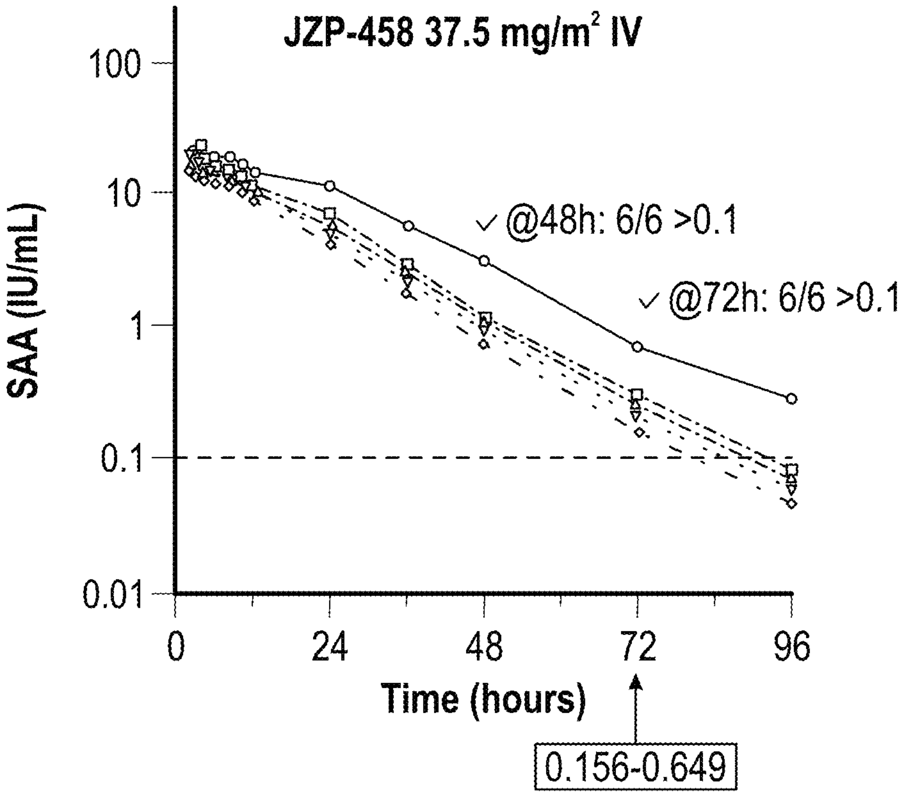

Figure 12 (Continued)
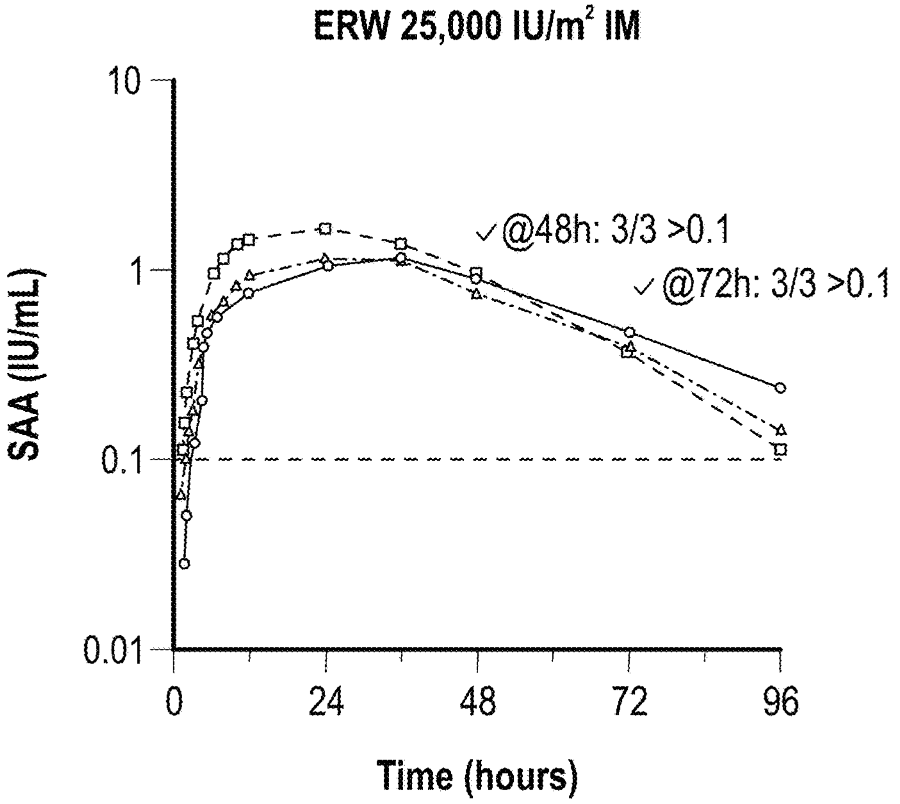
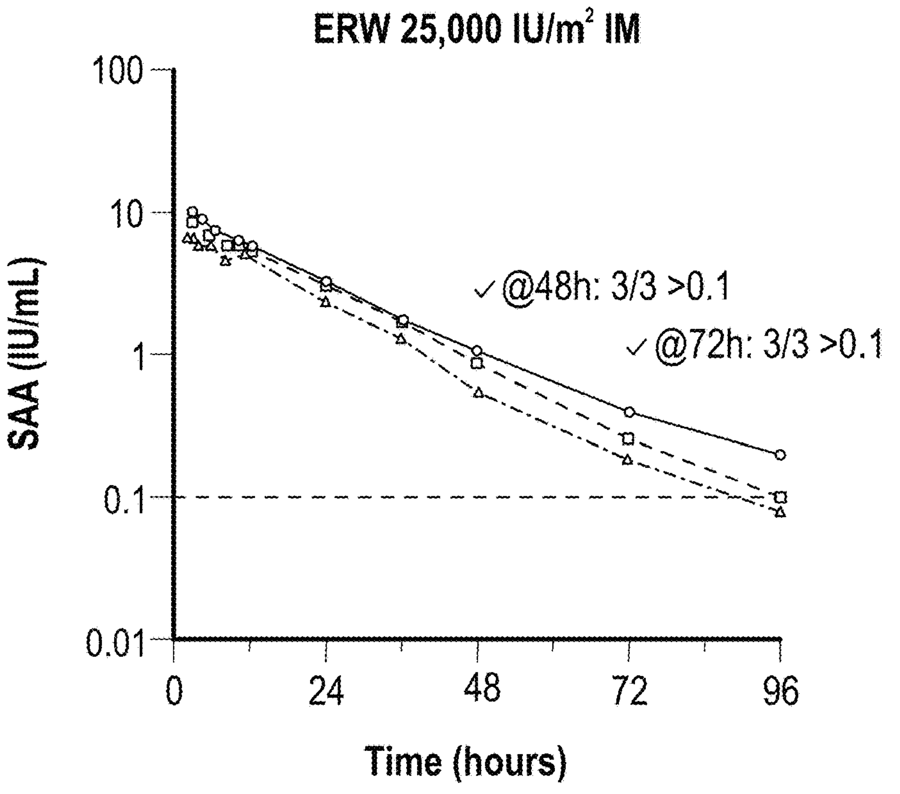

Figure 14C (Continued)
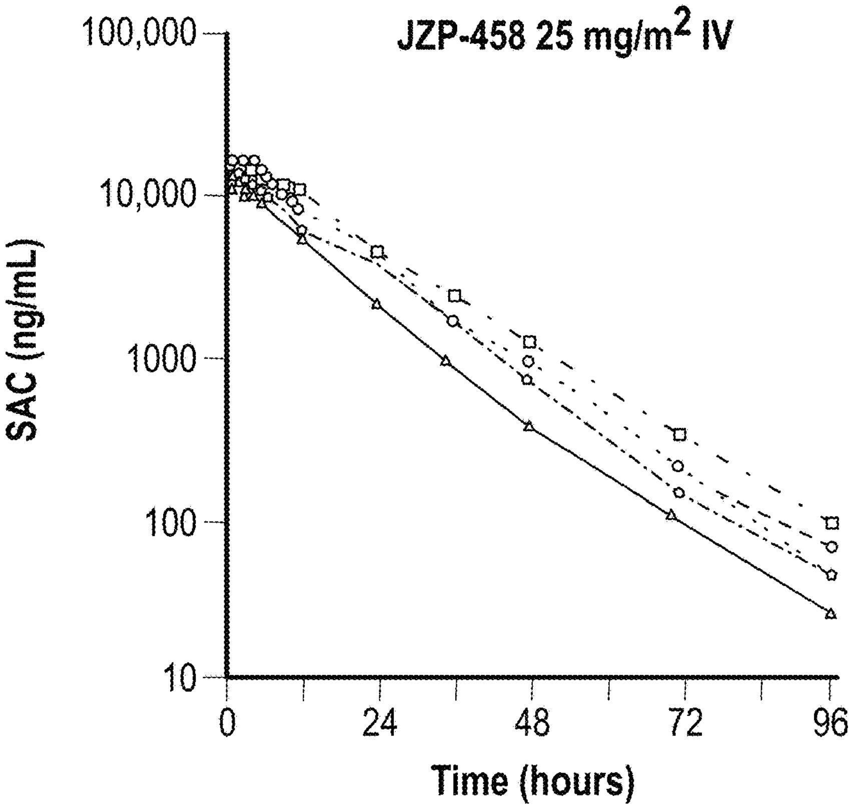
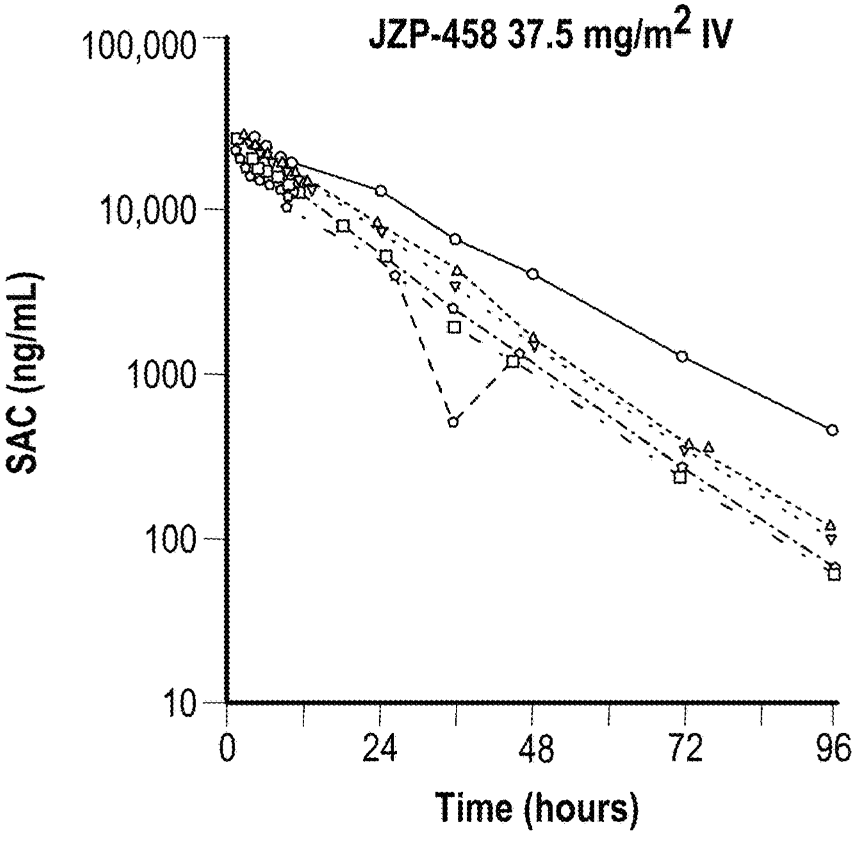

Figure 16

Baseline Demographics

| Characteristic | JZP-458 12.5 mg/m² IM (N = 6) | JZP-458 25 mg/m² IM (N = 6) | JZP-458 25 mg/m² IV (N = 6) | JZP-458 37.5 mg/m² IV (N = 6) | ERW 25,000 IU/m² IM (N = 3) | ERW 25,000 IU/m² IV (N = 3) |
|---|---|---|---|---|---|---|
| Age, mean ± SD, years | 43.0 ± 8.9 | 33.5 ± 7.7 | 33.8 ± 7.1 | 42.8 ± 6.8 | 36.0 ± 10.8 | 41.3 ± 3.8 |
| Male, n (%) | 6 (100) | 4 (67) | 4 (67) | 3 (50) | 1 (33) | 1 (33) |
| Weight, mean ± SD, kg | 80.8 ± 11.2 | 74.4 ± 5.5 | 80.0 ± 10.9 | 78.3 ± 11.0 | 74.9 ± 13.4 | 68.7 ± 8.6 |
| Body surface area, mean ± SD, $m^2$ | 2.0 ± 0.2 | 1.9 ± 0.1 | 2.0 ± 0.1 | 1.9 ± 0.1 | 1.9 ± 0.2 | 1.8 ± 0.1 |
| Ethnicity, n (%)[a] | | | | | | |
| Hispanic/Latino | 6 (100) | 5 (83) | 6 (100) | 6 (100) | 3 (100) | 3 (100) |
| Not Hispanic/Latino | 0 | 1 (17) | 0 | 0 | 0 | 0 |
| Race, n (%) | | | | | | |
| White | 5 (83) | 5 (83) | 5 (83) | 5 (83) | 2 (67) | 3 (100%) |
| Black/African American | 1 (17) | 1 (17) | 1 (17) | 1 (17) | 1 (33) | 0 |

Figure 17

Dose Proportionality Assessment for JZP-458 Based on SAA

| Route of Administration | SAA PK Parameter | n | Slope Estimate | 90% CI for Slope |
|---|---|---|---|---|
| IM | $C_{max}$ (IU/mL) | 12 | 1.02 | (0.77, 1.26) |
| | $AUC_{0-t}$ (IU•h/mL) | 12 | 1.00 | (0.76, 1.23) |
| | $AUC_{0-inf}$ (IU•h/mL) | 11 | 0.89 | (0.64, 1.13) |
| IV | $C_{max}$ (IU/mL) | 12 | 1.04 | (0.66, 1.43) |
| | $AUC_{0-t}$ (IU•h/mL) | 12 | 1.34 | (0.72, 1.95) |
| | $AUC_{0-inf}$ (IU•h/mL) | 12 | 1.33 | (0.72, 1.95) |

Figure 18

PK Summary Based on SAC

| **Treatment, Mean (CV%)** | **$C_{max}$ (ng/mL)** | **$t_{max}$ (h)** | **$t_{1/2}$ (h)** | **$AUC_{0-t}$ (ng•h/mL)** | **$AUC_{0-inf}$ (ng•h/mL)** | **$CL^a$ (L/h)** | **$V^a$ (L)** |
|---|---|---|---|---|---|---|---|
| JZP-458 12.5 mg/$m^2$ IM (N = 6)[b] | 858 (23.7) | 30.0 (24.0-36.0) | 28.9 (51.1) | 50,300 (18.2) | 58,800 (13.3) | 0.4 (22.4) | 11.3 (18.0) |
| JZP-458 25 mg/$m^2$ IM (N = 6) | 1,990 (13.7) | 30.0 (24.0-36.0) | 25.4 (20.0) | 106,000 (15.2) | 121,000 (19.3) | 0.4 (18.5) | 14.3 (13.4) |
| JZP-458 25 mg/$m^2$ IV (N = 6) | 14,400 (16.6) | 2.5 (2.0-4.0) | 12.0 (9.2) | 264,000 (18.8) | 266,000 (18.8) | 0.2 (28.1) | 3.2 (22.1) |
| JZP-458 37.5 mg/$m^2$ IV (N = 6) | 24,200 (7.9) | 2.5 (2.0-5.0) | 12.7 (12.8) | 443,000 (27.4) | 446,000 (28.1) | 0.2 (24.9) | 2.9 (13.3) |
| ERW 25,000 IU/$m^2$ IM (N = 3) | 1,790 (15.6) | 10.0 (10.0-36.0) | 25.3 (18.7) | 102,000 (12.1) | 113,000 (12.6) | 0.4 (25.5) | 15.1 (14.5) |
| ERW 25,000 IU/$m^2$ IV (N = 3) | 14,200 (17.1) | 3.0 (3.0-4.0) | 15.3 (13.2) | 267,000 (18.6) | 271,000 (18.5) | 0.2 (18.1) | 3.3 (16.5) |

Figure 19

Dose Proportionality Assessment for JZP-458 Based on SAC

| Route of Administration | Serum Asparaginase Concentrations PK Parameter | n | Slope Estimate | 90% CI for Slope |
|---|---|---|---|---|
| IM | $C_{max}$ (ng/mL) | 12 | 1.24 | (0.94, 1.54) |
| | $AUC_{0-t}$ (ng•h/mL) | 12 | 1.09 | (0.82, 1.35) |
| | $AUC_{0-inf}$ (ng•h/mL) | 9 | 1.03 | (0.69, 1.36) |
| IV | $C_{max}$ (ng/mL) | 12 | 1.31 | (0.96, 1.66) |
| | $AUC_{0-t}$ (ng•h/mL) | 12 | 1.25 | (0.65, 1.85) |
| | $AUC_{0-inf}$ (ng•h/mL) | 12 | 1.25 | (0.64, 1.86) |

Mean SAA-time Profiles for All Treatments and Corresponding Mean Plasma L-glutamine Levels

Figure 24

Summary of SAA Results (IU/mL) with JZP-458 IM in Course 1 (Evaluable Participants) (Study JZP458-201)

| Route/ Dose Level | Time Point | Mean (95% C1) SAA (IU/mL) | Median (Q1, Q3) SAA (IU/mL) |
|---|---|---|---|
| IM/25 $mg/m^2$ (N = 26) | Last 48 hour | 0.4504 (0.3637-0.5370) | 0.4091 (0.2813, 0.6577) |
| | Last 72 hour | 0.1560 (0.1144-0.1976) | 0.1345 (0.0886, 0.2178) |
| IM/37.5 $mg/m^2$ (N = 16) | Last 48 hour | 0.7146 (0.3976-1.0316) | 0.6503 (0.3248, 0.8736) |
| | Last 72 hour | 0.2605 (0.1326-0.3884) | 0.1732 (0.1157, 0.2849) |

Abbreviations: IM = intramuscular; Q1 = first quartile; Q3 = third quartile; SAA = serum asparaginase activity Source: Table 9 (Cohort 1a), Appendix 1; Table 9 (Cohort 1b), Appendix 2

Figure 25

Proportion of Participants with NSAA Levels ≥ 0.1 and ≥ 0.4 IU/mL at the Last 48 and 72 Hours in Course 1 (Evaluable Participants)
(Study JZP458-201)

| NSAA Level | Time Point | JZP-458, IM 25, mg/m$^2$ (N = 26) | JZP-458, IM 37.5 mg/m$^2$ (N = 16) |
|---|---|---|---|
| ≥ 0.1 IU/mL n (%) | Last 48 hour | 25 (96.2) | 15 (93.8) |
| | Last 72 hour | 17 (65.4) | 13 (81.3) |
| ≥ 0.4 IU/mL, n (%) | Last 48 hour | 13 (50.0) | 9 (56.3) |
| | Last 72 hour | 1 (3.8) | 3 (18.8) |

Abbreviations: IM = intramuscular; NSAA = nadir serum asparaginase activity
Source: Tables 1.1 and 1.2 (Cohort 1a), Appendix 1; Tables 1.1 and 1.2 (Cohort 1b), Appendix 2

Figure 27

Proportion of Patients Treated with JZP-458 Expected to Achieve Target SAA Trough Levels (FMW Dosing Schedule (Phase 2/3 JZP485-201 IM Simulation Model)

| Route/ Dose Level | Proportion of Patients ≥ 0.1 IU/mL (95% C1) | | | Mean SAA (IU/mL) (95% PI) | | |
|---|---|---|---|---|---|---|
| | Dose 1 72-Hour Trough | Dose 4[a] 72-Hour Trough | Dose 5 48-Hour Trough | Dose 1 72-Hour Trough | Dose 4[a] 72-Hour Trough | Dose 5 48-Hour Trough |
| IM/25 mg/m$^2$ | 62.4 (60.2, 64.5) | 68.7 (66.7, 70.7) | 99.1 (98.6, 99.5) | 0.15 (0.03, 0.38) | 0.19 (0.04, 0.56) | 0.37 (0.12, 0.87) |
| IM/37.5 mg/m$^2$ | 84.1 (82.4, 85.7) | 87 (85.5, 88.5) | 99.9 (99.7, 100) | 0.23 (0.06, 0.6) | 0.29 (0.06, 0.88) | 0.58 (0.2, 1.32) |
| IM/50 mg/m$^2$ | 92.4 (91.2, 93.6) | 94.2 (93.2, 95.2) | 100 (100, 100) | 0.31 (0.07, 0.77) | 0.39 (0.08, 1.15) | 0.77 (0.25, 1.75) |
| IM/65 mg/m$^2$ | 96.4 (95.6, 97.2) | 97.4 (96.7, 98.1) | 100 (100, 100) | 0.39 (0.09, 0.98) | 0.49 (0.1, 1.41) | 0.98 (0.31, 2.16) |
| IM/80 mg/m$^2$ | 98.9 (98.4, 99.3) | 99.3 (98.9, 99.6) | 100 (100, 100) | 0.48 (0.12, 1.22) | 0.61 (0.13, 1.83) | 1.21 (0.41, 2.78) |

Abbreviations: CL = clearance; IM = intramuscular; SAA = serum asparaginase activity
Proportion represents the number calculated for 2000 simulated subjects per dose level.
FMW = A dosing schedule of Friday, Monday, and Wednesday. Patient population age was 2 to 85 y ears.
The 95% Wald C1 was calculated using SAS proc freq with the following option: / binomial (CL = WALD).
95% P1 = prediction interval based on the percentiles (2.5 and 97.5 percentiles) for the simulated data
[a] Indicates the last 72hours, which is the primary endpoint in the JZP458-201 protocol.
Source: PPK Modeling and Simulation Memorandum, Table 5

Figure 28

Overview of Treatment-emergent Adverse Events (Safety Analysis Set) (Study JZP458-201)

| Number (%) of Participants with the following: | JZP-458, IM 25 $mg/m^2$ (N = 31) | JZP-458, IM 37.5 $mg/m^2$ (N = 17) |
|---|---|---|
| Any TEAEs | 26 (83.9) | 13 (76.5) |
| Serious TEAEs | 9 (29.0) | 3 (17.6) |
| Treatment-related TEAEs | 13 (41.9) | 9 (52.9) |
| Serious treatment-related TEAEs | 1 (3.2) | 2 (11.8) |
| Grade 3 or 4 TEAEs | 18 (58.1) | 6 (35.3) |
| Treatment-related Grade 3 or 4 TEAEs | 6 (19.4) | 4 (23.5) |
| TEAEs leading to discontinuation of study drug | 1 (3.2) | 0 |
| Treatment-related TEAEs leading to discontinuation of study drug | 1 (3.2) | 0 |
| TEAEs leading to death | 0 | 0 |

Figure 29

Grade 3 or 4 Treatment-emergent Adverse Events (Safety Analysis Set, Cohort 1a) (Study JZP458-201)

| Preferred Term, n (%) | JZP-458, IM 25 mg/m$^2$ (N = 31) |
|---|---|
| At least 1 Grade 3 or 4 TEAE | 18 (58.1) |
| Neutrophil count decreased | 9 (29.0) |
| White blood cell count decreased | 5 (16.1) |
| Febrile neutropenia | 6 (19.4) |
| Anemia | 5 (16.1) |
| Lymphocyte count decreased | 3 (9.7) |
| Platelet count decreased | 3 (9.7) |
| Alanine aminotransferase increased | 2 (6.5) |
| Neutropenia | 1 (3.2) |
| Lymphocyte count increased | 1 (3.2) |
| Decreased appetite | 1 (3.2) |
| Methaemoglobinaemia | 1 (3.2) |
| Stomatitis | 1 (3.2) |
| Fatigue | 1 (3.2) |
| Pyrexia | 1 (3.2) |
| Drug hypersensitivity | 1 (3.2) |
| Upper respiratory tract infection | 1 (3.2) |
| Lymphocyte count increased | 1 (3.2) |
| Dehydration | 1 (3.2) |
| Hypertriglyceridaemia | 1 (3.2) |
| Presyncope | 1 (3.2) |
| Uncoded event | 1 (3.2) |

Figure 30

Grade 3 or 4 Treatment-emergent Adverse Events (Safety Analysis Set, Cohort 1b) (Study JZP458-201)

| **Preferred Term, n (%)** | **JZP-458, IM 37.5 mg/m$^2$ (N = 17)** |
|---|---|
| At least 1 Grade 3 or 4 TEAE | 6 (35.3) |
| Febrile neutropenia | 3 (17.6) |
| Neutrophil count decreased | 2 (11.8) |
| Platelet count decreased | 1 (5.9) |
| Anemia | 1 (5.9) |
| Sinus tachycardia | 1 (5.9) |
| Proctalgia | 1 (5.9) |
| Fatigue | 1 (5.9) |
| Allergic transfusion reaction | 1 (5.9) |

Figure 31

JZP458-201—Summary of Treatment-emergent Adverse Events (Data cut-off date: 14 Oct. 2021)

| Number (%) of Participants with: | IM 25 mg/m$^2$ MWF (N = 33) | IM 37.5 mg/m$^2$ MWF (N = 53) | Total (N = 86) |
|---|---|---|---|
| Any TEAEs | 32 (97.0) | 51 (96.2) | 83 (96.5) |
| Serious TEAEs | 15 (45.5) | 12 (22.6) | 27 (31.4) |
| Treatment-related TEAEs | 17 (51.5) | 33 (62.3) | 50 (58.1) |
| Serious treatment-related TEAEs | 1 (3.0) | 4 (7.5) | 5 (5.8) |
| Grade 3 or 4 TEAEs | 22 (66.7) | 34 (64.2) | 56 (65.1) |
| Treatment-related Grade 3 or 4 TEAEs | 9 (27.3) | 18 (34.0) | 27 (31.4) |
| TEAEs leading to study drug discontinuation | 1 (3.0) | 2 (3.8) | 3 (3.5) |
| Treatment-related TEAEs leading to study drug discontinuation | 1 (3.0) | 2 (3.8) | 3 (3.5) |
| TEAEs leading to death | 0 | 0 | 0 |

Abbreviations: CTCAE=Common Terminology Criteria for Adverse Events; IM=intramuscular; MedDRA=Medical Dictionary for Regulatory Activities; MWF=Monday, Wednesday, Friday; PT=Preferred Term; SOC=System Organ Class; TEAE=treatment-emergent adverse event.

Figure 32

Study JZP458-201—Summary of Treatment-emergent Adverse Events in Cohort 1c (Safety Analysis Set; Data Cut-off Date: 11 Jan. 2021)

| **Number (%) of Participants with:** | **IM 25 (MW)/ 50 (F) mg/m$^2$ (N = 16)** |
|---|---|
| Any TEAEs | 13 (81.3) |
| Serious TEAEs | 4 (25.0) |
| Treatment-related TEAEs | 9 (56.3) |
| Serious treatment-related TEAEs | 1 (6.3) |
| Grade 3 or 4 TEAEs | 8 (50.0) |
| Treatment-related Grade 3 or 4 TEAEs | 5 (31.3) |
| TEAEs leading to study drug discontinuation | 1 (6.3) |
| Treatment-related TEAEs leading to study drug discontinuation | 1 (6.3) |
| TEAEs leading to death[b] | 0 |

Abbreviations: CTCAE=Common Terminology Criteria for Adverse Events; IM=intramuscular; MedDRA=Medical Dictionary for Regulatory Activities; PT=Preferred Term; SOC=System Organ Class. TEAE=treatment-emergent adverse event.

Figure 33A

Demographic and Baseline Characteristics (Safety Analysis Set as of 19 Jul. 2021)

| | IM 25 mg/m² MWF (N = 33) | IM 37.5 mg/m² MWF (N = 83) | IM 25 (M/W)/ 50 (F) mg/m² (N = 51) | IM Total (N = 167) | IV 25 (M/W)/ 50 (F) mg/m² (N = 61) |
|---|---|---|---|---|---|
| **Sex (n [%])** | | | | | |
| Female | 16 (48.5) | 28 (33.7) | 20 (39.2) | 64 (38.3) | 25 (41.0) |
| Male | 17 (51.5) | 55 (66.3) | 31 (60.8) | 103 (61.7) | 36 (59.0) |
| **Ethnicity (n [%])** | | | | | |
| Hispanic or Latino | 13 (39.4) | 23 (27.7) | 17 (33.3) | 53 (31.7) | 20 (32.8) |
| Not Hispanic or Latino | 18 (54.5) | 56 (67.5) | 32 (62.7) | 106 (63.5) | 35 (57.4) |
| Declined to state | 2 (6.1) | 4 (4.8) | 2 (3.9) | 8 (4.8) | 6 (9.8) |
| **Race (n [%])** | | | | | |
| American Indian or Alaska Native | 0 | 0 | 3 (5.9) | 3 (1.8) | 2 (3.3) |
| Asian | 1 (3.0) | 5 (6.0) | 1 (2.0) | 7 (4.2) | 3 (4.9) |
| Black or African American | 3 (9.1) | 11 (13.3) | 8 (15.7) | 22 (13.2) | 2 (3.3) |
| Native Hawaiian or other Pacific Islander | 0 | 0 | 0 | 0 | 0 |
| White | 24 (72.7) | 58 (69.9) | 33 (64.7) | 115 (68.9) | 43 (70.5) |
| Declined to state | 0 | 0 | 0 | 0 | 0 |
| Multiple | 1 (3.0) | 0 | 0 | 1 (0.6) | 1 (1.6) |
| Not reported | 4 (12.1) | 9 (10.8) | 6 (11.8) | 19 (11.4) | 10 (16.4) |
| **Age at enrollment (years)** | | | | | |
| n | 33 | 83 | 51 | 167 | 61 |
| Mean | 11.5 (7.11) | 9.6 (5.08) | 11.3 (5.41) | 10.2 (5.71) | 10.4 (6.30) |
| Median | 11.0 | 8.0 | 12.0 | 10.0 | 10.0 |
| Minimum, Maximum | 1, 24 | 1, 20 | 3, 25 | 1, 25 | 1, 24 |
| **Age subgrouping (n [%])** | | | | | |
| < 6 years | 9 (27.3) | 24 (28.9) | 11 (21.6) | 44 (26.3) | 20 (32.8) |
| 6 years to < 12 years | 9 (27.3) | 34 (41.0) | 14 (27.5) | 57 (34.1) | 14 (23.0) |
| 12 years to < 18 years | 7 (21.2) | 20 (24.1) | 18 (35.3) | 45 (26.9) | 17 (27.9) |

Abbreviations: ALL=acute lymphoblastic leukemia; B ALL=B-cell acute lymphoblastic leukemia; B LBL=B cell lymphoblastic lymphoma; BSA=body surface area; IM=intramuscular; LBL=lymphoblastic lymphoma; T ALL=T cell acute lymphoblastic leukemia; T cell lymphoblastic lymphoma; T LBL=T cell lymphoblastic lymphoma.

Figure 33B

Demographic and Baseline Characteristics (Safety Analysis Set as of 19 Jul. 2021)

| | IM 25 mg/m² MWF (N = 33) | IM 37.5 mg/m² MWF (N = 83) | IM 25 (MW)/ 50 (F) mg/m² (N = 51) | IM Total (N = 167) | IV 25 (MW)/ 50 (F) mg/m² (N = 61) |
|---|---|---|---|---|---|
| ≥ 18 years | 8 (24.2) | 5 (6.0) | 8 (15.7) | 21 (12.6) | 10 (16.4) |
| | | | | | |
| 1 year to < 6 years | 9 (27.3) | 24 (28.9) | 11 (21.6) | 44 (26.3) | 20 (32.8) |
| 6 years to < 12 years | 9 (27.3) | 34 (41.0) | 14 (27.5) | 57 (34.1) | 14 (23.0) |
| 12 years to < 17 years | 6 (18.2) | 15 (18.1) | 17 (33.3) | 38 (22.8) | 16 (26.2) |
| ≥ 17 years | 9 (27.3) | 10 (12.0) | 9 (17.6) | 28 (16.8) | 11 (18.0) |
| **Body surface area (m²) (n [%])** | | | | | |
| n | 33 | 82 | 53 | 168 | 61 |
| Mean | 1.283 (0.540) | 1.149 (0.452) | 1.346 (0.530) | 1.236 (0.505) | 1.256 (0.556) |
| Median | 1.280 | 1.010 | 1.290 | 1.185 | 1.180 |
| Minimum, Maximum | 0.44, 2.53 | 0.56, 2.26 | 0.54, 2.40 | 0.44, 2.53 | 0.52, 2.42 |
| **Body surface area (n [%])** | | | | | |
| 0 < BSA ≤ 1 | 12 (36.4) | 41 (49.4) | 17 (33.3) | 70 (41.9) | 26 (42.6) |
| 1 < BSA ≤ 2 | 19 (57.6) | 36 (43.4) | 28 (54.9) | 83 (49.7) | 30 (49.2) |
| 2 < BSA | 2 (6.1) | 5 (6.0) | 6 (11.8) | 13 (7.8) | 5 (8.2) |
| **Primary disease (n [%])** | | | | | |
| ALL | 0 | 0 | 0 | 0 | 0 |
| B-ALL | 27 (81.8) | 60 (72.3) | 37 (72.5) | 124 (74.3) | 51 (83.6) |
| T-ALL | 4 (12.1) | 13 (15.7) | 9 (17.6) | 26 (15.6) | 7 (11.5) |
| LBL | 0 | 0 | 0 | 0 | 0 |
| B-LBL | 0 | 0 | 1 (2.0) | 1 (0.6) | 2 (3.3) |
| T-LBL | 2 (6.1) | 10 (12.0) | 4 (7.8) | 16 (9.6) | 1 (1.6) |
| **Time since primary disease diagnosis to Study Day 1 (n [%])** | | | | | |
| 0 to 3 months | 28 (84.8) | 55 (66.3) | 39 (76.5) | 122 (73.1) | 47 (77.0) |
| 4 to 6 months | 5 (15.2) | 24 (28.9) | 11 (21.6) | 40 (24.0) | 14 (23.0) |
| 7 to 9 months | 0 | 4 (4.8) | 1 (2.0) | 5 (3.0) | 0 |
| 10 to 12 months | 0 | 0 | 0 | 0 | 0 |
| > 12 months | 0 | 0 | 0 | 0 | 0 |
| **Prior asparaginase treatment (n [%])** | | | | | |
| Oncaspar | 33 (100) | 83 (100) | 51 (100) | 167 (100) | 60 (98.4) |
| Other | 0 | 0 | 0 | 0 | 1 (1.6) |

Abbreviations: ALL=acute lymphoblastic leukemia; B ALL=B-cell acute lymphoblastic leukemia; B LBL=B cell lymphoblastic lymphoma; BSA=body surface area; IM=intramuscular; LBL=lymphoblastic lymphoma; T ALL=T cell acute lymphoblastic leukemia; T cell lymphoblastic lymphoma; T LBL=T cell lymphoblastic lymphoma.

Figure 33C

Demographic and Baseline Characteristics (Safety Analysis Set as of 19 Jul. 2021)

| | IM 25 mg/m$^2$ MWF (N = 33) | IM 37.5 mg/m$^2$ MWF (N = 83) | IM 25 (MW)/ 50 (F) mg/m$^2$ (N = 51) | IM Total (N = 167) | IV 25 (MW)/ 50 (F) mg/m$^2$ (N = 61) |
|---|---|---|---|---|---|
| **Time since last asparaginase received to Study Day 1 (days)** | | | | | |
| n | 33 | 83 | 51 | 167 | 61 |
| Mean | 16.8 (20.90) | 27.6 (37.67) | 23.8 (29.73) | 24.3 (32.68) | 24.9 (28.98) |
| Median | 9.0 | 10.0 | 10.0 | 10.0 | 13.0 |
| Minimum, Maximum | 2, 116 | 2, 158 | 2, 133 | 2, 158 | 2, 138 |
| **Eligibility Criteria (n [%])** | | | | | |
| Grade 2 allergic reaction to an *E. coli*-derived asparaginase | 0 | 0 | 0 | 0 | 0 |
| Grade ≥ 3 allergic reaction to an *E. coli*-derived asparaginase | 27 (81.8) | 75 (90.4) | 44 (86.3) | 146 (87.4) | 44 (72.1) |
| Silent inactivation | 3 (9.1) | 3 (3.6) | 1 (2.0) | 7 (4.2) | 8 (13.1) |
| Allergic reaction with inactivation | 3 (9.1) | 5 (6.0) | 6 (11.8) | 14 (8.4) | 9 (14.8) |

Abbreviations: ALL=acute lymphoblastic leukemia; B ALL=B-cell acute lymphoblastic leukemia; B LBL=B cell lymphoblastic lymphoma; BSA=body surface area; IM=intramuscular; LBL=lymphoblastic lymphoma; T ALL=T cell acute lymphoblastic leukemia; T cell lymphoblastic lymphoma; T LBL=T cell lymphoblastic lymphoma.

Figure 34

Study JZP458-201 – Summary of Serum Asparaginase Activity Results (IU/mL) With JZP-458 (Intramuscular and Intravenous) in Course 1 (Efficacy Analysis Set as of 19 July 2020)

| Route/ Dose Level | Time Point | N | Mean (95% CI) NSAA (IU/mL) | Median (Q1, Q3) NSAA (IU/mL) |
|---|---|---|---|---|
| IM 25 mg/m$^2$ MWF | Last 48 hour | 32 | 0.4489 (0.3720, 0.5258) | 0.4091 (0.2742, 0.6545) |
| | Last 72 hour | 28 | 0.1553 (0.1158, 0.1948) | 0.1345 (0.0859, 0.2257) |
| IM 37.5 mg/m$^2$ MWF | Last 48 hour | 83 | 0.8828 (0.7589, 1.0068) | 0.7370 (0.4706, 1.0853) |
| | Last 72 hour | 76 | 0.3305 (0.2740, 0.3870) | 0.2741 (0.1714, 0.4055) |
| IM 25 (MW)/ 50 (F) mg/m$^2$ | Last 48 hour | 49 | 0.6550 (0.5366, 0.7733) | 0.5988 (0.3338, 0.8877) |
| | Last 72 hour | 49 | 0.4677 (0.3492, 0.5862) | 0.3828 (0.1676, 0.5871) |
| IV 25 (MW)/ 50 (F) mg/m2 | Last 48 hour | 59 | 0.2450 (0.1999, 0.2902) | 0.2028 (0.1264, 0.3527) |
| | Last 72 hour | 50 | 0.1016 (0.0736, 0.1297) | 0.0818 (0.0372, 0.1399) |

Fig. 35
Correlation Between Serum Asparaginase Concentration and Serum Asparaginase Activity for Intramuscular and Intravenous JZP-458 in Course 1
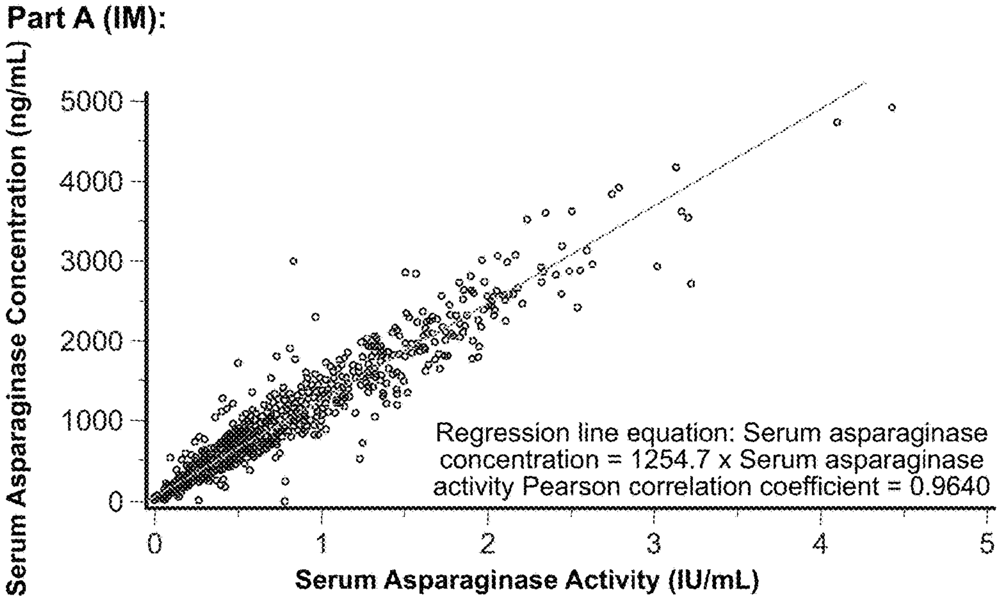
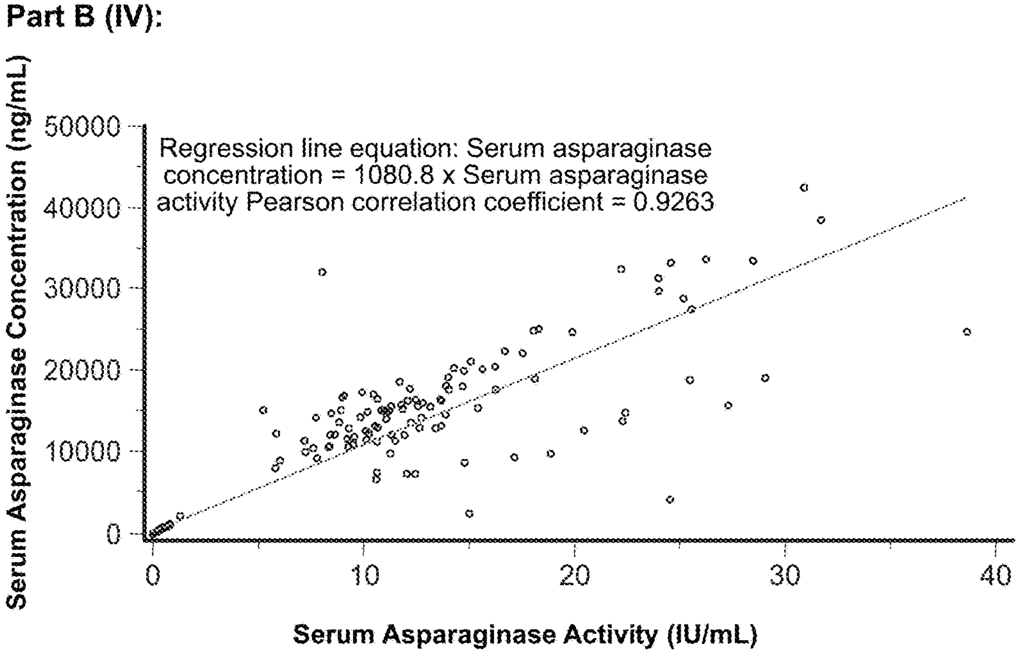

Fig. 36A (Cont.)
Part A (IM): WFM Schedule
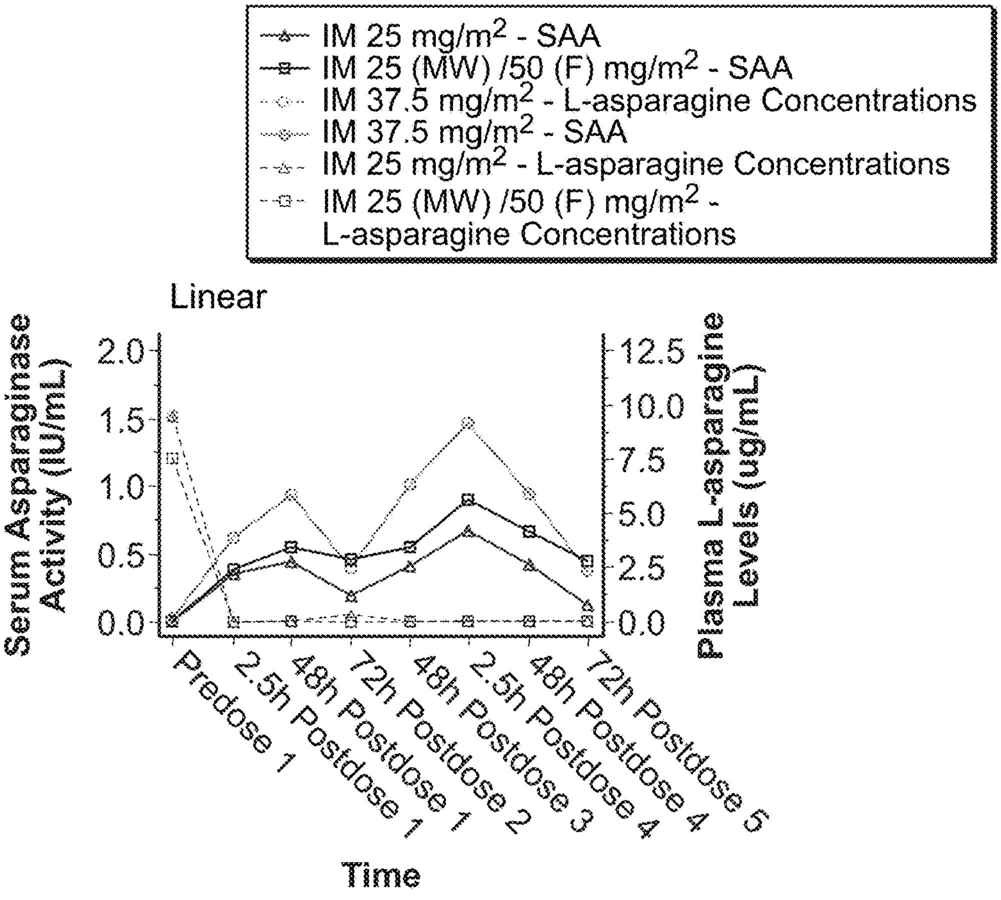
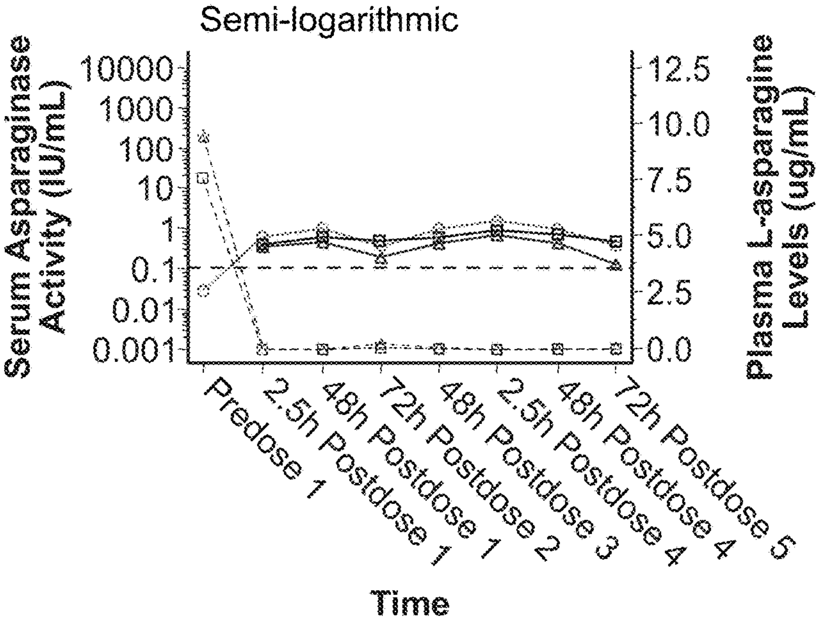

Fig. 36B (Cont.)
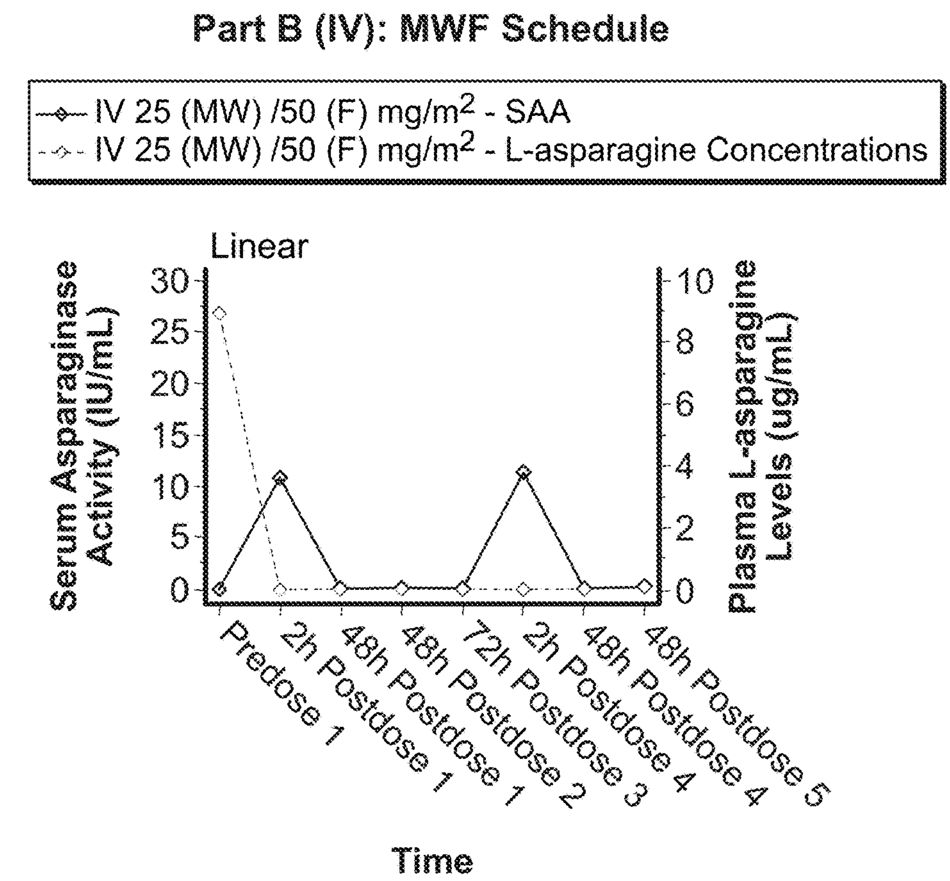
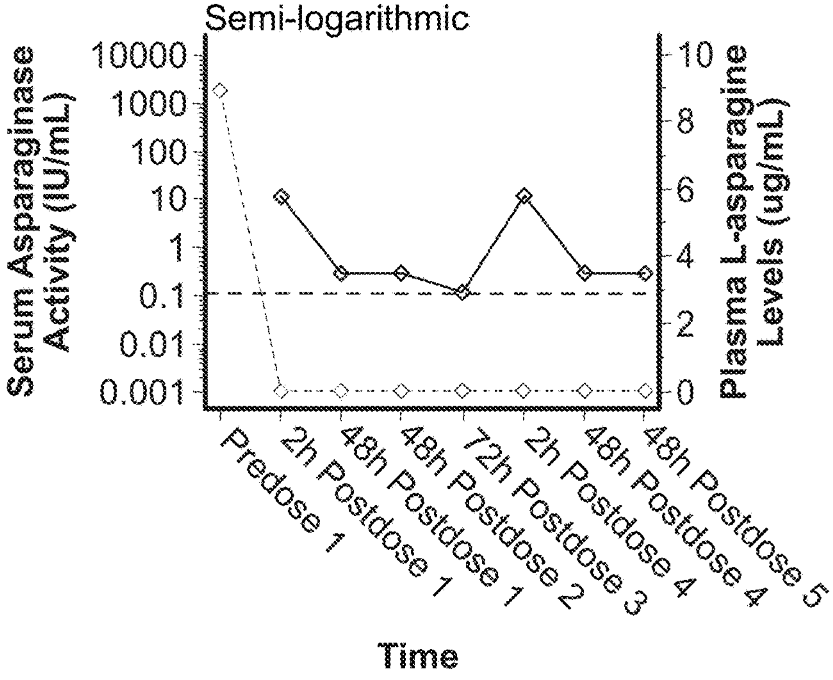

Fig. 37B (Cont.)
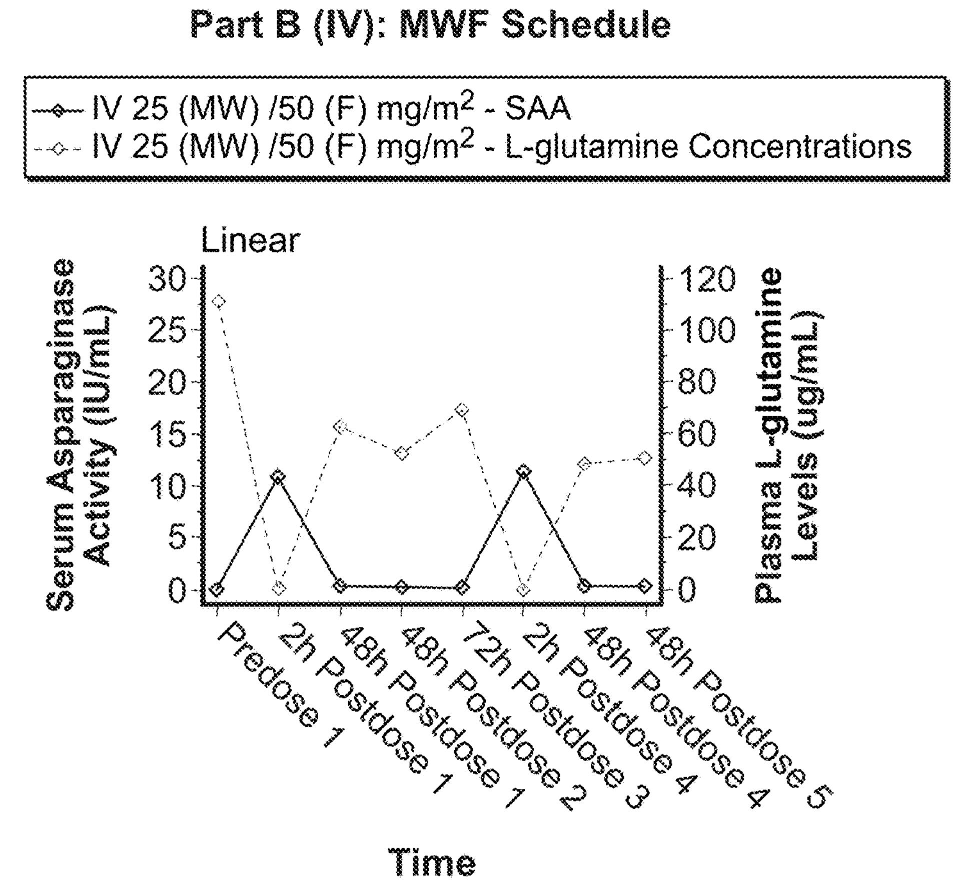
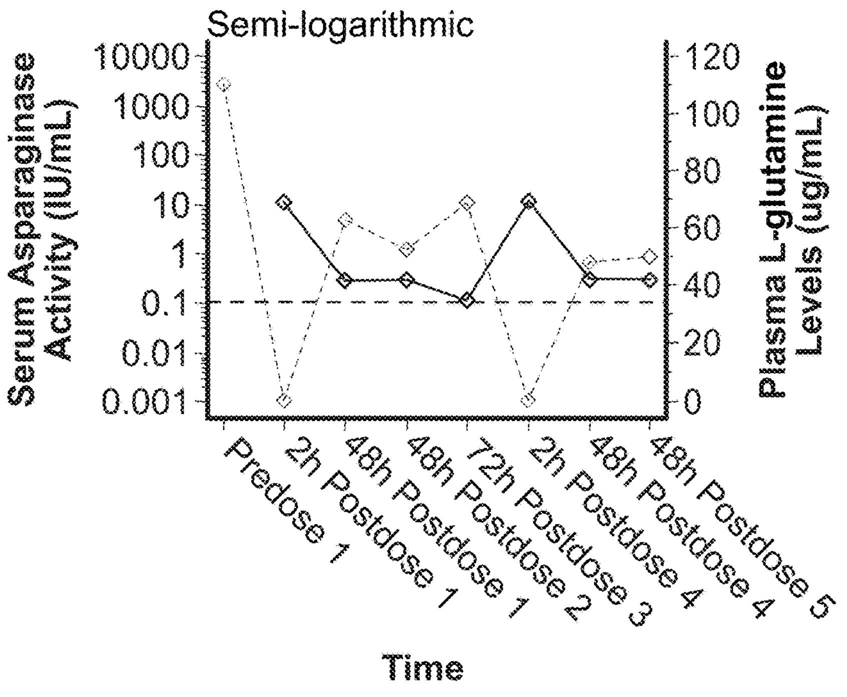

Figure 38

Dose Proportionality of JZP-458

| Dose ($mg/m^2$) | Mean $C_{max,1}$ (IU/mL) | Mean $C_{max,6}$ (IU/mL) | $AUC_{0-336}$ |
|---|---|---|---|
| 25 | 1.250 | 1.470 | 282.8 |
| 37.5 | 2.033 | 2.376 | 478.5 |
| DP ($C_{max}$ at 37.5/ $C_{max}$ at 25) | 1.63 | 1.62 | 1.69 |

Figure 39

Accumulation of JZP-458

| Dose ($mg/m^2$) | Mean $C_{max,1}$ (IU/mL) | Mean $C_{max,6}$ (IU/mL) | Accumulation Ratio |
|---|---|---|---|
| 25 | 1.250 | 1.470 | 1.18 |
| 37.5 | 2.033 | 2.376 | 1.17 |

Tiered Immunogenicity Testing Strategy

Figure 41

Study JZP458-201 – Maximum Number of Courses With Antidrug Antibody Collection (Data Cut-off Date: 19 July 2021)

| Maximum Number of Courses with ADA Collection | IM 25 $mg/m^2$ MWF (N = 33) n (%) | IM 37.5 $mg/m^2$ MWF (N = 83) n (%) | IM 25 (MW)/ 50 (F) $mg/m^2$ (N = 51) n (%) | IM Total (N = 167) n (%) | IV 25 (MW)/ 50 (F) $mg/m^2$ (N = 61) n (%) |
|---|---|---|---|---|---|
| 1 | 4 (12.1) | 17 (20.5) | 5 (9.8) | 26 (15.6) | 34 (55.7) |
| 2 | 2 (6.1) | 4 (4.8) | 6 (11.8) | 12 (7.2) | 18 (29.5) |
| 3 | 4 (12.1) | 8 (9.6) | 12 (23.5) | 24 (14.4) | 6 (9.8) |
| 4 | 1 (3.0) | 14 (16.9) | 16 (31.4) | 31 (18.6) | 1 (1.6) |
| 5 | 10 (30.3) | 18 (21.7) | 7 (13.7) | 35 (21.0) | 1 (1.6) |
| 6 | 8 (24.2) | 16 (19.3) | 4 (7.8) | 28 (16.8) | 0 |
| 7 | 1 (3.0) | 2 (2.4) | 0 | 3 (1.8) | 0 |
| 8 | 1 (3.0) | 1 (1.2) | 0 | 2 (1.2) | 0 |
| 10 | 0 | 1 (1.2) | 0 | 1 (0.6) | 1 (1.6) |
| 11 | 0 | 0 | 1 (2.0) | 1 (0.6) | 0 |
| 14 | 2 (6.1) | 0 | 0 | 2 (1.2) | 0 |
| 15 | 0 | 2 (2.4) | 0 | 2 (1.2) | 0 |

Figure 42A

Study JZP458-201—Summary of SAA Levels in ADA+Participants Who Had at Least 1 SAA Level<0.1 IU/mL in Course 1

| Participant ID/ Cohort/ Route/ Dose ($mg/m^2$)/ Schedule | Assay | Dose 1 Pre-dose | Dose 1 2.5h Post-dose | Dose 1 48h Post-dose | Dose 1 72h Post-dose | Dose 2 48h Post-dose | Dose 2 72h Post-dose | Dose 3 48h Post-dose | Dose 3 72h Post-dose | Dose 4 2.5h Post-dose | Dose 4 48h Post-dose | Dose 4 72h Post-dose | Dose 5 48h Post-dose | Dose 5 72h Post-dose |
|---|---|---|---|---|---|---|---|---|---|---|---|---|---|---|
| Route: Intramuscular | | | | | | | | | | | | | | |
| 17172002/ 1A / IM / 25/ FMW | SAA (IU/mL) | BLQ | 0.4978 | N/A | 0.1587 | 0.2037 | N/A | 0.0868 | N/A | 0.3076 | N/A | BLQ | 0.0855 | N/A |
| | SAC (ng/mL) | BLQ | 558.0 | N/A | 196.5 | 264.2 | N/A | 66.82 | N/A | 284.5 | N/A | 9.770 | 103.0 | N/A |
| 17132004/ 1B / IM / 37.5/ MWF | SAA (IU/mL) | BLQ | 0.1613 | 1.5664 | N/A | 1.5884 | N/A | N/A | 0.2349 | 0.3776 | 0.0703 | N/A | BLQ | N/A |
| | SAC (ng/mL) | BLQ | 198.1 | 1805 | N/A | 1845 | N/A | N/A | 354.4 | 441.9 | 28.11 | N/A | 1.896 | N/A |
| 13032004/ 1C / IM / 25(MWF)/50(F)/ MWF | SAA (IU/mL) | BLQ | 0.2410 | 0.3256 | N/A | 0.2341 | N/A | N/A | 0.0453 | 0.1360 | BLQ | N/A | 0.0510 | N/A |
| | SAC (ng/mL) | BLQ | 328.8 | 449.5 | N/A | 344 | N/A | N/A | 29.31 | 54.73 | 2.748 | N/A | 7.479 | N/A |
| 30012005/ 1C / IM / 25(MWF)/50(F)/ MWF | SAA (IU/mL) | BLQ | 0.1736 | 0.2703 | N/A | 0.2014 | N/A | N/A | 0.0369 | NR1 | NR1 | N/A | 0.0755 | N/A |
| | SAC (ng/mL) | BLQ | 188.9 | 344.7 | N/A | 266 | N/A | N/A | 85.66 | 138 | NC | N/A | 99.8 | N/A |

Abbreviations: ADA=antidrug antibody; BLQ=below the limit of quantification; FMW=Friday, Monday, Wednesday; h=hour; MWF=Monday, Wednesday, Friday; N/A=not applicable; SAA=serum asparaginase activity.

Figure 42B

Study JZP458-201—Summary of SAA Levels in ADA + Participants Who Had at Least 1 SAA Level<0.1 IU/mL in Course 1

| Participant ID/ Cohort/ Route/ Dose (mg/m²)/ Schedule | Assay | Dose 1 Pre-dose | Dose 1 2.5h Post-dose | Dose 1 48h Post-dose | Dose 1 72h Post-dose | Dose 2 48h Post-dose | Dose 2 72h Post-dose | Dose 3 48h Post-dose | Dose 3 72h Post-dose | Dose 4 2.5h Post-dose | Dose 4 48h Post-dose | Dose 4 72h Post-dose | Dose 5 48h Post-dose | Dose 5 72h Post-dose |
|---|---|---|---|---|---|---|---|---|---|---|---|---|---|---|
| Route: Intravenous | | | | | | | | | | | | | | |
| | | | | | | | | | | | | | | |
| 11072008/ 1A / IV / 25(MWF)/SkFY/ FMW | SAA (IU/mL) | BLQ | 16.6872 | N/A | 0.0410 | 0.0730 | N/A | BLQ | N/A | 14.6902 | N/A | BLQ | BLQ | N/A |
| | SAC (ng/mL) | BLQ | 22320 | N/A | 54.65 | 116.1 | N/A | 12.40 | N/A | 17980 | N/A | BLQ | BLQ | N/A |
| 19222008/ 1A / IV / 25(MWF)/SkFY/ WFM | SAA (IU/mL) | BLQ | OOW | OOW | N/A | N/A | 0.0789 | 0.0509 | N/A | 10.7963 | BLQ | N/A | N/A | BLQ |
| | SAC (ng/mL) | BLQ | OOW | OOW | N/A | N/A | 95.3 | 13.19 | N/A | 11340 | BLQ | N/A | N/A | BLQ |
| 19242004/ 1A / IV / 25(MWF)/SkFY/ WFM | SAA (IU/mL) | BLQ | 12.0948 | 0.1291 | N/A | N/A | 0.0403 | 0.1612 | N/A | 15.0495 | 0.2135 | N/A | N/A | 0.0395 |
| | SAC (ng/mL) | BLQ | 16250 | 170.0 | N/A | N/A | 62.27 | 218.0 | N/A | 21090 | 294.6 | N/A | N/A | 86.99 |

Abbreviations: ADA=antidrug antibody; BLQ=below the limit of quantification; FMW=Friday, Monday, Wednesday; h=hour; MWF=Monday, Wednesday, Friday; N/A=not applicable; SAA=serum asparaginase activity.

Summary of Immunogenicity Results

Part A (IM)

Part B (IV)

SEQUENCE LISTING

```
<160> NUMBER OF SEQ ID NOS: 3

<210> SEQ ID NO 1
<211> LENGTH: 327
<212> TYPE: PRT
<213> ORGANISM: Artificial Sequence
<220> FEATURE:
<223> OTHER INFORMATION: recombinant L-asparaginase

<400> SEQUENCE: 1

Ala Asp Lys Leu Pro Asn Ile Val Ile Leu Ala Thr Gly Gly Thr Ile
1               5                   10                  15

Ala Gly Ser Ala Ala Thr Gly Thr Gln Thr Thr Gly Tyr Lys Ala Gly
            20                  25                  30

Ala Leu Gly Val Asp Thr Leu Ile Asn Ala Val Pro Glu Val Lys Lys
        35                  40                  45

Leu Ala Asn Val Lys Gly Glu Gln Phe Ser Asn Met Ala Ser Glu Asn
    50                  55                  60

Met Thr Gly Asp Val Val Leu Lys Leu Ser Gln Arg Val Asn Glu Leu
65                  70                  75                  80

Leu Ala Arg Asp Asp Val Asp Gly Val Val Ile Thr His Gly Thr Asp
                85                  90                  95

Thr Val Glu Glu Ser Ala Tyr Phe Leu His Leu Thr Val Lys Ser Asp
            100                 105                 110
```

Lys Pro Val Val Phe Val Ala Ala Met Arg Pro Ala Thr Ala Ile Ser
115 120 125

Ala Asp Gly Pro Met Asn Leu Leu Glu Ala Val Arg Val Ala Gly Asp
130 135 140

Lys Gln Ser Arg Gly Arg Gly Val Met Val Val Leu Asn Asp Arg Ile
145 150 155 160

Gly Ser Ala Arg Tyr Ile Thr Lys Thr Asn Ala Ser Thr Leu Asp Thr
165 170 175

Phe Lys Ala Asn Glu Glu Gly Tyr Leu Gly Val Ile Ile Gly Asn Arg
180 185 190

Ile Tyr Tyr Gln Asn Arg Ile Asp Lys Leu His Thr Thr Arg Ser Val
195 200 205

Phe Asp Val Arg Gly Leu Thr Ser Leu Pro Lys Val Asp Ile Leu Tyr
210 215 220

Gly Tyr Gln Asp Asp Pro Glu Tyr Leu Tyr Asp Ala Ala Ile Gln His
225 230 235 240

Gly Val Lys Gly Ile Val Tyr Ala Gly Met Gly Ala Gly Ser Val Ser
245 250 255

Val Arg Gly Ile Ala Gly Met Arg Lys Ala Met Glu Lys Gly Val Val
260 265 270

Val Ile Arg Ser Thr Arg Thr Gly Asn Gly Ile Val Pro Pro Asp Glu
275 280 285

Glu Leu Pro Gly Leu Val Ser Asp Ser Leu Asn Pro Ala His Ala Arg
290 295 300

Ile Leu Leu Met Leu Ala Leu Thr Arg Thr Ser Asp Pro Lys Val Ile
305 310 315 320

Gln Glu Tyr Phe His Thr Tyr
325

<210> SEQ ID NO 2
<211> LENGTH: 20
<212> TYPE: PRT
<213> ORGANISM: Artificial Sequence
<220> FEATURE:
<223> OTHER INFORMATION: synthetic peptide

<400> SEQUENCE: 2

Ala Ala Pro Ala Ala Pro Ala Pro Ala Ala Pro Ala Ala Pro Ala Pro
1 5 10 15

Ala Ala Pro Ala
20

<210> SEQ ID NO 3
<211> LENGTH: 348
<212> TYPE: PRT
<213> ORGANISM: Artificial Sequence
<220> FEATURE:
<223> OTHER INFORMATION: native E. coli-derived L-asparaginase

<400> SEQUENCE: 3

Met Glu Phe Phe Lys Lys Thr Ala Leu Ala Ala Leu Val Met Gly Phe
1 5 10 15

Ser Gly Ala Ala Leu Ala Leu Pro Asn Ile Thr Ile Leu Ala Thr Gly
20 25 30

Gly Thr Ile Ala Gly Gly Gly Asp Ser Ala Thr Lys Ser Asn Tyr Thr
35 40 45

Val Gly Lys Val Gly Val Glu Asn Leu Val Asn Ala Val Pro Gln Leu

-continued

```
    50                  55                  60

Lys Asp Ile Ala Asn Val Lys Gly Glu Gln Val Val Asn Ile Gly Ser
65                  70                  75                  80

Gln Asp Met Asn Asp Asn Val Trp Leu Thr Leu Ala Lys Lys Ile Asn
                85                  90                  95

Thr Asp Cys Asp Lys Thr Asp Gly Phe Val Ile Thr His Gly Thr Asp
            100                 105                 110

Thr Met Glu Glu Thr Ala Tyr Phe Leu Asp Leu Thr Val Lys Cys Asp
        115                 120                 125

Lys Pro Val Val Met Val Gly Ala Met Arg Pro Ser Thr Ser Met Ser
    130                 135                 140

Ala Asp Gly Pro Phe Asn Leu Tyr Asn Ala Val Val Thr Ala Ala Asp
145                 150                 155                 160

Lys Ala Ser Ala Asn Arg Gly Val Leu Val Val Met Asn Asp Thr Val
                165                 170                 175

Leu Asp Gly Arg Asp Val Thr Lys Thr Asn Thr Thr Asp Val Ala Thr
            180                 185                 190

Phe Lys Ser Val Asn Tyr Gly Pro Leu Gly Tyr Ile His Asn Gly Lys
        195                 200                 205

Ile Asp Tyr Gln Arg Thr Pro Ala Arg Lys His Thr Ser Asp Thr Pro
    210                 215                 220

Phe Asp Val Ser Lys Leu Asn Glu Leu Pro Lys Val Gly Ile Val Tyr
225                 230                 235                 240

Asn Tyr Ala Asn Ala Ser Asp Leu Pro Ala Lys Ala Leu Val Asp Ala
                245                 250                 255

Gly Tyr Asp Gly Ile Val Ser Ala Gly Val Gly Asn Gly Asn Leu Tyr
            260                 265                 270

Lys Ser Val Phe Asp Thr Leu Ala Thr Ala Ala Lys Thr Gly Thr Ala
        275                 280                 285

Val Val Arg Ser Ser Arg Val Pro Thr Gly Ala Thr Thr Gln Asp Ala
    290                 295                 300

Glu Val Asp Asp Ala Lys Tyr Gly Phe Val Ala Ser Gly Thr Leu Asn
305                 310                 315                 320

Pro Gln Lys Ala Arg Val Leu Leu Gln Leu Ala Leu Thr Gln Thr Lys
                325                 330                 335

Asp Pro Gln Gln Ile Gln Gln Ile Phe Asn Gln Tyr
            340                 345
```

DOSING AND ADMINISTRATION OF RECOMBINANT L-ASPARAGINASE

CROSS-REFERENCE TO RELATED APPLICATIONS

This application claims priority to U.S. Provisional Application No. 63/168,224, filed on Mar. 30, 2021, which is incorporated herein in its entirety.

SEQUENCE LISTING

The instant application contains a Sequence Listing which has been submitted electronically in ASCII format and is hereby incorporated by reference in its entirety. Said ASCII copy, created Mar. 30, 2022, is named 48929-4009_SL.txt and is 6,543 bytes in size.

TECHNICAL FIELD

The present invention provides dosing regimens of a L-asparaginase.

BACKGROUND

Proteins with L-asparagine aminohydrolase activity, commonly known as L-asparaginases, have successfully been used for the treatment of various diseases that are potentially fatal, including Acute Lymphoblastic Leukemia (ALL) and Lymphoblastic Lymphoma (LBL), for which children constitute a large proportion of patients stricken with these diseases.

L-asparaginases of bacterial origin have a high immunogenic and antigenic potential. Currently on the market as first line treatment are *E. coli* derived L-asparaginase and pegaspargase. These products can provoke adverse hypersensitivity reactions including allergic reaction, silent inactivation, and anaphylactic shock in patients. Patients who experience hypersensitivity reactions to these products often have to stop treatment, resulting in poorer prognosis and survival rates. These patients have turned to Erwinaze® after experiencing hypersensitivity reactions. Erwinaze® has been plagued by supply issues for years, reportedly it can take 9 months to prepare (See www.statnews.com/2016/10/31/cancer-drug-shortage/and www.drugs.com/drug-shortages/asparaginase-erwinia-chrysanthemi-482). Even today the issues persist and Erwinase® shortages are common. (See www.accessdata.fda.gov/scripts/drugshortages/dsp ActiveIngredientDetails.cfm?AI=Asparaginase%20 Erwinia%20Chrysanthemi%20(Erwinaze)&st=c). The FDA has issued warning letters to the manufacturer stating that "changes in the source material or cell line have a substantial potential to adversely affect the identity, strength, quality, purity or potency of Erwinase®."

There is a need for new and improved dosing regimens for L-asparaginase (like recombinant L-asparaginase recombinantly produced in *Pseudomonas fluorescens*) with no immunological cross-reactivity to *E. coli*-derived asparaginase. The dosing regimens could be used as first line therapy or as a substitute for native *E. coli* derived L-asparaginase and/or long-acting *E. coli* derived L-asparaginases when a human subject experiences hypersensitivity. Novel dosing regimens for recombinant L-asparaginase would address a significant medical need (as a component of a multi-agent chemotherapeutic regimen) for patients with ALL/Lymphoblastic Lymphoma (LBL). Novel dosing regimens for L-asparaginase would also address a significant medical need (including without limitation dosing regimens that are a component of a multi-agent chemotherapeutic regimen) for patients with colorectal cancer (CRC), diffuse large B-cell lymphoma (DLBCL) and acute myeloid leukemia (AML), particularly Wnt negative CRC and R/R AML.

BRIEF SUMMARY OF THE INVENTION

Accordingly, the present disclosure provides a recombinant L-asparaginase with no immunological cross-reactivity to *E. coli*-derived asparaginase.

In one aspect, the present disclosure provides a method of treating cancer in a human subject in need thereof, said method comprising: administering to the human subject L-asparaginase, other than an *E-coli.*-derived asparaginase, as a set of time-ordered doses; wherein the set of time-ordered doses comprises a first dose followed by a second dose, the first dose is one of (i) about 50 mg/m$^2$ and (ii) about 25 mg/m$^2$ of L-asparaginase, the second dose is the other of (i) about 50 mg/m$^2$ and (ii) about 25 mg/m$^2$ L-asparaginase, the time period between administration of the first dose and the second dose to the human subject is three days when the first dose is about 50 mg/m$^2$, the time period between administration of the first dose and the second dose to the human subject is two days when the first dose is about 25 mg/m$^2$, no further L-asparaginase is administered to the subject for three days when the second dose is about 50 mg/m$^2$, and no further L-asparaginase is administered to the subject for two days when the second dose is about 25 mg/m$^2$, wherein the doses at about 25 mg/m$^2$ are administered intravascularly, and wherein the doses at about 50 mg/m$^2$ are administered intramuscularly. In some embodiments, the first dose is about 50 mg/m$^2$, the second dose is about 25 mg/m$^2$, the set of time-ordered doses further comprises a third dose after the second dose, the third dose is about 25 mg/m$^2$, and wherein the time period between administration of the second dose and the third dose to the human subject is two days. In some embodiments, the first dose is administered on a Friday and the second dose is administered on a Monday. In some embodiments, the first dose is administered on a Friday, the second dose is administered on a Monday, and the third dose is administered on a Wednesday. In some embodiments, the first dose is about 25 mg/m$^2$, the second dose is about 50 mg/m$^2$, the set of time-ordered doses further comprises a third dose after the second dose, the third dose is about 25 mg/m$^2$, and the time period between administration of the second dose and the third dose to the human subject is three days. In some embodiments, the first dose is administered on a Wednesday and the second dose is administered on a Friday. In some embodiments, the first dose is administered on a Wednesday, the second dose is administered on a Friday, and the third dose is administered on a Monday. In some embodiments, the first dose is about 25 mg/m$^2$, the second dose is about 50 mg/m$^2$, the set of time-ordered doses further comprises a third dose before the first dose, the third dose is about 25 mg/m$^2$, and the third dose is administered to the human subject two days before the first dose. In some embodiments, the first dose is administered on a Wednesday and the second dose is administered on a Friday. In some embodiments, the first dose is administered on a Wednesday, the second dose is administered on a Friday, and the third dose is administered on a Monday. In some embodiments, the method further comprises a third dose, wherein the first dose is administered on a Monday, the second dose is administered on a Wednesday, and the third dose is administered on a Friday. In some embodiments, the first dose is 25 mg/m$^2$, the second dose is 25 mg/m$^2$, and the third dose is 50 mg/m$^2$. In some embodiments, the method further comprises administering to the human subject a plurality of instances of the set of time-ordered doses of the L-asparaginase, wherein each respective instance of the set of time-ordered doses of the recombinant L-asparaginase is administered to the subject upon completion of a prior instance of the set of time-ordered doses in the plurality of instances of the set of time-ordered doses. In some embodiments, the plurality of instances of the set of time-ordered doses of the L-asparaginase is between two and one hundred. In some embodiments, the plurality of instances of the set of time-ordered doses of the L-asparaginase is between two and fifteen. In some embodiments, the *E-coli*.-derived asparaginase is native. In some embodiments, the *E-coli*.-derived asparaginase is long-acting. In some embodiments, the long-acting *E-coli*.-derived asparaginase is pegasparaginase. In some embodiments, the L-asparaginase is a tetramer, and wherein each monomer of the tetramer comprises SEQ ID NO: 1. In some embodiments, L-asparaginase is a tetramer, and wherein each monomer of the tetramer has a sequence identity of at least 95 percent to SEQ ID NO: 1. In some embodiments, the human subject exhibited hypersensitivity to the *E-coli*.-derived asparaginase. In some embodiments, the human subject is an adult. In some embodiments, the human subject is pediatric. In some embodiments, the L-asparaginase demonstrates less than 6% aggregation. In some embodiments, the L-asparaginase demonstrates less than 1% aggregation. In some embodiments, the L-asparaginase is non-lyophilized. In some embodiments, the L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration after treatment with the L-asparaginase. In some embodiments, the L-asparaginase is co-administered with one or more other chemotherapeutic agents as part of a multi-agent chemotherapeutic regimen.

In another aspect, the present disclosure provides for a method of substituting a treatment of a human subject for cancer, wherein the human subject is in need thereof, said method comprising: administering to the human subject, as a substitute for each dose of a long-acting *E-coli*.-derived asparaginase, a series of six doses of an L-asparaginase, wherein four of the six doses are about 25 mg/m$^2$, two of the six doses are about 50 mg/m$^2$, the time between administration of the two doses that are about 50 mg/m$^2$ is seven days, the time between administration of a dose in the series that is about 25 mg/m$^2$ and a next dose is two days, and the time between administration of a dose in the series that is about 50 mg/m$^2$ and a next dose is three days, wherein the doses at about 25 mg/m$^2$ are administered intravascularly, wherein the doses at about 50 mg/m$^2$ are administered intramuscularly, and wherein the L-asparaginase is not a long-acting *E-coli*.-derived asparaginase. In some embodiments, each respective dose of the long-acting *E-coli*.-derived asparaginase in a plurality of doses of the long-acting *E-coli*.-derived asparaginase is separately substituted with an instance of the series of six doses of the L-asparaginase. In some embodiments, the long-acting *E-coli*.-derived asparaginase is pegasparaginase. In some embodiments, the L-asparaginase is a tetramer, and wherein each monomer of the tetramer comprises SEQ ID NO: 1. In some embodiments, the L-asparaginase is a tetramer, and wherein each monomer of the tetramer has a sequence identity of at least 95 percent to SEQ ID NO: 1. In some embodiments, the human subject exhibited hypersensitivity to the *E-coli*.-derived asparaginase. In some embodiments, the human subject has terminated *E-coli*.-derived asparaginase therapy. In some embodiments, the human subject is an adult. In some embodiments, the human subject is pediatric. In some embodiments, the L-asparaginase demonstrates less than 6% aggregation. In some embodiments, the L-asparaginase demonstrates less than 1% aggregation. In some embodiments, the L-asparaginase is non-lyophilized. In some embodiments, the L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration after treatment with the L-asparaginase. In some embodiments, the L-asparaginase is co-administered with one or more other chemotherapeutic agents as part of a multi-agent chemotherapeutic regimen. In some embodiments, the cancer is acute lymphoblastic leukemia (ALL) or lymphoblastic lymphoma (LBL). In some embodiments, the cancer is colorectal cancer (CRC). In some embodiments, the CRC is Wnt-negative CRC or Wnt-mutant CRC. In some embodiments, the cancer is acute myeloid leukemia (AML). In some embodiments, the AML is R/R AML. In some embodiments, the cancer is DLBCL.

In another aspect, the present disclosure provides a method of substituting a human subject's treatment for cancer, wherein the human subject is in need thereof, said method comprising: administering intravascularly to the human subject, as a substitute for each respective dose of a long-acting *E-coli*.-derived asparaginase, a series of seven doses of a recombinant L-asparaginase, wherein each dose in the series is in an amount of about 25 mg/m$^2$ of the recombinant L-asparaginase, and the time between administration of each dose in the series is two days. In some embodiments, each respective dose of the long-acting *E-coli*.-derived asparaginase in a plurality of doses of the long-acting *E-coli*.-derived asparaginase is separately substituted with an instance of the series of seven doses of the recombinant L-asparaginase. In some embodiments, the long-acting *E-coli*.-derived asparaginase is pegasparaginase. In some embodiments, the recombinant L-asparaginase is a tetramer, and wherein each monomer of the tetramer comprises SEQ ID NO: 1. In some embodiments, the recombinant L-asparaginase is a tetramer, and wherein each monomer of the tetramer has a sequence identity of at least 95 percent to SEQ ID NO: 1. In some embodiments, the human subject exhibited hypersensitivity to the *E-coli*.-derived asparaginase. In some embodiments, the human subject is an adult patient. In some embodiments, the human subject is a pediatric patient. In some embodiments, the recombinant L-asparaginase is administered in a composition that demonstrates less than 6% aggregation of the L-asparaginase. In some embodiments, the recombinant L-asparaginase is administered in a composition that demonstrates less than 3% aggregation of the L-asparaginase. In some embodiments, the recombinant L-asparaginase is administered in a composition that demonstrates less than 1% aggregation of the L-asparaginase. In some embodiments, the recombinant L-asparaginase is non-lyophilized. In some embodiments, the recombinant L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration with the recombinant L-asparaginase. In some embodiments, the recombinant L-asparaginase is co-administered with one or more other chemotherapeutic agents as part of a multi-agent chemotherapeutic regimen.

In another aspect, the present disclosure provides a method of substituting a treatment of a human subject for cancer, wherein the human subject is in need thereof, said method comprising: administering intravascularly to the human subject, as a substitute for each dose of a long-acting *E-coli.*-derived asparaginase, a series of six doses of an L-asparaginase, wherein four of the six doses are about 25 $mg/m^2$, two of the six doses are about 50 $mg/m^2$, the time between administration of the two doses that are about 50 $mg/m^2$ is seven days, the time between administration of a dose in the series that is about 25 $mg/m^2$ and a next dose is two days, and the time between administration of a dose in the series that is about 50 $mg/m^2$ and a next dose is three days, wherein the L-asparaginase is not a long-acting *E-coli.*-derived asparaginase. In some embodiments, each respective dose of the long-acting *E-coli.*-derived asparaginase in a plurality of doses of the long-acting *E-coli.*-derived asparaginase is separately substituted with an instance of the series of six doses of the L-asparaginase. In some embodiments, the long-acting *E-coli.*-derived asparaginase is pegasparaginase. In some embodiments, the L-asparaginase is a tetramer, and wherein each monomer of the tetramer comprises SEQ ID NO: 1. In some embodiments, the L-asparaginase is a tetramer, and wherein each monomer of the tetramer has a sequence identity of at least 95 percent to SEQ ID NO: 1. In some embodiments, the human subject exhibited hypersensitivity to the *E-coli.*-derived asparaginase. In some embodiments, the human subject has terminated *E-coli.*-derived asparaginase therapy. In some embodiments, the human subject is an adult. In some embodiments, the human subject is pediatric. In some embodiments, the L-asparaginase demonstrates less than 6% aggregation. In some embodiments, the L-asparaginase demonstrates less than 1% aggregation. In some embodiments, the L-asparaginase is non-lyophilized. In some embodiments, the L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration after treatment with the L-asparaginase. In some embodiments, the L-asparaginase is co-administered with one or more other chemotherapeutic agents as part of a multi-agent chemotherapeutic regimen.

In another aspect, the present invention provides a method of treating cancer in a human subject in need thereof, said method comprising: administering intravascularly to the human subject L-asparaginase, other than an *E-coli.*-derived asparaginase, as a set of time-ordered doses; wherein the set of time-ordered doses comprises a first dose followed by a second dose, the first dose is one of (i) about 50 $mg/m^2$ and (ii) about 25 $mg/m^2$ of L-asparaginase, the second dose is the other of (i) about 50 $mg/m^2$ and (ii) about 25 $mg/m^2$ L-asparaginase, the time period between administration of the first dose and the second dose to the human subject is three days when the first dose is about 50 $mg/m^2$, the time period between administration of the first dose and the second dose to the human subject is two days when the first dose is about 25 $mg/m^2$, no further L-asparaginase is administered to the subject for three days when the second dose is about 50 $mg/m^2$, and no further L-asparaginase is administered to the subject for two days when the second dose is about 25 $mg/m^2$. In some embodiments, the first dose is about 50 $mg/m^2$, the second dose is about 25 $mg/m^2$, the set of time-ordered doses further comprises a third dose after the second dose, the third dose is about 25 $mg/m^2$, and wherein the time period between administration of the second dose and the third dose to the human subject is two days. In some embodiments, the first dose is administered on a Friday and the second dose is administered on a Monday. In some embodiments, the first dose is administered on a Friday, the second dose is administered on a Monday, and the third dose is administered on a Wednesday. In some embodiments, the first dose is about 25 $mg/m^2$, the second dose is about 50 $mg/m^2$, the set of time-ordered doses further comprises a third dose after the second dose, the third dose is about 25 $mg/m^2$, and the time period between administration of the second dose and the third dose to the human subject is three days. In some embodiments, the first dose is administered on a Wednesday and the second dose is administered on a Friday. In some embodiments, the first dose is administered on a Wednesday, the second dose is administered on a Friday, and the third dose is administered on a Monday. In some embodiments, the first dose is about 25 $mg/m^2$, the second dose is about 50 $mg/m^2$, the set of time-ordered doses further comprises a third dose before the first dose, the third dose is about 25 $mg/m^2$, and the third dose is administered to the human subject two days before the first dose. In some embodiments, the first dose is administered on a Wednesday and the second dose is administered on a Friday. In some embodiments, the first dose is administered on a Wednesday, the second dose is administered on a Friday, and the third dose is administered on a Monday. In some embodiments, the method further comprises a third dose, wherein the first dose is administered on a Monday, the second dose is administered on a Wednesday, and the third dose is administered on a Friday. In some embodiments, the first dose is 25 $mg/m^2$, the second dose is 25 $mg/m^2$, and the third dose is 50 $mg/m^2$. In some embodiments, the method further comprising intravascularly administering to the human subject a plurality of instances of the set of time-ordered doses of the L-asparaginase, wherein each respective instance of the set of time-ordered doses of the recombinant L-asparaginase is administered to the subject upon completion of a prior instance of the set of time-ordered doses in the plurality of instances of the set of time-ordered doses. In some embodiments, the plurality of instances of the set of time-ordered doses of the L-asparaginase is between two and one hundred. In some embodiments, the plurality of instances of the set of time-ordered doses of the L-asparaginase is between two and fifteen. In some embodiments, the *E-coli.*-derived asparaginase is native. In some embodiments, *E-coli.*-derived asparaginase is long-acting. In some embodiments, the long-acting *E-coli.*-derived asparaginase is pegasparaginase. In some embodiments, the L-asparaginase is a tetramer, and wherein each monomer of the tetramer comprises SEQ ID NO: 1. In some embodiments, the L-asparaginase is a tetramer, and wherein each monomer of the tetramer has a sequence identity of at least 95 percent to SEQ ID NO: 1. In some embodiments, the human subject exhibited hypersensitivity to the *E-coli.*-derived asparaginase. In some embodiments, the human subject is an adult. In some embodiments, the human subject is pediatric. In some embodiments, the L-asparaginase demonstrates less than 6% aggregation. In some embodiments, the L-asparaginase demonstrates less than 1% aggregation. In some embodiments, the L-asparaginase is non-lyophilized. In some embodiments, the L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration after treatment with the L-asparaginase. In some embodiments, the L-asparaginase is co-administered with one or more other chemotherapeutic agents as part of a multi-agent chemotherapeutic regimen. In some embodiments, the cancer is acute lymphoblastic leukemia (ALL) or lymphoblastic lymphoma (LBL). In some embodiments, the cancer is colorectal cancer (CRC). In some embodiments, the CRC is Wnt-negative CRC or Wnt-mutant CRC. In some embodiments, the cancer is acute myeloid leukemia (AML). In some embodiments, the AML is R/R AML. In some embodiments, the cancer is DLBCL.

BRIEF DESCRIPTION OF THE DRAWINGS

The invention may be best understood from the following detailed description when read in conjunction with the accompanying drawings. Included in the drawings are the following figures:

FIG. 1 shows the results of the safety study in Example 2.

FIG. 2 shows the purities of recombinant L-asparaginase (R-CRIS), *E. coli*-derived recombinant crisantaspase (*E. coli* RC), and Erwinase® evaluated by the SEC-HPLC Method outlined in Example 5.

FIG. 3 shows the purities of recombinant L-asparaginase (R-CRIS), *E. coli*-derived recombinant crisantaspase (*E. coli* RC), and Erwinase® evaluated by the SEC-MALLS Method outlined in Example 5.

FIG. 4 shows the results obtained from the analysis of the sedimentation velocity AUC data outlined in Example 5.

FIG. 5 shows the size profile of recombinant L-asparaginase was assessed by SE-UHPLC according to the release method as outlined in Example 6.

FIG. 6 shows high molecular weight species present in the recombinant L-asparaginase were measured using SEC-MALLS as outlined in Example 6.

FIG. 9 shows the proportion of Healthy Volunteers with SAA Levels at 48 and 72 hours post dose according to Example 7. Abbreviations: ERW, asparaginase *Erwinia chrysanthemi*; IM, intramuscular; IV, intravenous; SAA, serum asparaginase activity.

FIG. 10 shows PK Summary Based on SAA in the study described in Example 7. Abbreviations: $AUC_{0\text{-}inf}$, area under the curve from time 0 extrapolated to infinity; $AUC_{0\text{-}t}$, area under the curve from time 0 to the time of last quantifiable SAA; $C_{48h}$, SAA at 48 hours; $C_{72h}$, SAA at 72 hours; CL, clearance; $C_{max}$, maximum SAA; CV, coefficient of variation; ERW, asparaginase *Erwinia chrysanthemi*; IM, intramuscular; IV, intravenous; PK, pharmacokinetics; SAA, serum asparaginase activity; $t_{max}$, time at which $C_{max}$ is observed; $t_{1/2}$, half-life; V, volume of distribution. [a]For IM treatments, CL=CL/F (apparent clearance) and V=Vz/F (apparent volume of distribution). For IV treatments, CL=CL and $V=V_{SS}$ (estimate of the volume of distribution at steady state). [b]n=5 for $t_{1/2}$, $AUC_{0\text{-}inf}$, CL, and V. N is the number of healthy volunteers exposed. Mean (CV %) presented for all parameters except for $t_{max}$ values, which are reported as median and range.

FIG. 11 shows TEAEs after treatment as described in Example 7. Abbreviations: ERW, asparaginase *Erwinia chrysanthemi*; IM, intramuscular; IV, intravenous; TEAE, treatment-emergent adverse event. [a]By preferred term using MedDRA dictionary, version 22.0; treatment-related TEAEs are shown in descending order of frequency.

FIG. 12 shows individual SAA-time profiles. Abbreviations: ERW, asparaginase *Erwinia chrysanthemi*; IM, intramuscular; IV, intravenous; SAA, serum asparaginase activity. Further description can be found in Example 7.

FIG. 16 shows baseline demographics for the study in Example 7. Abbreviations: ERW, asparaginase *Erwinia chrysanthemi*; IM, intramuscular; IV, intravenous; SD, standard deviation. [a]Ethnicity was self-reported; healthy volunteers could identify as more than one ethnicity.

FIG. 17 shows the Dose Proportionality Assessment for JZP-458 Based on SAA as described further in the study in Example 7. Abbreviations: $AUC_{0\text{-}inf}$, area under the curve from time 0 extrapolated to infinity; $AUC_{0\text{-}t}$, area under the curve from time 0 to the time of the last quantifiable SAA; CI, confidence interval; $C_{max}$, maximum SAA; IM, intramuscular; IV, intravenous PK, pharmacokinetics; SAA, serum asparaginase activity. Results are based on the power model: In (parameter)=intercept+slope×ln (dose).

FIG. 18 shows a PK Summary based on SAC as described further in Example 7. Abbreviations: $AUC_{0\text{-}inf}$, area under the curve from time 0 extrapolated to infinity; $AUC_{0\text{-}t}$, area under the curve from time 0 to the time of last quantifiable SAA; CL, clearance; $C_{max}$, maximum SAA; CV, coefficient of variation; ERW, asparaginase *Erwinia chrysanthemi*; IM, intramuscular; IV, intravenous; PK, pharmacokinetics; $t_{1/2}$, half-life; SAA, serum asparaginase activity; SAC, serum asparaginase concentration; $t_{max}$, time at which $C_{max}$ is observed; V, volume of distribution. [a]For IM treatments, CL=CL/F (apparent clearance) and V=Vz/F (apparent volume of distribution). For IV treatments, CL=CL and $V=V_{SS}$ (estimate of the volume of distribution at steady state). [b]n=3 for $AUC_{0-inf}$, CL, and V; n=5 for $t_{1/2}$. N is the number of healthy volunteers exposed. Mean (CV %) presented for all parameters except for $t_{max}$ values, which are reported as median and range.

FIG. 19 shows the Dose Proportionality Assessment for JZP-458 Based on SAC. Abbreviations: $AUC_{0-inf}$, area under the curve from time 0 extrapolated to infinity; $AUC_{0-t}$, area under the curve from time 0 to the time of the last quantifiable SAA; CI, confidence interval; $C_{max}$, maximum SAA; IM, intramuscular; IV, intravenous; PK, pharmacokinetics; SAA, serum asparaginase activity; SAC, serum asparaginase concentration. Results are based on the power model: In (parameter)=intercept+slope×ln (dose).

Figure 20:
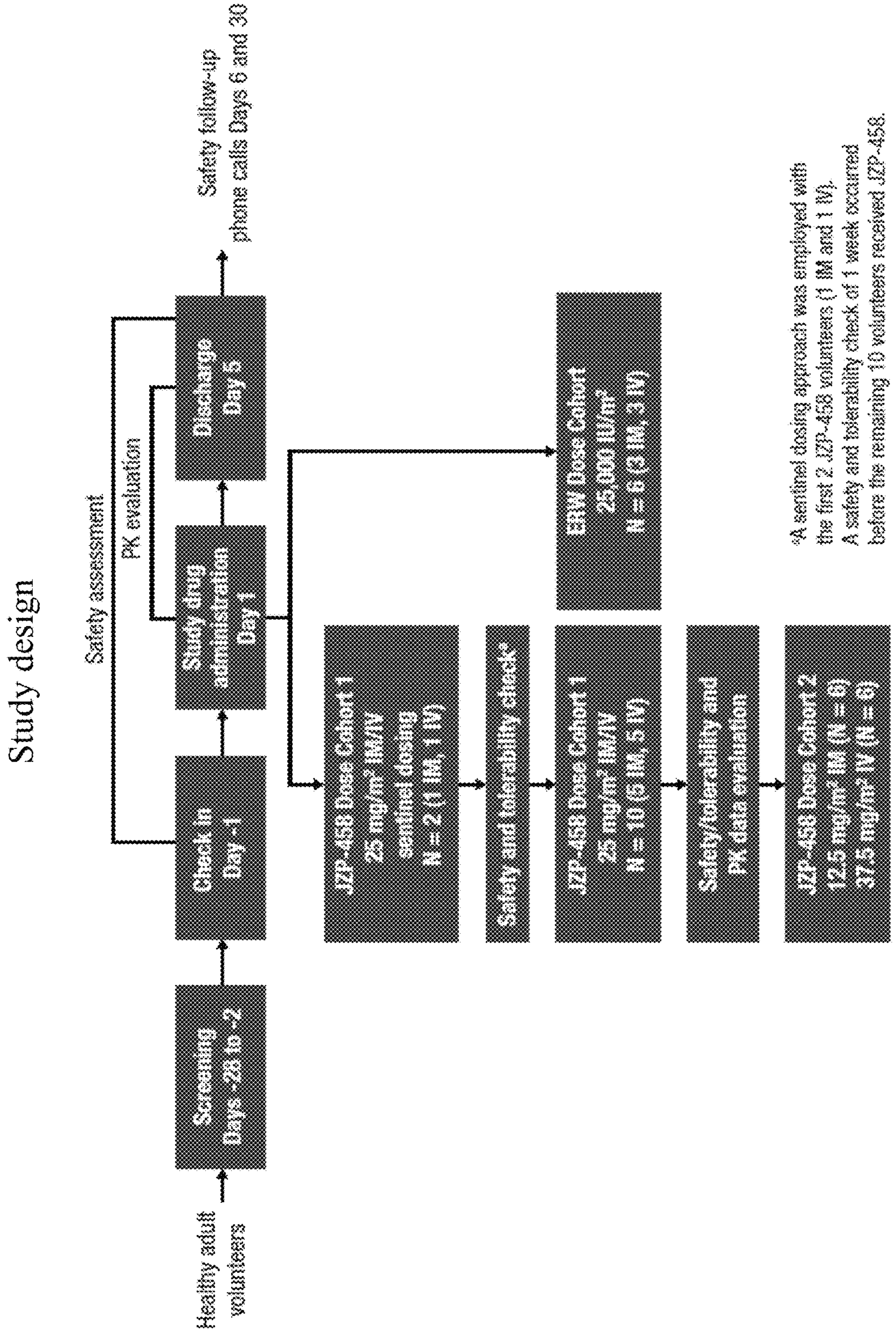

FIG. 20 shows the Study Design for the study in Example 7. Abbreviations: ERW, asparaginase *Erwinia chrysanthemi*; IM, intramuscular; IV, intravenous; PK, pharmacokinetics.

Figure 21:
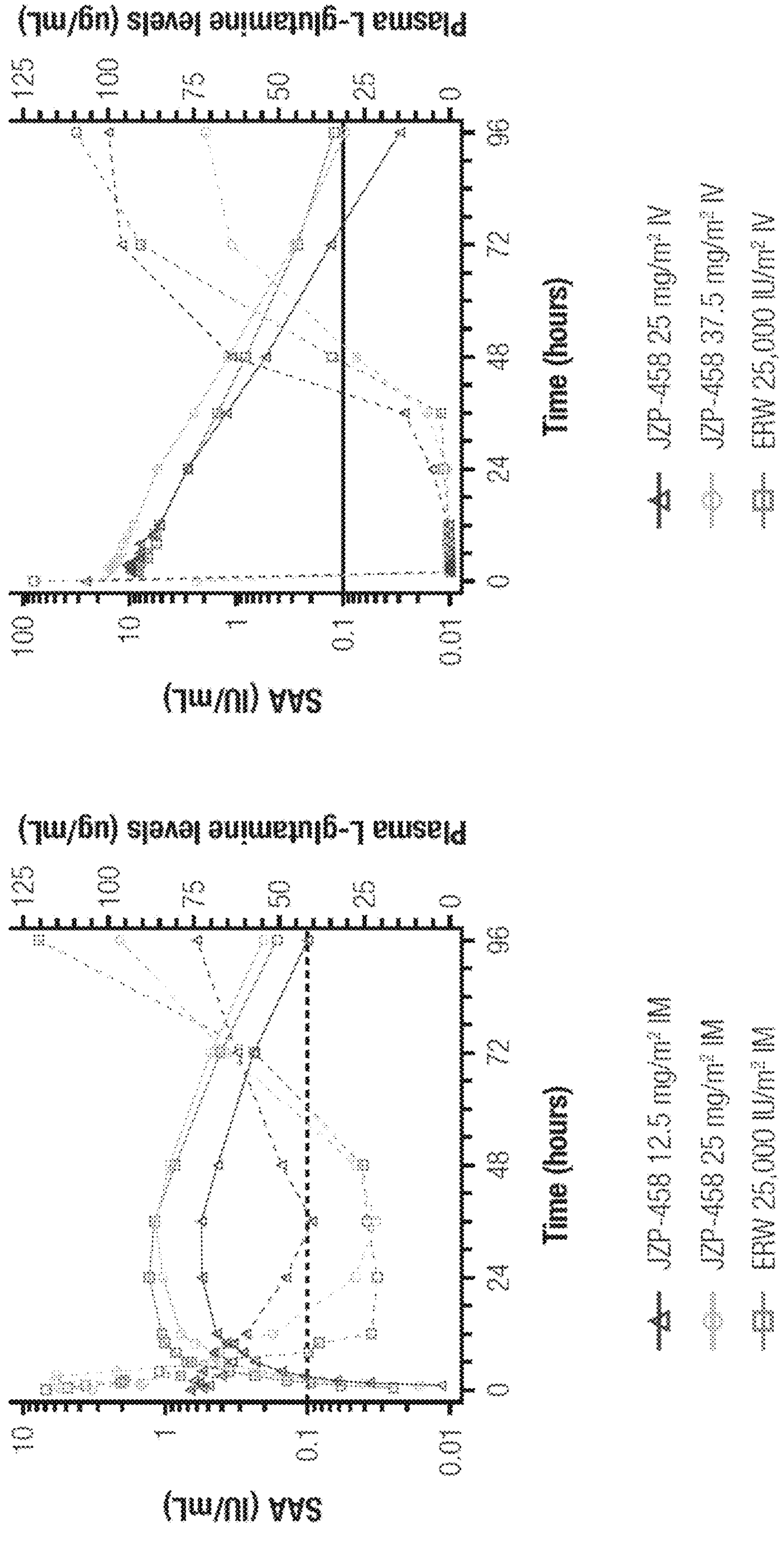

FIG. 21 shows Mean SAA-time Profiles for All Treatments and Corresponding Mean Plasma L-glutamine Levels as described further in the study in Example 7. Abbreviations: IM, intramuscular; IV, intravenous; SAA, serum asparaginase activity. Note: Lower limit of quantitation (LLOQ): asparaginase activity=0.0250 IU/mL; L-glutamine=0.250 ug/mL. Values below the LLOQ were set to zero. Abbreviations: IM, intramuscular; IV, intravenous; SAA, serum asparaginase activity. Note: Lower limit of quantitation (LLOQ): asparaginase activity=0.0250 IU/mL; L-glutamine=0.250 ug/mL. Values below the LLOQ were set to zero.

Figure 22:
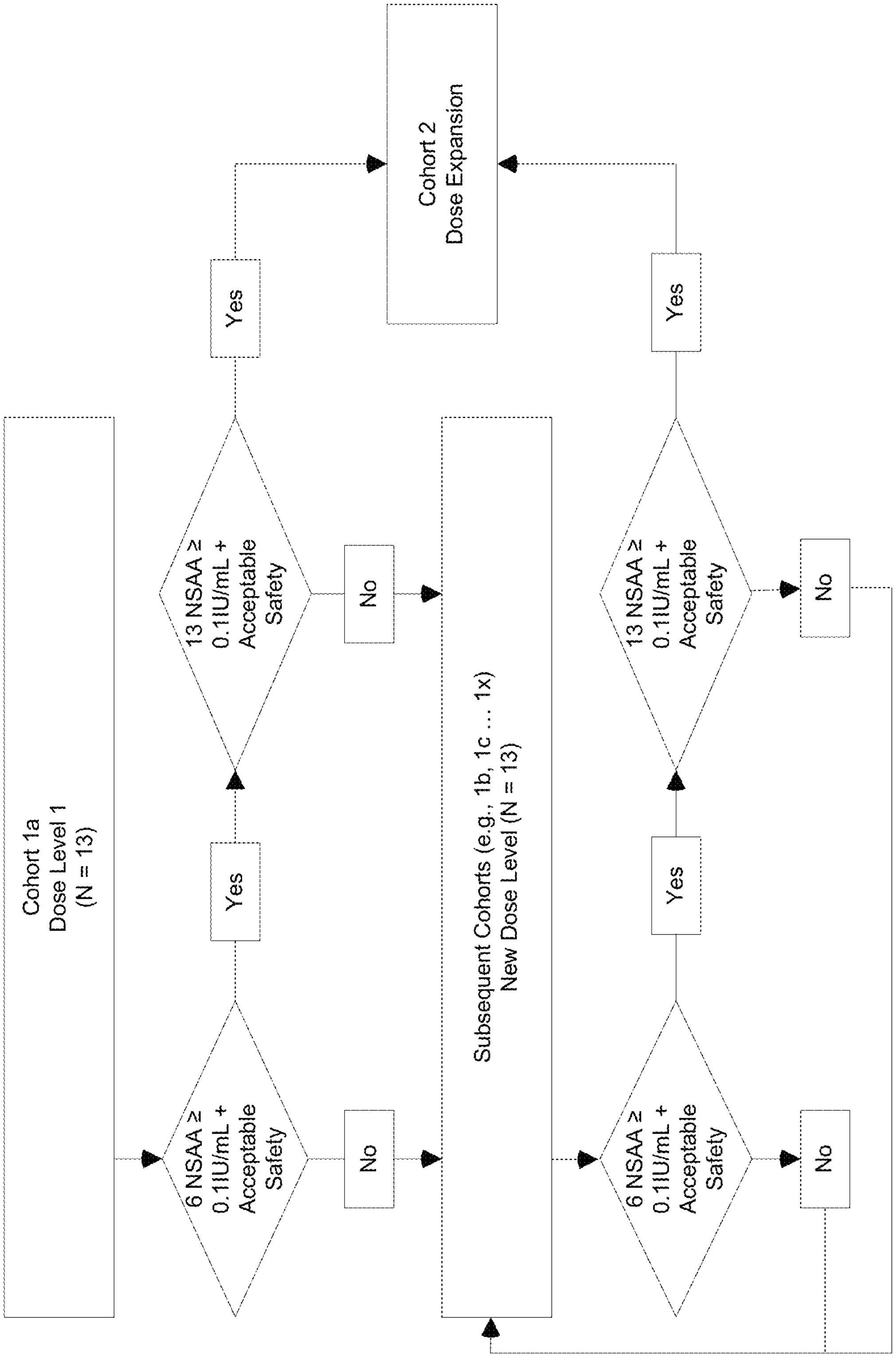

FIG. 22 shows Part A IM JZP-458 Dose Cohorts (Example 8). The SDRC will assess the safety and tolerability issues for participants in Cohort 1 to determine if additional participants at different dose levels are needed or if the appropriate IM JZP-458 dose level to proceed to the Expansion Cohort (Cohort 2) has been determined. The SDRC will review NSAA and safety/tolerability data when 6 and 13 evaluable participants in each subcohort complete Course 1; enrollment will not stop at the specified time points for SDRC review. Abbreviations: IM=intramuscular; IU=International Units; NSAA=nadir serum asparaginase activity; SDRC=Study Data Review Committee.

Figure 23:
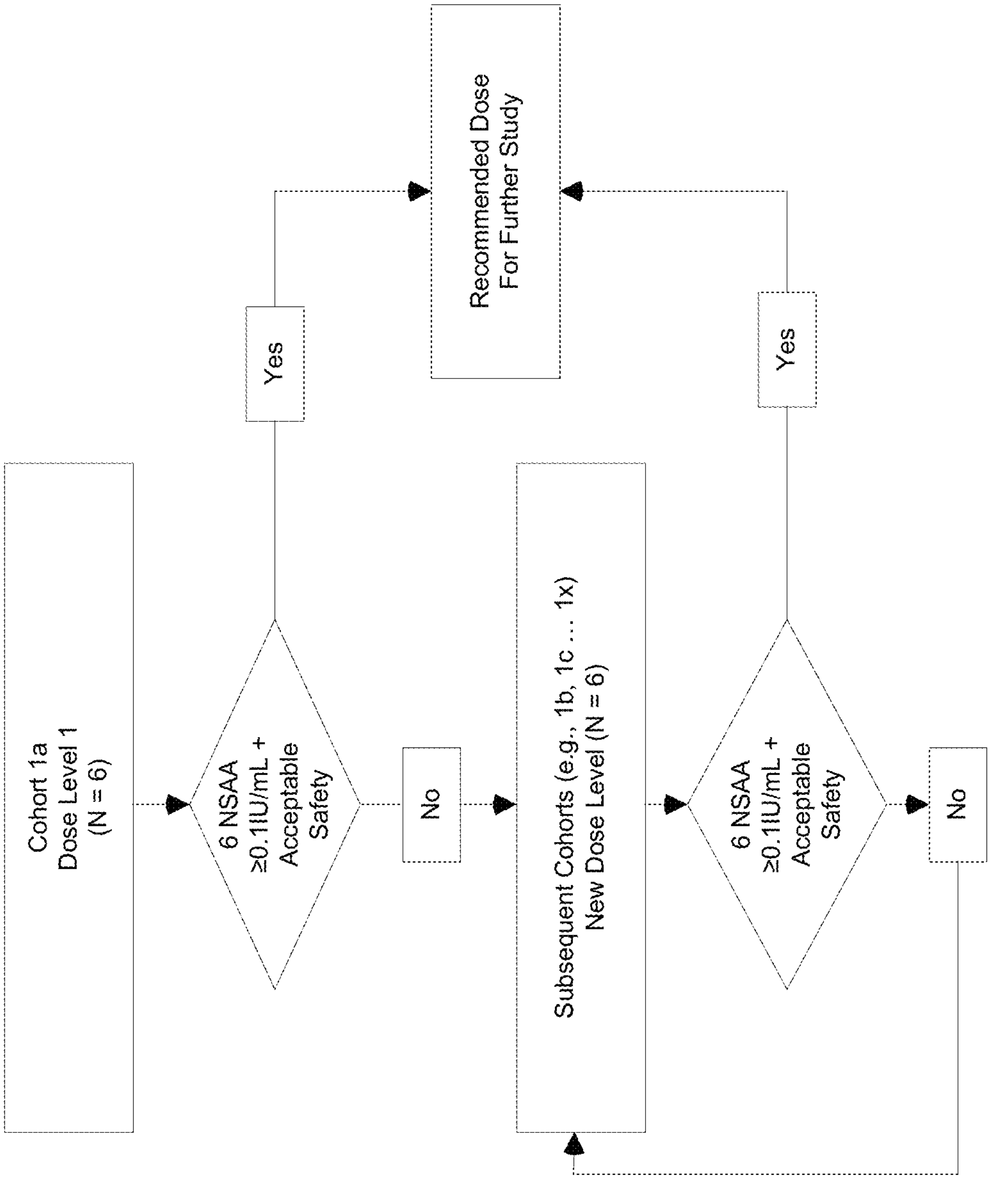

FIG. 23 shows Part B JZP-458 Dose Cohorts (Example 8). The SDRC will assess the safety and tolerability issues for participants in Cohort 1 to determine if additional participants at a different dose level are needed. The SDRC will review NSAA and safety/tolerability data when 6 evaluable participants in each subcohort complete Course 1. Abbreviations: IU=International Units; IV=intravenous; NSAA=nadir serum asparaginase activity; SDRC=Study Data Review Committee.

FIG. 24 shows a summary of SAA results (IU/mL) with JZP-458 in Course 1 (Evaluable Participants) (Example 8).

FIG. 25 shows the proportion of patients with NSAA levels ≥0.1 and ≥0.4 IU/mL at the last 48 and 72 hours in Course 1 (evaluable participants) (Example 8).

Figure 26:
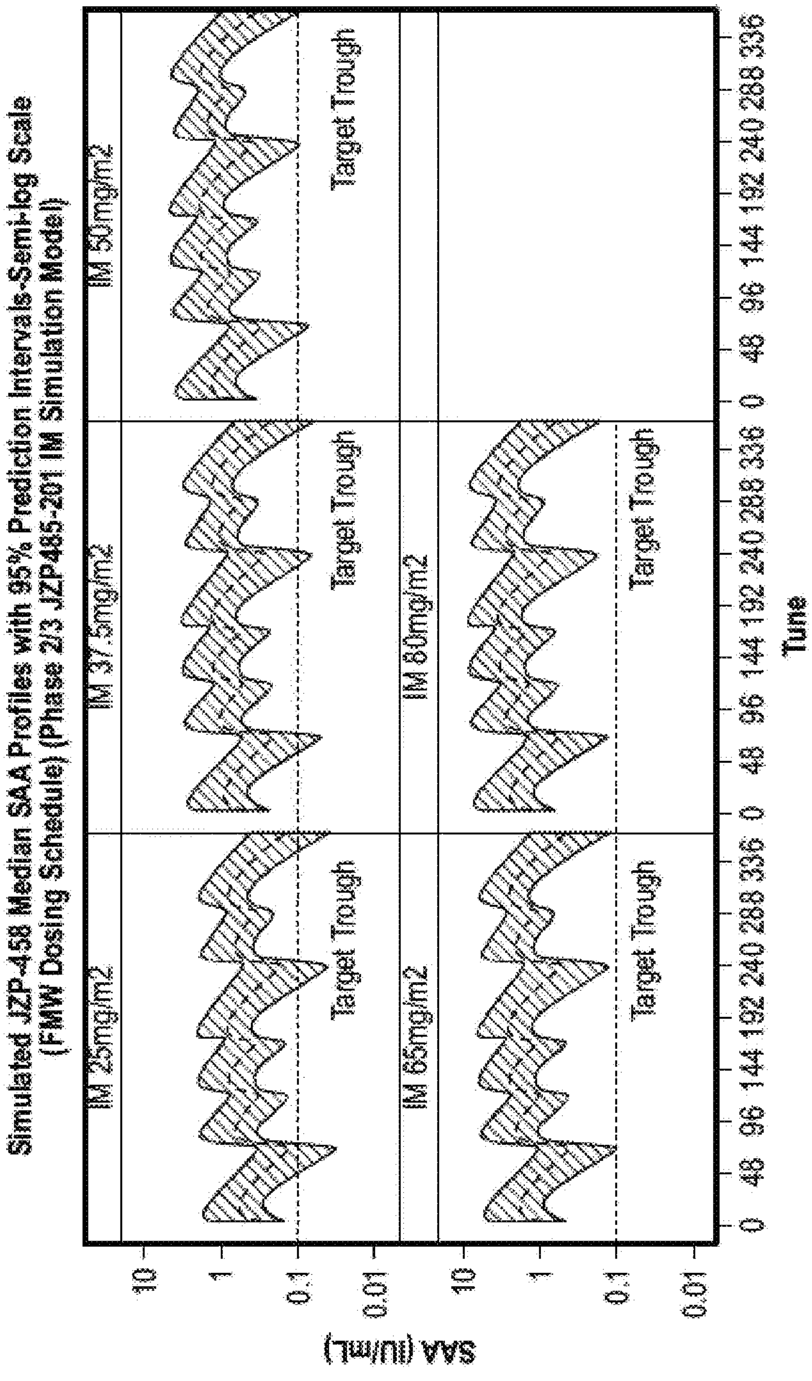

FIG. 26 shows simulated JZP-458 Median SAA Profiles with 95% Prediction Intervals—Semi-log scale (FMW Dosing Schedule) (Example 8 IM Simulation Model). Abbreviations: IM=intramuscular; FMW=Friday, Monday, Wednesday; SAA=serum asparaginase activity Center lines are the median value; bands (95% prediction interval) represent the 2.5th (lower) and 97.5th (upper) percentiles. The x-axis is displayed out to 336 hours with an extra offset, the data plotted include simulated observations to 504 hours after the start of the course.

FIG. 27 shows the proportion of patients treated with JZP-458 expected to achieve target SAA trough levels (FMW Dosing Schedule) (Example 8 IM Simulation Model).

FIG. 28 shows an overview of treatment-emergent adverse events (Safety Analysis Set) (Example 8).

FIG. 29 shows Grade 3 or 4 treatment-emergent adverse events (Safety Analysis Set Cohort 1a) (Example 8).

FIG. 30 shows Grade 3 or 4 treatment-emergent adverse events (Safety Analysis Set Cohort 1a) (Example 8). Percentages were calculated with the number of participants in the Safety Analysis Set as a denominator. Adverse events were coded to SOC and PT using MedDRA 22.1. The severity of AEs was recorded using CTCAE 5.0. A TEAE was defined as any event with onset date on or after the first dose of study treatment through the end of the study or any ongoing event that worsens in severity after the date of the first dose of study treatment through the end of the study. Abbreviations: AE=adverse event; CTCAE=Common Terminology Criteria for Adverse Events; IM=intramuscular injection; PT=preferred term; SOC=system organ class; TEAE=treatment-emergent adverse event.

FIG. 31 shows Study JZP458-201—Summary of Treatment-emergent Adverse Events (Data cut-off date: 14 Oct. 2021) as described in Example 9. Abbreviations: CTCAE=Common Terminology Criteria for Adverse Events; IM=intramuscular; MedDRA=Medical Dictionary for Regulatory Activities; MWF=Monday, Wednesday, Friday; PT=Preferred Term; SOC=System Organ Class; TEAE=treatment-emergent adverse event. (a) Doses were administered on a Monday, Wednesday, Friday schedule. (b) No participant had died as of the data cut-off date for the initial analysis (14 Oct. 2020). Three fatal cases have been reported between 15 Oct. 2020 and 11 Jan. 2021. Percentages were calculated with the number of participants in the Safety Analysis Set as a denominator. Adverse events were coded to SOC and PT using MedDRA 22.1. The severity of AEs was recorded using CTCAE 5.0. A TEAE was defined as any event with an onset date on or after the first dose of study treatment through the end of the study or any ongoing event that worsened in severity after the date of the first dose of study treatment through the end of the study.

FIG. 32 shows Study JZP458-201—Summary of Treatment-emergent Adverse Events in Cohort 1c (Safety Analysis Set; Data Cut-off Date: 11 Jan. 2021) as discussed in Example 10 and 11. Abbreviations: CTCAE=Common Terminology Criteria for Adverse Events; IM=intramuscular; MedDRA=Medical Dictionary for Regulatory Activities; PT=Preferred Term; SOC=System Organ Class. TEAE=treatment-emergent adverse event. Percentages were calculated with the number of participants in the Safety Analysis Set as a denominator. Adverse events were coded to SOC and PT using MedDRA 22.1. The severity of AEs was recorded using CTCAE 5.0. A TEAE was defined as any event with an onset date on or after the first dose of study treatment through the end of the study or any ongoing event that worsened in severity after the date of the first dose of study treatment through the end of the study.

FIG. 33A, FIG. 33B, and FIG. 33C show an update on Study JZP458-201—Demographic and Baseline Characteristics (Safety Analysis Set as of 19 Jul. 2021) as described in Example 12. Abbreviations: ALL=acute lymphoblastic leukemia; B ALL=B-cell acute lymphoblastic leukemia; B LBL=B cell lymphoblastic lymphoma; BSA=body surface area; IM=intramuscular; LBL=lymphoblastic lymphoma; T ALL=T cell acute lymphoblastic leukemia; T cell lymphoblastic lymphoma; T LBL=T cell lymphoblastic lymphoma.

Percentages were calculated with the number of participants in the Safety Analysis Set as a denominator. Time since diagnosis in months is calculated by taking the integer of '[(Study Day 1–Date of Diagnosis+1)/365.25]*12'. A baseline value is defined as the latest non-missing value obtained prior to or at the start date and/or time of the first dose of JZP-458 (Study Day 1). Study Day 1 is defined as the date of the first dose of JZP-458.

FIG. 34 shows an update on Study JZP458-201—Summary of Serum Asparaginase Activity Results (IU/mL) With JZP-458 (Intramuscular and Intravenous) in Course 1 (Efficacy Analysis Set as of 19 Jul. 2020) as described in Example 12. Abbreviations: CI=confidence interval; IM=intramuscular; IV=intravenous; MW=Monday, Wednesday; MWF=Monday, Wednesday, Friday; Q1=first quartile; Q3=third quartile; NSAA=nadir serum asparaginase activity; SAA=serum asparaginase activity. The Efficacy Analysis Set includes participants who received at least 1 dose of JZP-458 with at least one 48-hour or 72-hour NSAA assessment collected within the protocol-defined sample collection window (±2 hours) in Course 1.

FIG. 35 shows an update on Study JZP458-201—Correlation Between Serum Asparaginase Concentration and Serum Asparaginase Activity for Intramuscular and Intravenous JZP-458 in Course 1 (Pharmacokinetic Analysis Set as of 19 Jul. 2021) as described in Example 12. Abbreviations: IM=intramuscular; IV=intravenous; PK=pharmacokinetic; SAA=serum asparaginase activity; SAC=serum asparaginase concentration.

Figure 36A:
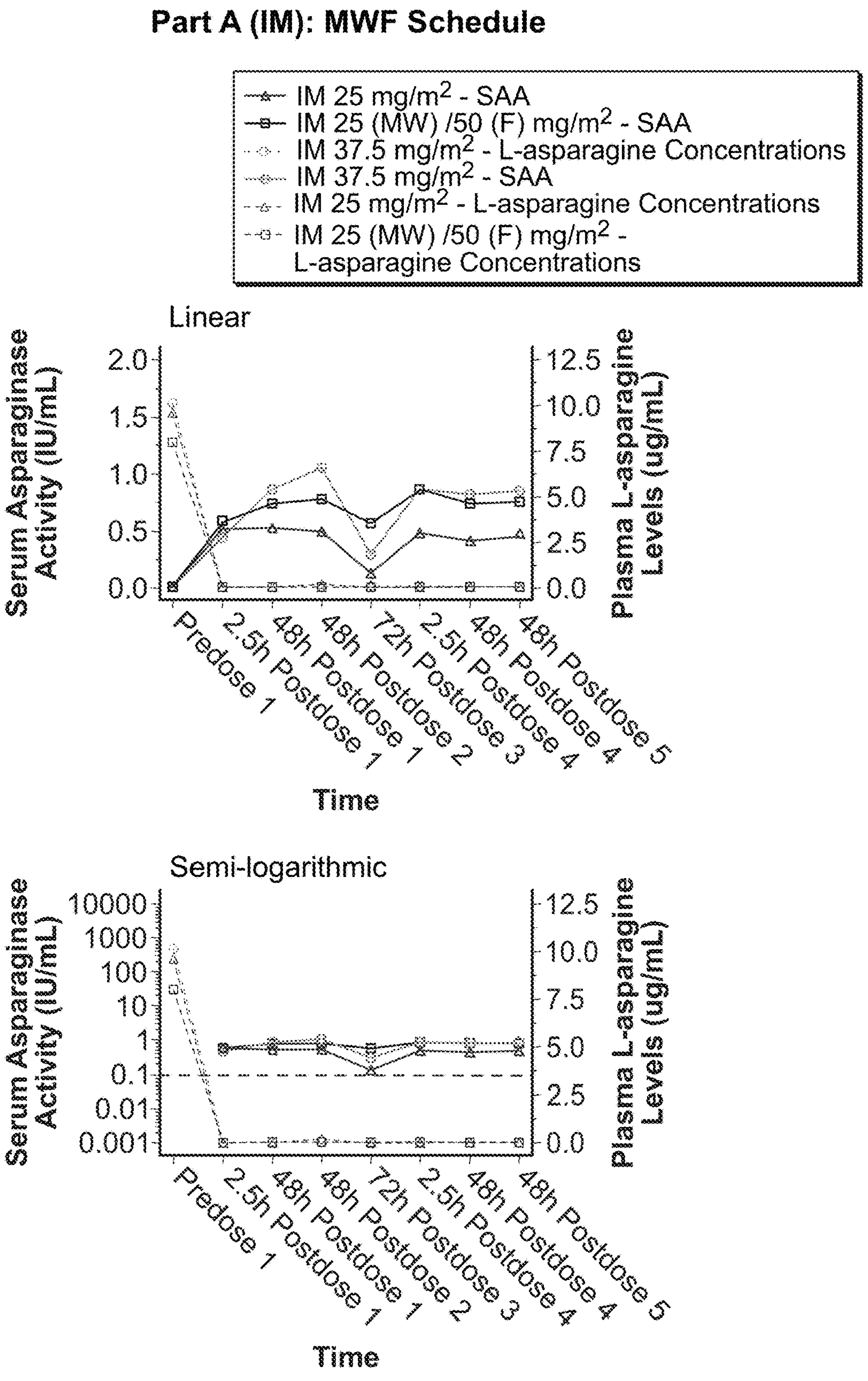
Figure 36B:
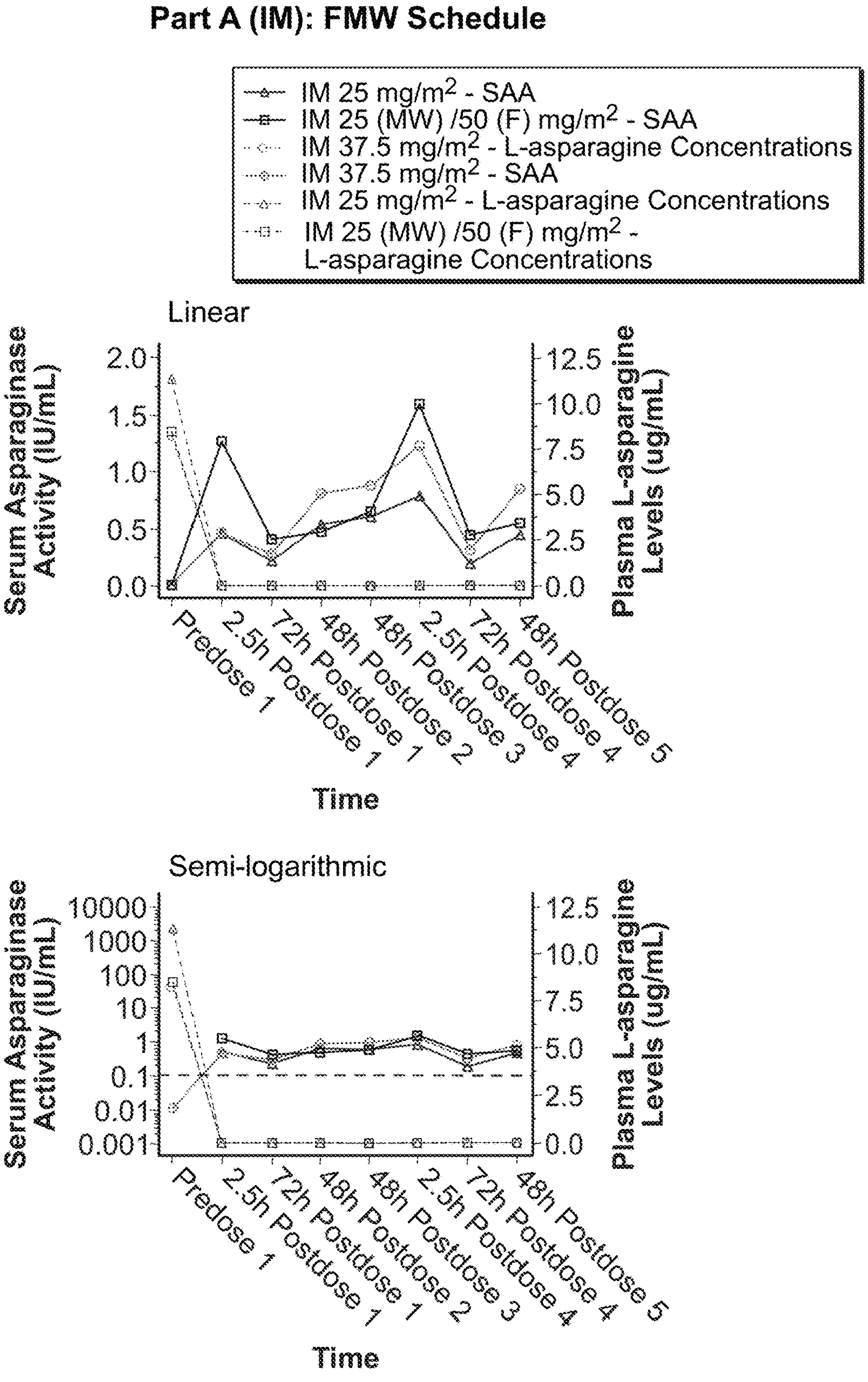

FIG. 36A and FIG. 36B shows an update on Study JZP458-201—Mean Serum Asparaginase Activity Versus Time Profiles for Corresponding Mean Plasma L-asparagine Levels with Intramuscular and Intravenous JZP-458 in Course 1 on Linear and Semi logarithmic Scales (Pharmacodynamic Analysis Set as of 19 Jul. 2021) as described in Example 12.

Figure 37A:
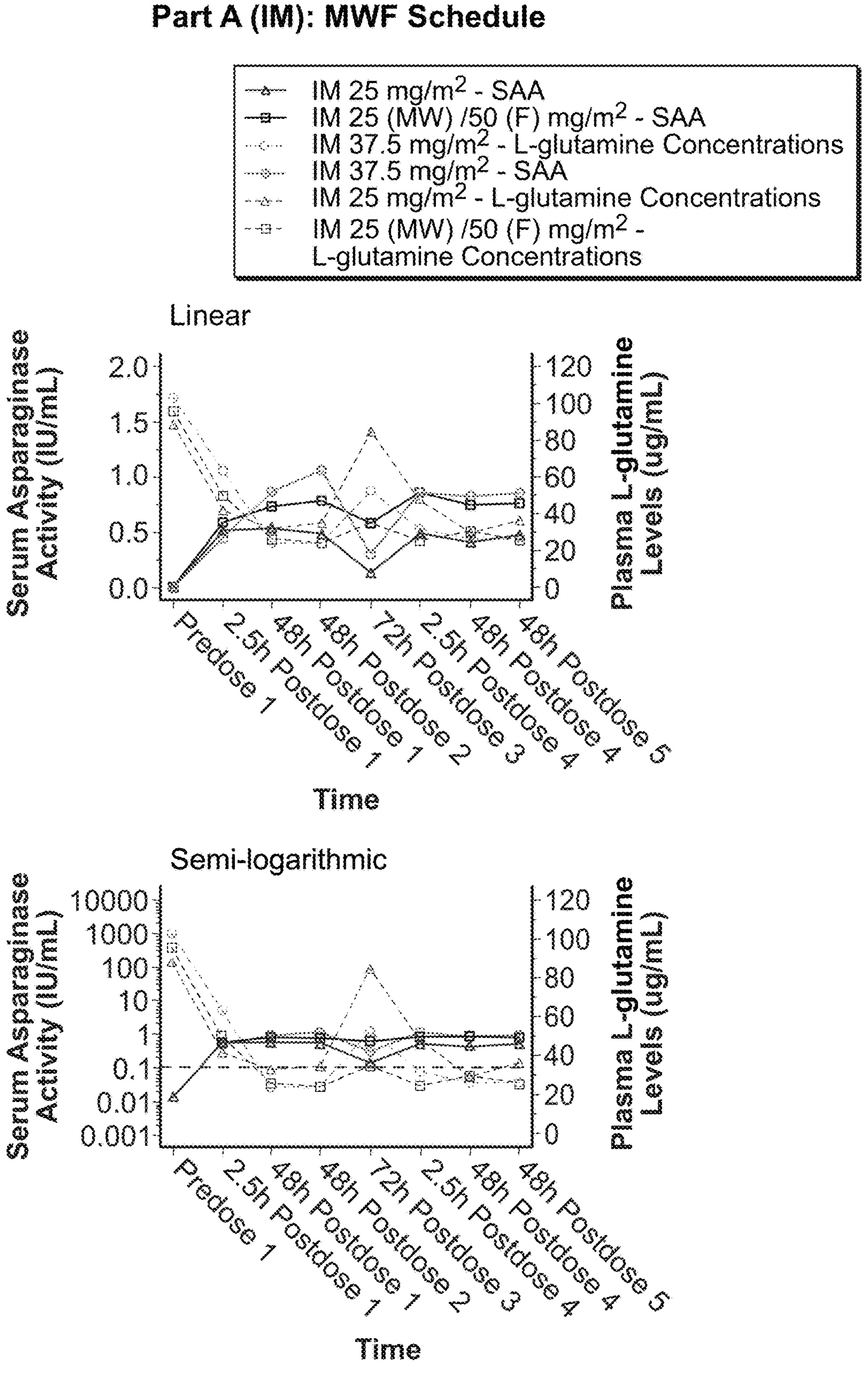
Figure 37A:
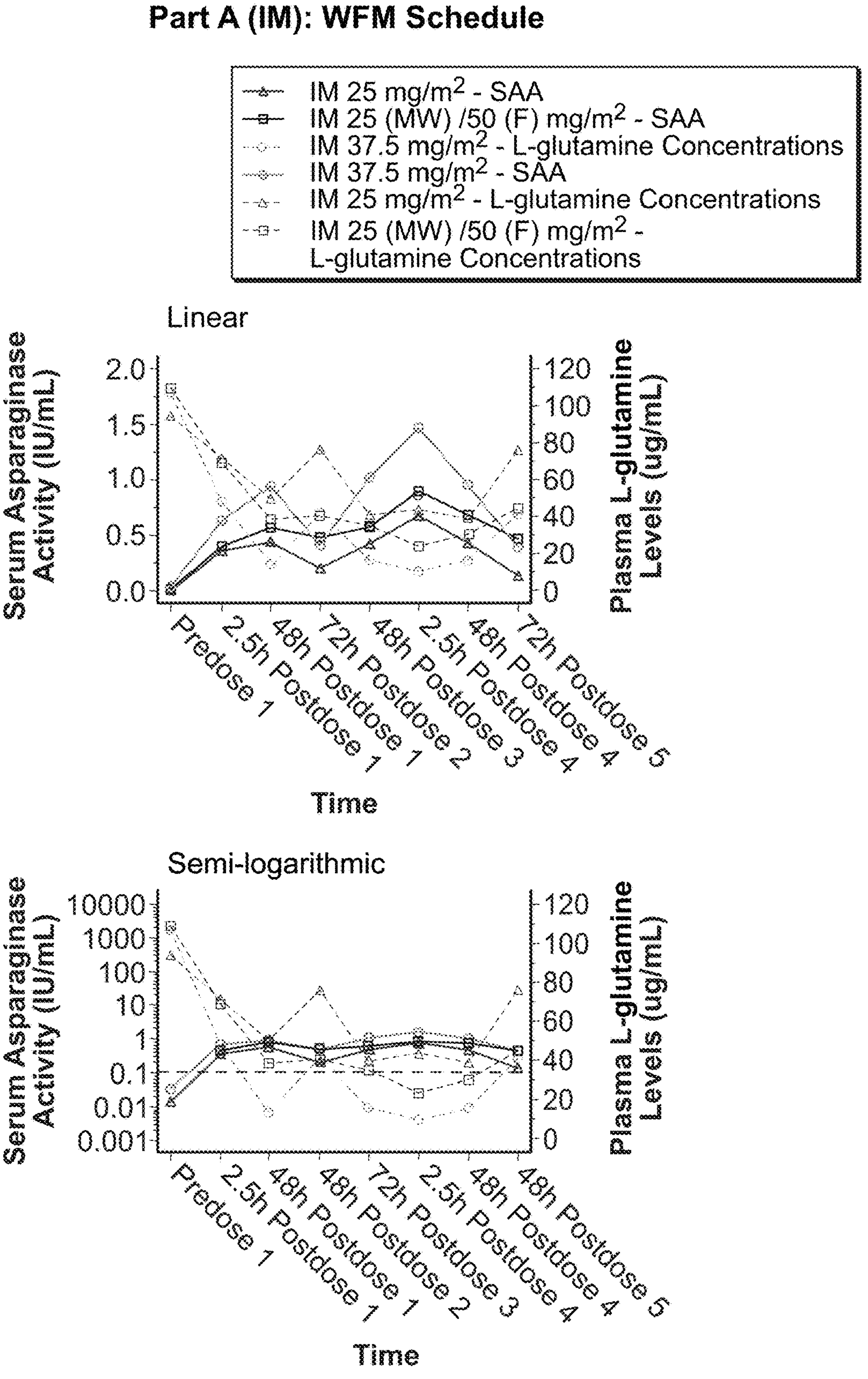
Figure 37B:
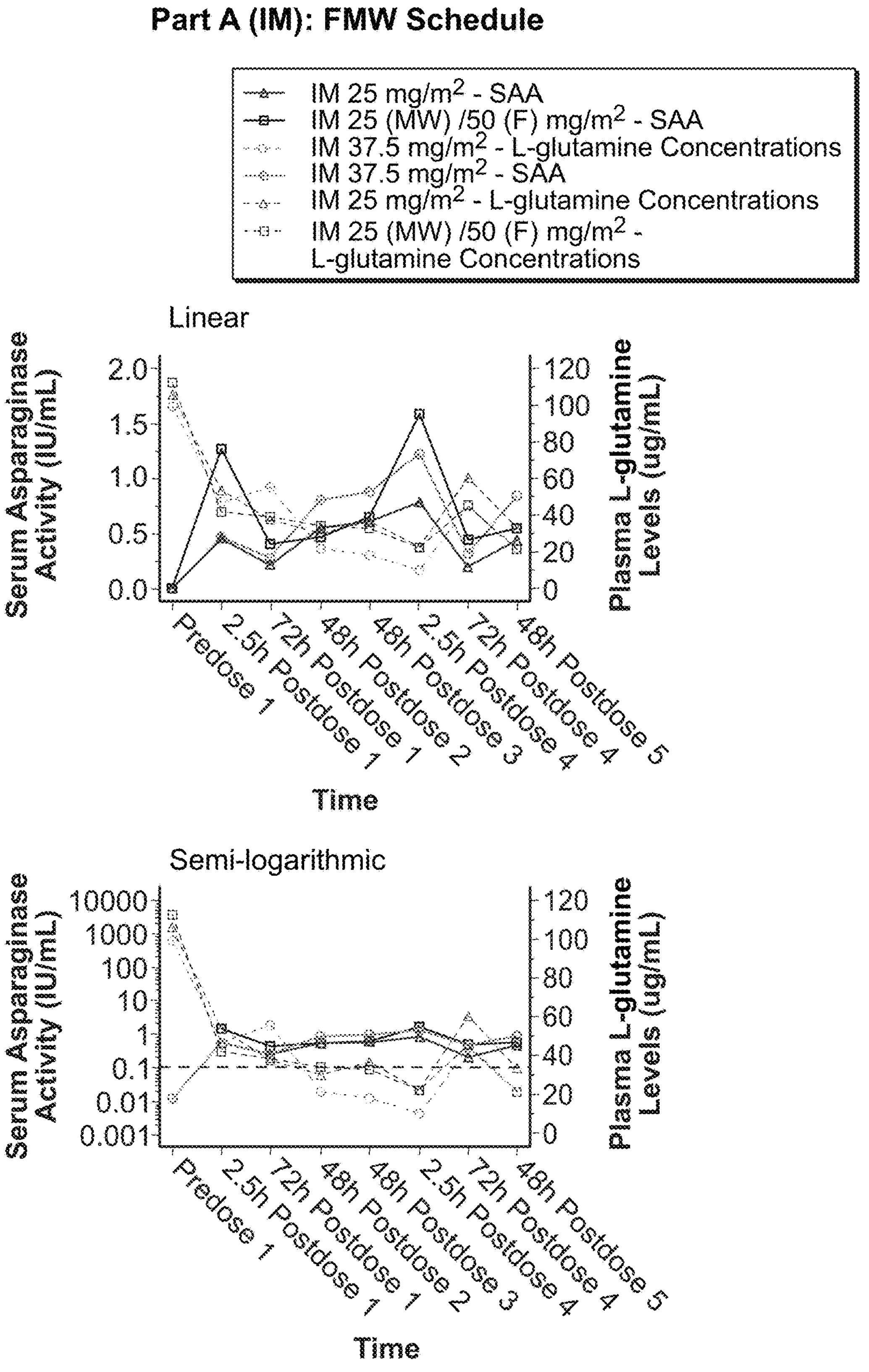
Figure 37C:
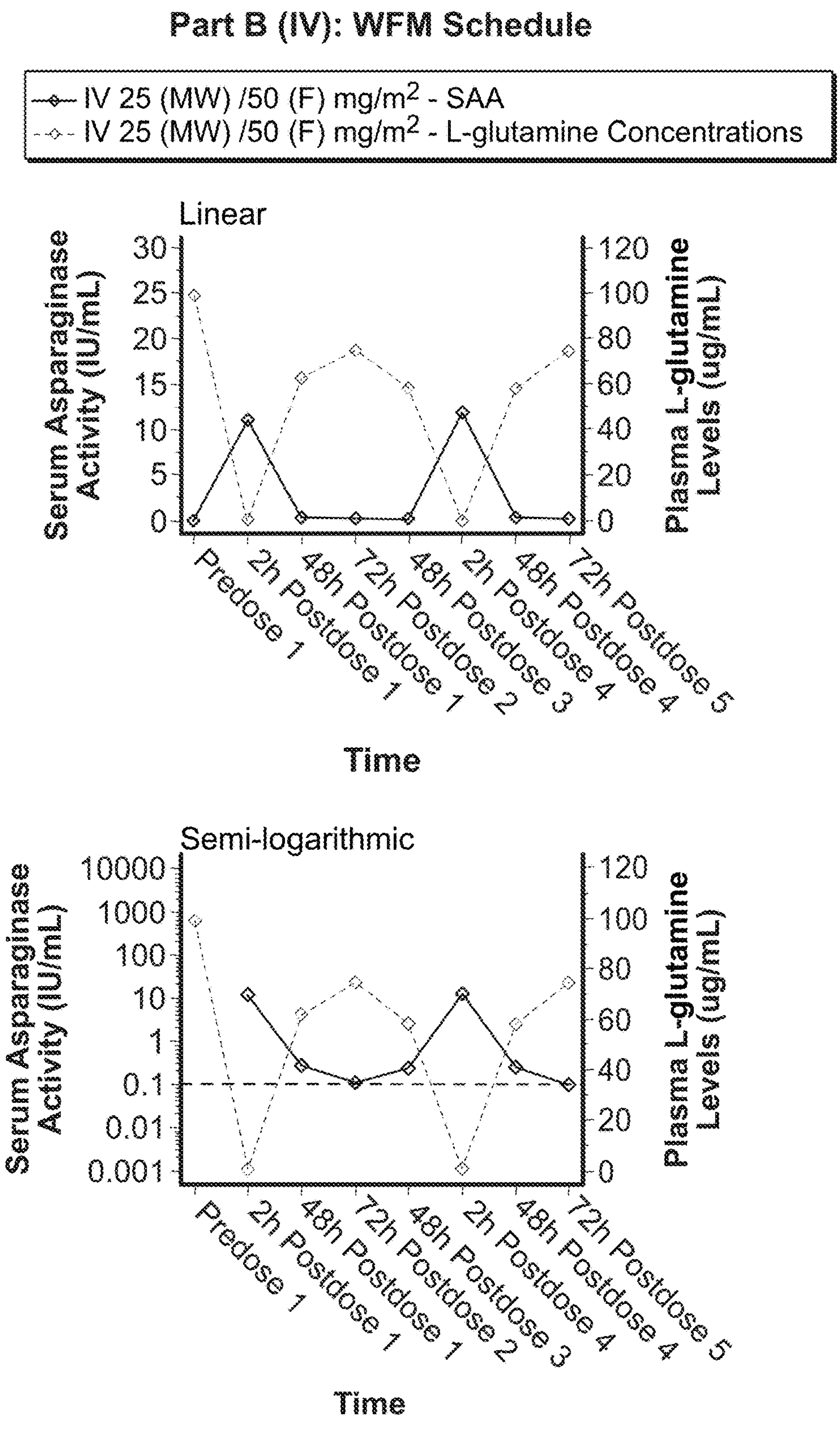
Figure 37C:
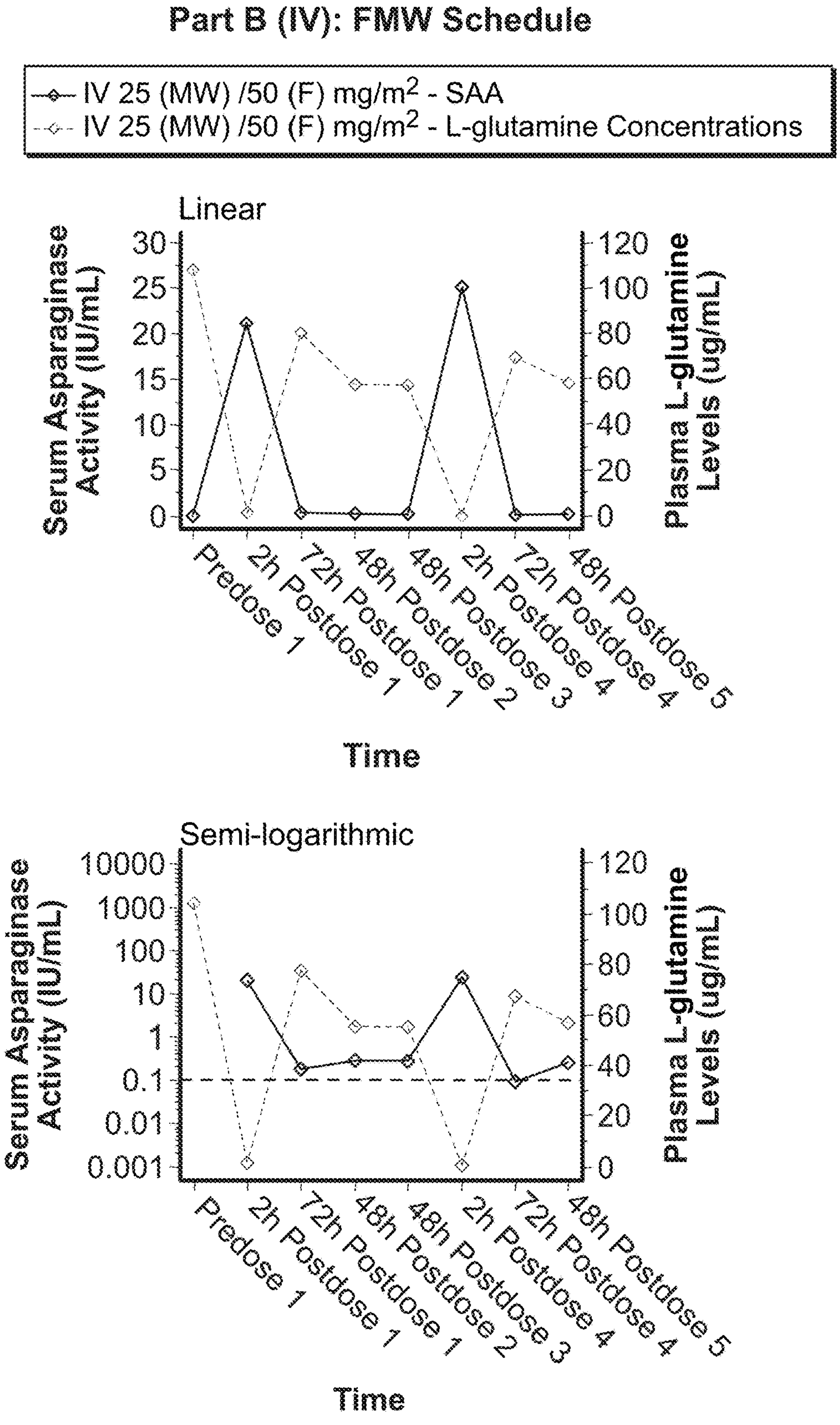

FIG. 37A, FIG. 37B, and FIG. 37C show an update on Study JZP458-201—Mean Serum Asparaginase Activity Versus Time Profiles for Corresponding Mean Plasma L-glutamine Levels with Intramuscular and Intravenous JZP-458 in Course 1 on Linear and Semi logarithmic Scales (Pharmacodynamic Analysis Set as of 19 Jul. 2021). Abbreviations: FMW=Friday, Monday, Wednesday; IM=intramuscular; IV=intravenous; MWF=Monday, Wednesday, Friday; PD=pharmacodynamic; SAA=Serum asparaginase activity; WFM=Wednesday, Friday, Monday. Lower limit of quantitation (LLOQ): SAA 0.0350 IU/mL, L-glutamine=0.250 μg/mL. Values below the LLOQ were set to 0. For the semi-logarithmic plot, only SAA in on a semi-logarithmic scale. If the mean is 0, the value will appear missing on the semi-logarithmic plot because the scale is undefined at 0.

FIG. 38 shows Dose Proportionality of JZP-458 as described in Example 12. Abbreviations: AUC=area under the concentration-time curve; Cmax=maximum SAA; Cmax,6=maximum SAA following the sixth dose during Course 1; DP=drug product FIG. 39 shows accumulation of JZP-458 as described in Example 12. Abbreviations: $C_{max}$=maximum SAA; $C_{max,6}$=maximum SAA following the sixth dose during Course 1.

Figure 40:
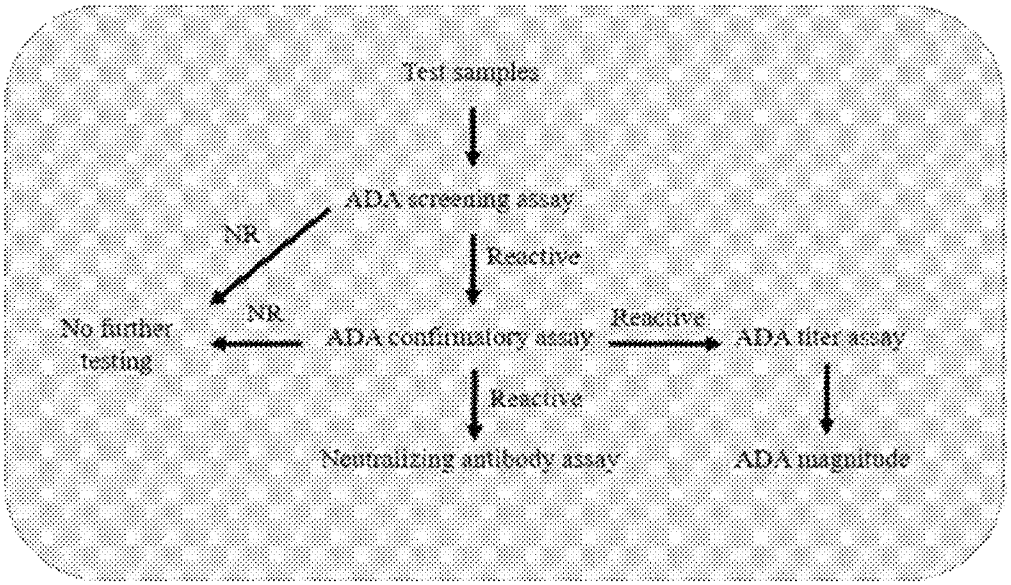

FIG. 40 shows the Tiered Immunogenicity Testing Strategy outlined in Example 12. Abbreviations: ADA=antidrug antibody; NR=nonreactive.

FIG. 41 Study JZP458-201—Maximum Number of Courses With Antidrug Antibody Collection (Data Cut-off Date: 19 Jul. 2021) as described in Example 12. Abbreviations: ADA=anti-drug antibody; IM=intramuscular; IV=intravenous; MWF=Monday, Wednesday, Friday.

FIG. 42A and FIG. 42B shows Study JZP458-201—Summary of SAA Levels in ADA+Participants Who Had at Least 1 SAA Level<0.1 IU/mL in Course 1 as of 19 Jul. 2021 as described in Example 12. Abbreviations: ADA=antidrug antibody; BLQ=below the limit of quantification; FMW=Friday, Monday, Wednesday; h=hour; MWF=Monday, Wednesday, Friday; N/A=not applicable; SAA=serum asparaginase activity.

Figure 43:
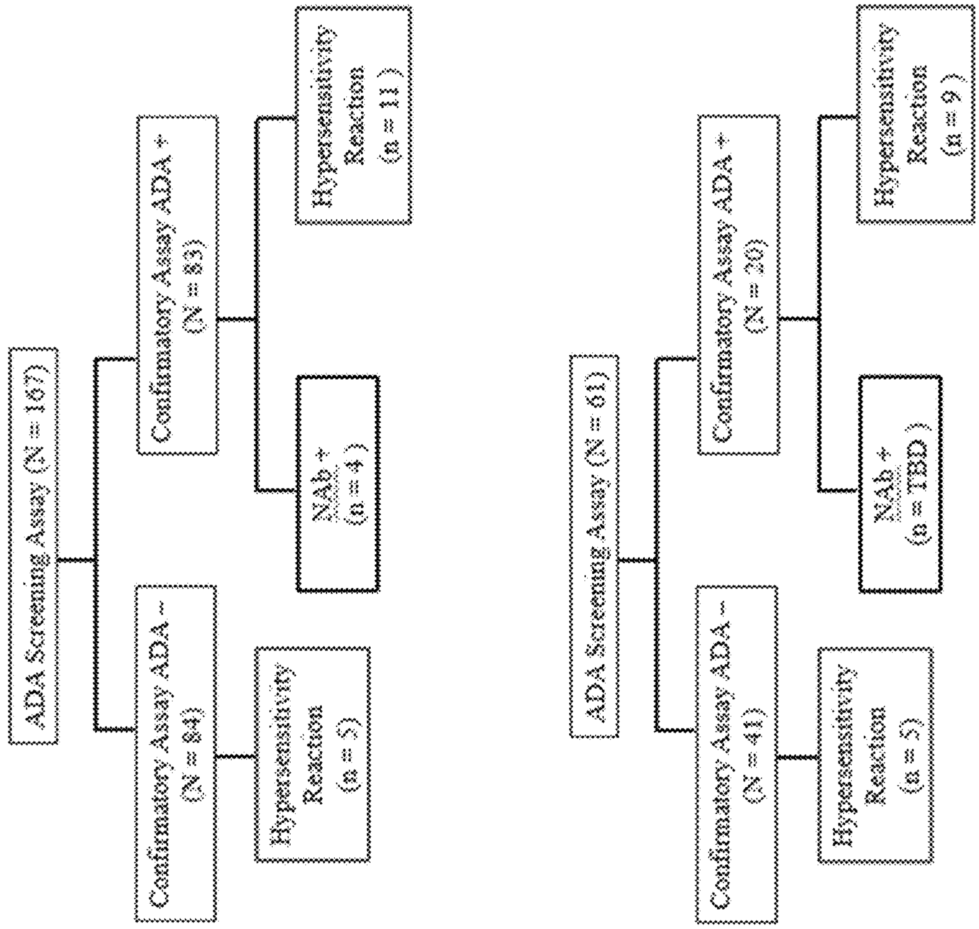

FIG. 43 shows the summary of immunogenicity results as described in Example 12. Abbreviations: ADA=anti-drug antibody; IM=intramuscular; IV=intravenous; NAb=neutralizing antibody.

DETAILED DESCRIPTION OF THE INVENTION

L-asparaginases of bacterial origin have a high immunogenic and antigenic potential. These products can provoke adverse hypersensitivity reactions including allergic reaction, silent inactivation, and anaphylactic shock in patients. L-asparaginases are enzymes with L-asparagine aminohydrolase activity. L-asparaginase enzymatic activity may include not only deamidation of asparagine to aspartic acid and ammonia, but also deamidation of glutamine to glutamic acid and ammonia. L-asparaginases from *E. coli* and *Erwinia chrysanthemi* are commonly used to treat a variety of diseases treated by asparagine depletion, including ALL and LBL. While healthy cells can produce asparagine, some diseased cells are unable to produce asparagine as they lack asparagine synthetase. When an L-asparaginase is administered to a diseased patient, the L-asparaginase reduces the levels of soluble asparagine, starving the diseased cells but not the healthy cells and leading to selective diseased cell death. Antibodies developed after treatment with L-asparaginase from *E. coli* do not cross react with L-asparaginase from *Erwinia chrysanthemi*. L-asparaginases produced in *Erwinia chrysanthemi* require long lead times for manufacture (for example Erwinase®). The present invention comprises new and improved dosing regimens for L-asparaginases that do not cross-react with L-asparaginase from *E. coli* and provides the improvements over the *E. coli*-derived L-asparaginase and the *Erwinia chrysanthemi*-derived L-asparaginase. These improvements are described herein.

I. Definitions

Unless otherwise expressly defined, the terms used herein will be understood according to their ordinary meaning in the art.

As used herein, the term "disease treatable by depletion of asparagine" refers to a condition or disorder wherein the cells involved in or responsible for the condition or disorder either lack or have a reduced ability to synthesize L-asparagine. Depletion or deprivation of L-asparagine can be partial or substantially complete (e.g., to levels that are undetectable using methods and apparatus that are known in the art).

As used herein, the term "therapeutically effective amount" refers to the amount of a protein (e.g., asparaginase or recombinant L-asparaginase thereof), required to produce a desired therapeutic effect.

The term "comprising the sequence of SEQ ID NO:1" means that the amino-acid sequence of the protein may not be strictly limited to SEQ ID NO:1 but may contain additional amino-acids.

The term "subject" or "patient" intends an animal, a mammal, or yet further a human patient.

The term "host cell or a non-human host transformed with the vector" relates to a host cell or a non-human host that comprises the vector or the nucleic acid as described herein. Host cells for the expression of polypeptides are well known in the art and comprise prokaryotic cells as well as eukaryotic cells. Appropriate culture media and conditions for the above described host cells are known in the art.

"Culturing the host or host cell" includes expression of a protein, including as a fusion protein, as defined herein and/or the polypeptide as defined herein and/or of the asparaginase in the host or host cell.

As used herein, the term "about" modifying, for example, the dimensions, volumes, quantity of an ingredient in a composition, concentrations, process temperature, process time, yields, flow rates, pressures, and like values, and ranges thereof, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods; and like considerations. The term "about" also encompasses amounts that differ due to aging of, for example, a composition, formulation, or cell culture with a particular initial concentration or mixture, and amounts that differ due to mixing or processing a composition or formulation with a particular initial concentration or mixture. Whether modified by the term "about" the claims appended hereto include equivalents to these quantities. The term "about" further may refer to a range of values that are similar to the stated reference value. In certain embodiments, the term "about" refers to a range of values that fall within 10, 9, 8, 7, 6, 5, 4, 3, 2, 1 percent or less of the stated reference value.

The terms "co-administration," "co-administering," "administered in combination with," "administering in combination with," "simultaneous," and "concurrent," as used herein, encompass administration of two or more active pharmaceutical ingredients to a human subject so that both active pharmaceutical ingredients and/or their metabolites are present in the human subject at the same time. Co-administration includes simultaneous administration in separate compositions, administration at different times in separate compositions, or administration in a composition in which two or more active pharmaceutical ingredients are present. Simultaneous administration in separate compositions and administration in a composition in which both agents are present is also encompassed in the methods of the invention.

As used herein, the term "therapeutically effective amount" refers to the amount of a protein (e.g., recombinant L-asparaginase or conjugate thereof), required to produce a desired therapeutic effect.

The terms "*E. coli*-derived L-asparaginase," "L-asparaginase from *E. coli,*" "*E. coli* asparaginase," and "*E. coli* L-asparaginase" are used interchangeably to refer to an asparaginase that is natively produced in *E. coli.*

The terms "*Erwinia*-derived L-asparaginase," "*Erwinia* asparaginase," "*Erwinia* L-asparaginase," "*Erwinia* asparaginase," "L-asparaginase from *Erwinia*," and "asparaginase from *Erwinia*," are used interchangeably herein to refer to an asparaginase that is natively produced in *Erwinia.*

The terms "L-asparaginase from *Erwinia chrysanthemi,*" "*Erwinia chrysanthemi* L-asparaginase" and "*Erwinia chrysanthemi*-derived L-asparaginase" are used interchangeably to refer to an asparaginase that is natively produced in *Erwinia chrysanthemi. Erwinia chrysanthemi* (also known as *Pectobacterium chrysanthemi*) has been renamed Dickeya *chrysanthemi*. Thus, the terms *Erwinia chrysanthemi, Pectobacterium chrysanthemi* and Dickeya *chrysanthemi* are used interchangeably herein.

Erwinaze® (Biologic License Application 125359) is an *Erwinia chrysanthemi* L-asparaginase type II product commercially approved in the United States for treatment of ALL in patients. Its active ingredient is *Erwinia chrysanthemi* L-asparaginase type II (see Erwinaze® package insert, incorporated herein by reference).

The terms "homology" and "sequence identity" are used interchangeably herein. Percent (%) amino acid sequence identity with respect to a protein sequence is defined as the percentage of amino acid residues in a candidate sequence that are identical with the amino acid residues in the specific (parental) sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or Megalign (DNASTAR) software. Those skilled in the art can determine appropriate parameters for measuring alignment, including any algorithms needed to achieve maximal alignment over the full length of the sequences being compared. One particular program is the ALIGN-2 program outlined at paragraphs [0279] to [0280] of US Pub. No. 20160244525, hereby incorporated by reference. The degree of identity between an amino acid sequence of the present invention ("invention sequence") and the parental amino acid sequence is calculated as the number of exact matches in an alignment of the two sequences, divided by the length of the "invention sequence," or the length of the parental sequence, whichever is the shortest. The result is expressed in percent identity. In some embodiments, two or more amino acid sequences are at least 50%, 60%, 70%, 80%, or 90% identical. In some embodiments, two or more amino acid sequences are at least 95%, 97%, 98%, 99%, or even 100% identical.

The term "two days" as used in the context of dosing, refers to an amount of time between a first dose and a second dose, where the second dose is administered after the first dose. For example, if the first dose is administered on a Monday of a given week, a second dose administered two days after the first dose would be administrated on the Wednesday of the given week. The term "two days" encompasses situations where the first dose is administered at the same time of day as the second dose, as well as situations where the first dose is administered at a different time of day than the second dose. So, in the example above, where the first dose is administered on a Monday and the second dose is administered on a Wednesday of a given week, the first dose could be administered in the early morning on the Monday of the given week, and the second dose could be administered in the afternoon or evening on the Wednesday of the given week and still be within the scope of the term "two days". Conversely, the first dose could be administered in the afternoon or evening on the Monday of the given week, and the second dose could be administered in the morning on the Wednesday of the given week and still be within the scope of the term "two days".

The term "three days" as used in the context of dosing, refers to an amount of time between a first dose and a second dose, where the second dose is administered after the first dose. For example, if the first dose is administered on a Friday of a given week, a second dose administered three days after the first dose would be administrated on the Monday of the week immediately following the given week. The term "three days" encompasses situations where the first dose is administered at the same time of day as the second dose, as well as situations where the first dose is administered at a different time of day than the second dose. So, in the example above, where the first dose is administered on the Friday of the given week and the second dose is administered on the Monday of the week immediately following the given week, the first dose could be administered in the early morning on the Friday of the given week, and the second dose could be administered in the afternoon or evening on the Monday of the week immediately following the given week and still be within the scope of the term "three days". Conversely, the first dose could be administered in the afternoon or evening on the Friday of the given week, and the second dose could be administered in the morning on the Monday of the week immediately following the given week and still be within the scope of the term "three days".

The term "seven days" as used in the context of dosing, refers to an amount of time between a first dose and a second dose, where the second dose is administered after the first dose. For example, if the first dose is administered on a Friday of a given week, a second dose administered seven days after the first dose would be administered on the Friday of the week immediately following the given week. The term "seven days" encompasses situations where the first dose is administered at the same time of day as the second dose, as well as situations where the first dose is administered at a different time of day than the second dose. So, in the example above, where the first dose is administered on the Friday of a given week and the second dose is administered on the Friday of the week immediately following the given week, the first dose could be administered in the early morning on the Friday of the given week, and the second dose could be administered in the afternoon or evening on the Friday of the week immediately following the given week and still be within the scope of seven days. Conversely, the first dose could be administered in the afternoon or evening on the Friday of the given week, and the second dose could be administered in the morning on the Friday of the week immediately following the given week and still be within the scope of seven days.

The term "about 48 hours" as used in the context of dosing, refers to an amount of time between a first dose and a second dose, where the second dose is administered after the first dose. For example, if the first dose is administered on a Monday of a given week, a second dose administered about 48 hours after the first dose would be administrated on the Wednesday of the given week. The term "about 48 hours" encompasses situations where the first dose is administered at the same time of day as the second dose, as well as situations where the first dose is administered at a different time of day than the second dose. So, in the example above, where the first dose is administered on a Monday and the second dose is administered on a Wednesday of a given week, the first dose could be administered in the early morning on the Monday of the given week, and the second dose could be administered in the afternoon or evening on the Wednesday of the given week and still be within the scope of the term "about 48 hours". Conversely, the first dose could be administered in the afternoon or evening on the Monday of the given week, and the second dose could be administered in the morning on the Wednesday of the given week and still be within the scope of the term "about 48 hours".

The term "about 72 hours" as used in the context of dosing, refers to an amount of time between a first dose and a second dose, where the second dose is administered after the first dose. For example, if the first dose is administered on a Friday of a given week, a second dose administered about 72 hours after the first dose would be administrated on the Monday of the week immediately following the given week. The term "about 72 hours" encompasses situations where the first dose is administered at the same time of day as the second dose, as well as situations where the first dose is administered at a different time of day than the second dose. So, in the example above, where the first dose is administered on the Friday of the given week and the second dose is administered on the Monday of the week immediately following the given week, the first dose could be administered in the early morning on the Friday of the given week, and the second dose could be administered in the afternoon or evening on the Monday of the week immediately following the given week and still be within the scope of the term "about 72 hours". Conversely, the first dose could be administered in the afternoon or evening on the Friday of the given week, and the second dose could be administered in the morning on the Monday of the week immediately following the given week and still be within the scope of the term "about 72 hours".

The term "about 168 hours" as used in the context of dosing, refers to an amount of time between a first dose and a second dose, where the second dose is administered after the first dose. For example, if the first dose is administered on a Friday of a given week, a second dose administered about 168 hours after the first dose would be administered on the Friday of the week immediately following the given week. The term "about 168 hours" encompasses situations where the first dose is administered at the same time of day as the second dose, as well as situations where the first dose is administered at a different time of day than the second dose. So, in the example above, where the first dose is administered on the Friday of a given week and the second dose is administered on the Friday of the week immediately following the given week, the first dose could be administered in the early morning on the Friday of the given week, and the second dose could be administered in the afternoon or evening on the Friday of the week immediately following the given week and still be within the scope of the term "about 168 hours". Conversely, the first dose could be administered in the afternoon evening on the Friday of the given week, and the second dose could be administered in the morning on the Friday of the week immediately following the given week and still be within the scope of the term "about 168 hours".

II. Recombinant L-asparaginase

In one aspect, a recombinant L-asparaginase in accordance with the disclosure provided herein is an L-asparaginase. In a further aspect, a recombinant L-asparaginase in accordance with the invention described herein is an enzyme with L-asparagine aminohydrolase activity. Such a recombinant L-asparaginase's enzymatic activity may include not only deamidation of asparagine to aspartic acid and ammonia, but also deamidation of glutamine to glutamic acid and ammonia.

In some embodiments, a recombinant L-asparaginase as disclosed herein is active as a multimer. In some embodiments, the recombinant L-asparaginase is an active enzyme as a tetramer. A tetramer is composed of four subunits (also known as monomers). In some embodiments, a recombinant L-asparaginase is a tetramer consisting of four identical 35 kD subunits. In some embodiments, the recombinant L-asparaginase is a non-disulfide bonded tetrameric therapeutic protein. In a particular embodiment, each of the subunits or monomers of a multimeric recombinant L-asparaginase comprises the amino acid sequence of SEQ ID NO: 1. In a particular embodiment, each of the subunits or monomers of a tetrameric recombinant L-asparaginase comprises the amino acid sequence of SEQ ID NO: 1. In another embodiment, the L-asparaginase is from *Erwinia chrysanthemi* NCPPB 1066 (Genbank Accession No. CAA32884, incorporated herein by reference in its entirety), either with or without signal peptides and/or leader sequences.

In some embodiments, the recombinant L-asparaginase is composed of multiple subunits, for example, four subunits or monomers (tetramer). A corresponding modified recombinant protein may then, e.g., consist of 1 to 20 (or more) peptides conjugated to each of the monomers of that tetramer. In some embodiments, the recombinant L-asparaginase comprises a monomer and 1, 2, 3, 4, 5, 6, 7, 8, 9, 10, 11, 12, 13, 14, 15, 16, 17, 18, 19, and 20 (or more) peptides conjugated to each of the L-asparaginase monomers. In a specific embodiment, the L-asparaginase is a multimer comprising multiple subunits or monomers, such as a tetramer, and each of the monomers in that tetramer is conjugated to 1 peptide, resulting in a tetramer comprising 4 conjugated peptides, one for each monomer. In some embodiments, the recombinant L-asparaginase is a tetramer comprising 1-4 peptides conjugated to each of the L-monomers. In some embodiments, the recombinant L-asparaginase is a tetramer comprising 4-20 peptides conjugated to each of the L-monomers. In some embodiments, the recombinant L-asparaginase is a tetramer comprising 6-18 peptides conjugated to each of the L-monomers. In some embodiments, the recombinant L-asparaginase is a tetramer comprising 6-18 peptides conjugated to each of the L-monomers. In some embodiments, the recombinant L-asparaginase is a tetramer comprising 10-15 peptides conjugated to each of the L-monomers.

In one aspect, the invention relates to a modified protein having a recombinant L-asparaginase and multiple chemically attached peptide sequences. In a further aspect the length of the peptide sequences are from about 10 to about 100, from about 15 to about 60 or from about 20 to about 40.

Fragments of recombinant L-asparaginase, preferably fragments of the recombinant L-asparaginase of SEQ ID NO:1, may be of use in the presently described invention. The term "a fragment of recombinant L-asparaginase" (e.g. a fragment of the recombinant L-asparaginase of SEQ ID NO: 1) means that the sequence of the recombinant L-asparaginase may include fewer amino-acids than in the recombinant L-asparaginases exemplified herein (e.g. the recombinant L-asparaginase of SEQ ID NO: 1) but still enough amino-acids to confer L-aminohydrolase activity. For example, a "fragment of recombinant L-asparaginase" is a fragment that is/consists of at least about 150 or 200 contiguous amino acids of one of the recombinant L-asparaginases exemplified herein (e.g. the recombinant L-asparaginase of SEQ ID NO: 1) (for example about 150, 160, 170, 180, 190, 200, 210, 220, 230, 240, 250, 260, 270, 280, 290, 300, 310, 320, 321, 322, 323, 324, 325, 326 contiguous amino acids) and/or wherein said fragment has up to 50 amino acids deleted from the N-terminus of said recombinant L-asparaginases exemplified herein (e.g. the recombinant L-asparaginase of SEQ ID NO: 1) (e.g. up to 1, 2, 3, 4, 5, 6, 7, 8, 9, 10, 15, 20, 25, 30, 35, 40, 45, or 50) and/or has up to up to 75 or 100 amino acids deleted from the C-terminus of said recombinant L-asparaginases exemplified herein (e.g. the recombinant L-asparaginase of SEQ ID NO: 1) (e.g. up to 1, 2, 3, 4, 5, 6, 7, 8, 9, 10, 15, 20, 25, 30, 35, 40, 45, 50, 55, 60, 70, 75, 80, 85, 90, 95 or 100) and/or has deleted amino acids at both the N-terminus and the C-terminus of said recombinant L-asparaginases exemplified herein (e.g. the recombinant L-asparaginase of SEQ ID NO: 1), wherein the total number of amino acids deleted can be up to 125 or 150 amino acids.

Indeed, a person skilled in the art will understand how to select and design homologous proteins retaining substantially their L-asparaginase activity. Typically, a Nessler assay is used for the determination of L-asparaginase activity according to a method described by Mashburn and Wriston (Mashburn, L., and Wriston, J. (1963) "Tumor Inhibitory Effect of L-Asparaginase," Biochem Biophys Res Commun 12, 50, incorporated herein by reference in its entirety).

It is well known in the art that a polypeptide can be modified by substitution, insertion, deletion and/or addition of one or more amino-acids while retaining its enzymatic activity. The term "one or more amino acids" in this context can refer to one, two, three, four, five, six, seven, eight, nine, ten or more amino acids. For example, substitution of one amino-acid at a given position by a chemically equivalent amino-acid that does not affect the functional properties of a protein is common Substitutions may be defined as exchanges within one of the following groups:

Small aliphatic, non-polar or slightly polar residues: Ala, Ser, Thr, Pro, Gly

Polar, negatively charged residues and their amides: Asp, Asn, Glu, Gln

Polar, positively charged residues: His, Arg, Lys

Large aliphatic, non-polar residues: Met, Leu, Ile, Val, Cys

Large aromatic residues: Phe, Tyr, Trp.

Thus, changes that result in the substitution of one negatively charged residue for another (such as glutamic acid for aspartic acid) or one positively charged residue for another (such as lysine for arginine) can be expected to produce a functionally equivalent product.

The positions where the amino-acids are modified and the number of amino-acids that may be modified in the amino-acid sequence are not particularly limited. The skilled artisan is able to recognize the modifications that can be introduced without affecting the activity of the protein. For example, modifications in the N- or C-terminal portion of a protein may be expected not to alter the activity of a protein under certain circumstances. With respect to asparaginases, in particular, much characterization has been done, particularly with respect to the sequences, structures, and the residues forming the active catalytic site. This provides guidance with respect to residues that can be modified without affecting the activity of the enzyme. All known L-asparaginases from bacterial sources have common structural features. All are homotetramers with four active sites between the N- and C-terminal domains of two adjacent monomers (Aghaipour (2001) Biochemistry 40, 5655-5664, incorporated herein by reference in its entirety). All have a high degree of similarity in their tertiary and quaternary structures (Papageorgiou (2008) FEBS J. 275, 4306-4316, incorporated herein by reference in its entirety). The sequences of the catalytic sites of L-asparaginases are highly conserved between *Erwinia chrysanthemi, Erwinia carotovora*, and *E. coli* L-asparaginase II (Id). The active site flexible loop contains amino acid residues 14-33, and structural analysis show that Thr15, Thr95, Ser62, Glu63, Asp96, and Ala120 contact the ligand (Id). Aghaipour et al. have conducted a detailed analysis of the four active sites of *Erwinia chrysanthemi* L-asparaginase by examining high resolution crystal structures of the enzyme complexed with its substrates (Aghaipour (2001) Biochemistry 40, 5655-5664). Kotzia et al. provide sequences for L-asparaginases from several species and subspecies of *Erwinia* and, even though the proteins have only about 75-77% identity between *Erwinia chrysanthemi* and *Erwinia carotovora*, they each still have L-asparaginase activity (Kotzia (2007) J. Biotechnol. 127, 657-669). Moola et al performed epitope mapping studies of *Erwinia chrysanthemi* 3937 L-asparaginase and were able to retain enzyme activity even after mutating various antigenic sequences in an attempt to reduce immunogenicity of the asparaginase (Moola (1994) Biochem. J. 302, 921-927). In view of the extensive characterization that has been performed on L-asparaginases, one of skill in the art could determine how to make fragments and/or sequence substitutions while still retaining enzyme activity.

More specifically, fragments of the protein of SEQ ID NO:1 are also comprised within the definition of the protein used in the recombinant L-asparaginase of the invention. The term "a fragment of SEQ ID NO:1" means that the sequence of the polypeptide may include fewer amino-acids than the full-length SEQ ID NO:1 but retains enough of the protein to confer L-aminohydrolase activity. In some embodiments, a recombinant L-asparaginase has at least about 80% homology or identity with the protein comprising SEQ ID NO: 1. In some embodiments, a recombinant L-asparaginase comprises a sequence identity of at least about 85%, 86%, 87%, 88%, 89%, 90% 91%, 92%, 93%, 94%, 95%, 96%, 97%, 98%, 99% identity to the amino acid sequence of SEQ ID NO: 1. The terms "homology" and "sequence identity" are used interchangeably herein. The term "comprising the sequence of SEQ ID NO: 1" (for example if the L-asparaginase has 100% homology or sequence identity to the amino acid sequence of SEQ ID NO: 1) means that the amino acid sequence of the asparaginase may not be strictly limited to SEQ ID NO: 1 but may contain one, two, three, four, five, six, seven, eight, nine, ten or more additional amino acids.

```
SEQ ID NO: 1 is as follows:
ADKLPNIVILATGGTIAGSAATGTQTTGYKAGALGVDTLI

NAVPEVKKLANVKGEQFSNMASENMTGDVVLKLSQRVNEL

LARDDVDGVVITHGTDTVEESAYFLHLTVKSDKPVVFVAA

MRPATAISADGPMNLLEAVRVAGDKQSRGRGVMVVLNDRI

GSARYITKTNASTLDTFKANEEGYLGVIIGNRIYYQNRID

KLHTTRSVFDVRGLTSLPKVDILYGYQDDPEYLYDAAIQH

GVKGIVYAGMGAGSVSVRGIAGMRKAMEKGVVVIRSTRIG

NGIVPPDEELPGLVSDSLNPAHARILLMLALTRTSDPKVI

QEYFHTY
```

The present disclosure also relates to a nucleic acid encoding the recombinant L-asparaginase described herein, particularly a nucleic acid encoding SEQ ID NO: 1 as defined herein.

A. PEGylation

In certain aspects, the recombinant L-asparaginase of the invention as described herein further comprises and/or is conjugated to a polymer. In some embodiments, the recombinant L-asparaginase as described herein is conjugated with a polyethylene glycol (PEG) moiety. In other embodiments, the recombinant L-asparaginase is not conjugated with a PEG moiety.

Polymers are selected from the group of non-toxic water soluble polymers such as polysaccharides, e.g. hydroxyethyl starch, poly amino acids, e.g. poly lysine, polyester, e.g., polylactic acid, and poly alkylene oxides, e.g., polyethylene glycol (PEG). Polyethylene glycol (PEG) or monomethoxy-polyethyleneglycol (mPEG) is well known in the art and comprises linear and branched polymers. Examples of some polymers, particularly PEG, are provided in the following, each of which is herein incorporated by reference in its entirety: U.S. Pat. Nos. 5,672,662; 4,179,337; 5,252,714; U.S. Patent Application Publication No. 2003/0114647; U.S. Pat. Nos. 6,113,906; 7,419,600; 9,920,311 PCT Publication WO2019/109018, and PCT Publication No. WO2004/083258.

The quality of such polymers is characterized by the polydispersity index (PDI). The PDI reflects the distribution of molecular weights in a given polymer sample and is calculated from the weight average molecular weight divided by the number average molecular weight. It indicates the distribution of individual molecular weights in a batch of polymers. The PDI has a value always greater than 1, but as the polymer chains approach the ideal Gauss distribution (=monodispersity), the PDI approaches 1.

In one embodiment, the conjugate has the formula: Asp-[NH—CO—CH.sub.2)x-CO—NH-PEG]n, wherein Asp is the recombinant L-asparaginase, NH is one or more of the NH groups of the lysine residues and/or the N-terminus of the Asp, PEG is a polyethylene glycol moiety, n is a number that represents at least about 40% to about 100% of the accessible amino groups (e.g., lysine residues and/or the N-terminus) in the Asp, and x is an integer ranging from about 1 to about 8, more specifically, from about 2 to about 5. In a specific embodiment, the PEG is monomethoxy-polyethylene glycol (mPEG).

B. PASylation

In some embodiments, the recombinant L-asparaginase is conjugated with a proline- or alanine-containing peptide. In other embodiments, the recombinant crisantaspase is not conjugated with a proline-, alanine-, or serine-containing peptide.

In some embodiments, the recombinant L-asparaginase is a fusion protein comprising (i) a recombinant L-asparaginase having at least 85%, 90%, 91%, 92%, 93%, 94%, 95%, 96%, 97%, 98%, 99%, or 100% identity to the amino acid sequence of SEQ ID NO: 1 and (ii) one or more polypeptide (s), wherein the polypeptide consists solely of proline and alanine amino acid residues.

In such fusion proteins, the proline residues in the polypeptide consisting solely of proline and alanine amino acid residues may constitute more than about 10% and less than about 70% of the polypeptide. Accordingly, in such fusion proteins, it may be preferred that 10% to 70% of the total number of amino acid residues in the polypeptide are proline residues; more preferably, 20% to 50% of the total number of amino acid residues comprised in the polypeptide are proline residues; and even more preferably, 30% to 40% (e.g., 30%, 35% or 40%) of the total number of amino acid residues comprised in the polypeptide are proline residues. The polypeptide may comprise a plurality of amino acid repeats, wherein said repeat consists of proline and alanine residues and wherein no more than 6 consecutive amino acid residues are identical. Particularly, the polypeptide may comprise or consist of the amino acid sequence AAPAAPA-PAAPAAPAPAAPA (SEQ ID NO: 2) or circular permuted versions or (a) multimers(s) of the sequences as a whole or parts of the sequence. In other embodiments, the recombinant L-asparaginase specifically lacks such a polypeptide, e.g., the recombinant L-asparaginase is not conjugated to a polypeptide containing the above-described percentages or repeats of proline residues.

The invention also relates to a nucleic acid encoding the recombinant L-asparaginase, particularly a fusion protein as defined herein. In some embodiments, the nucleotide sequence is a sequence encoding any of the recombinant L-asparaginases comprising SEQ ID NO: 1 and a polypeptide, wherein the polypeptide consists solely of proline and alanine amino acid residues, preferably wherein the protein is a fusion protein, described herein, except that one or more amino acid is added, deleted, inserted or substituted, with the proviso that the fusion protein having this amino acid sequence retains L-asparaginase activity. In other embodiments, the nucleotide sequence is a sequence encoding any recombinant L-asparaginase comprises SEQ ID NO: 1, wherein that sequence is not conjugated to (or part of a sequence encoding a fusion protein that contains) a polypeptide that consists solely of proline and alanine amino acid residues.

The recombinant L-asparaginase according to the present disclosure can be prepared using methods known in the art, particularly those methods disclosed in U.S. Pat. No. 10,174,302 and PCT Application No. WO2019/109018, herein incorporated by reference for exemplary embodiments.

C. Compositions Comprising Recombinant L-asparaginase

The present disclosure also provides for compositions comprising a recombinant L-asparaginase. Such compositions may include a recombinant L-asparaginase in combination with other elements (including without limitation buffers, salts, and excipients). Such compositions may include vehicles for administering L-asparaginase into a subject, including for example particles, powders, and encapsulation.

In some embodiments, a recombinant L-asparaginase described herein can be encapsulated. The encapsulation of asparaginase in erythrocytes can in some instances serve to improve the therapeutic index (D. Schrijvers et al., Clin. Pharmacokinet. 2003, 42 (9): 779-791). Methods for encapsulation are described for example in EP1773452, which is incorporated by reference herein in its entirety and in particular for all teachings related to encapsulation of L-asparaginase.

III. Functional Aspects and Other Characteristics of a Recombinant L-asparaginase and Compositions Thereof As will be appreciated, discussion herein of functional aspects and other characteristics of recombinant L-asparaginase can also apply to compositions comprising the recombinant L-asparaginase of the presently disclosed invention.

In some aspects, a recombinant L-asparaginase described herein may elicit a lower immunogenic response in the patient as compared to a wild-type L-asparaginase. In some embodiments, the recombinant L-asparaginase described herein can have a greater AUC value after a single dose compared to the native L-asparaginase. These characteristics of the recombinant L-asparaginase described herein are beneficial for a patient that may have had a previous hypersensitivity to an *E. coli* L-asparaginase or a PEGylated form thereof. In some embodiments, the recombinant L-asparaginase described herein does not raise any significant antibody response for a particular period of time after administration of a single dose, e.g., greater than about 1 week, 2 weeks, 3 weeks, 4, weeks, 5 weeks, 6 weeks, 7 weeks, 8 weeks, 9 weeks, 10 weeks, 11 weeks, 12 weeks, or longer. In one example, "does not raise any significant antibody response" means that the subject receiving the recombinant L-asparaginase is identified within art-recognized parameters as antibody-negative. Antibody levels can be determined by methods known in the art, for example ELISA or surface plasmon resonance assays (Zalewska-Szewczyk (2009) Clin. Exp. Med. 9, 113-116; Avramis (2009) Anticancer Research 29, 299-302, each of which is incorporated herein by reference in its entirety).

Compositions comprising the recombinant L-asparaginase of the present invention display reduced aggregation compared to those containing Erwinase® and *Erwinia chrysanthemi* L-asparaginase recombinantly expressed in *E. coli*. In some embodiments, compositions comprising the recombinant L-asparaginase described herein demonstrates reduced aggregation compared to compositions containing other forms L-asparaginase. For example, processes for manufacturing an unconjugated recombinant L-asparaginase of the present invention result in lower aggregation than Erwinase® and *Erwinia chrysanthemi* L-asparaginase recombinantly expressed in *E. coli*. The process for making batches of Erwinase® for example, results in a product with about 6% aggregation (see Example 5 and Example 6). Batches of a recombinant L-asparaginase of the present disclosure generally have less than about 1% aggregation (See Example 5 and Example 6).

In some embodiments, the recombinant L-asparaginase of the disclosure has greater purity than other L-asparaginases. In some embodiments, purity is measured by demonstrating the amount of aggregation in a given sample of an asparaginase. The amount of aggregation may be demonstrated by various methods described in the art, including but not limited to Size-Exclusion Chromatography (SEC-HPLC), Size-Exclusion Ultrahigh-Performance Liquid Chromatography (SE-UHPLC), Size Exclusion Chromatography-Multi-Angle Light Scattering (SEC MALLS), and sedimentation velocity Analytical Ultracentrifugation (svAUC). In some embodiments, the amount of aggregation of the recombinant L-asparaginase is less than 10%, 9%, 8%, 7%, 6%, 5%, 4%, 3%, 2%, 1%, 0.5%, 0.25%, 0.2%, 0.1%, or 0.01%. In some embodiments, the amount of aggregation seen in compositions containing the recombinant L-asparaginase is less than 1-10%. In some embodiments, the amount of aggregation seen in compositions containing the recombinant L-asparaginase is less than 10%. In some embodiments, the amount of aggregation of the recombinant L-asparaginase is less than 9%. In some embodiments, the amount of aggregation of the recombinant L-asparaginase is less than 8%. In some embodiments, the amount of aggregation of the recombinant L-asparaginase is less than 7%. In some embodiments, the amount of aggregation of the recombinant L-asparaginase is less than 6%. In some embodiments, the amount of aggregation of the recombinant L-asparaginase is less than 5%. In some embodiments, the amount of aggregation of the recombinant L-asparaginase is less than 4%. In some embodiments, the amount of aggregation of the recombinant L-asparaginase is less than 3%. In some embodiments, the amount of aggregation of the recombinant L-asparaginase is less than 2%. In some embodiments, the amount of aggregation of the recombinant L-asparaginase is less than 1%. In some embodiments, the amount of aggregation of the recombinant L-asparaginase is less than 0.5%. In some embodiments, the amount of aggregation of the recombinant L-asparaginase is less than 0.25%. In some embodiments, the amount of aggregation of the recombinant L-asparaginase is less than 0.2%. In some embodiments, the amount of aggregation of the recombinant L-asparaginase is less than 0.1%. In some embodiments, the amount of aggregation of the recombinant L-asparaginase is less than 0.01%. In some embodiments, the amount of aggregation of the recombinant L-asparaginase is between 0.01% and 10%. In some embodiments, the amount of aggregation of the recombinant L-asparaginase is between about 0.01% and about 9%. In some embodiments, the amount of aggregation of the recombinant L-asparaginase is between about 0.01% and about 8%. In some embodiments, the amount of aggregation of the recombinant L-asparaginase is between about 0.01% and about 7%. In some embodiments, the amount of aggregation of the recombinant L-asparaginase is between about 0.01% and about 6%. In some embodiments, the amount of aggregation of the recombinant L-asparaginase is between about 0.1% and about 5%. In some embodiments, the amount of aggregation of the recombinant L-asparaginase is between about 0.2% and about 4%. In some embodiments, the amount of aggregation of the recombinant L-asparaginase is between about 0.25% and about 3%. In some embodiments, the amount of aggregation of the recombinant L-asparaginase is between about 0.5% and about 2%. In some embodiments, the amount of aggregation of the recombinant L-asparaginase is about 1%. In some embodiments, the amount of aggregation of the recombinant L-asparaginase is 1%.

It is known to those skilled in the art that lower amounts of aggregation typically results in a product with lower immunogenicity. Immunogenicity is a key factor in causing adverse events in the clinic and is regulated by the Federal Drug Administration (FDA) (See U.S. Department of Health and Human Services, Guidance for Industry: Immunogenicity Assessment for Therapeutic Protein Products, 2014, p. 15-17 of Quaternary Structure: Product Aggregates and Measurement of Aggregates www.fda.gov/media/85017/download; See also, Ratanji et al; Immunogenicity of therapeutic proteins: Influence of Aggregation. *Journal of Immunotoxicology,* 2014; 11(2): 99-109; Wang et al; Immunogenicity of Protein Aggregates-Concerns and Realities, *International Journal of Pharmaceutics,* 2012, 431(1-2): 1-11; and Moussa et al, Immunogenicity of Therapeutic Protein Aggregates, Journal of Pharmaceutical Sciences, 2016; 105(2): 417-430).

In addition, protein aggregation correlates with enzyme activity, as aggregation interferes with the ability of the enzyme to function and also may cause a reduction in the total yield of active enzyme. Protein aggregation causes challenges for manufacturing and development, delaying the time it takes to get therapeutics to patients and increasing cost. The recombinant crisantaspase of present disclosure demonstrates lower aggregation than other *Erwinia chrysanthemi* L-asparaginase recombinantly expressed in *E. coli* and *Erwinia chrysanthemi*-derived L-asparaginases. These aspects of the recombinant L-asparaginase make it an improvement over the art.

The recombinant L-asparaginase of the present disclosure may have any combination of the properties in the above sections or any other properties described herein.

IV. Methods of Manufacturing a Recombinant L-asparaginase

In some embodiments, the recombinant crisantaspase disclosed herein is recombinantly produced in *Pseudomonas fluorescens*. In some embodiments, the *Pseudomonas fluorescens* is deficient in native L-asparaginase.

In some embodiments, the present disclosure provides methods for cytoplasmic production of a recombinant L-asparaginase in soluble form at high yields, wherein the recombinant protein is periplasmically produced at lower yields in its native host. In its native host, *Erwinia chrysanthemi*, L-asparaginase is produced in the periplasm. The present invention provides methods that allow production of high levels of soluble and/or active recombinant L-asparaginase in the cytoplasm of the host cell. In embodiments, methods provided herein yield high levels of soluble and/or active recombinant L-asparaginase in the cytoplasm of a Pseudomonadales, Pseudomonad, *Pseudomonas*, or *Pseudomonas fluorescens* host cell.

Methods that may be used for manufacturing a recombinant L-asparaginase are described for example in U.S. Pub. 2019/0127742, which is herein incorporated by reference in its entirety for all purposes and in particular for all teachings related to manufacturing methods for recombinant L-asparaginase. Further methods for isolating and/or developing L-asparaginase for use in the methods described herein include WO 2011/003886A1, WO 2018/234492A1, WO 2019/109018, WO 2021/078988, and PCT/US2021/032627 filed May 14, 2021, which are each herein incorporated by reference in its entirety for all purposes and in particular for all teachings related to manufacturing and development methods for L-asparaginase.

V. Methods of Treatment and Use of the Recombinant Asparaginase Protein

A. Diseases or Disorders

The recombinant L-asparaginase of the present disclosure can be used in the treatment of a disease in a human subject, where that disease is treatable by depletion of asparagine. In some embodiments, the recombinant L-asparaginase of the present disclosure can be used in the treatment of cancer. In some embodiments, the human subject has, prior to administration of the recombinant L-asparaginase, experienced silent inactivation of the *E. coli*-derived asparaginase. In some embodiments, the human subject has, prior to administration of the recombinant L-asparaginase, experienced an allergic reaction to the *E. coli*-derived asparaginase. In some embodiments, the human subject has, prior to administration of the recombinant L-asparaginase, experienced anaphylaxis to the *E. coli*-derived asparaginase. Non-limiting examples of objective signs of allergy or hypersensitivity include testing “antibody positive” for an asparaginase enzyme.

In some embodiments, the recombinant L-asparaginase of the present disclosure can be used in the treatment of cancer. In some embodiments, the recombinant L-asparaginase of the present disclosure is useful in the treatment or the manufacture of a medicament for use in the treatment of acute lymphoblastic leukemia (ALL). The incidence of relapse in ALL patients following treatment with L-asparaginase remains high, with approximately 10-25% of pediatric ALL patients having early relapse (e.g., some during maintenance phase at 30-36 months post-induction). If a patient treated with *E. coli*-derived L-asparaginase has a relapse, subsequent treatment with *E. coli* preparations could lead to a “vaccination” effect, whereby the *E. coli* preparation has increased immunogenicity during the subsequent administrations. In one embodiment, the recombinant L-asparaginase of the invention may be used in a method of treating patients with relapsed ALL who were previously treated with other asparaginase preparations, in particular those who were previously treated with *E. coli*-derived asparaginases. In some embodiments, the recombinant L-asparaginase administered to the patient with relapsed ALL is conjugated with a PEG moiety. In some embodiments, the recombinant L-asparaginase administered to the patient with relapsed ALL is not conjugated with a PEG moiety. In some embodiments, the recombinant L-asparaginase administered to the patient with relapsed ALL is conjugated with a proline- or alanine-containing peptide. In some embodiments, the recombinant L-asparaginase administered to the patient with relapsed ALL is not conjugated with a proline- or alanine-containing peptide.

In some embodiments, the recombinant L-asparaginase of the present disclosure is useful in the treatment or the manufacture of a medicament for use in the treatment of lymphoblastic lymphoma (LBL). Similarly to patients with ALL, in some embodiments, the recombinant L-asparaginase administered to the patient with relapsed LBL is conjugated with a PEG moiety. In some embodiments, the recombinant L-asparaginase administered to the patient with relapsed LBL is not conjugated with a PEG moiety. In some embodiments, the recombinant L-asparaginase administered to the patient with relapsed LBL is conjugated with a proline- or alanine-containing peptide. In some embodiments, the recombinant L-asparaginase administered to the patient with relapsed LBL is not conjugated with a proline- or alanine-containing peptide.

In some embodiments, the recombinant L-asparaginase of the present disclosure is used in the treatment or the manufacture of a medicament for use in the treatment of colorectal cancer (CRC). In some embodiments, the recombinant L-asparaginase administered to the patient with CRC is conjugated with a PEG moiety. In some embodiments, the recombinant L-asparaginase administered to the patient with CRC is not conjugated with a PEG moiety. In some embodiments, the recombinant L-asparaginase administered to the patient with CRC is conjugated with a proline- or alanine-containing peptide. In some embodiments, the recombinant L-asparaginase administered to the patient with CRC is not conjugated with a proline- or alanine-containing peptide. In some embodiments, the CRC is Wnt-negative CRC. In some embodiments, the CRC is Wnt-mutant CRC.

In some embodiments, the recombinant L-asparaginase of the present disclosure is useful in the treatment or the manufacture of a medicament for use in the treatment of acute myeloid leukemia (AML). In some embodiments, the recombinant L-asparaginase administered to the patient with AML is conjugated with a PEG moiety. In some embodiments, the recombinant L-asparaginase administered to the patient with AML is not conjugated with a PEG moiety. In some embodiments, the recombinant L-asparaginase administered to the patient with AML is conjugated with a proline- or alanine-containing peptide. In some embodiments, the recombinant L-asparaginase administered to the patient with AML is not conjugated with a proline- or alanine-containing peptide. In some embodiments, the AML is relapsed/refractory acute myeloid leukemia (R/R AML).

In some embodiments, the recombinant L-asparaginase of the present disclosure is useful in the treatment or the manufacture of a medicament for use in the treatment of diffuse large b cell lymphoma (DLBCL). In some embodiments, the recombinant L-asparaginase administered to the patient with DLBCL is conjugated with a PEG moiety. In some embodiments, the recombinant L-asparaginase administered to the patient with DLBCL is not conjugated with a PEG moiety. In some embodiments, the recombinant L-asparaginase administered to the patient with DLBCL is conjugated with a proline- or alanine-containing peptide. In some embodiments, the recombinant L-asparaginase administered to the patient with DLBCL is not conjugated with a proline- or alanine-containing peptide.

Diseases or disorders that the recombinant L-asparaginase of the present disclosure is useful in treating include but are not limited to the following: malignancies, or cancers, including but not limited to hematalogic malignancies, lymphoma, non-Hodgkin's lymphoma, NK lymphoma, pancreatic cancer, Hodgkin's disease, large cell immunoblastic lymphoma, acute promyelocytic leukemia, acute myelocytic leukemia, acute myelomonocytic leukemia, acute monocytic leukemia, acute T-cell leukemia, acute myeloid leukemia (AML), biphenotypic B-cell myelomonocytic Leukemia, chronic lymphocytic leukemia, lymphosarcoma, reticulosarcoma, and melanosarcoma, and diffuse large B-cell lymphoma (DLBCL). Other diseases or disorders that the recombinant L-asparaginase is useful in treating are cancers including, but not limited to, renal cell carcinoma, renal cell adenocarcinoma, glioblastoma including glioblastoma multiforma and glioblastoma astrocytoma, medulloblastoma, rhabdomyosarcoma, malignant melanoma, epidermoid carcinoma, squamous cell carcinoma, lung carcinoma including large cell lung carcinoma and small cell lung carcinoma, endometrial carcinoma, ovarian adenocarcinoma, ovarian tetratocarcinoma, cervical adenocarcinoma, breast carcinoma, breast adenocarcinoma, breast ductal carcinoma, pancreatic adenocarcinoma, pancreatic ductal carcinoma, colon carcinoma, colon adenocarcinoma, colorectal adenocarcinoma, bladder transitional cell carcinoma, bladder papilloma, prostate carcinoma, osteosarcoma, epitheloid carcinoma of the bone, prostate carcinoma, and thyroid cancer. The cancer may be a solid cancer, for example lung cancer or breast cancer. Representative non-malignant hematologic diseases which respond to asparagine depletion include immune system-mediated blood diseases, including but not limited to infectious diseases such as those caused by HIV infection (i.e., AIDS). Non-hematologic diseases associated with asparagine dependence include autoimmune diseases, for example rheumatoid arthritis, collagen vascular diseases, AIDS, osteoarthritis, Issac's syndrome, psoriasis, insulin dependent diabetes mellitus, multiple sclerosis, sclerosing panencephalitis, systemic lupus erythematosus (SLE), rheumatic fever, inflammatory bowel disease (e.g., ulcerative colitis and Crohn's disease), primary billiary cirrhosis, chronic active hepatitis, glomerulonephritis, myasthenia gravis, pemphigus vulgaris, and Graves' disease. Cells suspected of causing disease can be tested for asparagine dependence in any suitable in vitro or in vivo assay, e.g., an in vitro assay wherein the growth medium lacks asparagine.

Diseases or disorders that the recombinant L-asparaginase of the present disclosure is useful in treating include sarcoma, breast cancer, metastatic breast cancer, liver cancer, stomach cancer, colorectal cancer, and head and neck cancer.

B. Methods for Testing for Asparagine Dependence

Cells suspected of causing disease can be tested for asparagine dependence in any suitable in vitro or in vivo assay, e.g., an in vitro assay wherein the growth medium lacks asparagine. Thus, in some embodiments, the present disclosure is directed to a method of treating a disease treatable in a patient, the method comprising administering to the patient an effective amount of a recombinant L-asparaginase of the invention. In a specific embodiment, the disease is ALL. In a specific embodiment, the disease is LBL. In a particular embodiment, the recombinant L-asparaginase used in the treatment of a disease treatable by asparagine depletion comprises the sequence of SEQ ID NO:1. In a further embodiment, the recombinant L-asparaginase is not conjugated to a polymer such as PEG.

C. Methods for Assessing Nadir Serum Asparaginase Activity (NSAA)

Assays for measuring nadir serum asparaginase activity (NSAA) in human subjects may be conducted for evaluation of the human subject. In some embodiments, a serum sample is taken from the human subject to assess NSAA. In some embodiments, a whole blood sample is taken from the subject in order to assess NSAA. In some embodiments, assessing NSAA occurs before the patient is given recombinant L-asparaginase. In some embodiments, assessing NSAA occurs after the patient is given recombinant L-asparaginase.

D. Line of Therapy

A first line therapy is the first treatment given for a disease. A first line therapy may be a monotherapy or a standard set of treatments.

A second line therapy may be a monotherapy or a standard set of treatments. A second line therapy is a treatment given after a first treatment fails, loses its effect (either partially or totally), has side effects that are not tolerated, the patient elects to withdraw from the first treatment for any reason, or a new treatment becomes available that may have a better outcome than the present treatment. In some embodiments, the second line therapy may be given to the human subject in addition to the first line therapy for beneficial additive or synergistic results.

Additional lines of therapy including third, fourth, fifth, sixth, and any further lines of therapies are defined similarly to second line therapies but in this case both the first and the second line therapies either fail, lose their effect (either partially or totally), have side effects that are not tolerated, the patient elects to withdraw from the first and/or second lines of therapy for any reason, a new treatment becomes available that may have a better outcome than the first and second line treatment, or any combination of these reasons. Additional lines of therapy may be a monotherapy or a standard set of treatments. In some embodiments, the additional lines of therapy may be given to the human subject in addition to the first line and/or second line of therapy for beneficial additive or synergistic results.

In some embodiments, treatment with a recombinant L-asparaginase of the present disclosure will be administered as a first line therapy. In other embodiments, treatment with a recombinant L-asparaginase of the present disclosure will be administered as a second line therapy in patients, particularly patients with ALL and LBL, where objective signs of allergy or hypersensitivity, including "silent inactivation," have developed to other asparaginase preparations, in particular, the native *Escherichia-coli*-derived L-asparaginase or its PEGylated variant (pegaspargase). Non-limiting examples of objective signs of allergy or hypersensitivity include testing "antibody positive" for an asparaginase enzyme. The patient may have had a previous hypersensitivity to at least one L-asparaginase from *E. coli*, and/or may have had a previous hypersensitivity to at least one L-asparaginase from *Erwinia chrysanthemi*. The hypersensitivity may be selected from the group consisting of allergic reaction, anaphylactic shock, and silent inactivation. In a specific embodiment, the recombinant L-asparaginase of the present disclosure is used in second line therapy after treatment with pegaspargase. In a more specific embodiment, the recombinant L-asparaginase of the present disclosure used in second line therapy comprises an L-asparaginase produced in a Pseudomonadales flourescens cell, more specifically, comprising a tetramer, wherein each monomer or subunit comprises the sequence of SEQ ID NO: 1. In some embodiments, recombinant L-asparaginase of the present disclosure is used in second line therapy with patients who are hypersensitive to an *E. coli*-derived L-asparaginase, and/or may have had a previous hypersensitivity to an *Erwinia chrysanthemi*-derived L-asparaginase. An *E. coli*-derived L-asparaginase can be in the native form or a long-acting form of an *E. coli*-derived L-asparaginase. The native *E. coli*-derived L-asparaginase can be identified by SEQ ID NO: 3 or any of the following examples including, but not limited to, Crastinin (Bayer), Elspar (Merck), Kidrolase (Rhone-Poulenc) and Leunase (Kyowa) (Also see ASPG2_ECOLI, Uniprot accession number P00805, www.uniprot.org/uniprot/P00805).

```
SEQ ID NO: 3 is as follows:
MEFFKKTALAALVMGFSGAALALPNITILATGGTIAGGGDS

ATKSNYTVGKVGVENLVNAVPQLKDIANVKGEQVVNIGSQ

DMNDNVWLTLAKKINTDCDKTDGFVITHGTDTMEETAYFL

DLTVKCDKPVVMVGAMRPSTSMSADGPFNLYNAVVTAADK

ASANRGVLVVMNDTVLDGRDVTKTNTTDVATFKSVNYGPL

GYIHNGKIDYQRTPARKHTSDTPFDVSKLNELPKVGIVYN

YANASDLPAKALVDAGYDGIVSAGVGNGNLYKSVFDTLAT

AAKTGTAVVRSSRVPTGATTQDAEVDDAKYGFVASGTLNP

QKARVLLQLALTQTKDPQQIQQIFNQY
```

In some embodiments, the recombinant asparaginase will be administered as a second line therapy in patients with CRC. In some embodiments, the recombinant asparaginase will be administered as a second line therapy in patients with Wnt-negative CRC. In some embodiments, the recombinant asparaginase will be administered as a second line therapy in patients with Wnt-mutant CRC. In some embodiments, the recombinant asparaginase will be administered as a second line therapy in patients with AML. In some embodiments, the recombinant asparaginase will be administered as a second line therapy in patients with relapsed/refractory AML. In some embodiments, the recombinant asparaginase will be administered as a second line therapy in patients with DLBCL.

In some embodiments, the recombinant L-asparaginase may be used as a second line therapy with patients receiving a native *E. coli*-derived asparaginase. In some embodiments, one dose of the recombinant L-asparaginase are administered to the patient as a substitute for one dose of the native *E. coli*-derived asparaginase. In some embodiments, the recombinant L-asparaginase may be used as a second line therapy with patients receiving a long-acting *E. coli*-derived asparaginase. In some embodiments, six doses of the recombinant L-asparaginase are administered to the patient as a substitute for one dose of the long-acting *E. coli*-derived asparaginase. In some embodiments, seven doses of the recombinant L-asparaginase are administered to the patient as a substitute for one dose of the long-acting *E. coli*-derived asparaginase. In some embodiments, the long-acting *E. coli*-derived asparaginase is pegaspargase. In some embodiments, the long-acting *E. coli*-derived asparaginase is calaspargase (See Liu, G., Space for Calaspargase? A New Asparaginase for Acute Lymphoblastic Leukemia Clin Cancer Res 2020; 26:325-7). In some embodiments, treatment with a recombinant L-asparaginase of the present disclosure is administered as a third line therapy. In some embodiments, treatment with a recombinant L-asparaginase of the present disclosure is administered as a fourth line therapy. In some embodiments, treatment with a recombinant L-asparaginase of the present disclosure is administered as a fifth line therapy. In some embodiments, treatment with a recombinant L-asparaginase of the present disclosure is administered as a sixth line therapy. In some embodiments, treatment with a recombinant L-asparaginase of the present disclosure is administered as a maintenance therapy. In some embodiments, administering the recombinant L-asparaginase to a patient as a substitute for native or long-acting *E. coli*-derived asparaginase can occur anytime within the treatment cycle of the native or long-acting *E. coli*-derived asparaginase. In some embodiments, the treatment cycle for the native or long-acting *E. coli*-derived asparaginase is anywhere from 1 to 14 doses. In some embodiments, the treatment cycle for the native or long-acting *E. coli*-derived asparaginase is 1, 2, 3, 4, 5, 6, 7, 8, 9, 10, 11, 12, 13, or 14 doses. In some embodiments, the treatment cycle for the native or long-acting *E. coli*-derived asparaginase is between 2 and 12 doses. In some embodiments, the treatment cycle for the native or long-acting *E. coli*-derived asparaginase is between 4 and 10 doses. In some embodiments, the treatment cycle for the native or long-acting *E. coli*-derived asparaginase is between 4 and 10 doses. In some embodiments, the treatment cycle for the native or long-acting *E. coli*-derived asparaginase is between 4 and 8 doses. In some embodiments, the treatment cycle for the native or long-acting *E. coli*-derived asparaginase is between 4 and 6 doses. In some embodiments, administering the recombinant L-asparaginase to a patient as a substitute for native or long-acting *E. coli*-derived asparaginase can occur anytime within the treatment cycle of the native or long-acting *E. coli*-derived asparaginase depending on when the patient experiences hypersensitivity.

In some embodiments, treatment with a recombinant L-asparaginase of the present disclosure is co-administered with a multi-agent chemotherapeutic regimen. In some embodiments, treatment with a recombinant L-asparaginase of the present disclosure is co-administered with one or more other chemotherapeutic agents as part of a multi-agent chemotherapeutic regimen. In some embodiments, treating patients with a recombinant L-asparaginase of the present disclosure in addition to other agents helps to ensure availability of an asparaginase for patients who have developed hypersensitivity to *E. coli* derived-asparaginase. Examples of agents that may be part of a multi-agent chemotherapeutic regimen with a recombinant L-asparaginase of the present disclosure include, but are not limited to: cytarabine, vincristine, daunorubicin, methotrexate, leuvocorin, doxorubicin, anthracycline, corticosteroids and glucocortiods (including but not limited to prednisone, prednisolone, and/or dexamethasone), cyclophosphamide, 6-mercaptopurine, venetoclax, and etoposide. In some embodiments, the multi-agent chemotherapeutic regimen is the recombinant L-asparaginase and one additional chemotherapeutic agent. In some embodiments, the multi-agent chemotherapeutic regimen is the recombinant L-asparaginase and two or more additional chemotherapeutic agents.

As an example, patients with ALL will be co-administered the recombinant L-asparaginase of the present disclosure along with a multi-agent chemotherapy during 3 chemotherapy phases including induction, consolidation or intensification, and maintenance. In a specific example, the recombinant L-asparaginase of the present disclosure is co-administered with an asparagine synthetase inhibitor (e.g., such as set forth in WO 2007/103290, which is herein incorporated by reference in its entirety). In another specific example, the recombinant L-asparaginase of the present disclosure is not co-administered with an asparagine synthetase inhibitor, but is co-administered with other chemotherapy drugs. In another specific example, the recombinant L-asparaginase of the present disclosure is co-administered with an asparagine synthetase inhibitor and other chemotherapy drugs. The recombinant L-asparaginase of the present disclosure can be co-administered before, after, or simultaneously with other compounds as part of a multi-agent chemotherapy regimen. In a particular embodiment, the recombinant L-asparaginase of the present disclosure comprises a protein recombinantly produced in *Pseudomonas fluorescens*, and more specifically, the recombinant L-asparaginase comprising the sequence of SEQ ID NO:1.

VI. Compositions, Formulations, Routes of Administration, and Dosing

A. Compositions, Formulations and Routes of Administration

The invention also includes a pharmaceutical composition comprising a recombinant L-asparaginase of the present disclosure. The pharmaceutical composition can be administered to a patient using standard techniques. Techniques and formulations generally may be found in Remington's Pharmaceutical Sciences, 22nd edition, Mack Publishing, 2015 (herein incorporated by reference). The embodiments disclosed herein can further be utilized with or in addition to other regimens described for example in WO2021/078988 filed Oct. 23, 2020 and PCT/US2021/032627 filed May 14, 2021 which are each herein incorporated by reference for all purposes and in particular for all teachings related to administration and use of recombinant L-asparaginase Suitable dosage forms, in part, depend upon the use or the route of entry, for example, by injection (parenteral). Such dosage forms should allow the therapeutic agent to reach a target cell or otherwise have the desired therapeutic effect. For example, pharmaceutical compositions injected into the blood stream preferably are soluble. The pharmaceutical compositions according to the present disclosure can be formulated as pharmaceutically acceptable salts and complexes thereof. Pharmaceutically acceptable salts are non-toxic salts present in the amounts and concentrations at which they are administered. The preparation of such salts can facilitate pharmaceutical use by altering the physical characteristics of the compound without preventing it from exerting its physiological effect. Useful alterations in physical properties include lowering the melting point to facilitate transmucosal administration and increasing solubility to facilitate administering higher concentrations of the drug. The pharmaceutically acceptable salt of a modified protein as described herein may be present as a complex, as those in the art will appreciate. Pharmaceutically acceptable salts include acid addition salts such as those containing sulfate, hydrochloride, fumarate, maleate, phosphate, sulfamate, acetate, citrate, lactate, tartrate, methanesulfonate, ethanesulfonate, benzenesulfonate, p- to luenesulfonate, cyclohexylsulfamate, and quinate. Pharmaceutically acceptable salts can be obtained from acids, including hydrochloric acid, maleic acid, sulfuric acid, phosphoric acid, sulfamic acid, acetic acid, citric acid, lactic acid, tartaric acid, malonic acid, methanesulfonic acid, ethanesulfonic acid, benzenesulfonic acid, p-toluenesulfonic acid, cyclohexylsulfamic acid, fumaric acid, and quinic acid. Pharmaceutically acceptable salts also include basic addition salts such as those containing benzathine, chloroprocaine, choline, diethanolamine, ethylenediamine, meglumine, procaine, aluminum, calcium, lithium, magnesium, potassium, sodium, ammonium, alkylamine, and zinc, when acidic functional groups, such as carboxylic acid or phenol are present. For example, see Remington's Pharmaceutical Sciences, supra. Such salts can be prepared using the appropriate corresponding bases. Pharmaceutically acceptable carriers and/or excipients can also be incorporated into a pharmaceutical composition according to the invention to facilitate administration of the particular asparaginase. Examples of carriers suitable for use in the practice of the invention include calcium carbonate, calcium phosphate, various sugars such as lactose, glucose, or sucrose, or types of starch, cellulose derivatives, gelatin, vegetable oils, polyethylene glycols, and physiologically compatible solvents. Examples of physiologically compatible solvents include sterile solutions of water for injection (WFI), saline solution and dextrose. Pharmaceutical compositions according to the invention can be administered by different routes, including intravenous (IV) and intramuscular (IM) administration. For injection, pharmaceutical compositions are formulated in liquid solutions, preferably in physiologically compatible buffers or solutions, such as saline solution, Hank's solution, or Ringer's solution. In addition, the compounds may be formulated in solid form and redissolved or suspended immediately prior to use. For example, lyophilized forms of the recombinant L-asparaginase can be produced. In a specific aspect, the recombinant L-asparaginase is administered intramuscularly. In preferred specific aspect, the recombinant L-asparaginase is administered intravenously.

In a preferred embodiment, the pharmaceutical composition is not lyophilized. In a further embodiment, the pharmaceutical composition is in solution. In some embodiments, a final lyophilization step may cause induced stress and promote degradation of the compound. In some embodiments, lyophilization may increase aggregation. In some further preferred embodiments, the recombinant crisantaspase is administered intramuscularly. In some further preferred embodiments, the recombinant crisantaspase is administered intravenously. For each of these preferred embodiments of forms of administration, it will be appreciated that any form of the recombinant L-asparaginase may be administered, including modified and non-modified forms.

In some embodiments, the recombinant L-asparaginase will be administered intravenously to the human subject at specific time points and administered intramuscularly to the same human subject at other specific time points.

B. Dosing

In some embodiments, a dose is an amount administered to the human subject over a certain time and frequency. In some embodiments, the dose of recombinant L-asparaginase will be given to a human subject with hypersensitivity only when the hypersensitivity subsides.

In an exemplary embodiment, a recombinant L-asparaginase is administered to a human subject in an amount from about 10 mg/m$^2$ to 100 mg/m$^2$.

In an exemplary embodiment, a recombinant L-asparaginase is administered to a human subject in an amount from about 25 mg/m$^2$ to about 50 mg/m$^2$.

In an exemplary embodiment, a recombinant L-asparaginase is administered intramuscularly every other day over a period of 5 consecutive days followed by a rest period of 2 consecutive days, wherein the amount is about 25 mg/m$^2$.

In an exemplary embodiment, a recombinant L-asparaginase is administered intravenously every other day over a period of 5 consecutive days followed by a rest period of 2 consecutive days, wherein the amount is about 50 mg/m$^2$.

In further exemplary embodiments and in accordance with any of the discussion herein regarding dosing, the recombinant L-asparaginase administered in such doses is not conjugated to a polymer such as a PEG moiety and/or is not conjugated to a peptide comprising solely alanine and/or proline residues.

1. Dose Amount

The amounts of the recombinant L-asparaginase of the present disclosure that are to be delivered will depend on many factors, for example, the IC50, EC50, the biological half-life of the compound, the age, size, weight, and physical condition of the patient, and the disease or disorder to be treated. The importance of these and other factors to be considered are well known to those of ordinary skill in the art. Generally, the amount of the recombinant L-asparaginase of the present disclosure will be administered at a range from about 1 milligram per square meter of the surface area of the patient's body (mg/m$^2$) to 1,000/m$^2$, with a dosage range of about 10 mg/m$^2$ to about 100 mg/m$^2$ to treat disease, including but not limited to ALL or LBL. Of course, other dosages and/or treatment regimens may be employed, as determined by the attending physician.

In some embodiments, the method comprises administering the recombinant L-asparaginase of the present disclosure at an amount from about 10 mg/m$^2$ and about 100 mg/m$^2$. In some embodiments, the method comprises administering the recombinant L-asparaginase of the present disclosure at an amount from 10 mg/m$^2$ and 100 mg/m$^2$. In some embodiments, the recombinant L-asparaginase of the present disclosure is administered in an amount of about 10, 15, 20, 25, 30, 35, 40, 45, 50, 55, 60, 65, 70, 75, 80, 85, 95, or 95 mg/m$^2$ or an equivalent amount thereof (for example on a protein content basis). In a more specific embodiment, the recombinant L-asparaginase of the present disclosure is administered at an amount selected from the group consisting of about 10, 20, 30, 40, 50, 60, 70, 80, 90, and about 100 mg/m$^2$. In another specific embodiment, the recombinant L-asparaginase of the present disclosure is administered at a dose more than or equal to about 1, 10, 15, 20, 25, 30, 35, 40, 45, 50, 55, 60, 65, 70, 75, 80, 85, 95, 95, 100, 200, or 300 mg/m$^2$. In another specific embodiment, the recombinant L-asparaginase of the present disclosure is administered at a dose less than or equal to about 300, 200 100, 95, 80, 75, 70, 65, 60, 55, 50, 45, 40, 35, 30, 25, 20, 15, 10, 5, or 1 mg/m$^2$. In an exemplary embodiment, the recombinant L-asparaginase of the present disclosure is administered in an amount between about 12 mg/m$^2$ and about 90 mg/m$^2$. In another exemplary embodiment, the recombinant L-asparaginase of the present disclosure is administered in an amount between about 20 mg/m$^2$ and about 80 mg/m$^2$. In another exemplary embodiment, the recombinant L-asparaginase of the present disclosure is administered in an amount between about 25 mg/m$^2$ and about 70 mg/m$^2$. In an exemplary embodiment, the recombinant L-asparaginase of the present disclosure is administered in an amount between about 25 mg/m$^2$ and about 80 mg/m$^2$. In an exemplary embodiment, the recombinant L-asparaginase of the present disclosure is administered in an amount between about 37.5 mg/m$^2$ and about 80 mg/m$^2$. In an exemplary embodiment, the recombinant L-asparaginase of the present disclosure is administered in an amount between about 37.5 mg/m$^2$ and about 65 mg/m$^2$.

In an exemplary embodiment, the recombinant L-asparaginase of the present disclosure is administered in an amount between about 25 mg/$m^2$ and about 37.5 mg/$m^2$. In an exemplary embodiment, the recombinant L-asparaginase of the present disclosure is administered in an amount between about 25 mg/$m^2$ and about 100 mg/$m^2$. In an exemplary embodiment, the recombinant L-asparaginase of the present disclosure is administered in an amount between about 25 mg/$m^2$ and about 65 mg/$m^2$. In an exemplary embodiment, the recombinant L-asparaginase of the present disclosure is administered in an amount between about 25 mg/$m^2$ and about 80 mg/$m^2$.

In some embodiments, the method comprises administering the recombinant L-asparaginase of the present disclosure at an amount from about 25 mg/$m^2$ and about 50 mg/$m^2$. In some embodiments, the method comprises administering the recombinant L-asparaginase of the present disclosure at an amount from 25 mg/$m^2$ and 50 mg/$m^2$. In some embodiments, the recombinant L-asparaginase of the present disclosure is administered in an amount of about 25, 26, 27, 28, 29, 30, 31, 32, 33, 34, 35, 36, 37, 38, 39, 40, 41, 42, 43, 44, 45, 46, 47, 48, 49, or 50 mg/$m^2$ or an equivalent amount thereof (for example on a protein content basis).

In an exemplary embodiment, the recombinant L-asparaginase of the present disclosure is administered in an amount between about 20 mg/$m^2$ and about 30 mg/$m^2$. In an exemplary embodiment, the recombinant L-asparaginase of the present disclosure is administered in an amount between about 22.5 mg/$m^2$ and about 28.5 mg/$m^2$. In an exemplary embodiment, the recombinant L-asparaginase of the present disclosure is administered in an amount between about 23 mg/$m^2$ and about 27 mg/$m^2$. In an exemplary embodiment, the recombinant L-asparaginase of the present disclosure is administered in an amount between about 24 mg/$m^2$ and about 26 mg/$m^2$. In an exemplary embodiment, the recombinant L-asparaginase of the present disclosure is administered in an amount between about 24.5 mg/$m^2$ and about 25.5 mg/$m^2$.

In an exemplary embodiment, the recombinant L-asparaginase of the present disclosure is administered in an amount between about 40 mg/$m^2$ and about 60 mg/$m^2$. In an exemplary embodiment, the recombinant L-asparaginase of the present disclosure is administered in an amount between about 42.5 mg/$m^2$ and about 58.5 mg/$m^2$. In an exemplary embodiment, the recombinant L-asparaginase of the present disclosure is administered in an amount between about 43 mg/$m^2$ and about 57 mg/$m^2$. In an exemplary embodiment, the recombinant L-asparaginase of the present disclosure is administered in an amount between about 44 mg/$m^2$ and about 56 mg/$m^2$. In an exemplary embodiment, the recombinant L-asparaginase of the present disclosure is administered in an amount between about 45 mg/$m^2$ and about 55 mg/$m^2$. In an exemplary embodiment, the recombinant L-asparaginase of the present disclosure is administered in an amount between about 46 mg/$m^2$ and about 54 mg/$m^2$. In an exemplary embodiment, the recombinant L-asparaginase of the present disclosure is administered in an amount between about 47.5 mg/$m^2$ and about 52.5 mg/$m^2$. In an exemplary embodiment, the recombinant L-asparaginase of the present disclosure is administered in an amount between about 48 mg/$m^2$ and about 52 mg/$m^2$. In an exemplary embodiment, the recombinant L-asparaginase of the present disclosure is administered in an amount between about 49 mg/$m^2$ and about 51 mg/$m^2$. In an exemplary embodiment, the recombinant L-asparaginase of the present disclosure is administered in an amount between about 49.5 mg/$m^2$ and about 50.5 mg/$m^2$.

In an exemplary embodiment, the recombinant L-asparaginase of the present disclosure is administered in an amount between about 30 mg/$m^2$ and about 75 mg/$m^2$. In an exemplary embodiment, the recombinant L-asparaginase of the present disclosure is administered in an amount between about 35 mg/$m^2$ and about 70 mg/$m^2$. In an exemplary embodiment, the recombinant L-asparaginase of the present disclosure is administered in an amount between about 40 mg/$m^2$ and about 65 mg/$m^2$. In an exemplary embodiment, the recombinant L-asparaginase of the present disclosure is administered in an amount between about 45 mg/$m^2$ and about 60 mg/$m^2$. In an exemplary embodiment, the recombinant L-asparaginase of the present disclosure is administered in an amount between about 50 mg/$m^2$ and about 55 mg/$m^2$.

In an exemplary embodiment, the recombinant L-asparaginase of the present disclosure is administered in an amount between about 40 mg/$m^2$ and about 75 mg/$m^2$. In an exemplary embodiment, the recombinant L-asparaginase of the present disclosure is administered in an amount between about 45 mg/$m^2$ and about 70 mg/$m^2$. In an exemplary embodiment, the recombinant L-asparaginase of the present disclosure is administered in an amount between about 50 mg/$m^2$ and about 65 mg/$m^2$. In an exemplary embodiment, the recombinant L-asparaginase of the present disclosure is administered in an amount between about 55 mg/$m^2$ and about 60 mg/$m^2$.

In an exemplary embodiment, the recombinant L-asparaginase of the present disclosure is administered in an amount between about 40 mg/$m^2$ and about 60 mg/$m^2$. In an exemplary embodiment, the recombinant L-asparaginase of the present disclosure is administered in an amount between about 45 mg/$m^2$ and about 55 mg/$m^2$. In an exemplary embodiment, the recombinant L-asparaginase of the present disclosure is administered in an amount between about 47.5 mg/$m^2$ and about 50 mg/$m^2$.

In an exemplary embodiment, the recombinant L-asparaginase of the present disclosure is administered in an amount between about 30 mg/$m^2$ and about 35 mg/$m^2$.

In an exemplary embodiment, the recombinant L-asparaginase of the present disclosure is administered in an amount between about 30 mg/$m^2$ and about 95 mg/$m^2$. In an exemplary embodiment, the recombinant L-asparaginase of the present disclosure is administered in an amount between about 35 mg/$m^2$ and about 90 mg/$m^2$. In an exemplary embodiment, the recombinant L-asparaginase of the present disclosure is administered in an amount between about 40 mg/$m^2$ and about 85 mg/$m^2$. In an exemplary embodiment, the recombinant L-asparaginase of the present disclosure is administered in an amount between about 45 mg/$m^2$ and about 80 mg/$m^2$. In an exemplary embodiment, the recombinant L-asparaginase of the present disclosure is administered in an amount between about 50 mg/$m^2$ and about 75 mg/$m^2$. In an exemplary embodiment, the recombinant L-asparaginase of the present disclosure is administered in an amount between about 55 mg/$m^2$ and about 70 mg/$m^2$. In an exemplary embodiment, the recombinant L-asparaginase of the present disclosure is administered in an amount between about 60 mg/$m^2$ and about 65 mg/$m^2$.

In an exemplary embodiment, the recombinant L-asparaginase of the present disclosure is administered in an amount between about 30 mg/$m^2$ and about 60 mg/$m^2$. In an exemplary embodiment, the recombinant L-asparaginase of the present disclosure is administered in an amount between about 35 mg/$m^2$ and about 55 mg/$m^2$. In an exemplary embodiment, the recombinant L-asparaginase of the present disclosure is administered in an amount between about 40 mg/m$^2$ and about 50 mg/m$^2$. In an exemplary embodiment, the recombinant L-asparaginase of the present disclosure is administered in an amount between about 42.5 mg/m$^2$ and about 57.5 mg/m$^2$.

In an exemplary embodiment, the recombinant L-asparaginase of the present disclosure is administered in an amount between about 30 mg/m$^2$ and about 75 mg/m$^2$. In an exemplary embodiment, the recombinant L-asparaginase of the present disclosure is administered in an amount between about 35 mg/m$^2$ and about 70 mg/m$^2$. In an exemplary embodiment, the recombinant L-asparaginase of the present disclosure is administered in an amount between about 40 mg/m$^2$ and about 65 mg/m$^2$. In an exemplary embodiment, the recombinant L-asparaginase of the present disclosure is administered in an amount between about 45 mg/m$^2$ and about 60 mg/m$^2$. In an exemplary embodiment, the recombinant L-asparaginase of the present disclosure is administered in an amount between about 50 mg/m$^2$ and about 55 mg/m$^2$.

In some embodiments, the recombinant L-asparaginase of the present disclosure is administered intramuscularly or intravenously in an amount of between about 10 mg/m$^2$ and about 50 mg/m$^2$. In some embodiments, the recombinant L-asparaginase of the present disclosure is administered intramuscularly or intravenously in an amount of between about 12.5 mg/m$^2$ and about 47.5 mg/m$^2$. In some embodiments, the recombinant L-asparaginase of the present disclosure is administered intramuscularly or intravenously in an amount of between about 15 mg/m$^2$ and about 45 mg/m$^2$. In some embodiments, the recombinant L-asparaginase of the present disclosure is administered intramuscularly or intravenously in an amount of between about 20 mg/m$^2$ and about 42.5 mg/m$^2$. In some embodiments, the recombinant L-asparaginase of the present disclosure is administered intramuscularly or intravenously in an amount of between about 22.5 mg/m$^2$ and about 40 mg/m$^2$. In some embodiments, the recombinant L-asparaginase of the present disclosure is administered intramuscularly or intravenously in an amount of between about 24 mg/m$^2$ and about 39 mg/m$^2$. In some embodiments, the recombinant L-asparaginase of the present disclosure is administered intramuscularly or intravenously in an amount of between about 27 mg/m$^2$ and about 37.5 mg/m$^2$. In some embodiments, the recombinant L-asparaginase of the present disclosure is administered intramuscularly or intravenously in an amount of between about 30 mg/m$^2$ and about 45 mg/m$^2$. In some embodiments, the recombinant L-asparaginase of the present disclosure is administered intramuscularly or intravenously in an amount of about 25 mg/m$^2$. In some embodiments, the recombinant L-asparaginase of the present disclosure is administered intramuscularly or intravenously in an amount of 25 mg/m$^2$. In an exemplary embodiment, the recombinant L-asparaginase of the present disclosure is administered intramuscularly or intravenously in an amount between about 25 mg/m$^2$ and about 80 mg/m$^2$. In an exemplary embodiment, the recombinant L-asparaginase of the present disclosure is administered intramuscularly or intravenously in an amount between about 37.5 mg/m$^2$ and about 80 mg/m$^2$. In an exemplary embodiment, the recombinant L-asparaginase of the present disclosure is administered intramuscularly or intravenously in an amount between about 37.5 mg/m$^2$ and about 65 mg/m$^2$. In an exemplary embodiment, the recombinant L-asparaginase of the present disclosure is administered intramuscularly or intravenously in an amount between about 25 mg/m$^2$ and about 37.5 mg/m$^2$. In an exemplary embodiment, the recombinant L-asparaginase of the present disclosure is administered intramuscularly or intravenously in an amount between about 30 mg/m$^2$ and about 75 mg/m$^2$. In an exemplary embodiment, the recombinant L-asparaginase of the present disclosure is administered intramuscularly or intravenously in an amount between about 35 mg/m$^2$ and about 70 mg/m$^2$. In an exemplary embodiment, the recombinant L-asparaginase of the present disclosure is administered intramuscularly or intravenously in an amount between about 40 mg/m$^2$ and about 65 mg/m$^2$. In an exemplary embodiment, the recombinant L-asparaginase of the present disclosure is administered intramuscularly or intravenously in an amount between about 45 mg/m$^2$ and about 60 mg/m$^2$. In an exemplary embodiment, the recombinant L-asparaginase of the present disclosure is administered intramuscularly or intravenously in an amount between about 50 mg/m$^2$ and about 55 mg/m$^2$. In an exemplary embodiment, the recombinant L-asparaginase of the present disclosure is administered intramuscularly or intravenously in an amount between about 40 mg/m$^2$ and about 75 mg/m$^2$. In an exemplary embodiment, the recombinant L-asparaginase of the present disclosure is administered intramuscularly or intravenously in an amount between about 45 mg/m$^2$ and about 70 mg/m$^2$. In an exemplary embodiment, the recombinant L-asparaginase of the present disclosure is administered intramuscularly or intravenously in an amount between about 50 mg/m$^2$ and about 65 mg/m$^2$. In an exemplary embodiment, the recombinant L-asparaginase of the present disclosure is administered intramuscularly or intravenously in an amount between about 55 mg/m$^2$ and about 60 mg/m$^2$. In an exemplary embodiment, the recombinant L-asparaginase of the present disclosure is administered intramuscularly or intravenously in an amount between about 40 mg/m$^2$ and about 60 mg/m$^2$. In an exemplary embodiment, the recombinant L-asparaginase of the present disclosure is administered intramuscularly or intravenously in an amount between about 45 mg/m$^2$ and about 55 mg/m$^2$. In an exemplary embodiment, the recombinant L-asparaginase of the present disclosure is administered intramuscularly or intravenously in an amount between about 47.5 mg/m$^2$ and about 50 mg/m$^2$. In an exemplary embodiment, the recombinant L-asparaginase of the present disclosure is administered intramuscularly or intravenously in an amount between about 30 mg/m$^2$ and about 35 mg/m$^2$.

In some embodiments, the recombinant L-asparaginase of the present disclosure is administered intramuscularly or intravenously in an amount of between about 10 mg/m$^2$ and about 95 mg/m$^2$. In some embodiments, the recombinant L-asparaginase of the present disclosure is administered intramuscularly or intravenously in an amount of between about 20 mg/m$^2$ and about 60 mg/m$^2$. In some embodiments, the recombinant L-asparaginase of the present disclosure is administered intramuscularly or intravenously in an amount of between about 22.5 mg/m$^2$ and about 57.5 mg/m$^2$. In some embodiments, the recombinant L-asparaginase of the present disclosure is administered intramuscularly or intravenously in an amount of between about 25 mg/m$^2$ and about 55 mg/m$^2$. In some embodiments, the recombinant L-asparaginase of the present disclosure is administered intramuscularly or intravenously in an amount of between about 27.5 mg/m$^2$ and about 47.5 mg/m$^2$. In some embodiments, the recombinant L-asparaginase of the present disclosure is administered intramuscularly or intravenously in an amount of between about 30 mg/m$^2$ and about 45 mg/m$^2$. In some embodiments, the recombinant L-asparaginase of the present disclosure is administered intramuscularly or intravenously in an amount of between about 32.5 mg/m$^2$ and about 42.5 mg/m$^2$. In some embodiments, the recombinant L-asparaginase of the present disclosure is administered intramuscularly or intravenously in an amount of between about 21.5 mg/m$^2$ and about 38.5 mg/m$^2$. In some embodiments, the recombinant L-asparaginase of the present disclosure is administered intramuscularly or intravenously in an amount of between about 36 mg/m$^2$ and about 45 mg/m$^2$. In some embodiments, the recombinant L-asparaginase of the present disclosure is administered intramuscularly or intravenously in an amount of about 37.5 mg/m$^2$. In some embodiments, the recombinant L-asparaginase of the present disclosure is administered intravenously or intramuscularly in an amount of about 50 mg/m$^2$. In some embodiments, the recombinant L-asparaginase of the present disclosure is administered intravenously or intramuscularly in an amount of 50 mg/m$^2$.

In an exemplary embodiment, the recombinant L-asparaginase of the present disclosure is administered intramuscularly or intravenously in an amount between about 25 mg/m$^2$ and about 37.5 mg/m$^2$. In an exemplary embodiment, the recombinant L-asparaginase of the present disclosure is administered intramuscularly or intravenously in an amount between about 25 mg/m$^2$ and about 100 mg/m$^2$. In an exemplary embodiment, the recombinant L-asparaginase of the present disclosure is administered intramuscularly or intravenously in an amount between about 25 mg/m$^2$ and about 65 mg/m$^2$. In an exemplary embodiment, the recombinant L-asparaginase of the present disclosure is administered intramuscularly or intravenously in an amount between about 25 mg/m$^2$ and about 80 mg/m$^2$. In an exemplary embodiment, the recombinant L-asparaginase of the present disclosure is administered intramuscularly or intravenously in an amount between about 30 mg/m$^2$ and about 35 mg/m$^2$. In an exemplary embodiment, the recombinant L-asparaginase of the present disclosure is administered intramuscularly or intravenously in an amount between about 30 mg/m$^2$ and about 95 mg/m$^2$. In an exemplary embodiment, the recombinant L-asparaginase of the present disclosure is administered intramuscularly or intravenously in an amount between about 35 mg/m$^2$ and about 90 mg/m$^2$. In an exemplary embodiment, the recombinant L-asparaginase of the present disclosure is administered intramuscularly or intravenously in an amount between about 40 mg/m$^2$ and about 85 mg/m$^2$. In an exemplary embodiment, the recombinant L-asparaginase of the present disclosure is administered intramuscularly or intravenously in an amount between about 45 mg/m$^2$ and about 80 mg/m$^2$. In an exemplary embodiment, the recombinant L-asparaginase of the present disclosure is administered intramuscularly or intravenously in an amount between about 50 mg/m$^2$ and about 75 mg/m$^2$. In an exemplary embodiment, the recombinant L-asparaginase of the present disclosure is administered intramuscularly or intravenously in an amount between about 55 mg/m$^2$ and about 70 mg/m$^2$. In an exemplary embodiment, the recombinant L-asparaginase of the present disclosure is administered intramuscularly or intravenously in an amount between about 60 mg/m$^2$ and about 65 mg/m$^2$. In an exemplary embodiment, the recombinant L-asparaginase of the present disclosure is administered intramuscularly or intravenously in an amount between about 30 mg/m$^2$ and about 60 mg/m$^2$. In an exemplary embodiment, the recombinant L-asparaginase of the present disclosure is administered intramuscularly or intravenously in an amount between about 35 mg/m$^2$ and about 55 mg/m$^2$. In an exemplary embodiment, the recombinant L-asparaginase of the present disclosure is administered intramuscularly or intravenously in an amount between about 40 mg/m$^2$ and about 50 mg/m$^2$. In an exemplary embodiment, the recombinant L-asparaginase of the present disclosure is administered intramuscularly or intravenously in an amount between about 42.5 mg/m$^2$ and about 57.5 mg/m$^2$. In an exemplary embodiment, the recombinant L-asparaginase of the present disclosure is administered intramuscularly or intravenously in an amount between about 30 mg/m$^2$ and about 75 mg/m$^2$. In an exemplary embodiment, the recombinant L-asparaginase of the present disclosure is administered intramuscularly or intravenously in an amount between about 35 mg/m$^2$ and about 70 mg/m$^2$. In an exemplary embodiment, the recombinant L-asparaginase of the present disclosure is administered intramuscularly or intravenously in an amount between about 40 mg/m$^2$ and about 65 mg/m$^2$. In an exemplary embodiment, the recombinant L-asparaginase of the present disclosure is administered intramuscularly or intravenously in an amount between about 45 mg/m$^2$ and about 60 mg/m$^2$. In an exemplary embodiment, the recombinant L-asparaginase of the present disclosure is administered intramuscularly or intravenously in an amount between about 50 mg/m$^2$ and about 55 mg/m$^2$.

In another embodiment, the method comprises administering a recombinant L-asparaginase of the present disclosure that elicits a lower immunogenic response in a patient compared to a non-recombinant L-asparaginase.

In some embodiments, the method comprises administering intramuscularly or intravascularly to the human subject, a series of seven doses of a recombinant L-asparaginase, where each dose in the series is in an amount of about 20 mg/m$^2$ of the recombinant L-asparaginase, and the time between administration of each dose in the series is two days.

In some embodiments, the method comprises administering intramuscularly or intravascularly to the human subject, a series of seven doses of a recombinant L-asparaginase, where each dose in the series is in an amount of about 22.5 mg/m$^2$ of the recombinant L-asparaginase, and the time between administration of each dose in the series is two days.

In some embodiments, the method comprises administering intramuscularly or intravascularly to the human subject, a series of seven doses of a recombinant L-asparaginase, where each dose in the series is in an amount of about 25 mg/m$^2$ of the recombinant L-asparaginase, and the time between administration of each dose in the series is two days.

In some embodiments, the method comprises administering intramuscularly or intravascularly to the human subject, a series of seven doses of a recombinant L-asparaginase, where each dose in the series is in an amount of about 27.5 mg/m$^2$ of the recombinant L-asparaginase, and the time between administration of each dose in the series is two days.

In some embodiments, the method comprises administering intramuscularly or intravascularly to the human subject, a series of seven doses of a recombinant L-asparaginase, where each dose in the series is in an amount of about 30 mg/m$^2$ of the recombinant L-asparaginase, and the time between administration of each dose in the series is two days.

In some embodiments, the method comprises administering intramuscularly or intravascularly to the human subject, a series of six doses of an L-asparaginase, where four of the six doses are about 25 mg/m$^2$, two of the six doses are about 50 mg/m$^2$, the time between administration of the two doses that are about 50 mg/m$^2$ is seven days, the time between administration of a dose in the series that is about 25 mg/m$^2$ and a next dose is two days, and the time between administration of a dose in the series that is about 50 mg/m$^2$ and a next dose is three days, and wherein the L-asparaginase is not an *E-coli*.-derived asparaginase. In some embodiments, a dose that is about 25 mg/m$^2$ is administered intravascularly, and a dose that is about 50 mg/m$^2$ is administered intramuscularly. In some embodiments, all doses are administered intramuscularly. In some embodiments, all doses are administered intravascularly.

In some embodiments, the method comprises administering intramuscularly or intravascularly to the human subject, a series of six doses of an L-asparaginase, where four of the six doses are about 22.5 mg/m$^2$ to about 27.5 mg/m$^2$, two of the six doses are about 47.5 mg/m$^2$ to about 52.5 mg/m$^2$, the time between administration of the two doses that are about 47.5 mg/m$^2$ to about 52.5 mg/m$^2$ is seven days, the time between administration of a dose in the series that is about 22.5 mg/m$^2$ to about 27.5 mg/m$^2$ and a next dose is two days, and the time between administration of a dose in the series that is about 47.5 mg/m$^2$ to about 52.5 mg/m$^2$ and a next dose is three days, and wherein the L-asparaginase is not an *E-coli*.-derived asparaginase. In some embodiments, a dose that is about 22.5 mg/m$^2$ to about 27.5 mg/m$^2$ is administered intravascularly, and a dose that is about 47.5 mg/m$^2$ to about 52.5 mg/m$^2$ is administered intramuscularly. In some embodiments, all doses are administered intramuscularly. In some embodiments, all doses are administered intravascularly.

In some embodiments, the method comprises administering intramuscularly or intravascularly to the human subject, a series of six doses of an L-asparaginase, where four of the six doses are about 20 mg/m$^2$ to about 30 mg/m$^2$, two of the six doses are about 45 mg/m$^2$ to about 55 mg/m$^2$, the time between administration of the two doses that are about 45 mg/m$^2$ to about 55 mg/m$^2$ is seven days, the time between administration of a dose in the series that is about 20 mg/m$^2$ to about 30 mg/m$^2$ and a next dose is two days, and the time between administration of a dose in the series that is about 45 mg/m$^2$ to about 55 mg/m$^2$ and a next dose is three days, and wherein the L-asparaginase is not an *E-coli*.-derived asparaginase. In some embodiments, a dose that is about 20 mg/m$^2$ to about 30 mg/m$^2$ is administered intravascularly, and a dose that is about 45 mg/m$^2$ to about 55 mg/m$^2$ is administered intramuscularly. In some embodiments, all doses are administered intramuscularly. In some embodiments, all doses are administered intravascularly.

In some embodiments the method comprises administering intramuscularly or intravascularly to the human subject L-asparaginase, other than an *E-coli*.-derived asparaginase, as a set of time-ordered doses; where the set of time-ordered doses comprises a first dose followed by a second dose, the first dose is one of (i) about 50 mg/m$^2$ and (ii) about 25 mg/m$^2$ of L-asparaginase, the second dose is the other of (i) about 50 mg/m$^2$ and (ii) about 25 mg/m$^2$ L-asparaginase, the time period between administration of the first dose and the second dose to the human subject is three days when the first dose is about 50 mg/m$^2$, the time period between administration of the first dose and the second dose to the human subject is two days when the first dose is about 25 mg/m$^2$, no further L-asparaginase is administered to the subject for three days when the second dose is about 50 mg/m$^2$, and no further L-asparaginase is administered to the subject for two days when the second dose is about 25 mg/m$^2$. In some embodiments, any dose that is about 25 mg/m$^2$ is administered intravascularly and any dose that is about 50 mg/m$^2$ is administered intramuscularly. In some embodiments, all doses are administered intramuscularly. In some embodiments, all doses are administered intravascularly.

In some embodiments the method comprises administering intramuscularly or intravascularly to the human subject L-asparaginase, other than an *E-coli*.-derived asparaginase, as a set of time-ordered doses; where the set of time-ordered doses comprises a first dose followed by a second dose, the first dose is one of (i) about 47.5 mg/m$^2$ to about 52.5 mg/m$^2$ and (ii) about 22.5 mg/m$^2$ to about 27.5 mg/m$^2$ of L-asparaginase, the second dose is the other of (i) about 47.5 mg/m$^2$ to about 52.5 mg/m$^2$ and (ii) about 22.5 mg/m$^2$ to about 27.5 mg/m$^2$ L-asparaginase, the time period between administration of the first dose and the second dose to the human subject is three days when the first dose is about 47.5 mg/m$^2$ to about 52.5 mg/m$^2$, the time period between administration of the first dose and the second dose to the human subject is two days when the first dose is about 22.5 mg/m$^2$ to about 27.5 mg/m$^2$, no further L-asparaginase is administered to the subject for three days when the second dose is about 47.5 mg/m$^2$ to about 52.5 mg/m$^2$, and no further L-asparaginase is administered to the subject for two days when the second dose is about 22.5 mg/m$^2$ to about 27.5 mg/m$^2$. In some embodiments, any dose that is about 22.5 mg/m$^2$ to about 27.5 mg/m$^2$ is administered intravascularly and any dose that is about 47.5 mg/m$^2$ to about 52.5 mg/m$^2$ is administered intramuscularly. In some embodiments, all doses are administered intramuscularly. In some embodiments, all doses are administered intravascularly.

In some embodiments the method comprises administering intramuscularly or intravascularly to the human subject L-asparaginase, other than an *E-coli*.-derived asparaginase, as a set of time-ordered doses; where the set of time-ordered doses comprises a first dose followed by a second dose, the first dose is one of (i) about 45 mg/m$^2$ to about 55 mg/m$^2$ and (ii) about 20 mg/m$^2$ to about 30 mg/m$^2$ of L-asparaginase, the second dose is the other of (i) about 45 mg/m$^2$ to about 55 mg/m$^2$ and (ii) about 20 mg/m$^2$ to about 30 mg/m$^2$ L-asparaginase, the time period between administration of the first dose and the second dose to the human subject is three days when the first dose is about 45 mg/m$^2$ to about 55 mg/m$^2$, the time period between administration of the first dose and the second dose to the human subject is two days when the first dose is about 20 mg/m$^2$ to about 30 mg/m$^2$, no further L-asparaginase is administered to the subject for three days when the second dose is about 45 mg/m$^2$ to about 55 mg/m$^2$, and no further L-asparaginase is administered to the subject for two days when the second dose is about 20 mg/m$^2$ to about 30 mg/m$^2$. In some embodiments, any dose that is about 20 mg/m$^2$ to about 30 mg/m$^2$ is administered intravascularly and any dose that is about 45 mg/m$^2$ to about 55 mg/m$^2$ is administered intramuscularly. In some embodiments, all doses are administered intramuscularly. In some embodiments, all doses are administered intravascularly.

2. Dose Frequency

In a specific embodiment, treatment will be administered at a dose ranging from about 1 mg/m$^2$ to about 1000 mg/m$^2$, typically about 10 mg/m$^2$ to about 100 mg/m$^2$, at a schedule ranging from about three a week to about once a month, typically once per week or once every other week, as a single agent (e.g., monotherapy) or as part of a combination of chemotherapy drugs, including, but not limited to glucocorticoids, corticosteroids, anticancer compounds or other agents, including, but not limited to methotrexate, dexamethasone, prednisone, prednisolone, vincristine, cyclophosphamide, and anthracycline.

The recombinant L-asparaginase of the present disclosure can be administered before, after, or simultaneously with other compounds as part of a multi-agent chemotherapy regimen. In a particular embodiment, the recombinant L-asparaginase of the present disclosure comprises a protein recombinantly produced in *Pseudomonas fluorescens*, and more specifically, the recombinant L-asparaginase comprises a sequence according to SEQ ID NO:1. In some embodiments, the recombinant L-asparaginase of the present disclosure is administered at a dose that depletes L-asparagine to undetectable levels using methods and apparatus known in the art for a period of about 3 days to about 10 days (e.g., 3, 4, 5, 6, 7, 8, 9, or 10 days) for a single dose.

In some embodiments, the recombinant L-asparaginase of the present disclosure is administered three times a week. In some embodiments, the recombinant L-asparaginase of the present disclosure is administered every other day over a period of 5 consecutive days followed by a rest period of 2 consecutive days. In some embodiments, the recombinant L-asparaginase of the present disclosure is administered on Monday, Wednesday, and Friday of the same week.

In some embodiments, the recombinant L-asparaginase of the present disclosure is administered three times a week for at least one to three weeks. In some embodiments, the recombinant L-asparaginase of the present disclosure is administered every other day over a period of 5 consecutive days followed by a rest period of 2 consecutive days for about one to three weeks. In some embodiments, the recombinant L-asparaginase of the present disclosure is administered on Monday, Wednesday, and Friday of the week for about one to three weeks.

In some embodiments, the recombinant L-asparaginase of the present disclosure is administered three times a week for about two weeks. In some embodiments, the recombinant L-asparaginase of the present disclosure is administered every other day over a period of 5 consecutive days followed by a rest period of 2 consecutive days for about two weeks. In some embodiments, the recombinant L-asparaginase of the present disclosure is administered on Monday, Wednesday, and Friday of the same week for about two weeks.

In some embodiments, the recombinant L-asparaginase of the present disclosure is administered three times a week for two weeks. In some embodiments, the recombinant L-asparaginase of the present disclosure is administered every other day over a period of 5 consecutive days followed by a rest period of 2 consecutive days for two weeks. In some embodiments, the recombinant L-asparaginase of the present disclosure is administered on Monday, Wednesday, and Friday of the same week for two weeks.

In some embodiments, the recombinant L-asparaginase of the present disclosure is administered three times a week, continuing until the patient no longer has a disease that is treatable by depletion of asparagine. In some embodiments, the recombinant L-asparaginase of the present disclosure is administered every other day over a period of 5 consecutive days followed by a rest period of 2 consecutive days, continuing until the patient no longer has a disease that is treatable by depletion of asparagine. In some embodiments, the recombinant L-asparaginase of the present disclosure is administered on Monday, Wednesday, and Friday of the same week, continuing until the patient no longer has a disease that is treatable by depletion of asparagine.

In some embodiments, the recombinant L-asparaginase of the present disclosure is administered three times a week, continuing until the patient decides to end or postpone treatment. In some embodiments, the recombinant L-asparaginase of the present disclosure is administered every other day over a period of 5 consecutive days followed by a rest period of 2 consecutive days, continuing until the patient decides to end or postpone treatment. In some embodiments, the recombinant L-asparaginase of the present disclosure is administered on Monday, Wednesday, and Friday of the same week, continuing until the patient decides to end or postpone treatment.

In some embodiments, the recombinant L-asparaginase of the present disclosure is administered about every 48 hours. In some embodiments, the recombinant L-asparaginase of the present disclosure is administered every 40 to 58 hours. In some embodiments, the recombinant L-asparaginase of the present disclosure is administered about every 42 to 56 hours. In some embodiments, the recombinant L-asparaginase of the present disclosure is administered about every 44 to 52 hours. In some embodiments, the recombinant L-asparaginase of the present disclosure is administered about every 46 to 50 hours. In some embodiments, the recombinant L-asparaginase of the present disclosure is administered about every 72 hours. In some embodiments, the recombinant L-asparaginase of the present disclosure is administered every 64 to 80 hours. In some embodiments, the recombinant L-asparaginase of the present disclosure is administered about every 66 to 78 hours. In some embodiments, the recombinant L-asparaginase of the present disclosure is administered about every 68 to 76 hours. In some embodiments, the recombinant L-asparaginase of the present disclosure is administered about every 70 to 74 hours.

In some embodiments, recombinant L-asparaginase of the present disclosure is administered as a second line therapy with patients who are hypersensitive to an *E. coli*-derived L-asparaginase, and/or may have had a previous hypersensitivity to an *Erwinia chrysanthemi*-derived L-asparaginase.

In some embodiments, the recombinant L-asparaginase is administered to the human subject as a substitute for a dose of a long-acting *E. coli*-derived asparaginase. In some embodiments, six doses of recombinant L-asparaginase are administered to the human subject as a substitute for one dose of the long-acting *E. coli*-derived asparaginase. In some embodiments, seven doses of recombinant L-asparaginase are administered to the human subject as a substitute for one dose of the long-acting *E. coli*-derived asparaginase. In some embodiments, the long-acting *E. coli*-derived asparaginase is pegaspargase. In a further embodiment, the six separate doses may occur over a period of about two weeks. In another further embodiment, the seven separate doses may occur over a period of about two weeks.

In some embodiments, a dose regimen for the recombinant L-asparaginase comprises a cycle, wherein the cycle comprises a first dose, a second dose, and a third dose, wherein the cycle is optionally repeatable, and wherein the first dose, second dose, and third dose are administered about 48-72 hours apart.

In some embodiments, dose amounts may vary within the cycle.

In some embodiments, a dose regimen for the recombinant L-asparaginase comprises a cycle, wherein the cycle is optionally repeatable, and wherein the cycle comprises administration of the recombinant L-asparaginase every other day over a period of five consecutive days followed by a rest period of two consecutive days, wherein the first dose of the cycle is 25 mg/m$^2$, the second dose of the cycle is 25 mg/m$^2$ and the third dose of the cycle is 50 mg/m$^2$, followed by the rest period of two consecutive days.

In some embodiments, a dose regimen for the recombinant L-asparaginase comprises a cycle, wherein the cycle is optionally repeatable, and wherein the cycle comprises administration of the recombinant L-asparaginase every other day over a period of five consecutive days followed by a rest period of two consecutive days, wherein the first dose of the cycle is 25 mg/m$^2$, the second dose of the cycle is 25 mg/m$^2$ and the third dose of the cycle is 37.5 mg/m$^2$, followed by the rest period of two consecutive days.

In some embodiments, a dose regimen for the recombinant L-asparaginase comprises a cycle, wherein the cycle is optionally repeatable, and wherein the cycle comprises administration of the recombinant L-asparaginase every other day over a period of five consecutive days followed by a rest period of two consecutive days, wherein the first dose of the cycle is 37.5 mg/m$^2$, the second dose of the cycle is 37.5 mg/m$^2$ and the third dose of the cycle is 37.5 mg/m$^2$, followed by the rest period of two consecutive days.

In some embodiments, a dose regimen for the recombinant L-asparaginase comprises a cycle, wherein the cycle is optionally repeatable, and wherein the cycle comprises administration of the recombinant L-asparaginase every other day over a period of five consecutive days followed by a rest period of two consecutive days, wherein the first dose of the cycle is 37.5 mg/m$^2$, the second dose of the cycle is 25 mg/m$^2$ and the third dose of the cycle is 37.5 in mg/m$^2$, followed by the rest period of two consecutive days.

In some embodiments, a dose regimen for the recombinant L-asparaginase comprises a cycle, wherein the cycle is optionally repeatable, and wherein the cycle comprises administration of the recombinant L-asparaginase every other day over a period of five consecutive days followed by a rest period of two consecutive days, wherein the first dose of the cycle is 37.5 mg/m$^2$, the second dose of the cycle is 25 mg/m$^2$ and the third dose of the cycle is 25 mg/m$^2$, followed by the rest period of two consecutive days. In some embodiments, the first dose of the cycle is administered on a Monday, the second dose of the cycle is given on a Wednesday, and the third dose of the cycle is given on a Friday.

In some embodiments, a dose regimen for the recombinant L-asparaginase comprises a cycle, where the cycle is optionally repeatable, and where the cycle comprises administration of the recombinant L-asparaginase every other day over a period of five consecutive days followed by a rest period of two consecutive days, where the first dose of the cycle is 25 mg/m$^2$, the second dose of the cycle is 25 mg/m$^2$ and the third dose of the cycle is 50 mg/m$^2$, followed by the rest period of two consecutive days. In some embodiments, the first dose of the cycle is administered on a Monday, the second dose of the cycle is given on a Wednesday, and the third dose of the cycle is given on a Friday.

In some embodiments, the present disclosure provides a method for depleting asparaginase in a human subject to treat Acute Lymphoblastic Leukemia (ALL) or Lymphoblastic Lymphoma (LBL), the method comprising: on Mondays, Wednesdays, and Fridays, administering intramuscularly about 25 mg/m$^2$ of L-asparaginase to the human subject, such that the human subject receives a total of seven doses of L-asparaginase over a two week period.

In some embodiments, the present disclosure provides a method for depleting asparaginase in a human subject to treat cancers, including but not limited to Acute Lymphoblastic Leukemia (ALL), Lymphoblastic Lymphoma (LBL), Colorectal Cancer (CRC), Acute Myeloid Leukemia (AML), the method comprising: (a) on Mondays and Wednesdays, administering intramuscularly or intravascularly about 25 mg/m$^2$ of L-asparaginase to the human subject, and (b) on Fridays, administering intramuscularly or intravascularly about 50 mg/m$^2$ of L-asparaginase to the human subject; such that the human subject receives a total of six doses of L-asparaginase over a two week period.

The dose regimen may encompass any number of cycles for any number of weeks or until any endpoint that is specified herein.

3. Dose Time

In some embodiments, the dose time to the human subject has a short duration, for example, immediate or from one second to five minutes when delivered by intramuscular injection. In other embodiments, the dose time to the human subject is of longer duration, for example when delivered by intravenous injection. In some embodiments, the dose of recombinant L-asparaginase lasts between about 5 minutes and about 4 hours. In an exemplary embodiment, the dose time to the human subject lasts between 90 minutes and about 150 minutes. In some embodiments, the dose time to the human subject lasts about two hours. In some embodiments, the dose time to the human subject lasts two hours. In some embodiments, the dose time to the human subject lasts between about 45 minutes and about 75 minutes. In some embodiments, the dose time to the human subject lasts about one hour. In some embodiments, the dose time to the human subject lasts one hour.

4. Preferred Dosing Regimens

In some embodiments, the present disclosure provides for a method of treating cancer in a human subject. In some embodiments, the present disclosure provides for a method of treating a human subject with acute lymphoblastic leukemia (ALL) or lymphoblastic lymphoma (LBL). In some embodiments, the present disclosure provides for a method of treating a human subject with colorectal cancer (CRC). In some embodiments, the present disclosure provides for a method of treating a human subject with Wnt-negative colorectal cancer (CRC). In some embodiments, the present disclosure provides for a method of treating a human subject with Wnt-mutant colorectal cancer (CRC). In some embodiments, the present disclosure provides for a method of treating a human subject with acute myeloid leukemia (AML). In some embodiments, the present disclosure provides for a method of treating a human subject with diffuse large B-cell lymphoma (DLBCL). In some embodiments, the present disclosure provides for a method of treating a human subject with relapsing/refractory AML (R/R AML). In some embodiments, the recombinant L-asparaginase may be used as a first-line therapy. In some embodiments, the recombinant L-asparaginase may be used as a second-line therapy. In some embodiments, the recombinant L-asparaginase may be used as a third, fourth, or fifth-line therapy.

In some embodiments, the recombinant L-asparaginase may be substituted for a native *E. coli*-derived asparaginase. In some embodiments, one dose of the recombinant L-asparaginase is administered to the human subject as a substitute for one dose of the native *E. coli*-derived asparaginase. In some embodiments, the recombinant L-asparaginase may be substituted for a long-acting *E. coli*-derived asparaginase. In some embodiments, six doses of the recombinant L-asparaginase are administered to the human subject as a substitute for one dose of the long-acting *E. coli*-derived asparaginase. In some embodiments, seven doses of the recombinant L-asparaginase are administered to the human subject as a substitute for one dose of the long-acting *E. coli*-derived asparaginase. In some embodiments, the long-acting *E. coli*-derived asparaginase is pegaspargase. In some embodiments, treatment with a recombinant L-asparaginase of the present disclosure is administered as a maintenance therapy. In some embodiments, administering the recombinant L-asparaginase to a human subject as a substitute for native or long-acting *E. coli*-derived asparaginase can occur anytime within the treatment cycle of the native or long-acting *E. coli*-derived asparaginase. In some embodiments, the treatment cycle for the native or long-acting *E. coli*-derived asparaginase is anywhere from 1 to 14 doses. In some embodiments, the treatment cycle for the native or long-acting *E. coli*-derived asparaginase is 1, 2, 3, 4, 5, 6, 7, 8, 9, 10, 11, 12, 13, or 14 doses. In some embodiments, the treatment cycle for the native or long-acting *E. coli*-derived asparaginase is between 2 and 12 doses. In some embodiments, the treatment cycle for the native or long-acting *E. coli*-derived asparaginase is between 4 and 10 doses. In some embodiments, the treatment cycle for the native or long-acting *E. coli*-derived asparaginase is between 4 and 10 doses. In some embodiments, the treatment cycle for the native or long-acting *E. coli*-derived asparaginase is between 4 and 8 doses. In some embodiments, the treatment cycle for the native or long-acting *E. coli*-derived asparaginase is between 4 and 6 doses. In some embodiments, administering the recombinant L-asparaginase to a human subject as a substitute for native or long-acting *E. coli*-derived asparaginase can occur anytime within the treatment cycle of the native or long-acting *E. coli*-derived asparaginase depending on when the human subject experiences hypersensitivity. Of course, other substitute treatment regimens may be employed, as determined by the attending physician. The amounts of the recombinant L-asparaginase of the present disclosure may be administered in a hybrid dose format, wherein the dose amount varies within the dosing regimen. Generally, the amount of the recombinant L-asparaginase of the present disclosure under a hybrid dosing format will be administered at a range from about 25 mg/m$^2$ to about 50 mg/m$^2$ to treat disease, including but not limited to cancer. In some embodiments, the 25 mg/m$^2$ doses are administered intravascularly and the 50 mg/m$^2$ doses are administered intramuscularly. The amounts of the recombinant L-asparaginase of the present disclosure may be administered in a hybrid administration format, wherein the administration method varies within the dosing regimen. In some embodiments, the hybrid administration format will include intravenous and intramuscular administration. Of course, other dosages and/or treatment regimens may be employed, as determined by the attending physician.

In some embodiments, the present disclosure provides for a method of substituting a human subject's treatment for cancer. In some embodiments, the present disclosure provides for a method of substituting a human subject's treatment for acute lymphoblastic leukemia (ALL) or lymphoblastic lymphoma (LBL). In some embodiments, the present disclosure provides for a method of substituting a human subject's treatment for colorectal cancer (CRC). In some embodiments, the present disclosure provides for a method of substituting a human subject's treatment for Wnt-negative colorectal cancer (CRC). In some embodiments, the present disclosure provides for a method of substituting a human subject's treatment for Wnt-mutant colorectal cancer (CRC). In some embodiments, the present disclosure provides for a method of substituting a human subject's treatment for diffuse large B-cell lymphoma (DLBCL). In some embodiments, the present disclosure provides for a method of substituting a human subject's treatment for acute myeloid leukemia (AML). In some embodiments, the present disclosure provides for a method of substituting a human subject's treatment for relapsing/refractory AML (R/R AML). In some embodiments, the recombinant L-asparaginase may be used as a first-line therapy. In some embodiments, the recombinant L-asparaginase may be used as a second-line therapy. In some embodiments, the recombinant L-asparaginase may be used as a third, fourth, or fifth-line therapy.

(a) Dose Regimen 1: 7 Doses at 25 mg/m$^2$

In some embodiments, the present invention provides a method of substituting a human subject's treatment for cancer, wherein the human subject is in need thereof. In some embodiments, the present invention provides a method of substituting a human subject's treatment for acute lymphoblastic leukemia (ALL) or lymphoblastic lymphoma (LBL), wherein the human subject is in need thereof. In some embodiments, the present invention provides a method of substituting a human subject's treatment for colorectal cancer (CRC), wherein the human subject is in need thereof. In some embodiments, the present invention provides a method of substituting a human subject's treatment for Wnt-negative colorectal cancer (CRC), wherein the human subject is in need thereof. In some embodiments, the present invention provides a method of substituting a human subject's treatment for Wnt-mutant colorectal cancer (CRC), wherein the human subject is in need thereof. In some embodiments, the present disclosure provides for a method of substituting a human subject's treatment for diffuse large B-cell lymphoma (DLBCL). In some embodiments, the present invention provides a method of substituting a human subject's treatment for acute myeloid leukemia (AML), wherein the human subject is in need thereof. In some embodiments, the present invention provides a method of substituting a human subject's treatment for relapsing/refractory (R/R) acute myeloid leukemia (AML), wherein the human subject is in need thereof.

In some embodiments, the method comprises administering intramuscularly or intravascularly to the human subject, as a substitute for each respective dose of a long-acting *E-coli.*-derived asparaginase, a series of seven doses of a recombinant L-asparaginase, where each dose in the series is in an amount of about 25 mg/m$^2$ of the recombinant L-asparaginase, and the time between administration of each dose in the series is two days.

In some embodiments, the method comprises administering intramuscularly or intravascularly to the human subject, as a substitute for each respective dose of a long-acting *E-coli.*-derived asparaginase, a series of seven doses of a recombinant L-asparaginase, where each dose in the series is in an amount of about 25 mg/m$^2$ of the recombinant L-asparaginase, and the time between administration of each dose in the series is about 48 hours.

In some embodiments, the long-acting *E-coli.*-derived asparaginase is pegasparaginase. In some embodiments, the recombinant L-asparaginase is a tetramer, and each monomer of the tetramer comprises SEQ ID NO: 1. In some embodiments, the recombinant L-asparaginase is a tetramer, and each monomer of the tetramer has a sequence identity of at least 70 percent, at least 75 percent, at least 80 percent, at least 85 percent, at least 90 percent, at least 95 percent, at least 96 percent, at least 97 percent, at least 98 percent, or at least 99 percent to SEQ ID NO: 1. In some embodiments, the human subject exhibited hypersensitivity to the *E-coli.*-derived asparaginase prior to the substitution. In some embodiments, the human subject is an adult patient. In some embodiments, the human subject is a pediatric patient. In some embodiments, the recombinant L-asparaginase is administered in a composition that demonstrates less than 6% aggregation of the L-asparaginase. In some embodiments, the recombinant L-asparaginase is administered in a composition that demonstrates less than 1% aggregation of the L-asparaginase. In some embodiments, the recombinant L-asparaginase is non-lyophilized. In some embodiments, the recombinant L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration with the recombinant L-asparaginase. In some embodiments, the recombinant L-asparaginase is co-administered with one or more other chemotherapeutic agents as part of a multi-agent chemotherapeutic regimen.

(b) Dose Regimen 2: 6 Doses at 25 mg/m$^2$/25 mg/m$^2$/50 mg/m$^2$×2

The amounts of the recombinant L-asparaginase of the present disclosure may be administered in a mixed dose format, where the dose amount varies within the dosing regimen. Generally, the amount of the recombinant L-asparaginase of the present disclosure under a mixed dosing format will be administered at a range from about 25 mg/m$^2$ to about 50 mg/m$^2$ to treat disease, including but not limited to cancer. In some embodiments, the cancer to be treated is ALL or LBL. In some embodiments, the cancer to be treated is CRC. In some embodiments, the cancer to be treated is Wnt-negative CRC. In some embodiments, the cancer to be treated is Wnt-mutant CRC. In some embodiments, the cancer to be treated is diffuse large B-cell lymphoma (DLBCL). In some embodiments, the cancer to be treated is AML. In some embodiments, the cancer to be treated is R/R AML. Of course, other dosages and/or treatment regimens may be employed, as determined by the attending physician.

In some embodiments, the present disclosure provides a method of substituting a treatment of a human subject for cancer, where the human subject is in need thereof. In some embodiments, the present disclosure provides a method of substituting a treatment of a human subject for acute lymphoblastic leukemia (ALL) or lymphoblastic lymphoma (LBL), where the human subject is in need thereof. In some embodiments, the present disclosure provides a method of substituting a treatment of a human subject for colorectal cancer (CRC), where the human subject is in need thereof. In some embodiments, the present disclosure provides a method of substituting a treatment of a human subject for Wnt-negative colorectal cancer (CRC), where the human subject is in need thereof. In some embodiments, the present disclosure provides a method of substituting a treatment of a human subject for Wnt-mutant colorectal cancer (CRC), where the human subject is in need thereof. In some embodiments, the present disclosure provides for a method of substituting a human subject's treatment for diffuse large B-cell lymphoma (DLBCL). In some embodiments, the present disclosure provides a method of substituting a treatment of a human subject for acute myeloid leukemia (AML), where the human subject is in need thereof. In some embodiments, the present disclosure provides a method of substituting a treatment of a human subject for relapsing/refractory acute myeloid leukemia (R/R AML), where the human subject is in need thereof.

In some embodiments, the method comprises administering intramuscularly or intravascularly to the human subject, as a substitute for each dose of an *E-coli*.-derived asparaginase, a series of six doses of an L-asparaginase, where four of the six doses are about 25 mg/m$^2$, two of the six doses are about 50 mg/m$^2$, the time between administration of the two doses that are about 50 mg/m$^2$ is seven days, the time between administration of a dose in the series that is about 25 mg/m$^2$ and a next dose is two days, and the time between administration of a dose in the series that is about 50 mg/m$^2$ and a next dose is three days, and wherein the L-asparaginase is not an *E-coli*.-derived asparaginase.

In some embodiments, the method comprises administering intramuscularly or intravascularly to the human subject, as a substitute for each dose of an *E-coli*.-derived asparaginase, a series of six doses of an L-asparaginase, where four of the six doses are about 25 mg/m$^2$, two of the six doses are about 50 mg/m$^2$, the time between administration of the two doses that are about 50 mg/m$^2$ is seven days, the time between administration of a dose in the series that is about 25 mg/m$^2$ and a next dose is two days, and the time between administration of a dose in the series that is about 50 mg/m$^2$ and a next dose is three days, where the L-asparaginase is not an *E-coli*.-derived asparaginase, and wherein the 25 mg/m$^2$ doses are administered intravascularly and the 50 mg/m$^2$ doses are administered intramuscularly.

In some embodiments, the method comprises administering intramuscularly or intravascularly to the human subject, as a substitute for each dose of an *E-coli*.-derived asparaginase, a series of six doses of an L-asparaginase, where four of the six doses are about 25 mg/m$^2$, two of the six doses are about 50 mg/m$^2$, the time between administration of the two doses that are about 50 mg/m$^2$ is about 168 hours, the time between administration of a dose in the series that is about 25 mg/m$^2$ and a next dose is about 48 hours, and the time between administration of a dose in the series that is about 50 mg/m$^2$ and a next dose is about 72 hours, and wherein the L-asparaginase is not an *E-coli*.-derived asparaginase.

In some embodiments, the method comprises administering intramuscularly or intravascularly to the human subject, as a substitute for each dose of an *E-coli*.-derived asparaginase, a series of six doses of an L-asparaginase, where four of the six doses are about 25 mg/m$^2$, two of the six doses are about 50 mg/m$^2$, the time between administration of the two doses that are about 50 mg/m$^2$ is about 168 hours, the time between administration of a dose in the series that is about 25 mg/m$^2$ and a next dose is about 48 hours, and the time between administration of a dose in the series that is about 50 mg/m$^2$ and a next dose is about 72 hours, wherein the L-asparaginase is not an *E-coli*.-derived asparaginase, and wherein the 25 mg/m$^2$ doses are administered intravascularly and the 50 mg/m$^2$ doses are administered intramuscularly.

In some embodiments, the long-acting *E-coli*.-derived asparaginase is pegasparaginase. In some embodiments, the recombinant L-asparaginase is a tetramer, and wherein each monomer of the tetramer comprises SEQ ID NO: 1. In some embodiments, the recombinant L-asparaginase is a tetramer, and wherein each monomer of the tetramer has a sequence identity of at least 70 percent, at least 75 percent, at least 80 percent, at least 85 percent, at least 90 percent, at least 95 percent, at least 96 percent, at least 97 percent, at least 98 percent, or at least 99 percent to SEQ ID NO: 1. In some embodiments, the human subject exhibited hypersensitivity to the *E-coli*.-derived asparaginase. In some embodiments, the human subject is an adult patient. In some embodiments, the human subject is a pediatric patient. In some embodiments, the recombinant L-asparaginase is administered in a composition that demonstrates less than 6% aggregation of the L-asparaginase. In some embodiments, the recombinant L-asparaginase is administered in a composition that demonstrates less than 1% aggregation of the L-asparaginase. In some embodiments, the recombinant L-asparaginase is non-lyophilized. In some embodiments, the recombinant L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration with the recombinant L-asparaginase. In some embodiments, the recombinant L-asparaginase is co-administered with one or more other chemotherapeutic agents as part of a multi-agent chemotherapeutic regimen.

In some embodiments, the present disclosure provides a method of substituting a treatment of a human subject for cancer, wherein the human subject is in need thereof, said method comprising: administering intramuscularly or intravascularly to the human subject, as a substitute for each dose of an *E-coli.*-derived asparaginase, a series of six doses of an L-asparaginase, wherein four of the six doses are about 25 mg/m$^2$, two of the six doses are about 50 mg/m$^2$, the time between administration of the two doses that are about 50 mg/m$^2$ is six to eight days, the time between administration of a dose in the series that is about 25 mg/m$^2$ and a next dose is two days, and the time between administration of a dose in the series that is about 50 mg/m$^2$ and a next dose is three days, and wherein the L-asparaginase is not an *E-coli.*-derived asparaginase. In some embodiments, the long-acting *E-coli.*-derived asparaginase is pegasparaginase. In some embodiments, the recombinant L-asparaginase is a tetramer, and where each monomer of the tetramer comprises SEQ ID NO: 1. In some embodiments, the recombinant L-asparaginase is a tetramer, where each monomer of the tetramer has a sequence identity of at least 70 percent, at least 75 percent, at least 80 percent, at least 85 percent, at least 90 percent, at least 95 percent, at least 96 percent, at least 97 percent, at least 98 percent, or at least 99 percent to SEQ ID NO: 1. In some embodiments, the human subject exhibited hypersensitivity to the *E-coli.*-derived asparaginase. In some embodiments, the human subject is an adult patient. In some embodiments, the human subject is a pediatric patient. In some embodiments, the recombinant L-asparaginase is administered in a composition that demonstrates less than 6% aggregation of the L-asparaginase. In some embodiments, the recombinant L-asparaginase is administered in a composition that demonstrates less than 1% aggregation of the L-asparaginase. In some embodiments, the recombinant L-asparaginase is non-lyophilized. In some embodiments, the recombinant L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration with the recombinant L-asparaginase. In some embodiments, the recombinant L-asparaginase is co-administered with one or more other chemotherapeutic agents as part of a multi-agent chemotherapeutic regimen. In some embodiments, the cancer is lymphoblastic leukemia (ALL). In some embodiments, the cancer is lymphoblastic lymphoma (LBL). In some embodiments, the cancer is colorectal cancer. In some embodiments, the cancer is Wnt-negative colorectal cancer. In some embodiments, the cancer is colorectal cancer. In some embodiments, the cancer is Wnt-mutant colorectal cancer. In some embodiments, the cancer is diffuse large B-cell lymphoma (DLBCL). In some embodiments, the cancer is acute myeloid leukemia (AML). In some embodiments, the acute myeloid leukemia is relapsing/refractory AML.

In some embodiments, the present disclosure provides a method of substituting a treatment of a human subject for cancer, wherein the human subject is in need thereof, said method comprising: administering intramuscularly or intravascularly to the human subject, as a substitute for each dose of an *E-coli.*-derived asparaginase, a series of six doses of an L-asparaginase, wherein four of the six doses are about 25 mg/m$^2$, two of the six doses are about 50 mg/m$^2$, the time between administration of the two doses that are about 50 mg/m$^2$ is six to eight days, the time between administration of a dose in the series that is about 25 mg/m$^2$ and a next dose is two days, and the time between administration of a dose in the series that is about 50 mg/m$^2$ and a next dose is three days, where the L-asparaginase is not an *E-coli.*-derived asparaginase, and wherein the 25 mg/m$^2$ is administered intravascularly and the 50 mg/m$^2$ is administered intramuscularly. In some embodiments, the long-acting *E-coli.*-derived asparaginase is pegasparaginase. In some embodiments, the recombinant L-asparaginase is a tetramer, and where each monomer of the tetramer comprises SEQ ID NO: 1. In some embodiments, the recombinant L-asparaginase is a tetramer, where each monomer of the tetramer has a sequence identity of at least 70 percent, at least 75 percent, at least 80 percent, at least 85 percent, at least 90 percent, at least 95 percent, at least 96 percent, at least 97 percent, at least 98 percent, or at least 99 percent to SEQ ID NO: 1. In some embodiments, the human subject exhibited hypersensitivity to the *E-coli.*-derived asparaginase. In some embodiments, the human subject is an adult patient. In some embodiments, the human subject is a pediatric patient. In some embodiments, the recombinant L-asparaginase is administered in a composition that demonstrates less than 6% aggregation of the L-asparaginase. In some embodiments, the recombinant L-asparaginase is administered in a composition that demonstrates less than 1% aggregation of the L-asparaginase. In some embodiments, the recombinant L-asparaginase is non-lyophilized. In some embodiments, the recombinant L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration with the recombinant L-asparaginase. In some embodiments, the recombinant L-asparaginase is co-administered with one or more other chemotherapeutic agents as part of a multi-agent chemotherapeutic regimen.

(c) Dosing Regimen 3: 50/25 with Three Days in Between

The amounts of the recombinant L-asparaginase of the present disclosure may be administered in a hybrid dosing format, where the dose amount and dose time varies within the dosing regimen. Generally, the amount of the recombinant L-asparaginase of the present disclosure under a hybrid dosing format will be administered at a range from about 25 mg/m$^2$ to about 50 mg/m$^2$ to treat disease, including but not limited to ALL or LBL, CRC, AML, or DLBCL. In some embodiments, CRC is Wnt-negative CRC. In some embodiments, CRC is Wnt-mutant CRC. In some embodiments, AML is R/R AML. Of course, other dosages and/or treatment regimens may be employed, as determined by the attending physician.

In some embodiments, the present disclosure provides a method of treating Acute Lymphoblastic Leukemia (ALL) or Lymphoblastic Lymphoma (LBL) in a human subject in need thereof.

In some embodiments the method comprises administering intramuscularly to the human subject L-asparaginase, other than an *E-coli.*-derived asparaginase, as a set of time-ordered doses; where the set of time-ordered doses comprises a first dose followed by a second dose, the first dose is one of (i) about 50 mg/m$^2$ and (ii) about 25 mg/m$^2$ of L-asparaginase, the second dose is the other of (i) about 50 mg/m$^2$ and (ii) about 25 mg/m$^2$ L-asparaginase, the time period between administration of the first dose and the second dose to the human subject is three days when the first dose is about 50 mg/m$^2$, the time period between administration of the first dose and the second dose to the human subject is two days when the first dose is about 25 $mg/m^2$, no further L-asparaginase is administered to the subject for three days when the second dose is 50 $mg/m^2$, and no further L-asparaginase is administered to the subject for two days when the second dose is 25 $mg/m^2$.

In some embodiments, the first dose is about 50 $mg/m^2$, the second dose is about 25 $mg/m^2$, the set of time-ordered doses further comprises a third dose after the second dose, the third dose is about 25 $mg/m^2$, and the time period between administration of the second dose and the third dose to the human subject is two days. In some embodiments, the first dose is administered on a Friday and the second dose is administered on a Monday. In some further embodiments, the first dose is administered on a Friday, the second dose is administered on a Monday, and the third dose is administered on a Wednesday.

In some embodiments, the first dose is about 25 $mg/m^2$, the second dose is about 50 $mg/m^2$, the set of time-ordered doses further comprises a third dose after the second dose, the third dose is about 25 $mg/m^2$, and the time period between administration of the second dose and the third dose to the human subject is three days. In some embodiments, the first dose is administered on a Wednesday and the second dose is administered on a Friday. In some embodiments, the first dose is administered on a Wednesday, the second dose is administered on a Friday, and the third dose is administered on a Monday. In some embodiments, any dose that is about 25 $mg/m^2$ is administered intravascularly and any dose that is about 50 $mg/m^2$ is administered intramuscularly. In some embodiments, all doses are administered intramuscularly. In some embodiments, all doses are administered intravascularly.

In some embodiments, the first dose is about 25 $mg/m^2$, the second dose is about 50 $mg/m^2$, the set of time-ordered doses further comprises a third dose before the first dose, the third dose is about 25 $mg/m^2$, and the third dose is administered to the human subject two days before the first dose. In some embodiments, the first dose is administered on a Wednesday and the second dose is administered on a Friday. In some embodiments, the first dose is administered on a Wednesday, the second dose is administered on a Friday, and the third dose is administered on a Monday. In some embodiments, any dose that is about 25 $mg/m^2$ is administered intravascularly and any dose that is about 50 $mg/m^2$ is administered intramuscularly. In some embodiments, all doses are administered intramuscularly. In some embodiments, all doses are administered intravascularly.

In some embodiments, the method comprises a first dose, a second dose and a third dose, wherein the first dose is administered on a Monday, the second dose is administered on a Wednesday, and the third dose is administered on a Friday. In some embodiments, the first dose is 25 $mg/m^2$, the second dose is 25 $mg/m^2$, and the third dose is 50 $mg/m^2$.

In some embodiments, the method further comprises intramuscularly or intravascularly administering to the human subject a plurality of instances of the set of time-ordered doses of the L-asparaginase, where each respective instance of the set of time-ordered doses of the recombinant L-asparaginase is administered to the subject upon completion of a prior instance of the set of time-ordered doses in the plurality of instances of the set of time-ordered doses. In some embodiments, the plurality of instances of the set of time-ordered doses of the L-asparaginase is between two and one hundred. In some embodiments, the plurality of instances of the set of time-ordered doses of the L-asparaginase is between two and eighty. In some embodiments, the plurality of instances of the set of time-ordered doses of the L-asparaginase is between two and sixty. In some embodiments, the plurality of instances of the set of time-ordered doses of the L-asparaginase is between two and fifty. In some embodiments, the plurality of instances of the set of time-ordered doses of the L-asparaginase is between two and forty. In some embodiments, the plurality of instances of the set of time-ordered doses of the L-asparaginase is between two and thirty. In some embodiments, the plurality of instances of the set of time-ordered doses of the L-asparaginase is between two and twenty. In some embodiments, the plurality of instances of the set of time-ordered doses of the L-asparaginase is between two and fifteen. In some embodiments, the plurality of instances of the set of time-ordered doses of the L-asparaginase is between two and fourteen. In some embodiments, the plurality of instances of the set of time-ordered doses of the L-asparaginase is between two and thirteen. In some embodiments, the plurality of instances of the set of time-ordered doses of the L-asparaginase is between two and twelve. In some embodiments, the plurality of instances of the set of time-ordered doses of the L-asparaginase is between two and eleven. In some embodiments, the plurality of instances of the set of time-ordered doses of the L-asparaginase is between two and ten. In some embodiments, the plurality of instances of the set of time-ordered doses of the L-asparaginase is between two and nine. In some embodiments, the plurality of instances of the set of time-ordered doses of the L-asparaginase is between two and eight. In some embodiments, the plurality of instances of the set of time-ordered doses of the L-asparaginase is between two and seven. In some embodiments, the plurality of instances of the set of time-ordered doses of the L-asparaginase is between two and six. In some embodiments, the plurality of instances of the set of time-ordered doses of the L-asparaginase is between two and five. In some embodiments, the plurality of instances of the set of time-ordered doses of the L-asparaginase is between two and four. In some embodiments, the plurality of instances of the set of time-ordered doses of the L-asparaginase is between four and six.

In some embodiments, the long-acting *E-coli.*-derived asparaginase is pegasparaginase.

In some embodiments, the recombinant L-asparaginase is a tetramer, and each monomer of the tetramer comprises SEQ ID NO: 1. In some embodiments, the recombinant L-asparaginase is a tetramer, and each monomer of the tetramer has a sequence identity of at least 70 percent, at least 75 percent, at least 80 percent, at least 85 percent, at least 90 percent, at least 95 percent, at least 96 percent, at least 97 percent, at least 98 percent, or at least 99 percent to SEQ ID NO: 1.

In some embodiments, the human subject exhibited hypersensitivity to the *E-coli.*-derived asparaginase. In some embodiments, the human subject is an adult patient. In some embodiments, the human subject is a pediatric patient. In some embodiments, the recombinant L-asparaginase is administered in a composition that demonstrates less than 6% aggregation of the L-asparaginase. In some embodiments, the recombinant L-asparaginase is administered in a composition that demonstrates less than 1% aggregation of the L-asparaginase. In some embodiments, the recombinant L-asparaginase is non-lyophilized. In some embodiments, the recombinant L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration with the recombinant L-asparaginase. In some embodiments, the recombinant L-asparaginase is co-administered with one or more other chemotherapeutic agents as part of a multi-agent chemotherapeutic regimen.

In some embodiments, a dose regimen for the recombinant L-asparaginase comprises a cycle, where the cycle is optionally repeatable, and where the cycle comprises administration of the recombinant L-asparaginase every other day over a period of five consecutive days followed by a rest period of two consecutive days, where the first dose of the cycle is 25 mg/m$^2$, the second dose of the cycle is 25 mg/m$^2$ and the third dose of the cycle is 50 mg/m$^2$, followed by the rest period of two consecutive days. In some embodiments, the first dose of the cycle is administered on a Monday, the second dose of the cycle is given on a Wednesday, and the third dose of the cycle is given on a Friday.

(d) Dosing Regimen 3: 50/25 with about 72 Hours in Between

The amounts of the recombinant L-asparaginase of the present disclosure may be administered in a hybrid dosing format, where the dose amount and dose time varies within the dosing regimen. Generally, the amount of the recombinant L-asparaginase of the present disclosure under a hybrid dosing format will be administered at a range from about 25 mg/m$^2$ to about 50 mg/m$^2$ to treat disease, including but not limited to cancer. Some cancers treated using this dosing regimen include but are not limited to ALL or LBL, CRC, AML, or DLBCL. In some embodiments, CRC is Wnt-negative CRC. In some embodiments, CRC is Wnt-mutant CRC. In some embodiments, AML is R/R AML. Of course, other dosages and/or treatment regimens may be employed, as determined by the attending physician.

In some embodiments, the present disclosure provides a method of treating cancer, where the human subject is in need thereof. In some embodiments, the present disclosure provides a method of treating acute lymphoblastic leukemia (ALL) or lymphoblastic lymphoma (LBL), where the human subject is in need thereof. In some embodiments, the present disclosure provides a method of treating colorectal cancer (CRC), where the human subject is in need thereof. In some embodiments, the present disclosure provides a method of treating Wnt-negative colorectal cancer (CRC), where the human subject is in need thereof. In some embodiments, the present disclosure provides a method of treating Wnt-mutant colorectal cancer (CRC), where the human subject is in need thereof. In some embodiments, the present disclosure provides a method of treating diffuse large B-cell lymphoma (DLBCL). In some embodiments, the present disclosure provides a method of treating acute myeloid leukemia (AML), where the human subject is in need thereof. In some embodiments, the present disclosure provides a method of treating relapsing/refractory acute myeloid leukemia (R/R AML), where the human subject is in need thereof.

In some embodiments the method comprises administering intramuscularly or intravascularly to the human subject L-asparaginase, other than an *E-coli.*-derived asparaginase, as a set of time-ordered doses; where the set of time-ordered doses comprises a first dose followed by a second dose, the first dose is one of (i) about 50 mg/m$^2$ and (ii) about 25 mg/m$^2$ of L-asparaginase, the second dose is the other of (i) about 50 mg/m$^2$ and (ii) about 25 mg/m$^2$ L-asparaginase, the time period between administration of the first dose and the second dose to the human subject is about 72 hours when the first dose is about 50 mg/m$^2$, the time period between administration of the first dose and the second dose to the human subject is about 48 hours when the first dose is about 25 mg/m$^2$, no further L-asparaginase is administered to the subject for about 72 hours when the second dose is about 50 mg/m$^2$, and no further L-asparaginase is administered to the subject for about 48 hours when the second dose is about 25 mg/m$^2$. In some embodiments, any dose that is about 25 mg/m$^2$ is administered intravascularly and any dose that is about 50 mg/m$^2$ is administered intramuscularly. In some embodiments, all doses are administered intramuscularly. In some embodiments, all doses are administered intravascularly.

In some embodiments, the first dose is about 50 mg/m$^2$, the second dose is about 25 mg/m$^2$, the set of time-ordered doses further comprises a third dose after the second dose, the third dose is about 25 mg/m$^2$, and the time period between administration of the second dose and the third dose to the human subject is about 48 hours. In some embodiments, the first dose is administered on a Friday and the second dose is administered on a Monday. In some further embodiments, the first dose is administered on a Friday, the second dose is administered on a Monday, and the third dose is administered on a Wednesday. In some embodiments, any dose that is about 25 mg/m$^2$ is administered intravascularly and any dose that is about 50 mg/m$^2$ is administered intramuscularly. In some embodiments, all doses are administered intramuscularly. In some embodiments, all doses are administered intravascularly.

In some embodiments, the first dose is about 25 mg/m$^2$, the second dose is about 50 mg/m$^2$, the set of time-ordered doses further comprises a third dose after the second dose, the third dose is about 25 mg/m$^2$, and the time period between administration of the second dose and the third dose to the human subject is about 72 hours. In some embodiments, the first dose is administered on a Wednesday and the second dose is administered on a Friday. In some embodiments, the first dose is administered on a Wednesday, the second dose is administered on a Friday, and the third dose is administered on a Monday. In some embodiments, any dose that is about 25 mg/m$^2$ is administered intravascularly and any dose that is about 50 mg/m$^2$ is administered intramuscularly. In some embodiments, all doses are administered intramuscularly. In some embodiments, all doses are administered intravascularly.

In some embodiments, the first dose is about 25 mg/m$^2$, the second dose is about 50 mg/m$^2$, the set of time-ordered doses further comprises a third dose before the first dose, the third dose is about 25 mg/m$^2$, and the third dose is administered to the human subject about 48 hours before the first dose. In some embodiments, the first dose is administered on a Wednesday and the second dose is administered on a Friday. In some embodiments, the first dose is administered on a Wednesday, the second dose is administered on a Friday, and the third dose is administered on a Monday. In some embodiments, any dose that is about 25 mg/m$^2$ is administered intravascularly and any dose that is about 50 mg/m$^2$ is administered intramuscularly. In some embodiments, all doses are administered intramuscularly. In some embodiments, all doses are administered intravascularly.

In some embodiments, the method comprises a first dose, a second dose and a third dose, wherein the first dose is administered on a Monday, the second dose is administered on a Wednesday, and the third dose is administered on a Friday. In some embodiments, the first dose is 25 mg/m$^2$, the second dose is 25 mg/m$^2$, and the third dose is 50 mg/m$^2$.

In some embodiments, the method further comprises intramuscularly or intravascularly administering to the human subject a plurality of instances of the set of time-ordered doses of the L-asparaginase, where each respective instance of the set of time-ordered doses of the recombinant L-asparaginase is administered to the subject upon completion of a prior instance of the set of time-ordered doses in the plurality of instances of the set of time-ordered doses. In some embodiments, the plurality of instances of the set of time-ordered doses of the L-asparaginase is between two and one hundred. In some embodiments, the plurality of instances of the set of time-ordered doses of the L-asparaginase is between two and eighty. In some embodiments, the plurality of instances of the set of time-ordered doses of the L-asparaginase is between two and sixty. In some embodiments, the plurality of instances of the set of time-ordered doses of the L-asparaginase is between two and fifty. In some embodiments, the plurality of instances of the set of time-ordered doses of the L-asparaginase is between two and forty. In some embodiments, the plurality of instances of the set of time-ordered doses of the L-asparaginase is between two and thirty. In some embodiments, the plurality of instances of the set of time-ordered doses of the L-asparaginase is between two and twenty. In some embodiments, the plurality of instances of the set of time-ordered doses of the L-asparaginase is between two and fifteen. In some embodiments, the plurality of instances of the set of time-ordered doses of the L-asparaginase is between two and fourteen. In some embodiments, the plurality of instances of the set of time-ordered doses of the L-asparaginase is between two and thirteen. In some embodiments, the plurality of instances of the set of time-ordered doses of the L-asparaginase is between two and twelve. In some embodiments, the plurality of instances of the set of time-ordered doses of the L-asparaginase is between two and eleven. In some embodiments, the plurality of instances of the set of time-ordered doses of the L-asparaginase is between two and ten. In some embodiments, the plurality of instances of the set of time-ordered doses of the L-asparaginase is between two and nine. In some embodiments, the plurality of instances of the set of time-ordered doses of the L-asparaginase is between two and eight. In some embodiments, the plurality of instances of the set of time-ordered doses of the L-asparaginase is between two and seven. In some embodiments, the plurality of instances of the set of time-ordered doses of the L-asparaginase is between two and six. In some embodiments, the plurality of instances of the set of time-ordered doses of the L-asparaginase is between two and five. In some embodiments, the plurality of instances of the set of time-ordered doses of the L-asparaginase is between two and four. In some embodiments, the plurality of instances of the set of time-ordered doses of the L-asparaginase is between four and six.

In some embodiments, the long-acting *E-coli*.-derived asparaginase is pegasparaginase.

In some embodiments, the recombinant L-asparaginase is a tetramer, and wherein each monomer of the tetramer comprises SEQ ID NO: 1. In some embodiments, the recombinant L-asparaginase is a tetramer, and wherein each monomer of the tetramer has a sequence identity of at least 70 percent, at least 75 percent, at least 80 percent, at least 85 percent, at least 90 percent, at least 95 percent, at least 96 percent, at least 97 percent, at least 98 percent, or at least 99 percent to SEQ ID NO: 1.

In some embodiments, the human subject exhibited hypersensitivity to the *E-coli*.-derived asparaginase. In some embodiments, the human subject is an adult patient. In some embodiments, the human subject is a pediatric patient. In some embodiments, the recombinant L-asparaginase is administered in a composition that demonstrates less than 6% aggregation of the L-asparaginase. In some embodiments, the recombinant L-asparaginase is administered in a composition that demonstrates less than 1% aggregation of the L-asparaginase. In some embodiments, the recombinant L-asparaginase is non-lyophilized. In some embodiments, the recombinant L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration with the recombinant L-asparaginase. In some embodiments, the recombinant L-asparaginase is co-administered with one or more other chemotherapeutic agents as part of a multi-agent chemotherapeutic regimen.

In some embodiments, a dose regimen for the recombinant L-asparaginase comprises a cycle, where the cycle is optionally repeatable, and where the cycle comprises administration of the recombinant L-asparaginase every other day over a period of five consecutive days followed by a rest period of about 48 hours, where the first dose of the cycle is 25 mg/m$^2$, the second dose of the cycle is 25 mg/m$^2$ and the third dose of the cycle is 50 mg/m$^2$, followed by the rest period of about 48 hours. In some embodiments, the first dose of the cycle is administered on a Monday, the second dose of the cycle is given on a Wednesday, and the third dose of the cycle is given on a Friday.

(e) Additional Preferred Dosing Regimens

In some embodiments, the present disclosure provides a method for depleting asparaginase in a human subject to treat cancer, the method comprising: on Mondays, Wednesdays, and Fridays, administering intravascularly about 25 mg/m$^2$ of L-asparaginase to the human subject, such that the human subject receives a total of seven doses of L-asparaginase over a two week period. In some embodiments, the cancer to be treated is ALL or LBL. In some embodiments, the cancer to be treated is CRC. In some embodiments, the cancer to be treated is Wnt-negative CRC. In some embodiments, the cancer to be treated is Wnt-mutant CRC. In some embodiments, the cancer to be treated is diffuse large B-cell lymphoma (DLBCL). In some embodiments, the cancer to be treated is AML. In some embodiments, the cancer to be treated is R/R AML. In some embodiments, the long-acting *E-coli*.-derived asparaginase is pegasparaginase. In some embodiments, the recombinant L-asparaginase is a tetramer, and each monomer of the tetramer comprises SEQ ID NO: 1. In some embodiments, the recombinant L-asparaginase is a tetramer, and each monomer of the tetramer has a sequence identity of at least 70 percent, at least 75 percent, at least 80 percent, at least 85 percent, at least 90 percent, at least 95 percent, at least 96 percent, at least 97 percent, at least 98 percent, or at least 99 percent to SEQ ID NO: 1. In some embodiments, the human subject exhibited hypersensitivity to the *E-coli*.-derived asparaginase. In some embodiments, the human subject is an adult patient. In some embodiments, the human subject is a pediatric patient. In some embodiments, the recombinant L-asparaginase is administered in a composition that demonstrates less than 6% aggregation of the L-asparaginase. In some embodiments, the recombinant L-asparaginase is administered in a composition that demonstrates less than 1% aggregation of the L-asparaginase. In some embodiments, the recombinant L-asparaginase is non-lyophilized. In some embodiments, the recombinant L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration with the recombinant L-asparaginase. In some embodiments, the recombinant L-asparaginase is co-administered with one or more other chemotherapeutic agents as part of a multi-agent chemotherapeutic regimen.

In some embodiments, the present disclosure provides a method for depleting asparaginase in a human subject to treat cancer, the method comprising: (a) on Mondays and Wednesdays, administering intravascularly about 25 mg/m$^2$ of L-asparaginase to the human subject, and (b) on Fridays, administering intramuscularly about 50 mg/m$^2$ of L-asparaginase to the human subject; such that the human subject receives a total of six doses of L-asparaginase over a two week period. In some embodiments, the cancer to be treated is ALL or LBL. In some embodiments, the cancer to be treated is CRC. In some embodiments, the cancer to be treated is Wnt-negative CRC. In some embodiments, the cancer to be treated is Wnt-mutant CRC. In some embodiments, the cancer to be treated is AML. In some embodiments, the cancer to be treated is R/R AML. In some embodiments, the cancer to be treated is diffuse large B-cell lymphoma (DLBCL). In some embodiments, the long-acting *E-coli.*-derived asparaginase is pegasparaginase. In some embodiments, the recombinant L-asparaginase is a tetramer, and wherein each monomer of the tetramer comprises SEQ ID NO: 1. In some embodiments, the recombinant L-asparaginase is a tetramer, and each monomer of the tetramer has a sequence identity of at least 70 percent, at least 75 percent, at least 80 percent, at least 85 percent, at least 90 percent, at least 95 percent, at least 96 percent, at least 97 percent, at least 98 percent, or at least 99 percent to SEQ ID NO: 1. In some embodiments, the human subject exhibited hypersensitivity to the *E-coli.*-derived asparaginase. In some embodiments, the human subject is an adult patient. In some embodiments, the human subject is a pediatric patient. In some embodiments, the recombinant L-asparaginase is administered in a composition that demonstrates less than 6% aggregation of the L-asparaginase. In some embodiments, the recombinant L-asparaginase is administered in a composition that demonstrates less than 1% aggregation of the L-asparaginase. In some embodiments, the recombinant L-asparaginase is non-lyophilized. In some embodiments, the recombinant L-asparaginase is recombinantly produced in *Pseudomonas fluorescens*. In some embodiments, a nadir serum asparaginase activity (NSAA) assay as measured from a serum sample from the human subject equals or exceeds 0.1 IU/mL after administration with the recombinant L-asparaginase. In some embodiments, the recombinant L-asparaginase is co-administered with one or more other chemotherapeutic agents as part of a multi-agent chemotherapeutic regimen.

EXAMPLES

Example 1: Study to Evaluate Toxicity and Toxicokinetics

The toxicity and toxicokinetics (TK) of recombinant L-asparaginase was investigated in a good laboratory practices (GLP) 2-week daily intravenous infusion study in rats. A 2-week recovery phase was also included to assess the reversibility or persistence of the effects, and/or the occurrence of delayed toxicities. Considering that recombinant L-asparaginase is a biotechnology-derived product, the development of anti-drug antibodies (ADAs) was prospectively evaluated in all main study animals to aid in the interpretation of the study outcomes.

Four groups of male and female Crl:CD(SD) rats (n=10/sex/group) were administered doses of 0, 4.6, 15.2, and 45.6 mg/kg recombinant L-asparaginase respectively. Recovery animals were included in the control and high dose groups (n=5/sex/group). Toxicokinetic animals (n=3/sex for control group, and n=9/sex/dose groups) were also included. Animals received recombinant L-asparaginase via 2-hour intravenous infusion (±10 minutes) by means of a catheter implanted in a femoral vein at a dose rate of 5 mL/kg/hour. The vehicle and control article was 20 mM sodium phosphate, 50 mM sodium chloride, and 6.4% Trehalose, with a pH of 7.0.

A sentinel group was also dosed with the highest dose prior to initiation of the main study and observed for 2 days, and sacrificed on Day 3, without necropsy.

Mortality, clinical observations, body weights, body weight change, food consumption, ophthalmic observations, and clinical and anatomic pathology were documented along with toxicokinetics (as assessed via serum asparaginase activity (SAA)) and anti-drug antibody analysis.

Toxicity and toxicokinetic animals in groups 1 (control) through 3 (15.2 mg/kg) were dosed for 14 days and survived to their scheduled necropsy. Dosing in group 4 (45.6 mg/kg) was halted on Day 6 due to adverse clinical observations at which time animals were either necropsied or put on a 2-week recovery according to their assigned group. Recovery animals in group 1 were administered the vehicle once daily for 14 days, followed by 6 days of recovery, and were thus sacrificed on the same calendar day as the recovery animals in group 4.

Exposure, as assessed by SAA Cmax and AUC0-24, increased with the increase in dose level from 4.6 to 45.6 mg/kg/day on Day 1 and from 4.6 to 15.2 mg/kg/day on Day 14. The increases in Cmax and AUC0-24 values were approximately dose proportional from 4.6 to 15.2 and 15.2 to 45.6 mg/kg/day on Day 1 and from 4.6 to 15.2 mg/kg/day on Day 14, while from 4.6 to 45.6 mg/kg/day on Day 1, AUC0-24 increased 18-fold with a 10-fold increase in dose. There are no significant sex differences in SAA Cmax and AUC0-24 values. No accumulation of SAA was observed after multiple doses in rats.

In animals from the high dose group euthanized prematurely, clinical observations included piloerection, rough haircoat, red skin of the feet, and clear oral discharge. Significant hematology changes indicative of decreased hematopoiesis were noted and included decreased reticulocyte, platelet, and leukocyte counts. These changes were found to be reversible in the recovery animals. Increased blood glucose and urea nitrogen concentrations, as well as decreased protein and liver enzymes were suggestive of dehydration, prerenal azotemia, protein loss or compartmental shift and hepatic downregulation of enzymatic activity, respectively. Macroscopic observations were limited to focal red discoloration of the mucosa in the glandular stomach of one female that lacked microscopic correlate. Microscopic findings included decreased cellularity in the marrow of the femur, myocardial necrosis and hemorrhage, submucosal edema/abscess and epithelial hyperplasia/erosion in the nonglandular stomach/duodenum, decreased red pulp, extramedullary hematopoiesis, and lymphocytes in the spleen, decreased cortical lymphocytes in the thymus and secretory depletion in the pancreas. These changes were considered adverse. Increases in spleen and thymus weights in males and females were noted at the recovery sacrifice but considered consistent with recovery. Microscopic evaluation was not conducted on recovery animals.

Dose-related decrease in food consumption and body weights were noted in animals administered ≤15.2 mg/kg/day and piloerection was noted at 15.2 mg/kg/day. Dose-related hematology and clinical chemistry changes generally consistent with those observed in the high-dose group, but of lesser magnitude were observed in most animals. These clinical pathology changes were considered not adverse. Microscopic findings in low- and mid-dose groups animals consisted of minimal to slight decreased erythroid precursors and increased myeloid precursors were consistent with the hematology findings. The decreased spleen weights correlated with decreased extramedullary hematopoiesis and red pulp whereas the decreased thymus weights lacked a microscopic correlate.

In conclusion, male and female Crl:CD(SD) rats received vehicle control article or 4.6, 15.2, or 45.6 mg/kg/day recombinant L-asparaginase via intravenous infusion once daily for 14 days. Adverse clinical observations that required sacrifice in moribund condition and cessation of dosing on Day 6 of the dosing phase, and decreased cellularity of the marrow in the femur, myocardial necrosis and hemorrhage in the heart, submucosal edema or abscess and epithelial hyperplasia in the nonglandular stomach, and erosion/ulcer of the stomach or duodenum occurred in animals administered 45.6 mg/kg/day. Nonadverse clinical observations, clinical pathology changes, and microscopic findings occurred in animals administered ≤15.2 mg/kg/day. Thus, the no observed adverse effect level (NOAEL) is 15.2 mg/kg/day.

The highlights of this study include: Male and female Crl:CD(SD) rats (n=10/sex/gr) with recovery groups (n=5/sex/gr) in controls and high dose. Recombinant L-asparaginase (0, 4.6, 15.2, or 45.6 mg/kg/day) was administered via daily 2 h intravenous infusion for up to 14 days. Adverse clinical observations required sacrifice and cessation of dosing on Day 6 in high dose group. Adverse decreased cellularity of the marrow in the femur, necrosis and hemorrhage in the heart, and erosion, edema, hyperplasia, abscess and/or ulcer in the nonglandular stomach/duodenum occurred in high dose group. Nonadverse but qualitatively similar clinical observations, clinical pathology changes, and microscopic findings occurred in animals administered ≤15.2 mg/kg/day. No observed adverse effect level (NOAEL) was determined to be 15.2 mg/kg/day.

Example 2: Study to Evaluate Safety

Subjects were aged 18 to 55 years and in good general health as determined by the investigator. In Dose Cohort 1, the subjects were randomized (1:1) to receive a single recombinant L-asparaginase dose (25 mg/m$^2$) by either a 2-hour intravenous (IV) infusion (N=6) or an intramuscular (IM) injection (N=6). After the safety, tolerability, and pharmacokinetics of the recombinant L-asparaginase was evaluated to determine the need for another dosing cohort, Dose Cohort 2 randomized subjects (1:1) to receive a single recombinant L-asparaginase dose either 37.5 mg/m$^2$ IV (N=6) or 12.5 mg/m$^2$ IM (N=6). Recombinant L-asparaginase was administered in the inpatient clinical unit; the subjects were discharged on Day 5 with safety follow-up calls on Days 6 and 30. The primary objective was to assess safety and tolerability of recombinant L-asparaginase by IV and IM dosing for each cohort. Secondary objectives included characterization of recombinant L-asparaginase pharmacokinetics by IV and IM administrations based on serum asparaginase activity (SAA).

Among the 24 subjects enrolled, demographic characteristics (mean±SD) included: age (38.4±8.30 years), weight (77.04±10.00 kg), and body surface area (1.91±0.15 m$^2$). Additionally, 63% of the subjects were male, 97% were of Hispanic/Latino ethnicity, 83% were white, and 17% were black/African American. Both safety and pharmacokinetics were evaluated in this study. For safety, 8/12 (67%) subjects had ≥1 adverse event (IV=4 subjects; IM=4 subjects) in Dose Cohort 1. In Dose Cohort 2, 11/12 (92%) subjects had ≥1 adverse event (IV=6 subjects; IM=5 subjects). No serious adverse events or grade ≥3 adverse events were reported for any subject in either dosing cohort. The most common treatment-emergent adverse event occurring in ≥2 subjects in each dosing cohort was nausea (FIG. 1, see Table 1). Dyspepsia was the most common adverse event in subject who received recombinant L-asparaginase 12.5 mg/m$^2$ IM (FIG. 1, see Table 1). Pharmacokinetics assessment showed that when administered IM, recombinant L-asparaginase serum asparaginase activity levels achieved ≥0.1 IU/mL in 6/6 (100%) subjects at 48 and 72 hours post-dose in the 12.5 and 25 mg/m$^2$ dose cohorts. Following IV administration, serum asparaginase activity levels achieved ≥0.1 IU/mL in 6/6 (100%) subjects at 48 hours and 4/6 (67%) subjects at 72 hours post-dose at the 25 mg/m$^2$ dose level, while 6/6 (100%) subjects achieved ≥0.1 IU/mL at 48 and 72 hours post-dose at the 37.5 mg/m$^2$ dose level (FIG. 1, see Table 2).

Recombinant L-asparaginase administration in healthy adults was well tolerated and there were no unanticipated adverse events, no reported serum asparaginase activities, and no grade ≥3 adverse events. Serum asparaginase activity levels ≥0.1 IU/mL, a surrogate marker for asparagine depletion, were achieved in all human subjects receiving IM and IV recombinant L-asparaginase at 48 hours. SAA levels ≥0.1 IU/mL were also achieved by all subjects at 72 hours after recombinant L-asparaginase dosing, except for 2 subjects in the 25 mg/m$^2$ IV group. Based on the totality of pharmacokinetics and safety data from this study, the recommended phase 2/3 starting dose is 25 mg/m$^2$ for the IM route of administration and 37.5 mg/m$^2$ for the IV route of administration on a Monday/Wednesday/Friday dosing schedule.

Example 3: Population Pharmacokinetic (PK) Model Development and Simulation

A population PK model was developed for recombinant L-asparaginase using intensive serum asparaginase activity (SAA) data from a phase 1 single-dose study in healthy adult subjects (sbj), and effects of intrinsic covariates (body weight, body surface area, age, sex, and race) on PK parameters were evaluated. This population PK model was developed to inform the starting dose selected for the pivotal phase 2/3 recombinant L-asparaginase study. A total of 24 subjects were included in the model, including intravenous (IV) data at 25 mg/m$^2$ [N=6] and 37.5 mg/m$^2$ [N=6], and intramuscular (IM) data at 12.5 mg/m$^2$ [N=6] and 25 mg/m$^2$ [N=6]. The developed model was used to simulate adult and pediatric SAA profiles (1000 sbj/population) to explore the likelihood of achieving a therapeutic target trough SAA level ≥0.1 IU/mL based on different doses, schedules, and routes of administration.

The final model, which describes both IV and IM routes, is a 1-compartment model with linear elimination (IV) and mixed order absorption (IM only), with weight included as an allometric covariate on SAA clearance. Body size metrics, i.e. body weight and BSA (body surface area), were confirmed as statistically significant covariates and accounted for 2.8% and 3.4% variability in recombinant L-asparaginase PK. Based on phase 1 data and population PK modeling and simulations, the recommended starting dose for a phase 2/3 study is 25 mg/m$^2$ for IM and 37.5 mg/m$^2$ for IV routes of administration on a Monday/Wednesday/Friday dosing schedule. The recommended doses and schedule are anticipated to maintain trough SAA levels ≥0.1 IU/mL at 72 hours postdose.

Example 4: Study to Evaluate Safety and Efficacy

This test is an open-label, multicenter, dose confirmation and pharmacokinetic Phase 2/3 study of recombinant L-asparaginase in patients with Acute Lymphoblastic Leukemia (ALL) or Lymphoblastic Lymphoma (LBL) who are hypersensitive to an *E. coli*-derived asparaginase (allergic reaction or silent inactivation) and have more than one dose of *E. coli*-derived asparaginase remaining in their treatment plan (Table 3). The study is designed to assess the tolerability and efficacy of recombinant L-asparaginase in patients who develop hypersensitivity to an *E. coli*-derived asparaginase, as measured by asparaginase activity. For these patients, 6 doses of recombinant L-asparaginase are substituted for each dose of long-acting *E. coli*-derived asparaginase. Individual patient treatment duration varies depending on the number of *E. coli*-derived asparaginase doses that remain in the patient's original treatment plan.

The study consists of 2 sequential parts: Part A determined the dose of recombinant L-asparaginase for intramuscular (IM) administration and confirmed safety and efficacy; Part B defined the optimal dose and schedule of intravenous (IV) recombinant L-asparaginase.

Part A of the study has 2 IM cohorts. Cohort 1 is a repeat dose/confirmatory cohort, where a final IM dose level will be selected. Cohort 2 is an expansion cohort to confirm the efficacy and safety of the final IM dose level and schedule.

Part B will be conducted to define the optimal dose of the IV administration of recombinant L-asparaginase for further study in ALL/LBL patients as a repeated dose.

Additional courses of recombinant L-asparaginase will be administered based on each patient's original treatment plan for as long as the patient derives clinical benefit.

Blood samples will be collected at prespecified time points to determine serum asparaginase activity levels, and patients were monitored for adverse events. Immunogenicity of recombinant L-asparaginase treatment was also assessed.

The primary objectives are to (1) determine the response rate during the first course of IM recombinant L-asparaginase administration. The response rate is defined as the proportion of patients with the last 72-hour nadir serum asparaginase activity level being ≥0.1 IU/mL during the first course of treatment, and (2) assess the occurrence of treatment-emergent adverse events (TEAE).

Secondary objectives are to determine (1) the proportion of patients with the last 48-hour nadir serum asparaginase activity level ≥0.1 IU/mL during the first course of IM administration of recombinant L-asparaginase, in a time frame of two weeks (2) the proportion of patients with the last 48-hour nadir serum asparaginase activity level ≥0.4 IU/mL during the first course of IM administration of recombinant L-asparaginase in a time frame of two weeks, (3) the proportion of patients with the last 72-hour nadir serum asparaginase level ≥0.4 IU/mL during the first course of IM administration of recombinant L-asparaginase in a time frame of two weeks, (4) characterization of the pharmacokinetics of IM recombinant L-asparaginase based on serum asparaginase activity using a population pharmacokinetics approach and exposure related correlations in a time frame of up to 30 days after the last dose, (5) incidence of anti-drug antibody formation against recombinant L-asparaginase in a time frame up to 30 days after the last dose.

The eligibility criteria allows for both males and females. Inclusion criteria include: (1) pediatric and adult patients with a diagnosis of ALL or LBL, (2) patients that have had an allergic reaction to a long-acting *E. coli*-derived asparaginase OR have silent inactivation, (3) patients have 1 or more courses of *E. coli*-derived asparaginase remaining in his/her treatment plan, (4) patients must have, in the opinion of the investigator, fully recovered from their prior allergic reaction to *E. coli*-derived asparaginase. Exclusion criteria include: (1) patients having previously received *Erwinia chrysanthemi*-derived L-asparaginase or recombinant L-asparaginase, (2) patients having relapsed ALL or LBL, (3) patients who are currently receiving another investigational agent and/or treated with an investigation device at the same time as recombinant L-asparaginase (within 48 hours) during course 1 of recombinant L-asparaginase, (4) patients having a history of ≥Grade 3 pancreatitis, (5) patients having prior history of asparaginase-associated ≥Grade 3 hemorrhagic event or asparaginase-associated thrombus requiring anticoagulation therapy, excluding catheter-related thrombotic events.

Further testing will be with additional subcohorts at higher doses above 37.5 mg/m$^2$ with each additional dose level(s) not to exceed a 50% increase from the previous dose level.

This study allows enrollment for an assessment of IV formulation as well as IM formulation; study center participation will be at the discretion of the sponsor.

Undetectable SAA levels may be based on the lower limit of quantification, as defined by a certified laboratory authorized under CLIA to perform this testing. CLIA-certified laboratories utilize different limits of quantification depending on their assay methodologies, and results to determine undetectable SAA levels may vary between laboratories.

Serum asparaginase concentration is the same as PK Content for this study. Alignment between the SAP (which uses serum asparaginase concentration) and the label on the laboratory tubes (which uses PK Content).

The testing window is in certain preferred embodiments is 7 days for all laboratory tests, including coagulation tests and laboratory tests at screening.

Example 5: Study to Evaluate Protein Aggregation

A qualification study was conducted on a small scale recombinant L-asparaginase batch produced at lab scale. The study consisted of analytical comparability with commercial product Erwinase® to ensure that the quality, safety, and potency of the recombinant L-asparaginase was comparable to native L-asparaginase from the natural fermentation of Dickeya *chrysanthemi* (currently in clinical use) and is not adversely affected by the use of an alternative expression system and purification process.

SEC-HPLC Method: The determination of purity by size exclusion chromatography was performed using SEC-HPLC using a Phenomenex BioSep SEC-s4000 column. The column was conditioned with mobile phase (50 mM phosphate, 200 mM NaCl, pH 7.0) at 1 mL/min for 1 hour before injections. BioRad Gel Filtration Standards were diluted to 1 mg/mL in mobile phase and injected in triplicate after multiple injections of mobile phase blanks to clear the column. The purities of recombinant L-asparaginase, *E. coli*-derived recombinant crisantaspase, and Erwinase® were evaluated (FIG. 2).

The SEC-HPLC results exhibit a main peak which represents the tetramer as well as an aggregate peak. There are varying levels of HMW aggregation in all samples with higher amounts in Erwinaze CAMR176 (6%) when compared to recombinant L-asparaginase (0.3%).

Size Exclusion Chromatography-Multi-Angle Light Scattering (SEC MALLS) Method: Using C.52.S1640 and the Solvias standard operating procedure, test solutions were prepared in duplicate for all samples. The samples were diluted with formulation buffer to 10 mg/mL and mixed. At least 4 mL were prepared. The sample solution was filtered through a 0.2 μM syringe filter directly into an HPLC vial. The first few drops were discarded. If the protein concentration was below 10 mg/mL, the injection volume needed to be adjusted to be able to inject 750 μg. The following samples and references were analyzed with this technique: all non-stressed batches, all batches stressed due to overnight freeze at <−75° C. and 3 hours thawed room temperature for five and ten times, respectively. Results are shown in FIG. 3.

The SEC MALLS results confirm the SEC-HPLC results with levels of HMW aggregation in Erwinaze® CAMR176 (6%) higher when compared to recombinant L-asparaginase (1%).

Sedimentation Velocity AUC (svAUC) Method: Recombinant L-asparaginase and Erwinaze® samples were diluted to 10 mg/mL in 20 mM sodium phosphate, pH 7.0 and dialyzed against the same buffer. Samples were then placed into an AN-60Ti analytical rotor and loaded into a Beckman-Coulter ProteomeLab XL-analytical ultracentrifuge. The data were analyzed using the c(s) method developed by Peter Schuck at the N.I.H. and implemented in his analysis program SEDFIT (version 11.3). The resultant size distributions were graphed and the peaks were integrated using OriginLab Origin® version 9.0. In FIG. 4, the results demonstrate that recombinant L-asparaginase exhibits the highest homogeneity (due to the lowest aggregate content 1%) and the Erwinase® material is the least homogenous (aggregate 5%). In conclusion, measured by multiple orthogonal methods, recombinant L-asparaginase has a lower aggregate level than Erwinase®.

Example 6: Study to Evaluate Commercial Scale Protein Aggregation

This qualification study was conducted on a full scale recombinant L-asparaginase batch produced at 1000 L (intended commercial scale). The study consisted of analytical comparability with commercial product Erwinase® to ensure the small scale (SS) recombinant L-asparaginase comparability study in Example 5 was verified at full scale (1000 L). The study also used the SEC-MALLS method to characterize recombinant L-asparaginase.

One mL aliquots of recombinant L-asparaginase were pipetted into 5 mL PETG Bottles and stored at −20° C. The formulation was 20 mM sodium phosphate, 50 mM sodium chloride, 6.4% trehalose and the pH was 7.0.

SE-UHPLC Method: Size Exclusion Ultra High Pressure Liquid Chromatography (SE-UPLC) with UV detection is used to determine the purity of the recombinant L-asparaginase DS samples based on the size of the molecule, i.e. the hydrodynamic radius. Samples and reference material are diluted in Mobile Phase (10 mM phosphate, 0.3M arginine, 0.05% Sodium Azide) to 2.5 mg/mL and injected on to a Waters Acquity UPLC (BEH 200 SEC, 1.7 μm, 4.6×30 mm) column. Recombinant L-asparaginase DS is eluted isocratically at 0.4 mL/min. The purity profile is characterized by UV detection at 280 nm. For purity the % tetramer (main peak), % HMW and the % LMW are integrated and reported. The SE-UPLC profile of recombinant L-asparaginase DS consists of a main peak identified as the tetrameric form of the enzyme as well as a HMW peak which is identified as the Octomer in the SEC-MALLS analysis below. There are also very low levels of a low molecular weight (LMW) back shoulder. Percent areas are displayed in FIG. 5.

In line with the small scale data in Example 5 the SEC-UPLC showed that recombinant L-asparaginase FS batch (0.2%) has significantly lower aggregate values than Erwinase CAMR-174 (6%).

SEC-MALLS Method: High molecular weight species present in two samples (A and B) of the recombinant L-asparaginase were measured using SEC-MALLS Size Exclusion Chromatography coupled with a Multi Angle Light Scattering detector (SEC-MALLS). Samples were diluted with formulation buffer and injected on to a Superdex™ 200 Increase column with a Minidawn Treos MALLS Detector. FIG. 6 describes the percent UV peak areas. The results show that recombinant L-asparaginase is mainly present in tetrameric form with low levels of octamer and higher order aggregates. Minor levels of a LMW species were also noted.

Recombinant L-asparaginase and Erwinaze® samples were diluted to 10 mg/mL in 20 mM sodium phosphate, pH 7.0 and dialyzed against the same buffer. Samples were then placed into an AN-60Ti analytical rotor and loaded into a Beckman-Coulter ProteomeLab XL-analytical ultracentrifuge. The data were analyzed using the c(s) method developed by Peter Schuck at the N.I.H. and implemented in his analysis program SEDFIT (version 11.3). The resultant size distributions were graphed and the peaks were integrated using OriginLab Origin® version 9.0.

Figure 7:
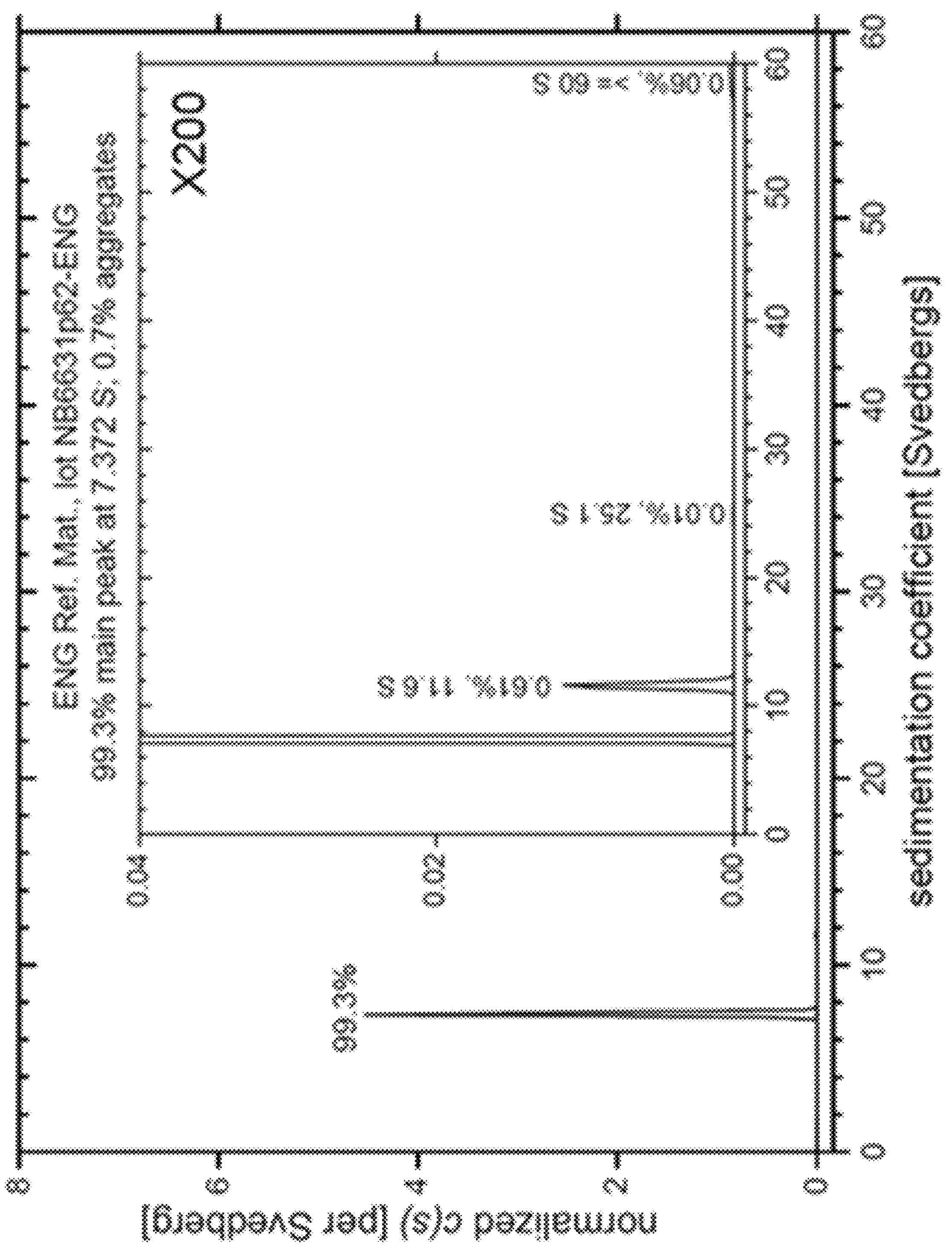
FIG. 7 shows the normalized sedimentation coefficient distribution of recombinant L-asparaginase (commercial scale) as outlined in Example 6.
Figure 8:
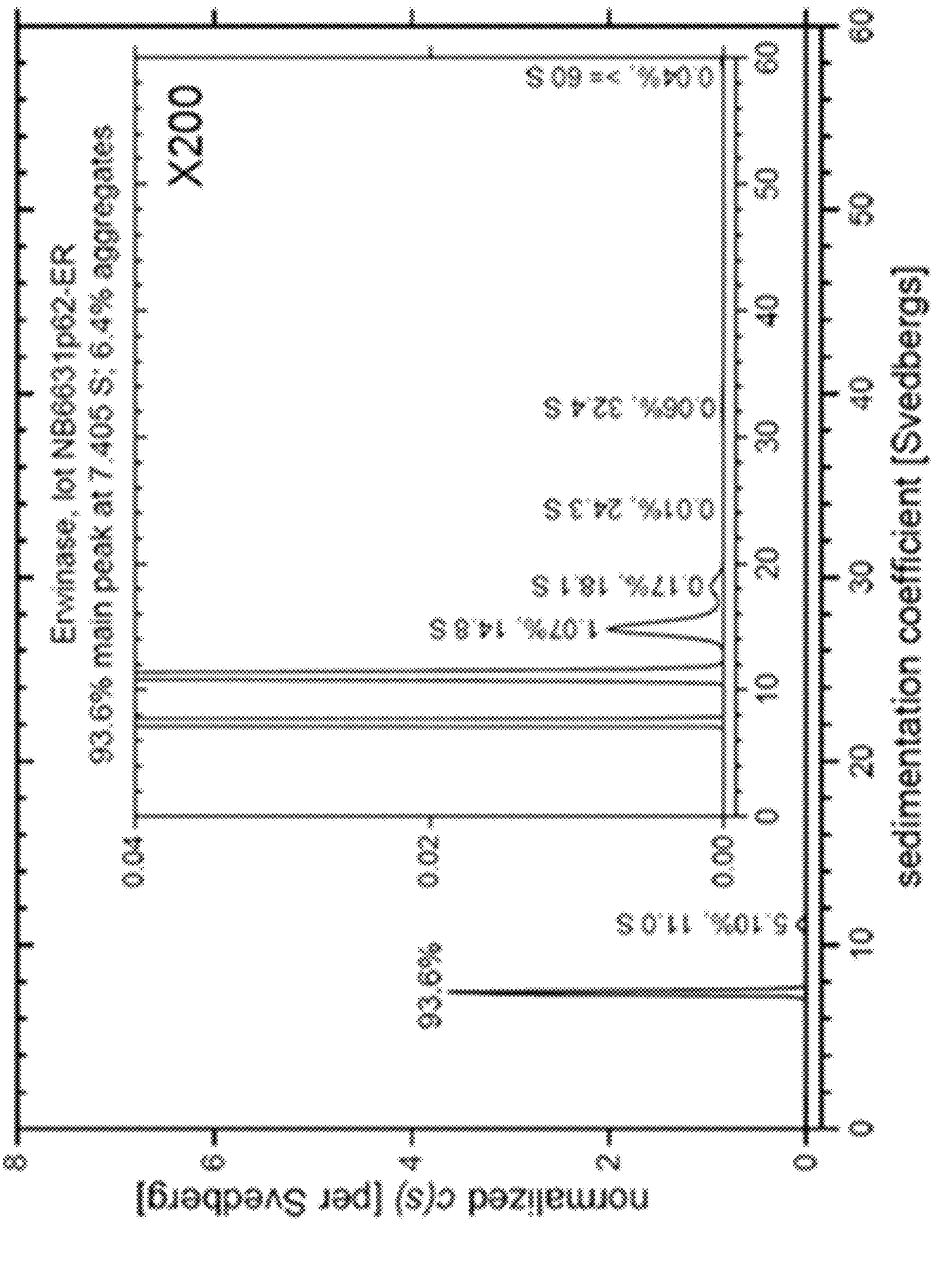
FIG. 8 shows the normalized sedimentation coefficient distribution of Erwinase® (commercial scale) as outlined in Example 6.

As seen in FIG. 7 and FIG. 8, recombinant L-asparaginase is highly homogenous with 99.2% in the tetrameric form of the enzyme with low levels of octamer (0.61%) and higher order aggregates (0.07%). This confirms the low aggregate levels observed in the SE-UHPLC and SEC-MALLS methods. The Erwinase® batch was observed to be more heterogeneous with 93.6% identified as tetramer with higher levels (6.4%) of HMW species present.

Example 7: A Randomized Phase 1 Study of the Safety, Tolerability, and Pharmacokinetics of Recombinant *Erwinia* Asparaginase (JZP-458) in Healthy Adult Volunteers JZP-458 is a recombinant *Erwinia* asparaginase produced using a novel *Pseudomonas fluorescens* expression platform that yields an enzyme with no immunologic cross-reactivity to *E. coli*.-derived asparaginases. To evaluate the safety, tolerability, and pharmacokinetics of a single dose of JZP-458, a randomized, single-center, open-label, phase 1 study was conducted with JZP-458 given via intramuscular (IM) injection or intravenous (IV) infusion to healthy adult volunteers. In determining asparaginase efficacy, serum asparaginase activity (SAA) levels served as a surrogate marker for asparagine depletion, and nadir SAA (NSAA) levels ≥0.1 IU/mL were the accepted threshold for demonstrating adequate asparagine depletion in clinical practice.

Methods. A phase 1, randomized, single-center, open-label study was conducted in the United States between Nov. 19, 2018 and May 20, 2019. The study was approved by the IntegReview Institutional Review Board in Austin, Texas, and conducted at QPS Miami Research Associates (Miami Clinical Research) in Miami, Florida, in accordance with the Declaration of Helsinki and Good Clinical Practice guidelines. All healthy volunteers provided written informed consent prior to enrollment. Eligible volunteers were men and nonpregnant, nonlactating women between the ages of 18 and 55 years with a normal body mass index (i.e., 19.0-30.0 kg/$m^2$) who were in good general health as determined by the investigator at screening and Day −1 and were able to understand and comply with study-specific requirements. Main exclusions from the study included the history or presence of any illness, physical finding, laboratory examination or electrocardiogram finding that, in the opinion of the sponsor and/or the investigator, might confound the results or conduct of the study or pose a risk to the healthy volunteer. This included any condition that might interfere with the distribution, metabolism, or excretion of drugs.

Study design. This study screened healthy adult volunteers for eligibility between 2 and 28 days prior to dosing (FIG. 20). Eligible healthy volunteers checked in at the study center on Day −1 for baseline assessments, then were admitted to the inpatient clinic and received a single dose of the study drug on Day 1. All volunteers remained in the inpatient clinic for pharmacokinetic (PK) and safety assessments until they were discharged on Day 5. Safety follow-up phone calls regarding adverse events (AEs) occurred on Days 6 and 30.

This was an open-label study with a total enrollment of 30 healthy adult volunteers. The study used an adaptive design for JZP-458, where the starting dose for Cohort 1 was 25 mg/$m^2$, and the dose selection for Cohort 2 was based on safety, tolerability, and PK data from Cohort 1. A sentinel dosing approach was followed for JZP-458 for the first 2 volunteers dosed in the study, who were randomized to the JZP-458 Dose Cohort 1 only. These 2 volunteers were randomized to either IM or IV JZP-458, 1 to each route of administration. One week separated the sentinel dosing volunteers from the dosing of the remaining volunteers in the initial cohorts (JZP-458 Dose Cohort 1 and Erwinaze Dose Cohort), which was permitted by the protocol, as the safety and tolerability for the first 2 volunteers was deemed acceptable by the investigator and sponsor (no study-drug related AE≥Grade 3).

The next 16 volunteers were randomized to JZP-458 and Erwinaze Dose Cohorts with 10 volunteers randomized to the JZP-458 Dose Cohort 1 and 6 volunteers to the Erwinaze Dose Cohort. Within the JZP-458 Dose Cohort 1 and Erwinaze Dose Cohort, the volunteers were randomized to IM or IV treatment groups in a 1:1 ratio. This randomization schema is equivalent to randomizing all 18 volunteers to IM JZP-458, IV JZP-458, IM Erwinaze, or IV Erwinaze in a 2:2:1:1 ratio, while ensuring that the first 2 randomized volunteers received IM JZP-458 and IV JZP-458 following the sentinel dosing approach.

The safety, tolerability, and PK data for all volunteers in the JZP-458 Dose Cohort 1 was evaluated by the investigator and sponsor to determine the need to enroll volunteers in another cohort, JZP-458 Dose Cohort 2. However, during SAP development, it was determined that the JZP-458 Dose Cohort 2 would be performed and the previously collected safety, tolerability, and PK data were evaluated to determine the dose levels to be used in this cohort. For JZP-458 Dose Cohort 2, 12 additional volunteers were randomized to IM or IV treatment groups in a 1:1 ratio.

Objectives. The primary objective was to assess the safety and tolerability of a single dose of JZP-458 (IM or IV) in healthy adult volunteers, assessed by the occurrence of treatment-emergent adverse events (TEAEs) and clinically significant changes in vital signs and laboratory tests. The secondary objective was to characterize the PK of a single dose of JZP-458 (IM or IV) in healthy adult volunteers, based on SAA data. Additional assessments included serum asparaginase concentration (SAC) determinations for JZP-458, and the measurement of L-asparagine and L glutamine levels to assess the pharmacodynamic (PD) effect of JZP-458 in healthy adults.

Pharmacokinetic/Pharmacodynamic sample collection and bioanalytical method. Serial blood samples for PK/PD evaluation were collected from all healthy volunteers at prespecified timepoints up to 96 hours post dose. For IM dosing, samples were taken predose and at 0.5, 1, 1.5, 2, 3, 4, 6, 8, 10, 12, 24, 36, 48, 72, and 96 hours after dosing. For IV dosing, samples were taken predose and at 2, 2.5, 3, 3.5, 4, 5, 6, 8, 10, 12, 24, 36, 48, 72, and 96 hours after the start of the infusion. Blood samples for PK analysis were collected into labeled 4 mL EDTA tubes and kept on ice until the samples were centrifuged to serum. Blood samples for PD analysis were collected into 4 mL EDTA tubes and kept on ice until the samples were centrifuged to plasma.

The bioanalytical analysis for PK samples was performed by Charles River Laboratories (Skokie, IL). PK samples were assayed for SAA levels using a validated enzyme activity method in human serum over the range of 0.025 IU/mL to 0.15 IU/mL. In addition, PK samples were also assayed for SAC using a validated ECLIA enzyme content assay in human serum over the range of 1.0 ng/mL to 128 ng/mL. PD samples were assayed for L-asparagine and L-glutamine concentrations by Syneos Health (Princeton, NJ), using a validated liquid chromatography tandem mass spectrometry (LC/MS/MS) method over the range of 0.025 μg/mL to 10.0 μg/mL for L asparagine and 0.250 μg/mL to 100 μg/mL for L-glutamine.

Pharmacokinetic and statistical analyses. PK of JZP-458 was primarily evaluated based on SAA data. The following PK parameters were evaluated using noncompartmental analysis in Phoenix WinNonlin Version 6.3: $C_{max}$=maximum SAA; $C_{48h}$=SAA value at 48 hours; $C_{72h}$=SAA value at 72 hours; $t_{max}$=time to reach $C_{max}$; $AUC_{0-t}$=area under the SAA-time curve from time zero to time of last quantifiable SAA; $AUC_{0-inf}$=area under the SAA-time curve from time zero to infinity; CL=clearance; $V_{SS}$=estimate of the volume of distribution at steady state following IV dosing; $V_z$/F=apparent volume of distribution following IM dosing, and $t_{1/2}$=terminal elimination half-life.

Descriptive statistics (n, mean, standard deviation, median, minimum and maximum) were used to summarize continuous data, while counts and percentages were used to summarize categorical data. Post hoc analyses were performed to assess the relationship between SAA and serum asparaginase concentration (SAC). Correlation and linear regression analyses were performed by study drug and across routes of administration, as well as by route of administration. In the linear regression modeling, SAC was the dependent variable and SAA was the independent variable. Lastly, no formal hypothesis testing was performed.

Results. At the highest doses tested for each route of administration (ie, 25 mg/$m^2$ for IM and 37.5 mg/$m^2$ for IV), JZP-458 achieved serum asparaginase activity (SAA) levels ≥0.1 IU/mL at 72 hours postdose for 100% of healthy volunteers. All JZP-458 dose levels were well tolerated. There were no unanticipated adverse events (AEs), no serious AEs, and no grade 3 or higher AEs. Based on pharmacokinetic and safety data from this study, the recommended JZP-458 starting dose for the pivotal phase 2/3 study is 25 mg/$m^2$ for IM administration and 37.5 mg/$m^2$ for IV administration on a Monday/Wednesday/Friday dosing schedule.

Baseline demographics. In total, 30 healthy adult volunteers were enrolled and randomized in the study. Of the 30 volunteers enrolled, all 30 completed the study, including the final scheduled safety follow-up phone call on Day 30. The overall baseline demographics (mean±SD) included the a mean±SD age of 38.4±8.30 years, weight of 77.04±9.998 kg, and BSA of 1.91±0.150 $m^2$ (FIG. 16). In addition, 63% were male, 97% were Hispanic or Latino ethnicity, 83% were White, and 17% were Black/African American.

Pharmacokinetics analysis. The PK analysis set consisted of all 30 healthy volunteers (100%) enrolled in the study.

Serum asparaginase activity data. In this study, the starting dose for JZP-458 Dose Cohort 1 was 25 mg/$m^2$. Individual SAA-time profiles were generated for all treatment groups (FIG. 12). Predose SAA values were below the limit of quantitation for all volunteers and all treatments. The number and proportion of volunteers with SAA levels ≥0.1 IU/mL and ≥0.4 IU/mL at 48 and 72 hours postdose are presented in FIG. 9.

The dose level of Cohort 2 was determined based on the safety, tolerability, and PK SAA data from Cohort 1. There were no unanticipated AEs, no reported serious AEs, and no grade 3 or higher AEs observed in Cohort 1. The PK SAA data for JZP-458 in Cohort 1 at 25 mg/$m^2$ is shown in FIG. 12. For the IM dose of 25 mg/$m^2$, SAA values at 72 hours postdose were ≥0.1 IU/mL in 6/6 (100%) healthy volunteers. In Cohort 2, the IM dose level was decreased by 50% to 12.5 mg/$m^2$ to study the dose proportionality and safety profile at this dose. Alternatively, for an IV dose of 25 mg/$m^2$, SAA values at 72 hours postdose were ≥0.1 IU/mL in only 4/6 (67%) healthy volunteers. This suggested that the IV dose of 25 mg/$m^2$ was inadequate for maintaining SAA levels ≥0.1 IU/mL for 72 hours. Therefore, in Cohort 2, the IV dose level was increased by 50% to 37.5 mg/$m^2$.

Following IM administration of JZP-458, SAA levels achieved ≥0.1 IU/mL in 6/6 (100%) healthy volunteers at 48 and 72 hours postdose for both the 12.5 mg/$m^2$ and 25 mg/$m^2$ dose levels. After IV administration of JZP-458, SAA levels achieved ≥0.1 IU/mL in 6/6 (100%) healthy volunteers at 48 hours and in 4/6 (67%) healthy volunteers at 72 hours postdose at the dose level of 25 mg/$m^2$, while SAA levels achieved ≥0.1 IU/mL in 6/6 (100%) healthy volunteers at both 48 and 72 hours postdose at the dose level of 37.5 mg/$m^2$. At the same dose level, IM route of administration was able to maintain higher levels of SAA when compared with IV. SAA data for healthy volunteers who received ERW are also presented in FIG. 12 and FIG. 9.

Figure 13:
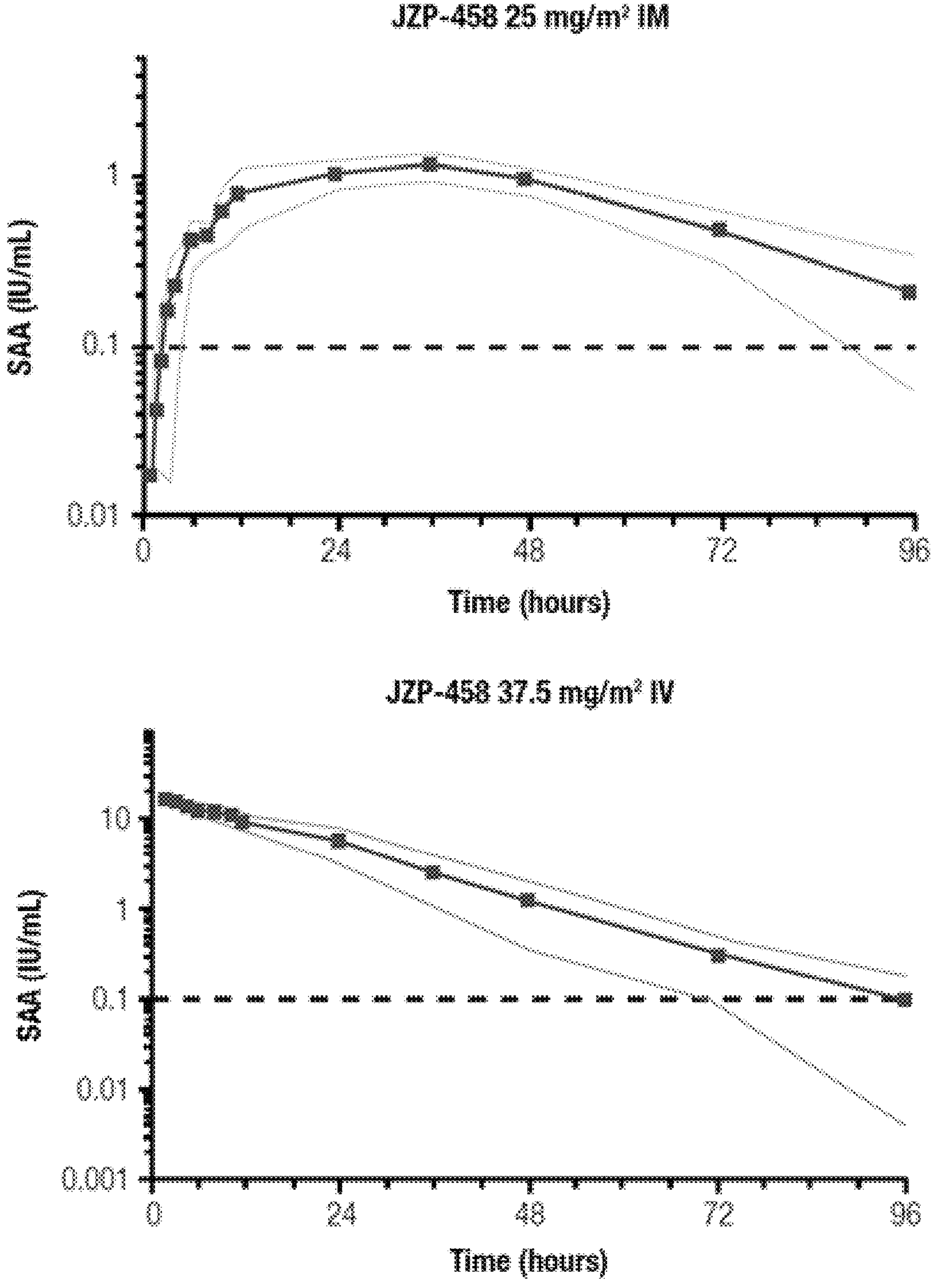
FIG. 13 shows mean (95% CI) SAA-time profiles as described further in Example 7. Abbreviations: CI, confidence interval; IM, intramuscular; IV, intravenous; SAA, serum asparaginase activity.

Mean and 95% confidence interval (CI) curves for SAA were also generated for JZP-458 for IM administration at 25 mg/$m^2$ and IV administration at 37.5 mg/$m^2$ based on observed data (N=6 each; FIG. 13). Data indicated that the lower bound of 95% CI achieved ≥0.1 IU/mL at 72 hours postdose for both IM administration at 25 mg/$m^2$ and IV administration at 37.5 mg/$m^2$ for JZP-458 (lower bound of 95% CI for IM and IV were 0.31107 IU/mL and 0.09476 IU/mL, respectively). These data facilitated dose recommendations for the pivotal phase 2/3 study.

PK parameters based on SAA were summarized for all treatment groups (FIG. 10). When administered IM, JZP-458 was slowly absorbed based on SAA, with median tmax of 24 hours and 36 hours following administration of 12.5 mg/$m^2$ and 25 mg/$m^2$ doses, respectively. Mean $t_{1/2}$ values of 23.4 hours and 19.1 hours were estimated following administration of 12.5 mg/$m^2$ and 25 mg/$m^2$, respectively. When administered IV, JZP-458 SAA levels declined with mean $t_{1/2}$ of 11.5 hours and 12.6 hours following administration of 25 mg/$m^2$ and 37.5 mg/$m^2$ doses, respectively. In general, the $t_{1/2}$ of JZP-458 after IM administration was longer than IV infusion. Furthermore, the volume of distribution was approximately the same as the plasma volume.

Dose proportionality assessment based on SAA showed that JZP-458 exposures increased with increasing doses based on SAA (FIG. 17). For both IM and IV administration, the increases in JZP-458 SAA exposures ($C_{max}$ and AUC) were approximately dose-proportional for the dose ranges studied. The bioavailability for JZP-458 for the IM route of administration was also calculated; it was estimated at 34.5% to 36.8% for JZP 458 based on SAA data.

Serum asparaginase concentration data: Historically, asparaginase PK has been determined based on SAA data. However, an enzyme content assay was developed to measure JZP-458 asparaginase concentrations in human serum.

Figure 14A:
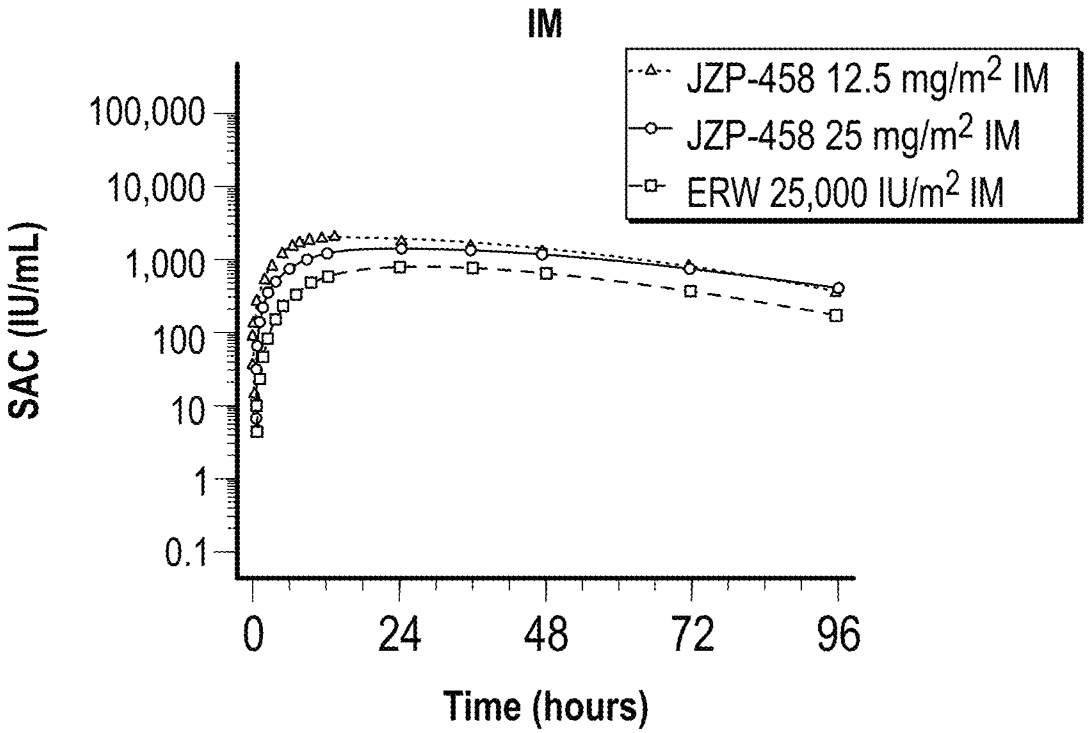
FIG. 14 shows A) Mean SAA-time profiles for JZP-458 IM. JZP-458 is a recombinant *Erwinia* asparaginase produced using a novel *Pseudomonas fluorescens* expression platform that yields an enzyme with no immunologic cross-reactivity to *E. coli*.-derived asparaginases. Abbreviations: ERW, asparaginase *Erwinia chrysanthemi*; IM, intramuscular; SAC, serum asparaginase concentration. Note: Lower limit of quantitation (LLOQ)=1.00 ng/mL. Values below the LLOQ were set to zero, B) Mean SAA-time profiles for JZP-458 IV. ERW, asparaginase *Erwinia chrysanthemi*; Iv, intravenous; SAC, serum asparaginase concentration. Note: Lower limit of quantitation (LLOQ)=1.00 ng/ml. Values below the LLOQ were set to zero, C) Individual asparaginase concentration-time profiles. ERW, asparaginase *Erwinia chrysanthemi*; IM, intramuscular; IV, intravenous; SAC, serum asparaginase concentration, and D) Correlation between SAC and SAA for JZP-458 IM and IV administration. Abbreviations: IM, intramuscular; IV, intravenous; SAA, serum asparaginase activity; SAC, serum asparaginase concentration. Note: Regression line equation: SAC=1407.9×SAA; Pearson correlation coefficient=0.9779. Further description can be found in Example 7.
Figure 14B:
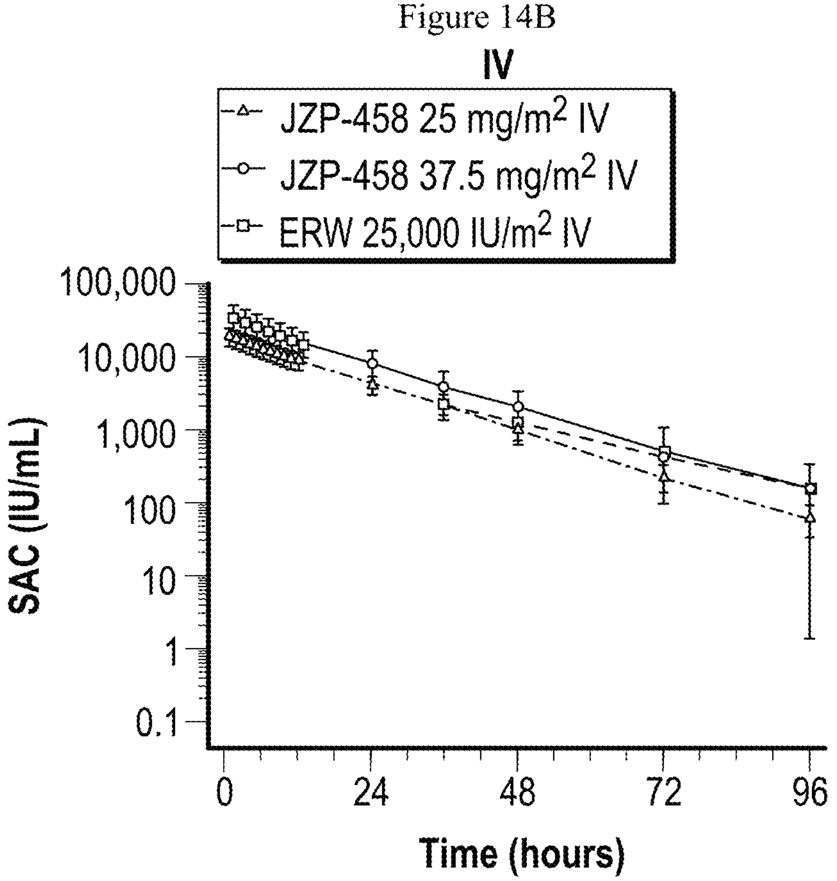
Figure 14C:
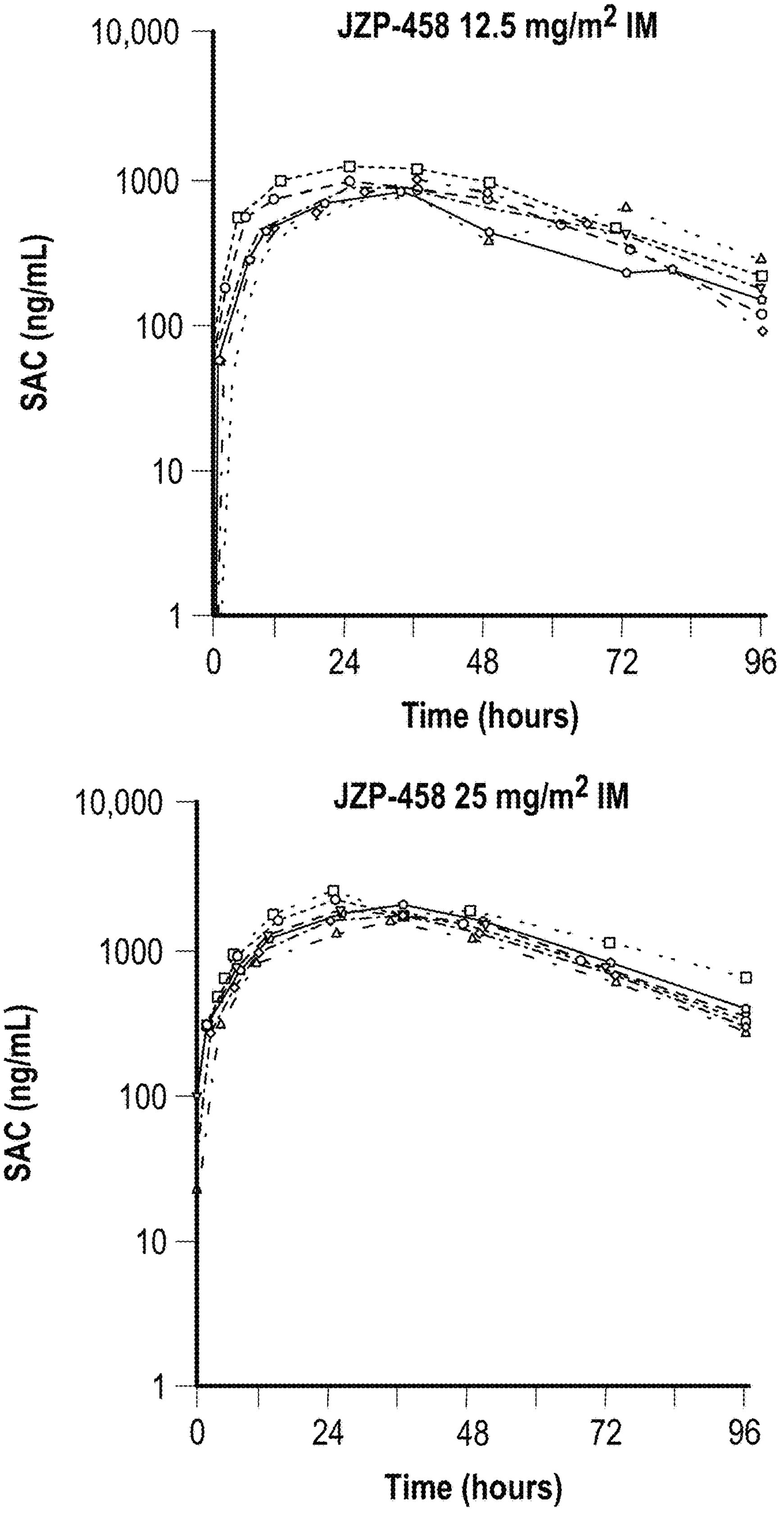
Figure 14C:
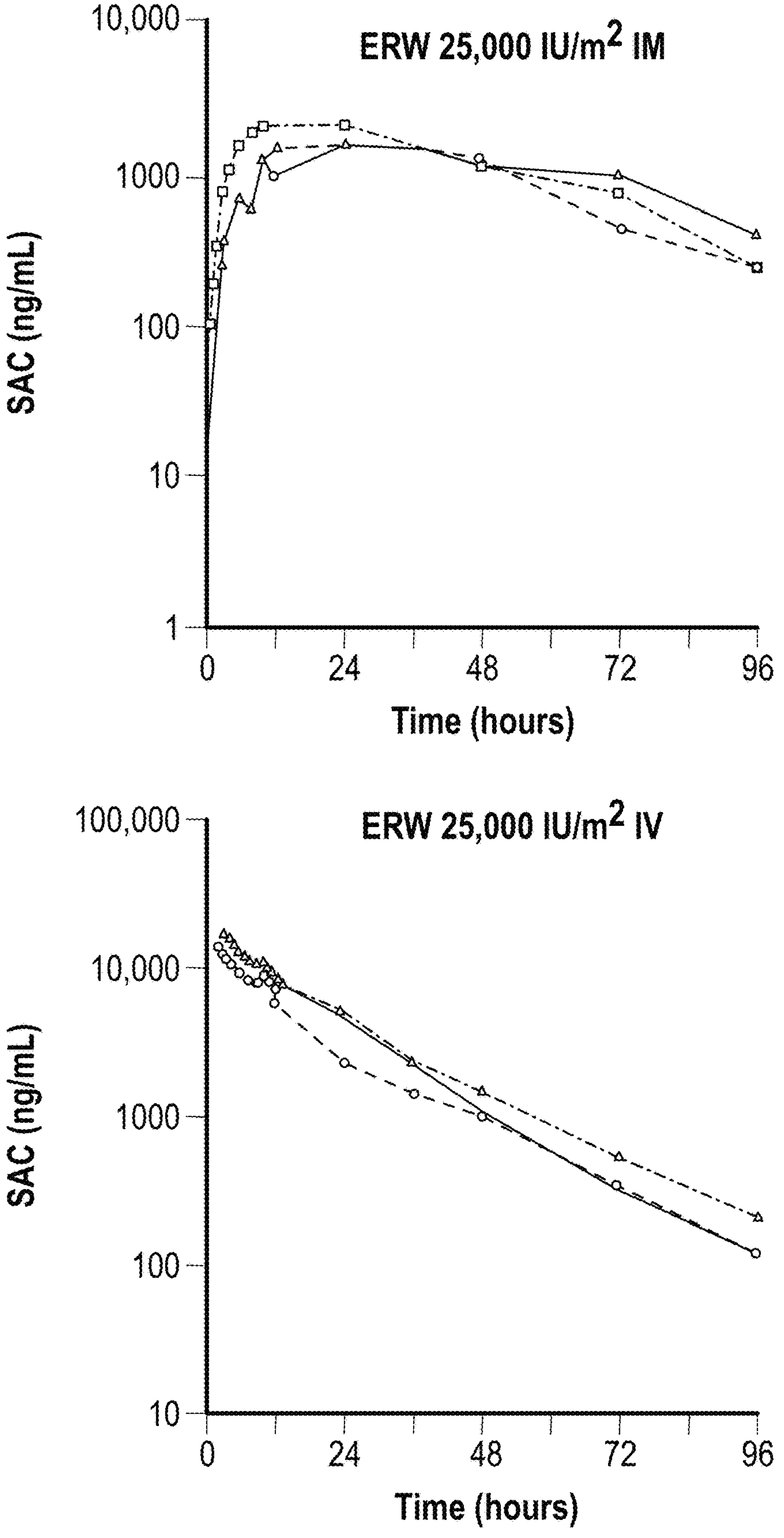

Individual and mean SAC-time profiles were generated for all treatment groups (FIG. 14A-C), and PK parameters based on SAC are summarized in FIG. 18. When administered IM, JZP-458 was slowly absorbed based on SAC, with median tmax values of 30 hours for both 12.5 mg/$m^2$ and 25 mg/$m^2$ doses. Mean $t_{1/2}$ values of 28.9 hours and 25.4 hours were estimated for JZP-458 at 12.5 mg/$m^2$ and 25 mg/$m^2$, respectively. Following IV administration of JZP-458, SAC levels declined with mean $t_{1/2}$ of 12.0 hours and 12.7 hours following administration of 25 mg/$m^2$ and 37.5 mg/$m^2$ doses, respectively.

Dose proportionality and bioavailability were also assessed for JZP-458 based on SAC (FIG. 19). JZP-458 exposures increased with increasing dose based on SAC. For both IM and IV administration, the increases in JZP-458 exposures based on SAC ($C_{max}$ and AUC) were approximately dose-proportional for the dose ranges studied. For the IM route of administration, bioavailability was estimated at 37.7% to 43.9% for JZP-458 based on SAC data.

Figure 14D:
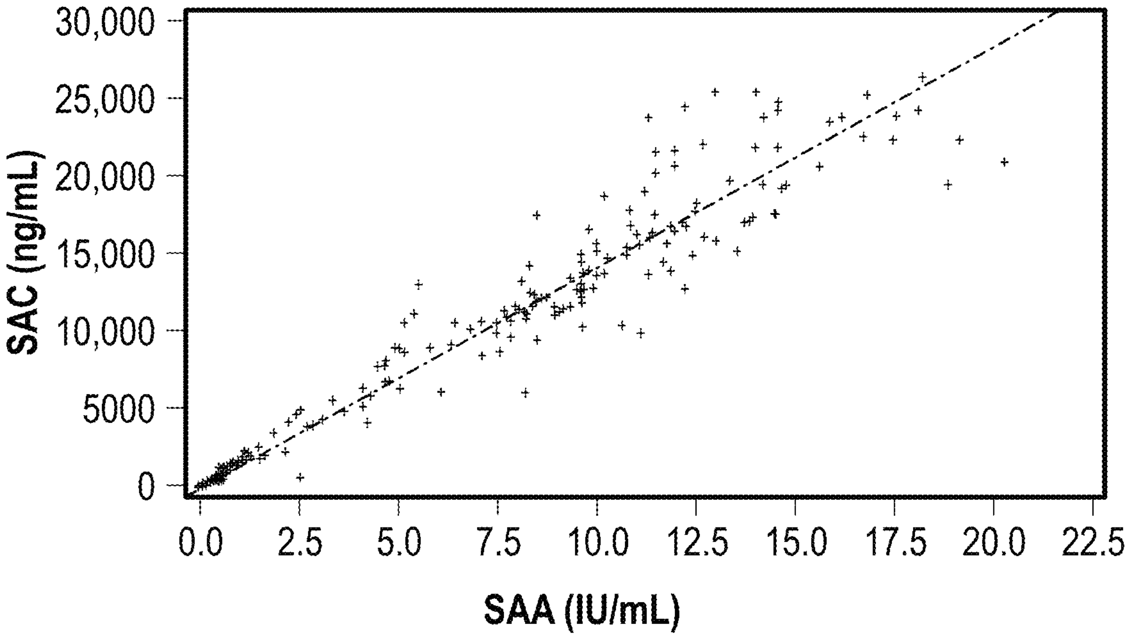

The relationship between SAA and SAC was further explored for JZP-458 (FIG. 14D). When assessed across routes of administration for JZP-458, a strong positive association was observed between SAA and SAC with a correlation coefficient greater than 0.95. Additionally, the equation from the linear regression model was SAC=1407.9×SAA. These data suggest that when SAA levels are at 0.1 IU/mL, the corresponding SAC would be approximately 141 ng/mL in this healthy adult population.

Figure 15:
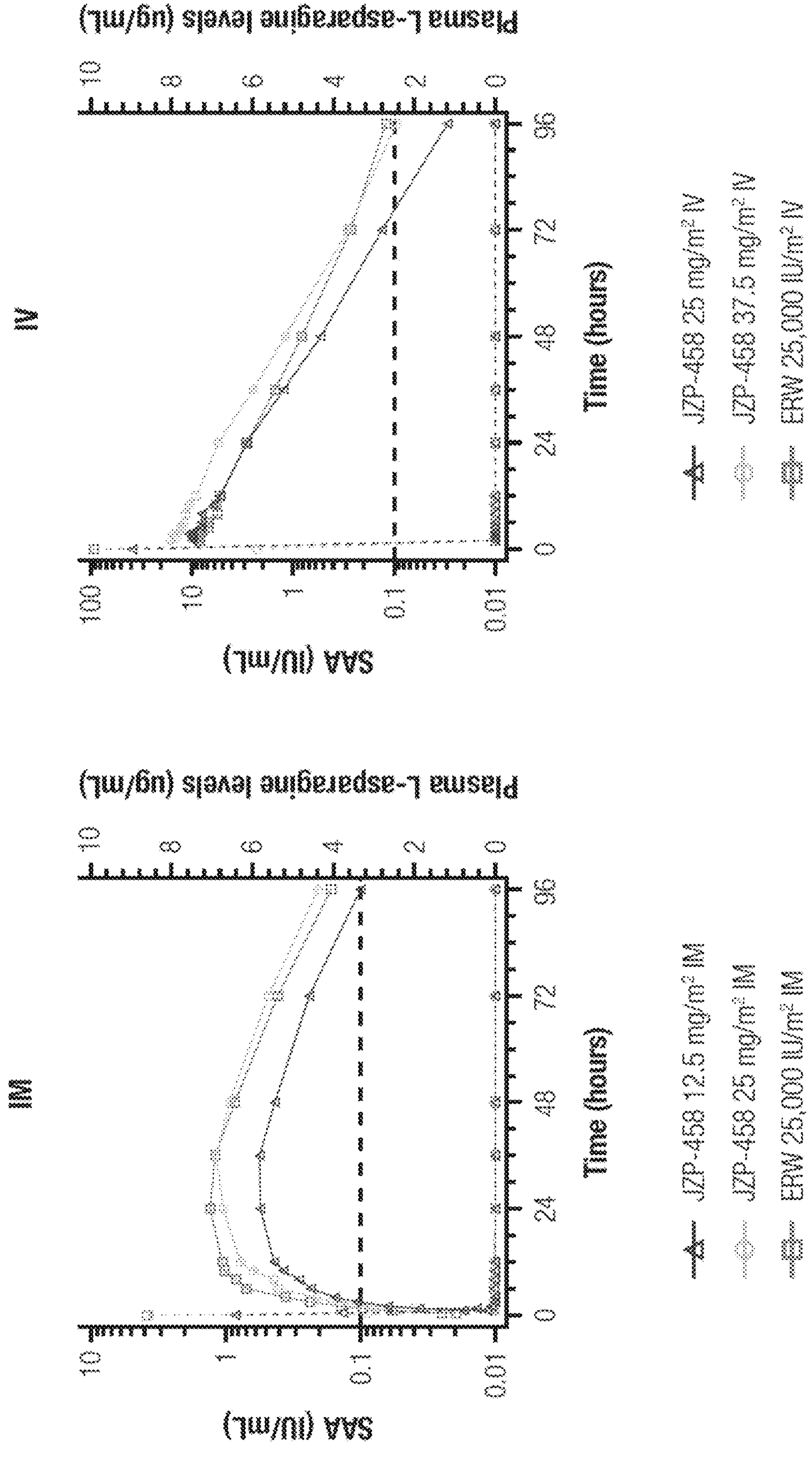
FIG. 15 shows mean SAA-time profiles and corresponding mean plasma L-asparagine levels further described in the study in Example 7. Abbreviations: IM, intramuscular; IV, intravenous; SAA, serum asparaginase activity. Note: Lower limit of quantitation (LLOQ): asparaginase activity=0.0250 IU/mL; L-asparagine=0.0250 ug/mL. Values below the LLOQ were set to zero.

Pharmacodynamic data. Asparaginase hydrolyzes the amino acid asparagine into aspartic acid and ammonia. Plasma levels of asparagine were monitored throughout the treatment duration. Mean SAA versus mean plasma asparagine concentration over time profiles are provided in FIG. 15. Baseline (predose) mean plasma asparagine concentrations were similar for IM and IV groups; individual asparagine concentrations ranged from 5.09 μg/mL to 13.8 μg/mL for all volunteers, which is consistent with literature-reported values. After JZP-458 administration (IM and IV), mean plasma asparagine levels were rapidly depleted from the predose concentrations (Cohort 1: 8.62 μg/mL and 8.96 μg/mL for IM and IV, respectively; Cohort 2: 6.42 μg/mL and 5.89 μg/mL for IM and IV, respectively) to levels below the assay lower limit of quantitation (LLOQ; 0.025 μg/mL) for both routes, and remained undetectable through the final sample collection time point at 96 hours. Data indicated that there was direct correlation between SAA and the reduction in plasma asparagine levels. At all JZP-458 dose levels, plasma asparagine levels were completely depleted with JZP-458 administration. At the highest JZP-458 doses tested (ie, 25 mg/$m^2$ for IM and 37.5 mg/$m^2$ for IV) in this phase 1 healthy volunteer study, JZP-458 not only achieved SAA levels ≥0.1 IU/mL at 72 hours postdose for 100% of the healthy volunteers for each route, but also resulted in a complete depletion of plasma asparagine levels through 96 hours postdose.

In addition to asparagine, asparaginase is also capable of hydrolyzing glutamine to glutamic acid and ammonia, but with much less efficiency. Plasma levels of glutamine were monitored for all treatments (FIG. 17). Baseline (predose) mean plasma glutamine concentrations were similar for IM and IV groups; individual glutamine predose concentrations ranged from 60.4 μg/mL to 146 μg/mL for all volunteers, which is also consistent with literature-reported values. Data showed that mean plasma glutamine levels fell quickly following JZP-458 IV administration from the predose concentrations of 106.5 and 74.0 μg/mL for Cohort 1 and Cohort 2, respectively, to levels below the assay LLOQ (0.25 μg/mL) for approximately 12 hours, after which glutamine levels recover to approximately predose levels at the final sample collection time point at 96 hours postdose. For the IM route, mean plasma glutamine levels declined following IM administration of JZP-458, with the lowest glutamine level observed at 36 hours postdose with 79% and 47% glutamine depletion at 25 mg/m$^2$ and 12.5 mg/m$^2$, respectively, after which glutamine levels recovered to levels similar to predose at the last sample collection time point of 96 hours postdose. Complete depletion of L-glutamine was not observed; glutamine levels were moderately affected to only partial depletion, and data were more variable than those observed for L-asparagine.

Safety and tolerability. The safety profile observed for JZP-458 in this phase 1 study was consistent with profiles of other asparaginases. All dose levels of JZP-458 were well tolerated; there were no unanticipated AEs, no serious AEs, and no grade 3 or higher AEs. The most common TEAE occurring in >2 healthy volunteers in each dosing cohort was nausea (FIG. 11).

Discussion JZP-458, a recombinant *Erwinia* asparaginase with no expected immunologic cross-reactivity to *E-coli*.-derived asparaginases, is being developed to ensure the availability of asparaginase therapy for patients with ALL or LBL who develop hypersensitivity to *E-coli*.-derived asparaginases. In this randomized, single-center, open-label, phase 1 study, at the highest doses tested for each route of administration (i.e., 25 mg/m$^2$ for IM and 37.5 mg/m$^2$ for IV), JZP-458 achieved SAA levels ≥0.1 IU/mL at 72 hours postdose for 100% of the healthy adult volunteers in each route. The SAA levels observed in this study also indicated that JZP-458 is capable of complete depletion of plasma asparagine levels. This was confirmed by asparagine concentrations measured from this study. At all JZP-458 dose levels, plasma asparagine levels were completely depleted with JZP-458 treatment with both IM and IV routes of administration. Additionally, the safety profile for JZP-458 in this study was consistent with the profiles of other asparaginases. All dose levels of JZP-458 were well tolerated; there were no unanticipated AEs, no reported serious AEs, and no grade 3 or higher AEs.

Based on the cumulative PK and safety data, the recommended pivotal phase 2/3 JZP-458 starting dose is 25 mg/m$^2$ for the IM route of administration and 37.5 mg/m$^2$ for the IV route of administration on a Monday/Wednesday/Friday dosing schedule. These doses achieved SAA levels ≥0.1 IU/mL at 72 hours postdose for 6/6 (100%) healthy volunteers in this phase 1 study in healthy adult volunteers, and these doses are expected to maintain SAA levels ≥0.1 IU/mL throughout the treatment duration in the pivotal phase 2/3 study.

Completing asparaginase therapy is important for improved patient outcomes and as has been shown in previous studies. In the Dana-Farber Cancer Institute ALL Consortium Protocol 91-01 study, patients with asparaginase intolerance, defined as completion of ≤25 weeks of a planned total of 30 weeks of asparaginase therapy, had a significantly lower 5 year EFS when compared with patients who received ≥26 weeks of asparaginase therapy (73% vs 90%, respectively; P<0.01). A recent Children's Oncology Group study demonstrated that high-risk and slow early-responding standard-risk ALL patients who did not complete their prescribed asparaginase doses had a significantly inferior EFS compared with patients who received all prescribed asparaginase doses. Notably, patients with hypersensitivity reactions who completed their course of therapy with *Erwinia* asparaginase substitution showed similar EFS as those who completed their course of first-line asparaginase therapy. These studies suggest that patients who complete their prescribed asparaginase doses, whether on first- or second-line asparaginase, have better outcomes than those who discontinue early. These results highlight the need for alternative asparaginase preparations to ensure that patients who develop hypersensitivity to *E. coli*-derived asparaginases are able to complete their full treatment course.

Conclusions. At the highest doses tested for each route of administration (i.e., 25 mg/m$^2$ for IM and 37.5 mg/m$^2$ for IV), JZP-458 achieved SAA levels >0.1 IU/mL at 72 hours postdose in each route for 100% of the healthy adult volunteers in this phase 1 study, and resulted in complete asparagine depletion with no unanticipated AEs, SAEs, or grade ≥3 AEs. Based on the cumulative PK and safety data from this study, the recommended phase 2/3 JZP-458 starting dose is 25 mg/m$^2$ for the IM route of administration and 37.5 mg/m$^2$ for the IV route of administration on a Monday/Wednesday/Friday dosing schedule. JZP-458 may be used as a treatment alternative for ALL/LBL patients who develop hypersensitivity to *E-coli*.-derived asparaginases.

Example 8: Phase 2/3 Study of JZP-458 in ALL/LBL Patients Hypersensitive to *E-coli*.-Derived Asparaginases (Cohorts 1a and 1b)

An open-label, multicenter, dose confirmation, and PK study of JZP-458 was designed for participants (of any age) with ALL/LBL who are hypersensitive to *E-coli*.-derived asparaginases (allergic reaction or silent inactivation). This study was designed to assess the tolerability and efficacy of JZP-458, as measured by serum asparaginase activity with additional supportive analyses for asparagine depletion and anti-drug antibody (ADA) levels. Six doses of JZP-458 are substituted for each dose of a long-acting *E-coli*.-derived asparaginase. Two consecutive weeks of treatment with JZP-458 is defined as one course.

Study design. This study consists of 2 parts: Part A to determine the dose of JZP-458 for IM administration and to confirm safety and efficacy; and Part B to define the optimal dose and schedule of IV JZP-458 (see FIG. 22 and FIG. 23). Part A and Part B may be investigated in parallel. Part A (IM) investigated multiple cohorts: in Cohort 1, the optimal dose is determined; and in Cohort 2, the number of participants treated at the optimal dose is expanded. Part B (IV) mirrors Part A: in both parts, a course of JZP-458 (6 doses over 2 weeks) may start on either a Monday, Wednesday, or a Friday and the number of courses per participant will depend on their individual treatment plan. In each part, a course of JZP-458 (6 doses over 2 weeks) may start on either a Monday, Wednesday, or a Friday; the number of courses per participant will depend on their individual treatment plan. The starting dose was 25 mg/m$^2$ for the IM route of administration (Cohort 1a). The starting dose was selected based on the phase 1 study results.

Objectives. The primary objectives of the study were to determine the efficacy of IM JZP-458 administration as measured by the response in Cohort 1 and Cohort 2, which is defined as the last 72 hour NSAA level ≥0.1 IU/mL during the first course, and to assess the safety and tolerability of IM JZP-458 in participants with ALL/LBL who are hypersensitive to *E. coli* derived asparaginases. Additional objectives included the following:

Key secondary objective: To determine the efficacy of IM JZP-458 administration as measured by the response in Cohort 1 and Cohort 2, defined as the last 48-hour NSAA level >0.1 IU/mL during the first course.

Secondary objectives: 1) Determine the efficacy of IM JZP-458 administration as measured by the response in Cohort 1 and Cohort 2, defined as the last 48-hour and the last 72-hour NSAA levels >0.4 IU/mL during the first course, 2) Characterize the PK of IM JZP-458 using a PPK approach and to explore E-R correlations using data from all participants from all dose levels and samples from all time points, and 3) Assess the immunogenicity of IM JZP-458 following repeat administration of JZP-458.

Exploratory objectives (for Part B of the study). 1) Determine the efficacy of IV JZP-458 administration as measured by the response, defined as the last 48-hour NSAA ≥0.1 IU/mL and the last 72-hour NSAA ≥0.1 IU/mL during the first course, 2) Determine the efficacy of IV JZP-458 administration measured by the response, defined as the last 48-hour NSAA ≥0.4 IU/mL and the last 72-hour NSAA ≥0.4 IU/mL during the first course, 3) Assess the safety and tolerability of IV JZP-458 in participants with ALL/LBL who are hypersensitive to *E-coli.*-derived asparaginases, 4) Characterize the PK of IV JZP-458 using a population PK approach and 5) Assess the immunogenicity of IV JZP-458 following repeat administration of JZP-458.

Preliminary results: As of 7 Oct. 2020, 31 participants were enrolled in Cohort 1a and 56 participants in Cohort 1b of the pivotal Phase 2/3 study (JZP458-201). The first protocol-defined SDRC evaluation of Cohort 1a included data from 6 evaluable participants, and the second SDRC evaluation of Cohort 1a included cumulative data from 16 evaluable participants. Each SDRC recommendation is based on a review of all available data at that time. After an evaluation of available efficacy data and because there were no unanticipated safety events observed at the IM 25 mg/m$^2$ dose level, the IM 37.5 mg/m$^2$ dose level evaluation was initiated (Cohort 1b). The first participant enrolled in Cohort 1b on 29 Jun. 2020. SDRC evaluation of Cohort 1b data occurred on 1 Sep. 2020 as a preliminary review of data through the first 7 participants enrolled in Cohort 1b. This review included all available SAA data, PPK modeling and simulation data, and safety data from the study. The preliminary results supported continued enrollment without modification with subsequent review of the study again when data was available for at least 13 evaluable participants in Cohort 1b, in line with the SDRC Charter. Available preliminary results from Cohorts 1a (N=31) and 1b (N=17) are summarized below.

Serum asparaginase activity levels. Serum samples were assayed for SAA. SAA levels serve as a surrogate marker for efficacy and response. The bioanalytical analyses for SAA were performed by Charles River Laboratories (Skokie, IL), using a validated enzyme activity method in human serum and JZP-458 reference standard (lot #RM-M-009; specific activity of 693 U/mg) over the range of 0.035 IU/mL to 0.210 IU/mL.

Evaluable participants for Cohort 1 were defined as participants who had received at least 3 doses of IM JZP-458 and had a 72-hour NSAA level collected within the protocol-defined sample collection window (±2 hours) during the second half of Course 1. Of the 31 participants enrolled at 25 mg/m$^2$, 26 participants were considered evaluable for the purpose of the primary efficacy objective in Cohort 1 per protocol. Reasons for participants being considered unevaluable included the following: 1) 2 participants had 72-hour PK samples collected out of the defined sample collection time window. 2) 1 participant had no 72-hour PK sample collected. 3) 1 participant withdrew informed consent and had no PK samples collected. 4) 1 participant had SAA values that were unevaluable due to assay interference from elevated lipids (as assessed by the bioanalytical laboratory, Charles River Laboratory). This participant had Grade 2 hypertriglyceridemia (318 mg/dL) at baseline and Grade 4 hypertriglyceridemia (2679 mg/dL) (reported as a TEAE; see details in safety summary below) during Course 1. The participant's triglycerides continued to decrease to baseline or below baseline in subsequent courses of JZP-458, and more recently, the participant completed Course 5 with triglycerides levels decreased to 234 mg/dL (Grade 1).

Of the 17 participants included in the preliminary analysis for Cohort 1b (37.5 mg/m$^2$), 16 participants were evaluable for the purpose of the primary efficacy objective in Cohort 1 (1 participant had a 72-hour PK sample collected out of the defined collection window, so was excluded for the primary endpoint but is included for other endpoints). Preliminary individual SAA results at key time points are summarized in FIG. 24. Preliminary observed SAA results show that at JZP-458 IM dose level of 25 mg/m$^2$ (N=26 evaluable participants), the mean (95% CI) SAA levels at the last 72 and 48 hours postdose were 0.1560 (0.1144-0.1976) and 0.4504 (0.3637-0.5370), respectively (median [first quartile, Q1; third quartile, Q3] SAA levels at the last 72 and 48 hours postdose were 0.1345 [0.0886, 0.2178] and 0.4091 [0.2813, 0.6577], respectively). At JZP-458 IM dose level of 37.5 mg/m$^2$ (N=16 evaluable participants), the mean (95% CI) SAA levels at the last 72 and 48 hours postdose were 0.2605 (0.1326-0.3884) and 0.7146 (0.3976-1.0316), respectively (median [Q1, Q3] SAA levels at the last 72 and 48 hours postdose were 0.1732 [0.1157, 0.2849] and 0.6503 [0.3248, 0.8736], respectively).

The proportions of participants with NSAA levels ≥0.1 IU/mL and >0.4 IU/mL at the last 72 and 48 hours postdose are presented in FIG. 25. At JZP-458 IM dose levels of 25 mg/m$^2$ (N=26 evaluable participants) and 37.5 mg/m$^2$ (N=16 evaluable participants), 65.4% and 81.3% of participants, respectively, achieved NSAA levels ≥0.1 IU/mL at the last 72-hour assessment (primary endpoint); and 96.2% and 93.8% of participants, respectively, achieved NSAA levels ≥0.1 IU/mL at the last 48-hour assessment (key secondary endpoint).

Population pharmacokinetic modeling and simulation: Preliminary PPK analyses (secondary endpoint) were performed using SAA data (data received on 28 Sep. 2020). A total of 319 quantifiable SAA data points (Course 1 only) from 47 participants (30 participants at 25 mg/m$^2$ and 17 participants at 37.5 mg/m$^2$) from the JZP458-201 study who received IM JZP-458 were included in the PPK model development. Models were fit to the SAA data to identify a structural model. Weight, height, body surface area, age, gender, race, ethnicity, disease, and disease subtype were tested as potential covariates on JZP-458 SAA clearance and volume. Only weight was found to be statistically significant and were included in the model.

The covariate model developed for JZP-458 was a 1-compartment IM-only model with linear elimination and first order absorption, with weight included as an allometric covariate on JZP-458 SAA clearance and volume, and a proportional residual error model. Model diagnostics showed good fits based on the redicted versus the observed data and predictive modeling methodologies.

The covariate model was used to simulate patient SAA profiles (N=2000 subjects per dose level) to explore the likelihood of achieving a therapeutic NSAA level of ≥0.1 IU/mL. The simulated virtual populations were created by resampling subjects with replacement from demographics in the Centers for Disease Control National Health and Nutrition Examination Survey Data. The simulation population ranged from 2 to 85 years of age, with a weight range of 8.9 to 174.6 kg (median 62.7 kg).

Both Friday, Monday, Wednesday (FMW) and MWF dosing schedules were simulated for 6 doses per 1 course of treatment, with a focus on the FMW schedule because it represented the most conservative scenario with the first 72-hour NSAA after only one dose. Simulation data indicated that start day does not impact the simulated percentage of patients with NSAA levels ≥0.1 IU/mL for the last 48- or 72-hour time points. Simulated profiles for FMW dosing schedule with median and 95% prediction intervals are presented in FIG. 26. Tabular summaries of the simulated percentage of patients achieving NSAA ≥0.1 IU/mL, and the mean predicted SAA levels for IM doses ranging from 25 to 80 mg/m$^2$ are presented in FIG. 27.

Based on PPK modeling and simulation, at an IM dose of 37.5 mg/m$^2$ JZP-458 on a FMW schedule, JZP-458 is expected to achieve the last 72-hour NSAA levels ≥0.1 IU/mL in 87% of patients (95% CI: 85.5%-88.5%) and to achieve the last 48-hour NSAA level ≥0.1 IU/mL in 99.9% of patients (95% CI: 99.7%-100%); the simulated mean NSAA levels were 0.29 (95% prediction interval: 0.06-0.88) and 0.58 (95% prediction interval: 0.2-1.32) at the last 72 and 48 hours, respectively. The PPK model predicts that at a dose of 50 mg/m$^2$, 94.2% of patients would achieve NSAA levels ≥0.1 IU/mL at 72 hours postdose.

Preliminary asparagine depletion results. Pharmacodynamic samples were assayed for asparagine concentrations by Syneos Health (Princeton, NJ), using a validated liquid chromatography tandem mass spectrometry method over the range of 0.025 to 10.0 μg/mL (Biomarker Partial Validation Report Amendment 1, SN 0044). Blood samples for asparagine assay were placed in ice bath immediately after collection and processed plasma was stored at −80° C. within 30 minutes to ensure analytical measurements represent in vivo asparagine levels. Asparagine levels were measured to support the effectiveness of JZP-458 over the dosing interval. The average baseline asparagine level was 10.2557 μg/mL (95% CI: 9.2175-11.2938) for 30 participants treated in Cohort 1a (25 mg/m$^2$) and was 10.2282 μg/mL (95% CI: 7.1852-13.2712) for 17 participants treated in Cohort 1b (37.5 mg/m$^2$), which are consistent with literature reported values (Tong 2014). For most participants, complete depletion of plasma asparagine was observed in a majority of samples, e.g., plasma asparagine levels were rapidly depleted from the predose levels to levels below or near the assay lower limit of quantitation (0.025 μg/mL), and lasted throughout the treatment duration of Course 1 up to predose 6, where the last sample was collected. Four participants had transient low level increases in asparagine (3 from Cohort 1a and 1 from Cohort 1b).

Preliminary safety results. In Cohort 1a, a total of 31 participants have been dosed with JZP-458 IM 25 mg/m$^2$. In Cohort 1b, data is available for 17 participants dosed with JZP-458 IM 37.5 mg/m$^2$.

An overview of TEAEs is presented by dose cohort in FIG. 28. The majority of participants have experienced at least 1 TEAE. In the JZP-458 IM 25 mg/m$^2$ cohort, the most frequent TEAEs have been neutrophil count decreased (32.3% of participants, 10/31), white blood cell count decreased (25.8% of participants, 8/31), and anemia (22.6% of participants, 7/31) (Table 4, Cohort 1a). In the JZP-458 IM 37.5 mg/m$^2$ cohort, the most frequent TEAEs have been vomiting (35.3% of participants, 6/17) and nausea (23.5% of participants, 4/17) (FIG. 27, Cohort 1b).

In the JZP-458 IM 25 mg/m$^2$ cohort (N=31), Grade 3 or 4 TEAEs were reported in 18 participants (58.1%), with Grade 3 or 4 TEAEs of neutrophil count decreased (29.0%), white blood cell count decreased (16.1%), and febrile neutropenia (19.4%) being the most common (Table 6). Overall, a Grade 3 or higher treatment-emergent, unanticipated, clinically significant nonhematologic toxicity has been reported in 1 participant (Grade 4 hypertriglyceridemia, deemed related to study drug) (Table 6 and Listing 1, Cohort 1a).

Serious TEAEs have been reported in 9 participants (29.0%) in the JZP-458 IM 25 mg/m$^2$ cohort (Table 5). Serious TEAEs included presyncope in 1 participant; rhinorrhea and febrile neutropenia in 1 participant; febrile neutropenia, dehydration, and pyrexia in 1 participant; drug hypersensitivity and febrile neutropenia in 1 participant; febrile neutropenia in 1 participant; febrile neutropenia and stomatitis in 1 participant; worsening mucositis oral in 1 participant; pyrexia in 1 participant; and methemoglobinemia in 1 participant. All of these serious TEAEs were considered not related to study drug, except for the events of drug hypersensitivity and febrile neutropenia in 1 participant.

Overall, 1 participant (JZP-458 25 mg/m$^2$) has experienced a TEAE leading to discontinuation of study drug. The participant (4 years of age) presented with a Grade 2 allergic reaction (nonserious) to cefepime and sulfamethoxazole/trimethoprim on the day of Dose 5 of Course 1.

Both of these drugs were discontinued. Subsequently, 1 day after receiving Dose 3 of Course 2 of JZP-458, the participant experienced a serious TEAE of drug hypersensitivity (Grade 3). The next day, the event resolved and the participant was discharged. This event was considered related to study drug and led to discontinuation of study drug (Listing 1, Cohort 1a). In the JZP-458 IM 37.5 mg/m$^2$ cohort (N=17), 6 participants have experienced Grade 3 or 4 TEAEs, with febrile neutropenia (17.6%, 3/17) being the most common (FIG. 30 and Listing 1, Cohort 1b). Three participants in the JZP-458 IM 37.5 mg/m$^2$ cohort have experienced serious TEAEs (vomiting and abdominal pain [not related to study drug] in 1 participant; drug hypersensitivity [verbatim term: allergic reaction to JZP-458; related to study drug] and febrile neutropenia in 1 participant [related to study drug]; and febrile neutropenia [related to study drug; 2 events] in 1 participant) (FIG. 28). No Grade 3 or higher treatment-emergent, unanticipated, clinically significant non-hematologic toxicity event has been reported in these participants and no TEAEs have led to study discontinuation (FIG. 29, Cohort 1b).

Adverse events of interest for asparaginase include allergic reactions, pancreatitis, and thrombosis (Stock 2011; Kearney 2009; Pieters 2011; Plourde 2014; Kloos 2020; Asparlas, Summary Basis of Approval 2018). As of the data cutoff for this preliminary safety analysis, only 1 participant (Cohort 1a) has experienced a ≥Grade 3 allergic reaction/hypersensitivity (discussed above) and no participant has experienced an event of ≥ Grade 3 pancreatitis or thrombosis. No deaths were reported.

In summary, the TEAE profile observed is consistent with other asparaginases, and showed that both dose levels of JZP-458 (25 and 37.5 mg/m$^2$) were well tolerated in participants.

Based on a complete review of the available study data by internal and external experts on the SDRC an IM JZP-458 dose of 37.5 mg/m$^2$ is the appropriate dose for registration of JZP-458, with a favorable benefit:risk profile. This dose may ensure patients complete their treatment regimen of asparaginase and is in line with FDA guidance on benefit: risk and minimum effective dosing.

Safety. A further safety study will be conducted with a minimum of 82 participants, including 31 from Cohort 1a (25 mg/m$^2$) and 51 from Cohort 1 b (37.5 mg/m$^2$), will be available for safety evaluation. Preliminary data on 47 participants (31 participants at 25 mg/m$^2$ and 17 participants at 37.5 mg/m$^2$) demonstrated that the proposed dose of 37.5 mg/m$^2$ is safe and well tolerated. In a preliminary safety analysis, only 1 participant (Cohort 1a, 25 mg/m$^2$) experienced a ≥Grade 3 allergic reaction/hypersensitivity and no participant experienced an event of ≥Grade 3 pancreatitis or thrombosis. The Grade 3 serious adverse event (SAE) of drug hypersensitivity (related to study drug) led to discontinuation of study drug; no other participant has discontinued from the study due to a TEAE.

Efficacy data. The standard for early efficacy assessment was based on the target SAA value of 0.1 IU/mL, as well as confirmation of asparagine depletion and consideration of a clinically appropriate response rate for patients with previous exposure to an asparaginase. Preliminary observed SAA results show that at JZP-458 IM dose level of 25 mg/m$^2$ (N=26 evaluable participants), the mean (95% CI) SAA levels at the last 72 and 48 hours postdose were 0.1560 (0.1144-0.1976) and 0.4504 (0.3637-0.5370), respectively (median [Q1, Q3] SAA levels at the last 72 and 48 hours postdose were 0.1345 [0.0886, 0.2178] and 0.4091 [0.2813, 0.6577], respectively). At JZP-458 IM dose level of 37.5 mg/m$^2$ (N=16 evaluable participants), the mean (95% CI) SAA levels at the last 72 and 48 hours postdose were 0.2605 (0.1326-0.3884) and 0.7146 (0.3976-1.0316), respectively (median [Q1, Q3] SAA levels at the last 72 and 48 hours postdose were 0.1732 [0.1157, 0.2849] and 0.6503 [0.3248, 0.8736], respectively).

At JZP-458 IM dose levels of 25 and 37.5 mg/m$^2$, 65.4% and 81.3% of participants, respectively, achieved NSAA levels ≥0.1 IU/mL at the last 72-hour assessment (primary endpoint); and 96.2% and 93.8% of participants, respectively, achieved NSAA levels ≥0.1 IU/mL at the last 48-hour assessment (key secondary endpoint). At 37.5 mg/m$^2$ (N=16), while the percentage of participants achieving NSAA levels ≥0.1 IU/mL at the last 72-hour assessment did not meet the primary endpoint criteria (as defined in the statistical analysis plan [SAP]), the results demonstrate clinically appropriate response rates consistent with published observed or predicted rates (80% to 88%) for patients who received non-*E-coli*.-based asparaginase for treatment following hypersensitivity reactions (Vrooman 2010; Panetta 2020; Salzer 2013). At 37.5 mg/m$^2$ (N=16), the percentage of participants achieving NSAA levels ≥0.1 IU/mL at the last 48-hour assessment (secondary key endpoint) was 93.8% and is expected to meet the prespecified success criteria outlined in the SAP for the IA (planned for N=51 participants).

Additional confirmation of the efficacy of JZP-458 is demonstrated in the preliminary PPK results. Preliminary PPK were consistent with observed data and provide additional support for the proposed 37.5 mg/m$^2$ dose selection. Based on the PPK modeling and simulation (secondary endpoint), at an IM dose of 37.5 mg/m$^2$ JZP-458 on a FMW schedule, JZP-458 is expected to achieve the last 72-hour NSAA level ≥0.1 IU/mL in 87% of patients (95% CI: 85.5%-88.5%) and to achieve the last 48-hour NSAA level ≥0.1 IU/mL in 99.9% of patients (95% CI: 99.7%-100%); the simulated mean NSAA levels were 0.29 (95% prediction interval: 0.06-0.88) and 0.58 (95% prediction interval: 0.2-1.32) at the last 72 and 48 hours, respectively. Simulation results indicated that start day does not impact the percentage of patients with NSAA levels ≥0.1 IU/mL for the last 72- or 48-hour time points.

The PPK analysis provides robust support of the observed data and for the total data package for the BLA because the model uses available data across all patients, time points, and dose levels. The PPK model results, based on all clinical and PK data available, can illustrate the exposure-response characteristics of JZP-458. As this model does not depend on categorized data, it provides reliable predictions of NSAA levels at the relevant times. The model demonstrates that the percentage of patients with 72-hour NSAA level ≥0.1 IU/mL after JZP-458 IM administration is consistent with the response expected in a population of patients with hypersensitivity to *E-coli*.-based asparaginase product. The modeled SAA values suggests that an IM dose of 37.5 mg/m$^2$ is an appropriate dose on a MWF dosing schedule.

As further measure of the confirmed 37.5 mg/m$^2$ dose for JZP-458, the goal of total asparagine depletion as measured by the validated method (Biomarker Partial Validation Report Amendment 1, SN 0044) was achieved. A comparison of baseline asparagine levels to those measured at trough throughout the dosing period at 25 and 37.5 mg/m$^2$ consistently demonstrated near complete depletion of asparagine. Deviations from this pattern were small and transient. The effects of potential doses, toxicity studies, the effect of number of injections, number of vials, as well as other factors were evaluated. Such studies balanced higher doses with potential effect of increased risk of higher adverse events.

Example 9: Comprehensive Clinical Data Package for JZP-458: Observed Efficacy Data, PD Data, Safety Data, and Immunogenicity Data for Cohorts 1a and 1b The following are the 4 key elements of the data that support the efficacy and safety of 25/25/50 mg/m$^2$ JZP-458 administered IM on MWF:

1. Observed efficacy data from cohorts 1a and 1b. At 25 mg/m$^2$ (N=29) and 37.5 mg/m$^2$ (N=51) JZP-458 IM administered MWF/WFM/FMW, the percentage of participants achieving NSAA levels ≥0.1 IU/mL at the last 72-hour assessment in Course 1 was 65.5% (95% CI: 48.2%, 82.8%) and 80.4% (95% CI: 69.5%, 91.3%), respectively (Initial Analysis Table 9.2.1.1). At 25 mg/m$^2$ (N=32) and 37.5 mg/m$^2$ (N=53) JZP-458 IM administered MWF/WFM/FMW, the percentage of participants achieving NSAA levels ≥0.1 IU/mL at the last 48-hour assessment in Course 1 was 96.9% (95% CI: 90.8%, 100%) and 98.1% (95% CI: 94.5%, 100.0%), respectively. The lower bound of the 95% CI exceeds 90%, which supports the efficacy of 25 mg/m2 and 37.5 mg/m2 JZP-458 dosing every 48 hours.

2. PD Data from cohorts 1a (N=32) and 1b (N=53). Administration of IM doses of 25 and 37.5 mg/$m^2$ JZP-458 resulted in complete depletion of plasma asparagine levels. Plasma asparagine levels declined rapidly from predose levels to levels below or near the assay lower limit of quantitation (0.025 μg/mL), and lasted throughout the treatment duration of Course 1 up to dose 6, where the last sample was collected. Four participants had transient low level increases in plasma asparagine (3 from Cohort 1a and 1 from Cohort 1b).

3. Safety data from cohorts 1a and 1b (by cohort and overall). The overall safety profile of JZP-458 in participants with ALL/LBL, based on combined safety data from Cohorts 1a and 1b (N=86) demonstrated that JZP-458 is well tolerated and that the safety profile of JZP-458 is predictable and consistent with the established safety profile of asparaginases.

4. Adverse Events. Overall, 96.5% of participants (83/86) experienced 1 or more treatment-emergent adverse events (TEAEs) during the study (FIG. 31). Overall, the most frequent TEAEs have been anemia (37.2% of participants [32/86]), neutrophil count decreased (34.9% of participants [30/86]), and platelet count decreased (29.1% of participants [25/86]). The most frequent treatment-related TEAEs have been neutrophil count decreased (18.6% of participants [16/86]), anemia (15.1% of participants [13/86]), and nausea (15.1% of participants [13/86]).

Example 10: Safety Study of Cohort 1c

The preliminary safety (TEAEs) data for Cohort 1c (25/25/50 mg/$m^2$ administered IM on MWF) indicate that this dose and regimen of JZP-458 is well tolerated and is consistent with the well-established safety profile of asparaginase products. Preliminary data show that, in Cohort 1c, 81.3% of participants (13/16) experienced 1 or more TEAEs (FIG. 32). Overall, the most frequent TEAEs was anemia (25.0% of participants [4/16]), platelet count decreased (25.0% of participants [4/16]), and lymphocyte count decreased, neutrophil count decreased, and white blood cell count decreased (18.8% of participants [3/16] each)

Preliminary data also show that no participant died in Cohort 1c. Four of 16 participants (25.0%) experienced SAEs. One participant had a treatment-related SAE of Pancreatitis acute (Grade 3), which led to study drug discontinuation. This event started on Study Day 13 and resolved by Study Day 24. No other participant in Cohort 1c had discontinued study drug due to a TEAE in the preliminary data. Also, in preliminary data for Cohort 1c (N=16), no TEAEs of allergic reactions (including hypersensitivity and anaphylaxis) or thrombosis have occurred.

As of the data cut-off date, 2 of 16 participants (12.5%) in Cohort 1c experienced TEAEs of pancreatitis; both assessed by the investigator as related to JZP-458. The first participant developed Grade 2 pancreatitis 4 days after receiving Dose 6 of Course 1. The participant began with Grade 2 epigastric pain with no other symptoms and had elevated lipase of 871 U/L (reference range 73-393 U/L). Amylase was reported to be within normal limits by the investigator (no values provided). The investigator stated that the symptoms resolved quickly without treatment and lipase had decreased to 300 U/L 8 days later. The investigator assessed the event as Grade 2 pancreatitis and related to JZP-458. No action was taken with JZP-458 and the participant started Course 2 of JZP-458 14 days after the onset of this event without any further problems. Laboratory results at the start of Course 2 were lipase of 218 U/L and amylase of 64 (reference range 25-115 U/L).

The second participant developed Grade 3 pancreatitis 1 day after completing Dose 6 of Course 1. The participant presented to the emergency room with moderate abdominal pain (8/10) that radiated to the left upper quadrant, middle abdomen, and left lower quadrant. IV morphine was given and pain decreased to 7/10. Relevant laboratory results included: lipase 549 U/L (reference range 73-393) and amylase 47 U/L (range 25-115 U/L). X-rays showed moderate degree of constipation. COVID test and urine culture were negative. The participant was hospitalized for work-up and treatment for pancreatitis. The event resolved approximately 10 days later, with lipase results returning to within range on this date (lipase 355 U/L). The investigator assessed the event as related to JZP-458, and the participant ended treatment on Study Day 13 due to Grade 3 pancreatitis.

A preliminary review of the clinical database was conducted for reports of pancreatitis in JZP458-201. Amongst the 161 participants currently enrolled, including 44 participants from Cohort 1c, there were 7 cases that report an event of pancreatitis across all cohorts. Five reports occurred in participants enrolled in Cohort 1b in addition to the 2 participants in Cohort 1c. Six of the 7 reports were considered to be serious, and 1 was nonserious. Two of the 6 serious reports of pancreatitis occurred in a participant in Cohort 1b, who subsequently died (1 participant developed sepsis and died and the other developed aspiration pneumonia associated with esophageotracheal fistula and died), are described above. The overall rate of pancreatitis is in range of expectations for asparaginases.

Summary. In the ongoing Study JZP458-201, 3 dose regimens were evaluated that had a positive benefit:risk profile. The totality of the data support the efficacy of 25/25/50 mg/$m^2$ JZP-458 administered IM on a MWF schedule given over 6 doses to replace one course of a long-acting *E. coli* asparaginase. The safety profile of JZP-458 (preliminary data for Cohorts 1a, 1b, and Cohort 1c) is comparable to the established safety profile of asparaginase products.

Example 11:60 Day Update: Efficacy PK and PD Data from Cohorts 1a, 1b, and 1c Available efficacy, PK (SAA), and PD data from cohorts 1a (N=32) and 1b (N=53). Available data includes data collected for Cohorts 1a (N=33) and 1b (N=53) through the data cut-off date that has been analyzed by the bioanalytical laboratory prior to the data extraction date.

Efficacy, PK (SAA), and PD data from cohort 1c (N=16). As of the data cut-off date, a total of 17 participants (including 1 participant who was never dosed) had been enrolled in Cohort 1c (25/25/50 mg/$m^2$ administered IM on MWF). For the 16 participants who have received at least 1 dose of study drug, the median (range) duration of time on study was 4.75 (1.9 to 7.1) weeks, with 2 participants on study for <2 weeks, 3 participants on study for 2 to <4 weeks, 9 participants on study for 4 to <6 weeks, and 2 participants on study for 6 to <8 weeks. Of these 16 participants, 7 have received 1 course of treatment and 9 have received 2 courses of treatment.

Based on preliminary results, at 25/25/50 mg/$m^2$ JZP-458 administered IM on MWF (N=13), the percentage of participants achieving NSAA levels ≥0.1 IU/mL at the last 72- and 48-hour assessments in Course 1 was 92.3% (12/13 participants) and 92.3% (12/13 participants), respectively. These results support the efficacy of 25/25/50 mg/m$^2$ JZP-458 administered IM on MWF schedule. The 1 participant (12 to <18 years of age) who did not achieve NSAA levels ≥0.1 IU/mL at the last 72- and 48-hour assessments in Course 1 had a Grade 3 allergic reaction to Oncaspar and received approximately 5% of the infusion when the participant began to have symptoms. The first dose of JZP-458 was administered 7 days later. The participant's laboratory values (including hemoglobin, bilirubin, triglycerides, and cholesterol) at Screening and Day 1 were not elevated. Two AEs have been reported for this participant to date: throat pain (not related) and mild (Grade 1) injection site reaction (related to JZP-458), which occurred after the last dose of Course 1 (Dose 6). In Course 1, this participant had NSAA levels >0.1 IU/mL (at 2.5 and 48 hours post Dose 1 and at 48 hours post Dose 2), which decreased to 0.0453 IU/mL at 72 hours post Dose 3 (last 72-hour assessment), 0.1369 IU/mL at 2.5 hours post Dose 4, BLQ at 48 hours post Dose 4, and 0.0510 IU/mL at 48 hours post Dose 5 (last 48-hour assessment). ADA data for this participant are pending.

Example 12: Phase 2/3 Study of JZP-458 in ALL/LBL Patients Hypersensitive to *E-coli.*-Derived Asparaginases This is an ongoing open-label, multicenter, dose confirmation, and PK study of JZP-458 in participants (of any age) with ALL/LBL who are hypersensitive to *E. coli*-derived asparaginases (allergic reaction or silent inactivation). This study is designed to assess the tolerability and efficacy of JZP-458, as measured by SAA with additional supportive analyses for asparagine depletion and ADA levels. Six doses of JZP 458 are substituted for each dose of a long-acting *E. coli*-derived asparaginase. Two consecutive weeks of treatment with JZP-458 is defined as 1 course. A course of JZP-458 (6 doses over 2 weeks) starts on either a Monday, Wednesday, or a Friday; the number of courses per participant depends on their individual treatment plan.

This study consists of 2 parts: Part A to determine the dose of JZP-458 for IM administration and to confirm safety and efficacy; and Part B to define the optimal dose and schedule of IV JZP-458.

Part A: Cohort 1a was initiated at an IM dose of 25 mg/m$^2$ on a MWF schedule over 2 weeks. Data from Cohort 1a was assessed after 6 evaluable participants enrolled at the IM 25 mg/m$^2$ dose on MWF schedule and again with cumulative data from 16 evaluable participants. Because the percentage of participants with NSAA levels at the last 72 hours postdose were below the protocol-defined threshold, and due to the acceptable safety profile at the IM 25 mg/m$^2$ dose level, Jazz decided to escalate to an IM dose of 37.5 mg/m$^2$ on a MWF schedule (Cohort 1b).

Safety data, SAA data, PPK modeling and simulation results after the first 7 participants, and then again cumulatively after 17 evaluable participants enrolled in Cohort 1b were assessed. Jazz then decided to continue enrollment at the dose of 37.5 mg/m$^2$ on a MWF schedule without modifications in Cohort 1b.

Based on PPK modeling and discussion with FDA, Cohort 1c was initiated to evaluate a dose of 25 mg/m$^2$ on Mondays and Wednesdays and a dose of 50 mg/m$^2$ on Fridays. A preliminary PPK model using participant data from Course 1 of Cohorts 1a (N=30) and 1b (N=32) predicted that the optimal dose to support a MWF dosing schedule is a dose of 25/25/50 mg/m$^2$ administered on MWF for a total of 6 doses to replace every dose of long-acting *E. coli* asparaginase. As of 19 Jul. 2021, a total of 51 participants had enrolled in Cohort 1c.

Part B

Part B Cohort 1a (IV Dose Confirmation): Participants in this cohort will receive 6 IV doses JZP 458; a target of at least 6 evaluable participants were enrolled. Evaluable participants are defined as those who have received at least 3 doses of IV JZP 458 and have a 72 hour NSAA level (obtained within the ±2 hour window) during the second half of Course 1. Blood samples were collected for SAA level determination and other PK/PD laboratory evaluations. Additional courses of IV JZP 458 will be administered based on the participant's original treatment plan for as long as the participant derives clinical benefit; subsequent scheduled doses of a long acting *E. coli* derived asparaginase remaining on the participant's treatment plan will be replaced by 6 doses, which is equivalent to a course, of IV JZP 458 until the participant's asparaginase treatment has been completed.

After all required participants in a cohort are enrolled and treated with 6 doses of JZP 458, the dose level will be evaluated and the necessity for additional participants/cohorts will be determined by the SDRC.

Part B (IV JZP 458 Determination for Possible Additional Cohorts): If 6 of 6 evaluable participants in the initial IV dosing cohort have a 72 hour NSAA level ≥0.1 IU/mL and the safety and tolerability are acceptable based on a review by SDRC, then the dose may be confirmed as a dose for further evaluation. If the dose is not confirmed, additional dose cohorts may be investigated as described in (Section 8.1/Protocol Amendment 02/Section 3.1.3).

This summary presents the results of an analysis subset using the data cut-off date of 19 Jul. 2021, which includes participants from Part A (Cohort 1a [IM 25 mg/m$^2$ on a MWF schedule; N=33], Cohort 1b [IM 37.5 mg/m$^2$ on a MWF schedule; N=83], and Cohort 1c [IM 25 mg/m$^2$ administered on Mondays and Wednesdays and 50 mg/m$^2$ administered on Fridays; N=51]) and Part B (25 mg/m$^2$ administered IV on Mondays and Wednesdays and 50 mg/m$^2$ administered IV on Fridays; N=62).

The primary objectives of the study were to determine the efficacy of IM JZP-458 administration as measured by the response in Cohort 1 and Cohort 2, which was defined as the last 72-hour NSAA level ≥0.1 IU/mL during the first course, and to assess the safety and tolerability of IM JZP-458 in participants with ALL/LBL who are hypersensitive to *E. coli*-derived asparaginases.

As of the data cut-off date 19 Jul. 2021, a total of 228 participants (Part A: 33 in Cohort 1a [IM 25 mg/m$^2$ MWF], 83 in Cohort 1b [IM 37.5 mg/m$^2$ MWF], and 51 in Cohort 1c [IM 25 (MW)/50 (F) mg/m$^2$]; Part B: 62 in Cohort 1a [IV 25 (MW)/50 (F) mg/m$^2$]) were enrolled in the study. As of 19 Jul. 2021, 28 (16.8%) participants in Part A and 39 (62.9%) participants in Part B are continuing to receive JZP-458 treatment in the study.

In Part A (IM), a total of 35 of 167 participants (21.0%) have discontinued JZP-458 treatment (21 of 167 [12.6%] due to TEAE, 8 of 167 [4.8%] due to physician decision, 3 of 167 [1.8%] due to progressive disease, 1 of 167 [0.6%] withdrawn by a parent or guardian, 1 of 167 [0.6%] due to participant withdrawal, and 1 of 167 [0.6%] was discontinued due to "other"). A total of 3 of 167 [1.8%] participants in Part A have died as of the data cut-off of 19 Jul. 2021.

In Part B (IV), a total of 22 of 62 participants (35.5%) have discontinued JZP-458 treatment (15 of 62 [24.2%] due to TEAE, 4 of 62 [6.5%] due to physician decision, 1 of 62

[1.6%] due to recurrent disease, 1 of 62 [1.6%] withdrawal by participant, and 1 of 62 [1.6%] was discontinued due to "other" reason). No participants in Part B have died as of the data cut-off of 19 Jul. 2021.

Overall, for Part A (IM), the majority of participants were white (115 of 167 [68.9%]); median age at enrollment was 10 years (range: 1 to 25 years). Of the 167 participants in the Safety Analysis Set, 44 (26.3%) were <6 years of age, 57 (34.1%) were 6 to <12 years of age, 45 (26.9%) were 12 to <18 years of age, and 21 (12.6%) were ≥18 years of age. A higher percentage of male participants (103 of 167 [61.7%]) than female participants (64 of 167 [38.3%]) is included in the Safety Analysis Set.

For Part B (IV), the majority of participants were white (43 of 61 [70.5%]); median age at enrollment was 10 years (range: 1 to 24 years). Of the 61 participants in the Safety Analysis Set, 20 (32.8%) were <6 years of age, 14 (23.0%) were 6 to <12 years of age, 17 (27.9%) were 12 to <18 years of age, and 10 (16.4%) were ≥18 years of age. A higher percentage of male participants (36 of 61 [59.0%]) than female participants (25 of 61 [41.0%]) is included in the Safety Analysis Set.

Overall, in Part A (IM), primary disease status was reported as B-cell ALL for 124 of 167 participants [74.3%], T cell ALL for 26 of 167 participants [15.6%], T-cell LBL for 16 of 167 [9.6%] participants, and B cell LBL for 1 of 167 participants (0.6%). Overall, the time since the primary diagnosis, relative to Study Day 1, ranged from 0 to 3 months for the majority of participants (122 of 167 [73.1%]). Prior asparaginase treatment was Oncaspar for all participants (167 of 167) and the average time since the last asparaginase treatment, relative to Study Day 1, was 24.3 days (range 2 to 158 days).

Overall, in Part B (IV), primary disease status was reported as B-cell ALL for 51 of 61 participants [83.6%], T cell ALL for 7 of 61 participants [11.5%], B cell LBL for 2 of 61 participants (3.3%), and T-cell LBL for 1 of 61 participants [1.6%]. Overall, the time since the primary diagnosis, relative to Study Day 1, ranged from 0 to 3 months for the majority of participants (47 of 61 [77.0%]). Prior asparaginase treatment was Oncaspar for most participants (60 of 61 [98.4%]) and the average time since the last asparaginase treatment, relative to Study Day 1, was 24.9 days (range 2 to 138 days). Demographic and baseline characteristics are provided in FIG. 33.

Pharmacokinetics Based on Serum Asparaginase Activity: In Part A (IM), the PK analysis set consisted of 32 participants (97.0%) in the 25 mg/m$^2$ MWF cohort, 83 participants (100%) in the 37.5 mg/m$^2$ MWF cohort, and 51 participants (100%) in the 25 (MW)/50 (F) mg/m$^2$ cohort; in Part B (IV), the PK analysis set consisted of 60 (96.8%) participants receiving JZP 458 IV at doses of 25 (MW)/50 (F) mg/m$^2$.

Observed SAA results show that at JZP-458 IM dose levels of 25 mg/m$^2$ MWF, 37.5 mg/m$^2$ MWF, and 25 (MW)/50 (F) mg/mg$^2$, mean and median SAA levels at the last 72 and 48 hours postdose were ≥0.1 IU/mL (FIG. 34).

Part A (IM)

At JZP-458 IM dose levels of 25 and 37.5 mg/m$^2$ administered on a MWF schedule, 64.3% (95% CI: 46.5%, 82.0%) and 90.8% (95% CI: 84.3%, 97.3%) of participants, respectively, achieved NSAA levels ≥0.1 IU/mL at the last 72 hour assessment during the first course of treatment. When JZP 458 was administered IM at doses of 25 (MW)/50 (F) mg/m$^2$, 89.8% (95% CI: 81.3%, 98.3%) of participants achieved NSAA levels ≥0.1 IU/mL at the last 72 hour assessment during the first course of treatment.

At JZP-458 IM dose levels of 25 and 37.5 mg/m$^2$ administered on a MWF schedule, 96.9% (95% CI: 90.8%, 100.0%) and 98.8% (95% CI: 96.4%, 100.0%) of participants, respectively, achieved NSAA levels ≥0.1 IU/mL at the last 48-hour assessment during the first course of treatment. When JZP 458 was administered IM at doses of 25 (MW)/50 (F) mg/m$^2$, 95.9% (95% CI: 90.4%, 100.0%) of participants achieved NSAA levels ≥0.1 IU/mL at the last 48-hour assessment during the first course of treatment.

Part B (IV)

At JZP-458 IV dose levels 25 (MW)/50 (F) mg/m$^2$ administered on a MWF schedule, 40.0% (95% CI: 26.4%, 53.6%) of participants, respectively, achieved NSAA levels ≥0.1 IU/mL at the last 72 hour assessment during the first course of treatment.

At JZP-458 IV dose levels administered IV at doses of 25 (MW)/50 (F) mg/m$^2$, 89.8% (95% CI: 82.1%, 97.5%) of participants achieved NSAA levels ≥0.1 IU/mL at the last 48-hour assessment during the first course of treatment.

Pharmacokinetics Based on Serum Asparaginase Concentration: The relationship between SAA and SAC was explored for JZP-458 within the JZP458-201 study.

Part A (IM):

When JZP-458 was administered IM in participants with ALL/LBL, a strong positive association was observed between SAA and SAC, with a correlation coefficient of 0.9640 (Pearson correlation coefficient) for pooled JZP 458 IM 25 mg/m$^2$ MWF, IM 37.5 mg/m$^2$ MWF, and IM 25 (MW)/50 (F) mg/m$^2$ from Course 1 (FIG. 35). Additionally, the equation from the linear regression model was SAC=1254.7×SAA (FIG. 35). These data suggested that when SAA levels are at 0.1 IU/mL, the corresponding serum asparaginase concentration would be approximately 125 ng/mL in this patient population.

Part B (IV)

When JZP-458 was administered IV in participants with ALL/LBL, a strong positive association was observed between SAA and SAC, with a correlation coefficient of 0.9263 (Pearson correlation coefficient) for JZP 458 IV 25 (MW)/50 (F) mg/m$^2$ from Course 1 (FIG. 35). Additionally, the equation from the linear regression model was SAC=1080.8×SAA (FIG. 35). These data suggested that when SAA levels are at 0.1 IU/mL, the corresponding serum asparaginase concentration would be approximately 108 ng/mL in this patient population.

Pharmacodynamic Results: The PD analysis set consisted of 166 (99.4%) participants enrolled in Part A (IM) of the study and 60 (96.8%) participants enrolled in Part B (IV) of the study. The PD samples were assayed for L-asparagine and L-glutamine concentrations in human plasma using a validated liquid chromatography tandem mass spectrometry method over the range of 0.025 to 10.0 g/mL for L-asparagine and 0.250 to 100 μg/mL for L-glutamine.

Plasma L-asparagine Depletion:

Part A (IM): Complete depletion of plasma asparagine was observed after IM doses of JZP-458 at 25 mg/m$^2$ MWF, 37.5 mg/m$^2$ MWF, and 25 (MW)/50 (F) mg/m$^2$. In Course 1, mean predose L-asparagine concentrations ranged from 7.5865 to 11.3215 μg/mL for all dose levels and all schedules. For the majority of participants, complete depletion of plasma asparagine was observed. FIGS. 36A, 36B, and 36C show that following IM administration of doses of JZP-458 at 25 mg/m$^2$ MWF, 37.5 mg/m$^2$ MWF, and 25 (MW)/50 (F) mg/m$^2$, mean plasma asparagine levels rapidly declined from the predose levels to levels below or near the assay LLOQ (0.025 μg/mL). The reduced plasma asparagine levels lasted throughout the treatment duration of Course 1 up to predose 6, where the last sample was collected. Four participants had transient low-level increases in plasma asparagine (3 participants from Cohort 1a and 1 participant from Cohort 1b).

Part B (IV): Complete depletion of plasma asparagine was observed after IV doses of JZP-458 at 25 (MW)/50 (F) mg/$m^2$. In Course 1, mean predose L-asparagine concentrations ranged from 8.2218 to 8.9348 μg/mL for all dose schedules. For the majority of participants, complete depletion of plasma asparagine was observed. FIGS. 36A-36C shows=that following IV administration of doses of JZP-458 at 25 (MW)/50 (F) mg/$m^2$, mean plasma asparagine levels rapidly declined from the predose levels to levels below or near the assay LLOQ (0.025 μg/mL). The reduced plasma asparagine levels lasted throughout the treatment duration of Course 1 up to predose 6, where the last sample was collected. Two participants had low-to-moderate level increases in plasma asparagine.

Plasma L-glutamine Depletion:

Part A (IM): Depletion of plasma glutamine was also observed after IM doses of JZP-458 at 25 mg/$m^2$ MWF, 37.5 mg/$m^2$ MWF, and 25 (MW)/50 (F) mg/$m^2$. In Course 1, mean predose L-glutamine concentrations ranged from 88.3000 to 112.7875 μg/mL for all dose levels and all schedules. FIGS. 37A-37C show that mean L glutamine levels declined following IM administration of JZP-458 at doses of 25 mg/$m^2$ MWF, 37.5 mg/$m^2$ MWF, and 25 (MW)/50 (F) mg/$m^2$; however, complete depletion of L glutamine was not observed based on mean profiles, and glutamine levels were only moderately affected.

Part B (IV): Depletion of plasma glutamine was also observed after IV doses of JZP-458 at 25 (MW)/50 (F) mg/$m^2$. In Course 1, mean predose L-glutamine concentrations ranged from 99.3727 to 111.0048 μg/mL for all dose schedules. FIGS. 37A-37C show that mean L-glutamine levels declined following IV administration of JZP-458 at doses of 25 (MW)/50 (F) mg/$m^2$. Complete depletion of L-glutamine was only observed immediately postdose at end of infusion; at other timepoints throughout the treatment duration during Course 1, glutamine levels were only moderately affected.

The clinical pharmacology of JZP-458 has been characterized by PPK analyses. A PPK analysis of data from Study JZP458-101 in healthy participants facilitated the selection of a starting dose and dosing schedule in the phase 2/3 pivotal study. In the phase 2/3 Study JZP458-201, sparse SAA samples were collected from participants with ALL/LBL. Population PK and E-R analyses with data (as of 19 Jul. 2021) from 228 participants with ALL/LBL in Study JZP458-201 (Part A: Cohorts 1a [N=33; 25 mg/$m^2$ JZP458 administered IM on a MWF schedule], 1b [N=83; 37.5 mg/$m^2$ JZP458 administered IM on a MWF schedule], and 1c [N=51; JZP458 administered IM as 25 (MW)/50 (F) mg/$m^2$]; Part B: N=61; JZP458 administered IV as 25 [MW]/50 [F] mg/$m^2$) were performed to estimate PPK parameters and to establish the optimal effective dose of JZP-458.

Absorption: JZP-458 is slowly absorbed after IM administration. The median (range) of individual predicted Tmax of JZP 458 after the sixth dose of JZP-458 is 13.1 (5.85 to 20.2) hours in participants with ALL/LBL based on PPK analysis using data from Cohorts 1a and 1b (N=85) from Study JZP458 201.

Distribution: Population estimate of V/F for JZP-458 in a 40 kg patient is 3.35 (standard error: 0.46) L based on PPK analysis of data from 85 participants with ALL/LBL in Cohorts 1a and 1b in Study JZP458 201.

Metabolism: JZP-458 is an enzyme that may be metabolized by proteolytic degradation.

Elimination: JZP-458 PK is described by a 1-compartment IM model with linear elimination and sequential mixed order absorption, with weight included as an allometric covariate on JZP-458 CL/F and V/F. The mean (SD) of individual predicted t½ of JZP-458 following simulation of the first dose in Course 1 is 16.1 (1.38) hours. The population estimate of CL/F for JZP-458 in a 40 kg patient is 0.416 (standard error: 0.0193) L/h based on PPK analysis of data from 85 participants with ALL/LBL in Cohorts 1a and 1b in Study JZP458 201.

Dose Proportionality: Dose proportionality for JZP-458 was evaluated in the phase 1, single-dose Study JZP458-101 in healthy volunteers and in the phase 2/3 Study JZP458-201 in participants with ALL/LBL. In Study JZP458-101, JZP-458 exposures ($C_{max}$ and AUC) increased with increasing doses based on SAA, and the increases in JZP-458 SAA exposures were approximately dose-proportional between the dose range of 12.5 to 25 mg/$m^2$ for IM administration. In Study JZP458-201, based on PPK analyses, model-predicted $C_{max}$ and AUC values after the first and sixth doses of JZP-458 ($C_{max,1}$ and $C_{max,6}$, respectively) are presented in FIG. 38. With a dose increase of 1.5-fold from 25 to 37.5 mg/$m^2$, the ratios of $C_{max}$ 37.5 mg/$m^2$/$C_{max}$ 25 mg/$m^2$ were 1.63 and 1.62 for mean $C_{max,1}$ and $C_{max,6}$, respectively; and the ratio of AUC 37.5 mg/$m^2$/AUC 25 mg/$m^2$ was 1.69. These results suggest that the increases in JZP-458 SAA exposures ($C_{max}$ and AUC) were approximately dose-proportional between the dose range of 25 to 37.5 mg/$m^2$ for IM administration.

Accumulation: Accumulation for JZP-458 was evaluated in the phase 2/3 Study JZP458-201 in participants with ALL/LBL. In Study JZP458-201, based on dosing frequency and $t_{1/2}$ (16.1 hours), the accumulation ratio for IM JZP-458 is 1.15 assuming a dosing interval of 48 hours. The PPK model predicted $C_{max}$ values after the first and sixth doses of JZP-458 in Study JZP458-201 are presented in FIG. 39. Accumulation ratios (calculated as $C_{max,6}$/$C_{max,1}$) were 1.18 and 1.17 for 25 and 37.5 mg/$m^2$ JZP-458, respectively, suggesting very little accumulation.

An integrated summary of immunogenicity for JZP-458 is provided in Module 5.3.5.3/ISI. Overall, no additional risks are expected for JZP-458 compared with other asparaginases.

A multi-tiered approach is being used to measure ADA and NAb to evaluate immunogenicity of JZP-458 in clinical Study JZP458-201 (FIG. 40). During the first tier, serum samples are screened for the detection of ADAs that bind to JZP-458. Serum samples with any potentially ADA positive samples from the screening assay are retested for confirmation of the specificity of binding. Samples that have confirmed antibodies are titrated further to measure the magnitude of the ADA response. In addition, samples with confirmed antibodies are evaluated further for neutralizing activity of JZP 458.

In Study JZP458-201, immunogenicity samples are being collected from all participants prior to the first dose in each course, prior to dose 6 in Course 1, and at the End of Study visit (30 days [±3] after last dose in the last course). Additional samples to test for ADAs may be obtained if a participant experiences an allergic reaction. If it is determined that a participant has subtherapeutic NSAA levels (<0.1 IU/mL), a test for ADA may be performed if there is a blood sample available. In addition, for participants who exhibit positive ADA from samples obtained prior to the end of study, efforts are being made to collect follow-up ADA samples up to approximately 6 months after a participant's last dose of their last course of JZP-458. For these ADA positive participants, their follow-up ADA samples will be the last sample obtained. All immunogenicity samples are being assessed as described in FIG. 40 using validated methods.

In Part A (IM), a total of 217, 500, and 245 samples were collected from participants in the IM 25 mg/m$^2$ MWF, IM 37.5 mg/m$^2$ MWF, and IM doses of 25 (MW)/50 (F) mg/m$^2$ dose cohorts, respectively. As of the data cut-off date, ADA data were available from a median (range) of 5.0 (1 to 14) courses from 33 participants in Cohort 1a, 4.0 (1 to 15) courses from 83 participants in Cohort 1b, and 4.0 (1 to 11) courses from 51 participants in Cohort 1c. In Part B (IV), a total of 174 samples were collected from participants after IV administration of doses of 25 (MW)/50 (F) mg/m$^2$. As of the data cut-off date, ADA data were available from a median (range) of 1.0 (1 to 10) courses. The maximum number of courses with ADA collection is summarized categorically in FIG. 41.

Part A (IM): As of the data cut-off date, 83 of 167 (49.7%) participants receiving IM JZP 458 had confirmed positive ADA toward JZP 458. Of these 83 ADA positive participants, 11 of 83 participants experienced treatment-related hypersensitivity reactions during the study, and 4 of 83 participants had NAbs. A total of 84 of 167 (50.3%) participants were ADA negative toward JZP-458, and 5 of 84 participants experienced treatment-related hypersensitivity reactions during the study.

Of the 83 ADA positive participants, 7 participants were ADA positive at Predose 1, and all became ADA negative at least once during the study. Predose 1 ADA positive status did not affect Course 1 SAA levels in these participants; all 7 participants had SAA levels ≥0.1 IU/mL at all available 48- and 72-hour timepoints during Course 1. There were 76 participants who developed a positive ADA following administration of JZP-458; 51 of these 76 participants subsequently became ADA negative at least once during the study.

Antidrug antibody status was evaluated as a potential covariate for the PK of JZP 458 within the PPK analysis, and it was determined not to be a significant covariate. Based on observed data, 4 ADA positive participants with lower SAA levels (<0.1 IU/mL) at matching timepoints in Course 1 were observed in FIG. 42A and FIG. 42B. The SAA and SAC data for these 4 participants are highly correlated, suggesting that the low SAA observed may be due to low SAC. Seventeen ADA positive participants with high SAA levels (≥0.1 IU/mL) at matching timepoints in Course 1 were observed, suggesting that a low SAA may not be due to a positive ADA.

Part B (IV): As of the data cut-off date, analysis of participants receiving JZP 458 by IV administration showed that 20 of 61 (32.8%) participants had confirmed positive ADA toward JZP-458. Of these 20 ADA positive participants, 9 participants experienced treatment-related hypersensitivity reactions during the study. A total of 41 participants were ADA negative toward JZP-458 and 5 of these participants experienced treatment-related hypersensitivity reactions during the study. Based on observed data, 3 ADA positive participants with lower SAA levels (<0.1 IU/mL) at matching timepoints in Course 1 were observed (FIG. 42A and FIG. 42B). The SAA and SAC data for these 3 participants are highly correlated, suggesting that the low SAA observed may be due to low SAC.

See FIG. 43 for a summary of the immunogenicity results.

While embodiments and applications of the present invention have been described in some detail by way of illustration and example, it would be apparent to those of skill in the art that many additional modifications would be possible without departing from the inventive concepts contained herein. All references cited herein are hereby incorporated in their entirety.

The invention claimed is:

1. A method of treating cancer in a human subject in need thereof, said method comprising administering to the human subject L-asparaginase, other than an *Escherichia coli* derived asparaginase, as a set of time-ordered doses;

wherein the set of time-ordered doses comprises two series of three doses, wherein a first dose and a second dose are each 25 mg/m$^2$ and a third dose is 50 mg/m$^2$, wherein the first, the second and the third dose are administered on a Monday, Wednesday and Friday, respectively, and wherein the L-asparaginase is a tetramer wherein each monomer of the tetramer comprises SEO ID NO:1, wherein the doses at 25 mg/m$^2$ are administered intravascularly and the doses at 50 mg/m$^2$ are administered intramuscularly, and wherein the cancer is a blood cell cancer treatable by asparagine depletion, thereby treating cancer in the subject.

2. The method of claim 1, wherein the human subject exhibited hypersensitivity to the *Escherichia coli* derived asparaginase.

3. The method of claim 1, wherein the human subject is an adult.

4. The method of claim 1, wherein the human subject is pediatric.

5. The method of claim 1, wherein the L-asparaginase demonstrates less than 6% aggregation.

6. The method according to claim 1, wherein the L-asparaginase is co-administered with one or more other chemotherapeutic agents as part of a multi-agent chemotherapeutic regimen.

7. A method of substituting a treatment of a human subject for cancer, wherein the human subject is in need thereof, said method comprising administering to the human subject, as a substitute for an *Escherichia coli* derived asparaginase, a series of six doses of an L-asparaginase, wherein a first dose and a second dose are each 25 $mg/m^2$ and a third dose is 50 $mg/m^2$, wherein the first, the second and the third dose are administered on a Monday, Wednesday and Friday, respectively, and wherein the L-asparaginase is a tetramer wherein each monomer of the tetramer comprises SEO ID NO: 1 wherein the doses at 25 $mg/m^2$ are administered intravascularly and the doses at 50 $mg/m^2$ are administered intramuscularly, wherein the L-asparaginase is not an *Escherichia coli* derived asparaginase, and wherein the cancer is a blood cell cancer treatable by asparagine depletion, thereby substituting a treatment of the human subject for cancer.

8. The method of claim 7, wherein each respective dose of the *Escherichia coli* derived asparaginase in a plurality of doses of the *Escherichia coli* derived asparaginase is separately substituted with an instance of the series of six doses of the L-asparaginase.

9. The method of claim 7, wherein the human subject exhibited hypersensitivity to the *Escherichia coli* derived asparaginase.

10. The method of claim 7, wherein the human subject is an adult.

11. The method of claim 7, wherein the human subject is pediatric.

12. The method of claim 7, wherein the L-asparaginase demonstrates less than 6% aggregation.

13. The method according to claim 7, wherein the L-asparaginase is co-administered with one or more other chemotherapeutic agents as part of a multi-agent chemotherapeutic regimen.

14. The method according to claim 1, wherein the cancer is acute lymphoblastic leukemia (ALL) or lymphoblastic lymphoma (LBL).

15. The method according to claim 1, wherein the cancer is acute myeloid leukemia (AML).

16. The method according to claim 1, wherein the cancer is diffuse large B-cell lymphoma (DLBCL).

17. The method according to claim 7, wherein the cancer is acute lymphoblastic leukemia (ALL) or lymphoblastic lymphoma (LBL).

18. The method according to claim 7, wherein the cancer is acute myeloid leukemia (AML).

19. The method according to claim 7, wherein the cancer is diffuse large B-cell lymphoma (DLBCL).

20. The method of claim 1, wherein the first dose is administered on a Monday, the second dose is administered on a Wednesday, and the third dose is administered on a Friday.

* * * * *